US009426259B2

(12) United States Patent
Gower et al.

(10) Patent No.: US 9,426,259 B2
(45) Date of Patent: Aug. 23, 2016

(54) CLIENT SERVER INTERACTION FOR GRAPHICAL/AUDIO APPLICATIONS

(71) Applicant: Fen Research Limited, Cambridge (GB)

(72) Inventors: Andrew Christopher Gower, Cambridge (GB); James Christopher Bielby, Cambridge (GB)

(73) Assignee: Fen Research Limited, Cambridge (GB)

(*) Notice: Subject to any disclaimer, the term of this patent is extended or adjusted under 35 U.S.C. 154(b) by 257 days.

(21) Appl. No.: 14/173,761

(22) Filed: Feb. 5, 2014

(65) Prior Publication Data
US 2015/0222730 A1 Aug. 6, 2015

(51) Int. Cl.
*H04L 29/06* (2006.01)
*G06F 9/54* (2006.01)
*G06F 9/44* (2006.01)

(52) U.S. Cl.
CPC .............. *H04L 67/42* (2013.01); *G06F 9/542* (2013.01); *H04L 65/607* (2013.01); *G06F 8/34* (2013.01)

(58) Field of Classification Search
CPC ................................ H04L 65/607; G06F 8/34
See application file for complete search history.

(56) References Cited

U.S. PATENT DOCUMENTS

| 6,295,367 | B1* | 9/2001 | Crabtree | G01S 3/7865 382/103 |
| 8,441,496 | B1* | 5/2013 | Maguire | G06T 15/005 345/419 |
| 2003/0236800 | A1* | 12/2003 | Goeltzenleuchter | G06F 11/1492 |
| 2011/0138190 | A1* | 6/2011 | Chase | G06F 21/6227 713/189 |
| 2012/0109928 | A1* | 5/2012 | Prasad | G06F 17/30371 707/709 |
| 2012/0283008 | A1 | 11/2012 | Martone | |
| 2013/0339421 | A1* | 12/2013 | Dawson | A63F 13/60 709/203 |
| 2014/0362086 | A1* | 12/2014 | Brockmann | H04N 19/56 345/440 |
| 2014/0362930 | A1* | 12/2014 | Brockmann | H04N 19/103 375/240.26 |
| 2015/0149394 | A1* | 5/2015 | Yedidia | G06N 99/005 706/12 |

OTHER PUBLICATIONS

Extended EP Search Report mailed Apr. 16, 2015 for European patent application No. 15153857.6, 6 pages.

* cited by examiner

*Primary Examiner* — Lashonda Jacobs
(74) *Attorney, Agent, or Firm* — Bea Koempel-Thomas; Lee & Hayes, PLLC

(57) ABSTRACT

Client server interaction for networked graphical and/or audio applications is described, for example, for networked games. A graph of connected nodes at a server encodes a state, a behavior and a plurality of graphical and/or audio displays of an application. For example, the application may be a game and the plurality of displays may be displays of client computers participating in the game. In various examples, client computers are connected to the server over a communications network and each client executes a copy of at least part of the graph of connected nodes received from the server so that different clients can have different displays. In examples, update commands are generated and sent to clients on the basis of changes to the graph of connected nodes at the server. In examples, events occurring at a client update a prediction copy of a client graph of connected nodes.

19 Claims, 62 Drawing Sheets

Continuing from Fig. 55

CLIENT SERVER INTERACTION FOR GRAPHICAL/AUDIO APPLICATIONS

COPYRIGHT NOTICE

A portion of the disclosure of this patent contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates to client server interactions. It is particularly related to, but in no way limited to, multi-client deployments whereby multiple end users interact simultaneously with a single software application maintained by a server.

BACKGROUND

There are many situations where client server deployments are used to enable client computers to interact with one or more remote servers over a network. For example, web services, cloud based services and networked applications of many types (such as email, calendar, document processing, games and others. Where applications are networked these typically comprise a graphical user interface or other graphical display and optionally also an audio display.

An existing way to implement such a client server deployment is with a thin client approach. With this approach the server runs the application, and sends each client a video stream of the application which the client displays. The client then sends input events (keyboard, mouse, etc. . . . ) back to the server which processes them. The client merely acts as a remote display and input device without needing any understanding of the specific application being run.

The advantage of this approach is it is relatively simple to implement and is very general purpose (once the client and server are written they can be used to run any application in a networked fashion, even potentially including applications which were not originally designed to be run over a network). However disadvantages include: sending a video stream to each client is very bandwidth and resource intensive; any network latency will result in a delay between the client providing an input event and the corresponding effect being shown on that client's display, if multiple users are using the application simultaneously it is difficult for them to see different views of the same application. Take for example a networked game application, it might be desirable that each client displays a different area of the map, or each client might have private information only they are supposed to know (for example what cards they are holding in their hand).

Another way to implement a client server deployment is by programming a custom server, client, and protocol for each application. (Instead of using a thin client approach). This way the client can already have many commonly used graphics assets preloaded, and have an understanding of how to fit them together. The protocol rather than just brute force sending the entire display sends just the information which the client needs to reconstruct the display based on its understanding of how the application works. For example for a hypothetical card game application the server can send just a few bytes indicating which cards are on the table, rather than a picture of the entire table, and the client then builds the picture of the table based on its own knowledge of how those cards must be placed. The server can also be programmed to send different information to different clients, so for instance one player cannot see cards held by another. Furthermore by programming a custom client the client can also be programmed to have some understanding of how the application works and hence predict what the server will do in response to certain input events. This allows it to display the result of an input before the server sends that result back, hence reducing perceived network latency.

The disadvantage of this custom client approach is complexity. It involves designing a custom server, client, and protocol for each application. Furthermore the server, client, and protocol must be developed in parallel and if any change is made to one, a corresponding change must be made to the other two. This is error prone and makes rapid prototyping difficult. If the client is also programmed to try and predict what the server will do it is even more complex, as much of the logic code on the server has to be written again on the client to allow it to make those predictions. The client may not have all the information (for example it may not know the cards in other player's hands) so the code on the client often cannot be a straight copy of the code on the server. Furthermore the client may not always predict correctly (for example if another client performs a conflicting action simultaneously), and therefore the client and server must be able to compensate for that incorrect prediction. All of which adds significant expense and risk of bugs compared to just using a thin client approach.

The embodiments described below are not limited to implementations which solve any or all of the disadvantages of known client server interaction processes and deployments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Client server interaction for networked graphical and/or audio applications is described, for example, for networked games. A graph of connected nodes at a server encodes a state, a behavior and a plurality of graphical and/or audio displays of an application. For example, the application may be a game and the plurality of displays may be displays of client computers participating in the game. In various examples, client computers are connected to the server over a communications network and each client executes a copy of at least part of the graph of connected nodes received from the server so that different clients can have different displays. In examples, update commands are generated and sent to clients on the basis of changes to the graph of connected nodes at the server. In examples, events occurring at a client update a prediction copy of a client graph of connected nodes.

A first aspect provides a computer implemented method at a server comprising:

executing, at a processor of the server, a graph of connected nodes that encode a state, a behavior and, a plurality of graphical and/or audio displays of an application;

receiving data from a plurality of clients connected to the server over a communications network, each of the clients executing a copy of at least part of the graph of connected nodes received from the server such that at least part of at least one of the graphical and/or audio displays is rendered at the clients;

from time to time computing update commands arranged to update the copies of the graph at the clients on the basis of changes to the graph of connected nodes at the server which occur as a result of the execution;

transmitting synchronization packets comprising the update commands to the clients over the communications network.

The graph of connected nodes comprises both the code of the application and its current state and is flexible enough to represent a wide variety of graphical applications. By using the graph of connected nodes in this way it is possible to transmit from the server to the client efficiently The synchronization packets may be transmitted using a general purpose communications protocol such as TCP or any other packet-based communications protocol.

A second aspect provides a client computer comprising:

a processor arranged to execute a copy of at least part of a graph of connected nodes that encode a state, a behavior and, a graphical and/or audio display of an application, the copy of at least part of the graph of connected nodes having been received from a server executing the whole graph of connected nodes;

a communications interface arranged to receive from the server, over a communications network, synchronization packets, each packet comprising update commands;

the processor arranged to execute the update commands to update the copy of the at least part of the graph of connected nodes;

the processor arranged to render the graphical and/or audio display of the application at the client on the basis of the updated copy.

In this way a general purpose server, client and protocol may be used to send the application itself to the client several times a second (including a snapshot of both its code and current state). The client may then run the application to render the display and make predictions. As the client receives updated snapshots of the application repeatedly it is kept in synchrony with the server, even if it predicts incorrectly (for example due to the unpredictable actions of another client).

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
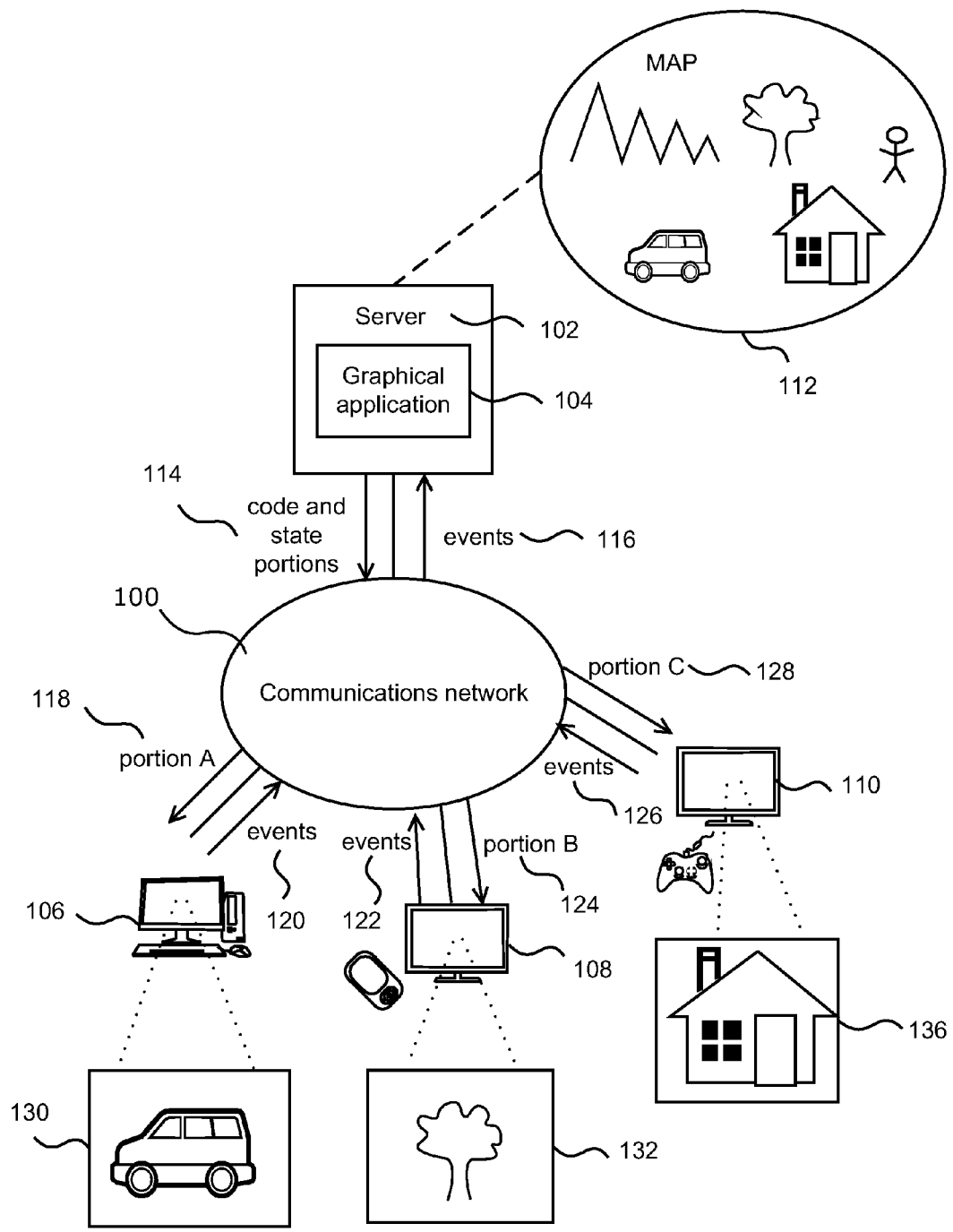
FIG. 1 is a schematic diagram of a client server deployment for a networked graphical and/or audio application.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 is a schematic diagram of a client server deployment for a networked graphical and/or audio application 104. A server 102 and a plurality of clients 106, 108, 110 are connected to a communications network 100 such that a graphical and/or audio application 104 at the server 102 is accessible to the clients. In this example one computer implemented server 102 is shown as a single entity for clarity. However, in practice many servers may be used to provide the graphical and/or audio application. The communications network 100 may be any suitable wired and/or or wireless communications network such as the internet. The clients may be any computing devices which are able to communicate with the server, to receive user input, and to render a graphical and/or audio display. For example, a personal computer, game device, interactive television, tablet computer, smart phone or other end user computing device.

The server executes the graphical and/or audio application 104 and in so doing maintains a state of the application and functions and data to enable rendering of a plurality of graphical and/or audio displays; one at each of the clients. The graphical and/or audio displays at the clients may be different from one another as indicated in the schematic representations 130, 132, 136 in FIG. 1. Some parts of the graphical and/or audio displays at the clients may be the same. The server knows about the displays at each of the clients and this is illustrated schematically at 112 in FIG. 1.

In various examples the graph of connected nodes comprises a sub graph for each client, the sub graph encoding a part of the graphical and/or audio displays which is private to the client; and a shared sub graph encoding: at least parts of the graphical and/or audio displays which may be rendered at a plurality of the clients, and state of the application shared by a plurality of the clients. By using a shared sub graph at the server it is possible for changes made in response to a first client to be seen by other clients. By having sub graphs which may be private to clients the networked application is able to provide appropriate security to different clients. For example, an end user at a first client is able to use the networked graphical application in a manner private from a second client.

The server executes the graphical and/or audio application in the form of a graph of connected nodes which encode a state, a behavior and, a plurality of graphical and/or audio displays of an application (one for each client and one for shared display elements for example). Each client has a copy (referred to as an authoritative version) of at least part of the graph of connected nodes. For example, a copy of the part of the graph which encodes the state, behavior and display of the application at the client. A client may make a copy of its authoritative version of the graph of connected nodes. This is referred to as a prediction copy.

In various examples a first one of the clients executes a first part of the graph of connected nodes and a second one of the clients executes a second part of the graph of connected nodes, the first and second parts being different subsets of the graph of connected nodes.

In various examples, each node comprises zero or more properties, zero or more labels and zero or more slots, wherein a property may comprise a function, a slot comprises zero, one or more other nodes, and a label stores an automatically set value indicating the position of the node in the slot it is in.

Each client is able to communicate with the server using a communications protocol which may be a packet-based communications protocol. In some examples, the communications protocol ensures a sequence in which packets are processed. Using the communications protocol the server receives data about events occurring at the clients as indicated by arrows 120, 122, 126, 116 in FIG. 1. The server takes into account the event data during its execution of the graphical and/or audio application 104.

The server is arranged to generate and send synchronization packets to the clients. Different synchronization packets may be sent to different clients. The synchronization packets comprise update commands generated from the graph of connected nodes at the server. The update commands act to send code and state portions 114 to the clients. In the example of FIG. 1 client 106 receives portion A 118, client 108 receives portion B 124 and client 110 receives portion C 128. The clients synchronize their authoritative versions of the graph using the synchronization packets.

In various examples methods comprise determining that configuration or contents of some nodes cannot change during execution of the graph and, as a result, reducing the size of the synchronization packets and/or reducing the computation of the update commands.

In various examples the server is arranged to determine that some portions of the graph of connected nodes have not changed since a last synchronization packet was transmitted to the clients and, as a result, reducing the size of the synchronization packets and/or reducing the computation of the update commands.

In various examples the server is arranged to determine that some portions of the graph of connected nodes are not present at any of the clients and, as a result, to reduce the computation of the update commands.

In various examples the server is arranged to receive a plurality of event objects from one or more of the clients, each of the event objects having an apply time being a time at which the event object is to be applied to the graph of connected nodes, and executing functions at properties of nodes of the graph according to the event objects and the apply times.

For example, the server may clamp the apply time so the apply time is not in the past. This enables problems due to network latency to be overcome which would otherwise potentially corrupt the networked application.

For example, the server may modify the apply time at the server so the apply time is not in the future by more than a threshold amount. This avoids problems for example if the clock on the client is adjusted whilst the application is running.

In examples, the server may place the event objects into an event queue, the queue also comprising event objects arising from internal events generated from the graph of connected nodes and which execute as a result of time passing.

In addition the clients may carry out prediction by applying events known to the client to the prediction copy of the client's graph of connected nodes. Where prediction is implemented a client uses the prediction copy to render its display of the graphical and/or audio application. Where prediction is not used a client may use the authoritative version to render its display.

In examples the server may calculate prediction metrics for each client and add the prediction metrics to the synchronization packets, the prediction metrics comprising at least an estimate of an insertion delta which is a value that compensates for both network latency and time difference between a clock on the server and a client clock. In this way prediction at the client may be improved as the client gains knowledge from the server about network latency and time differences.

In various examples, a client receives a user input event and generates an event object comprising an apply time being a time at which the event object is to be applied to the graph of connected nodes at the server; and applies the event object to a prediction copy of the copy of the at least part of the graph of connected nodes. The client may form the prediction copy from the copy of the at least part of the graph of connected nodes. In examples, the client, in response to executing the update commands, checks for errors in the prediction copy and corrects the errors.

In examples a client renders the graphical and/or audio display by finding nodes which represent graphical primitives in at least part of the prediction copy of the graph of connected nodes.

In various examples a client is arranged to find at least one node having a viewport property which refers to a node of a shared part of the whole graph of connected nodes at the server, the shared part of the whole graph being available to at least one other client.

Figure 2:
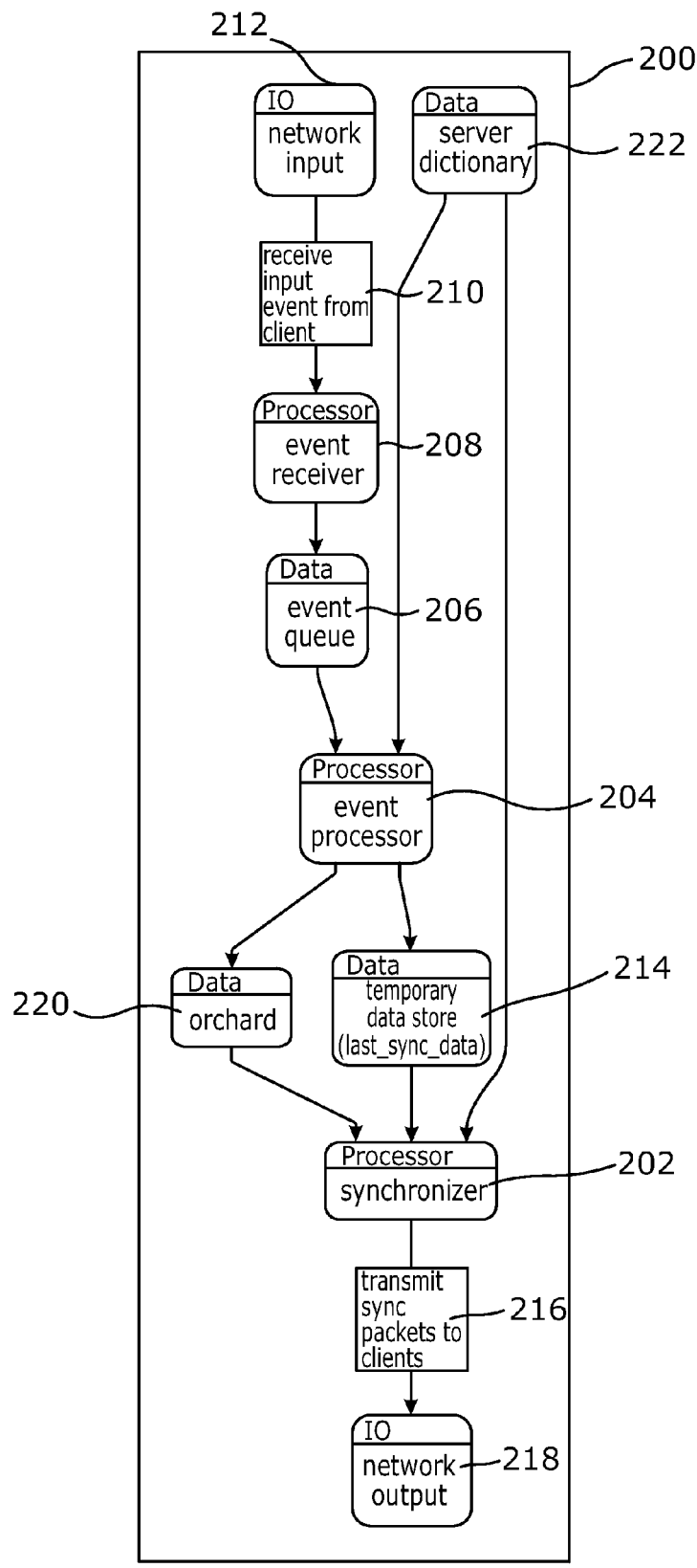
FIG. 2 is a schematic diagram of a server.
Figure 22:
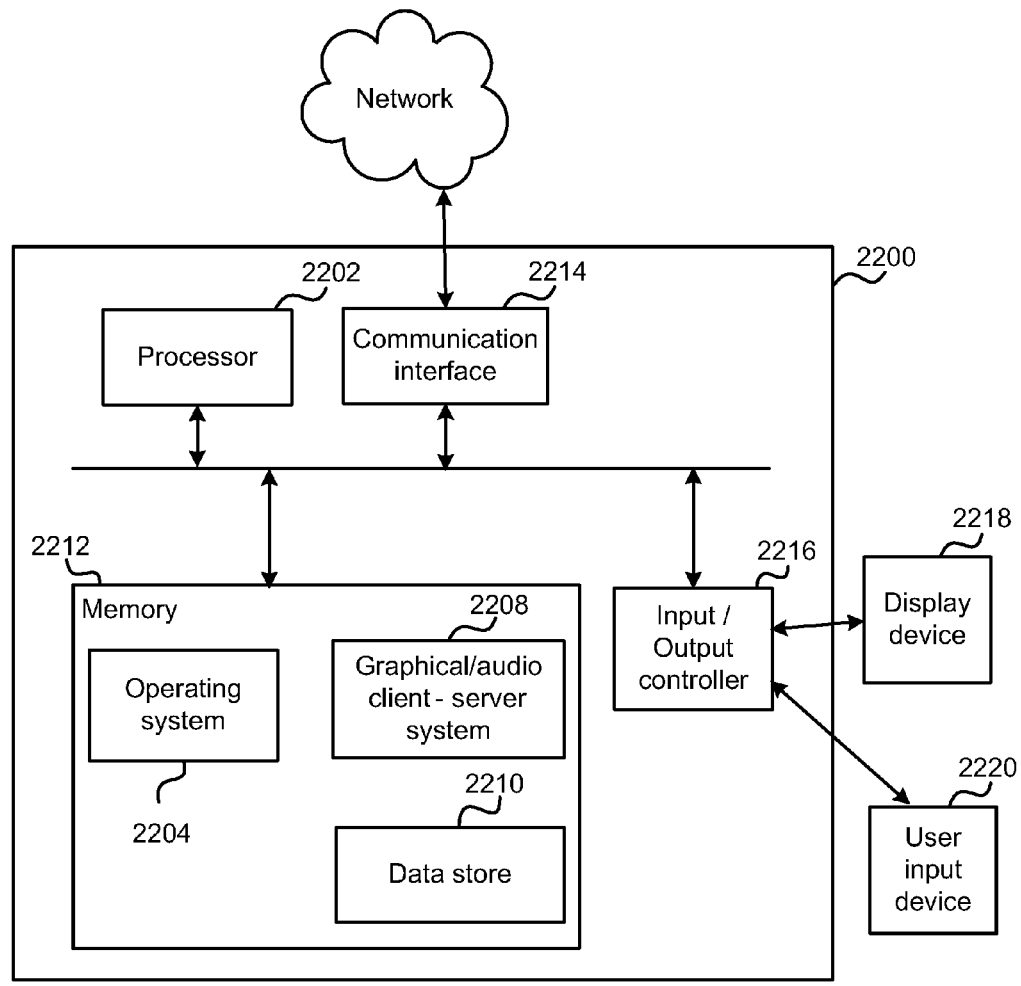
FIG. 22 is a schematic diagram of a computing-based device used to implement a server or a client.
Figure 23:
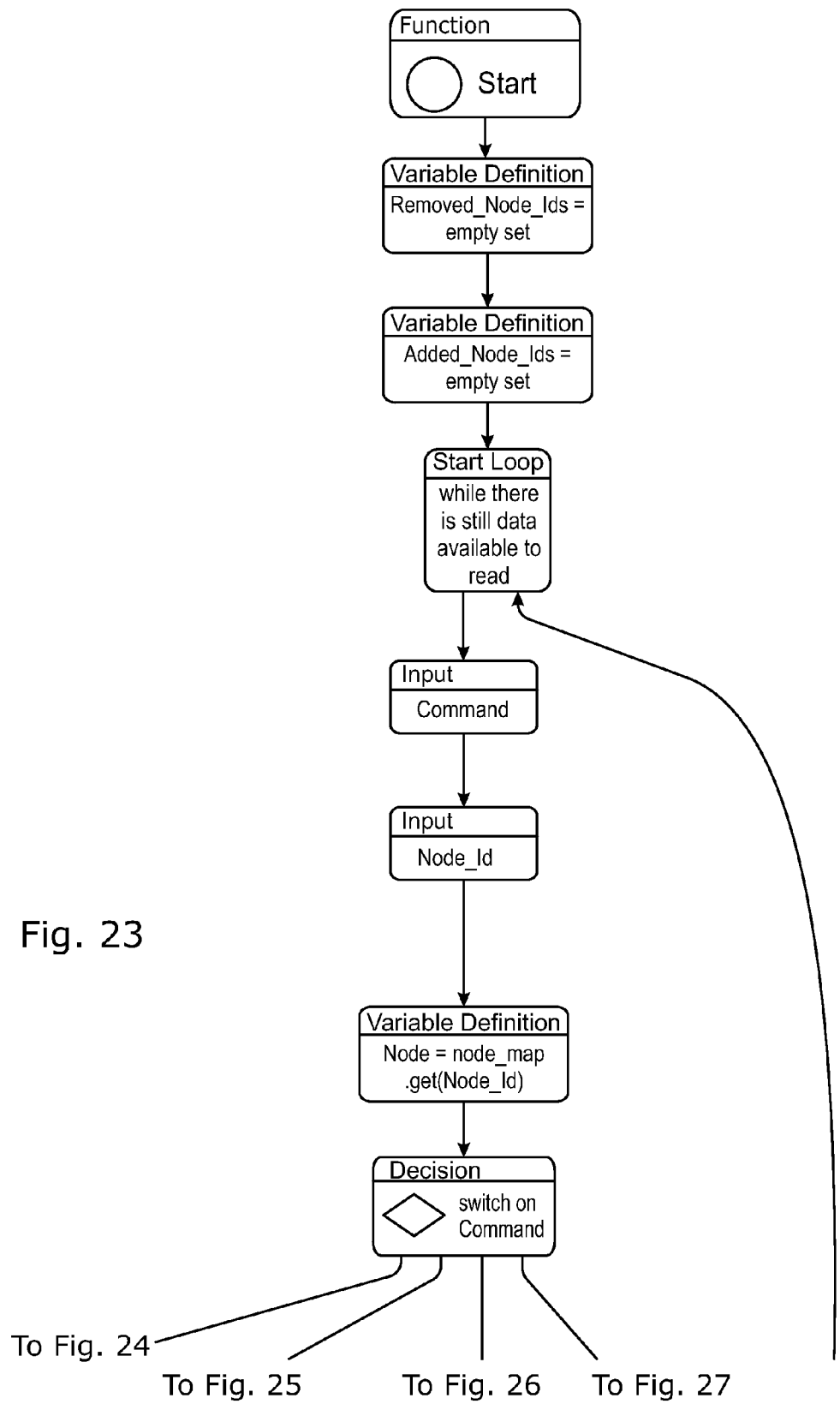
FIGS. 23 to 35 show a flow diagram of a method at a client of reading and processing synchronization packets.
Figure 24:
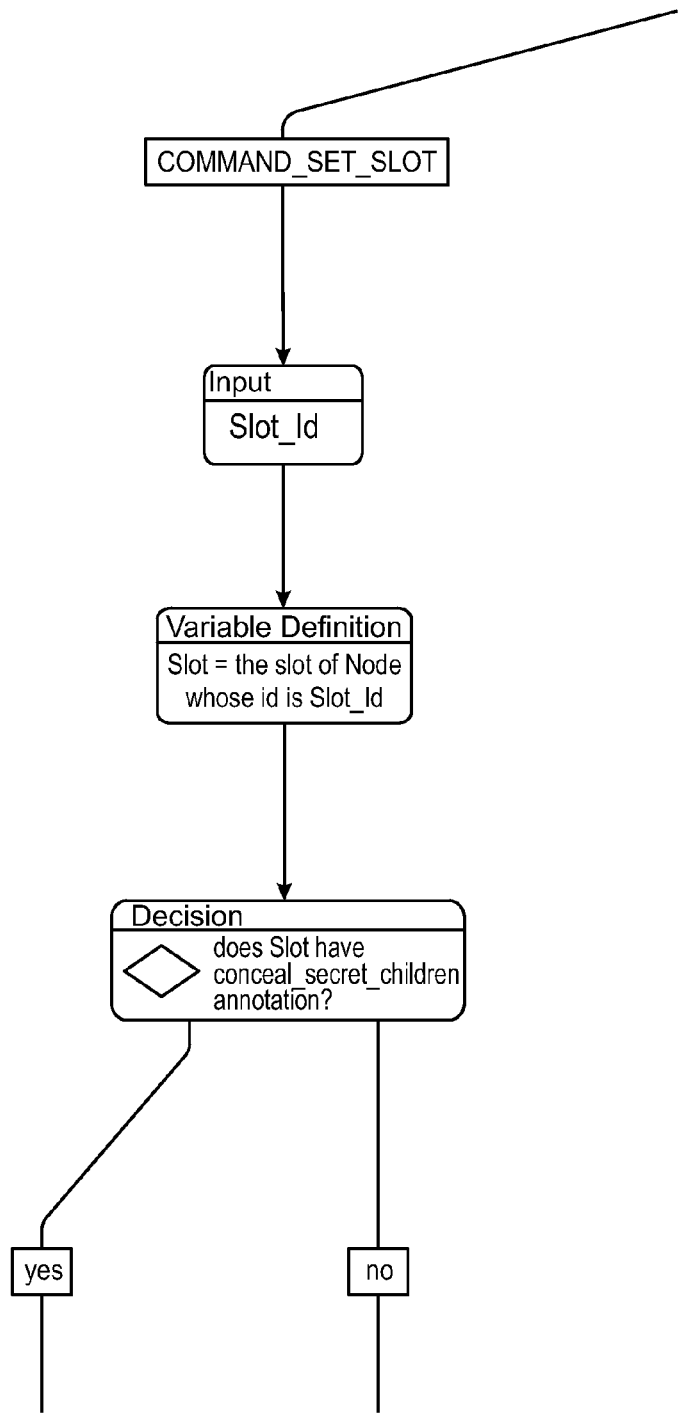
Figure 25:
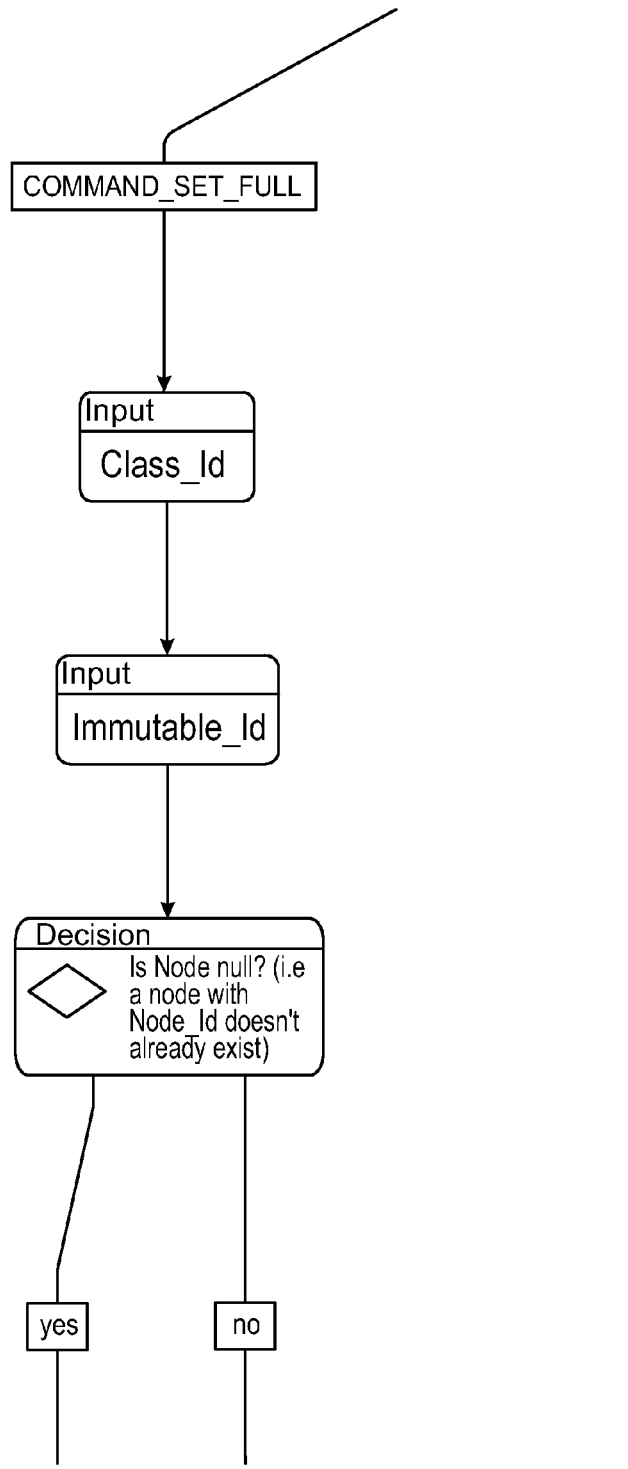
Figure 26:
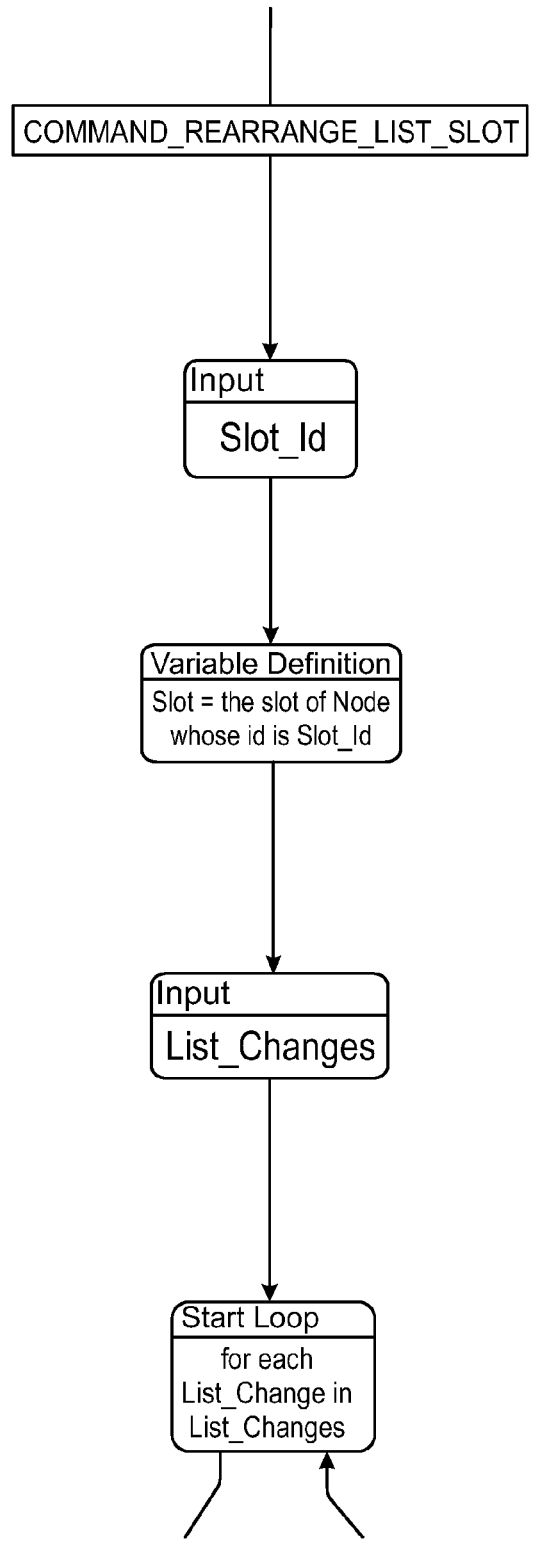
Figure 27:
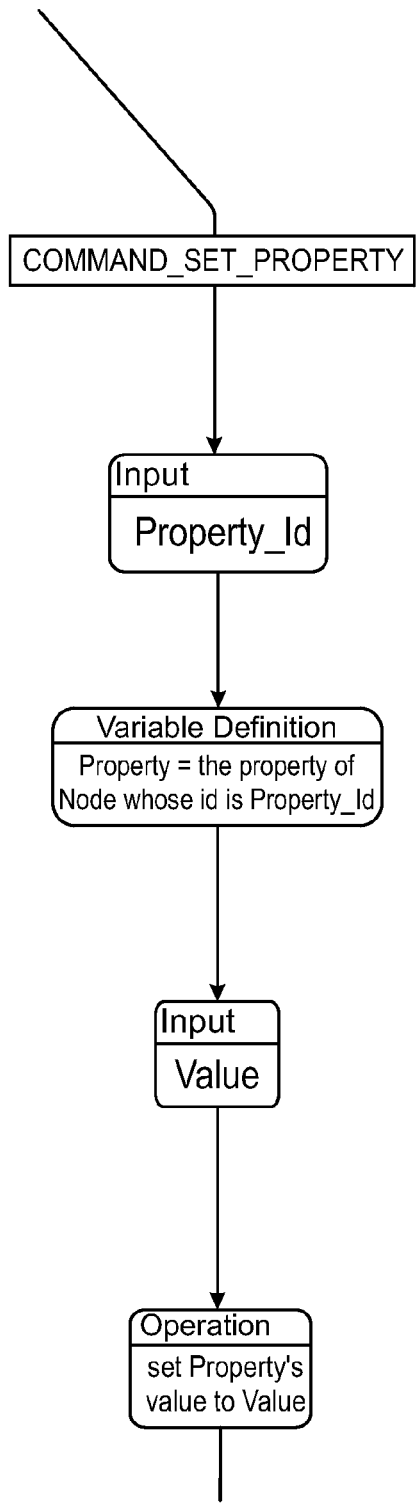
Figure 28:
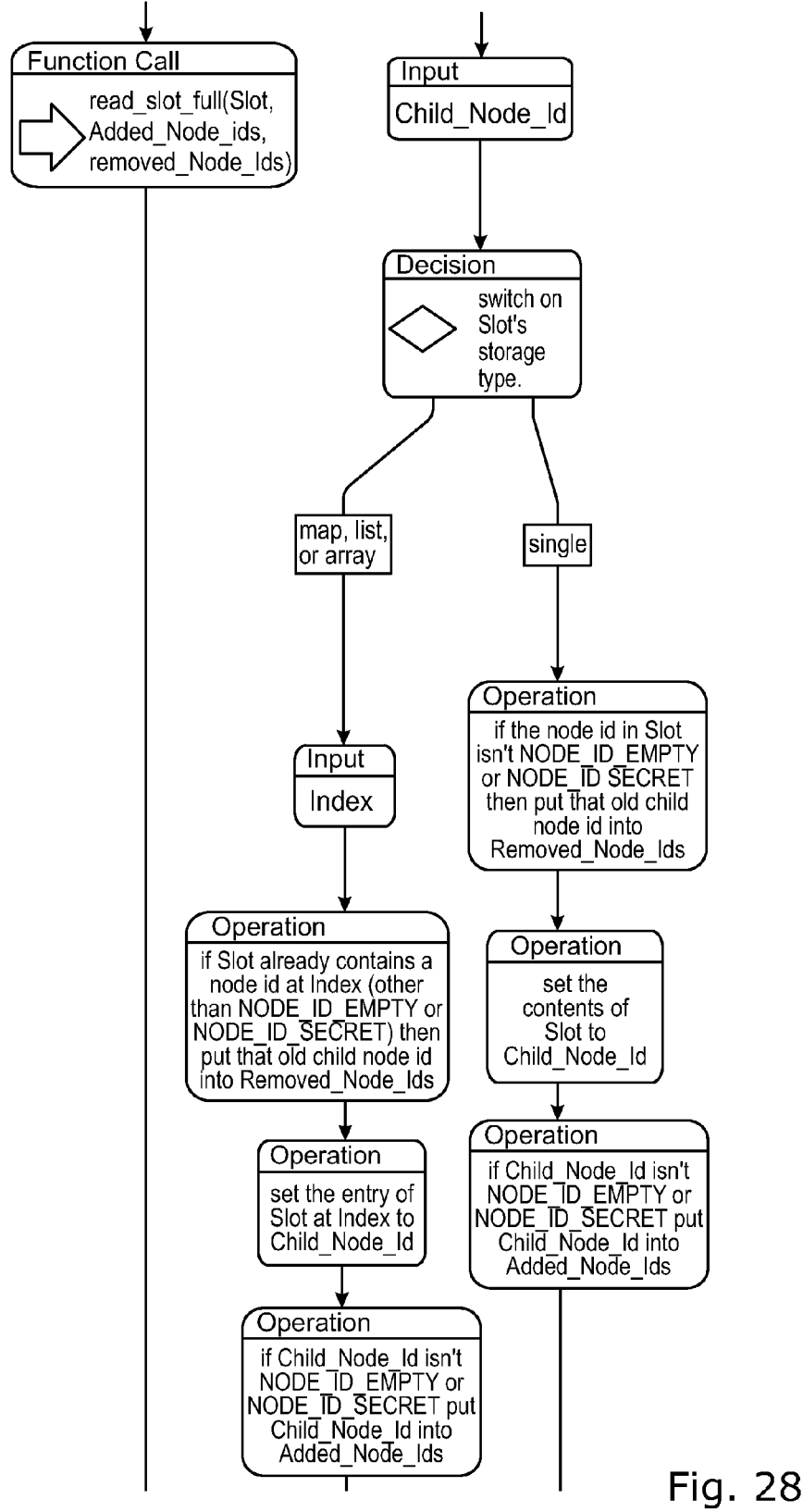
Figure 29:
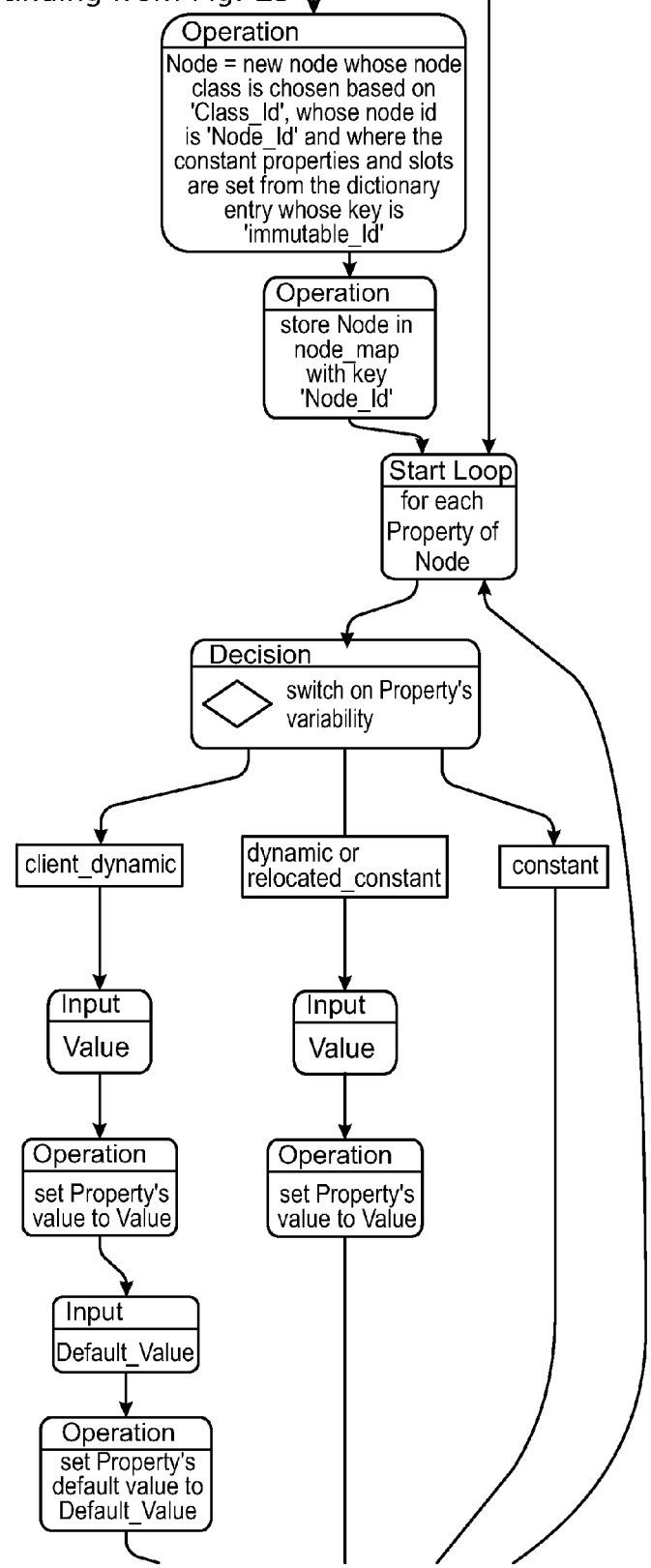
Figure 30:
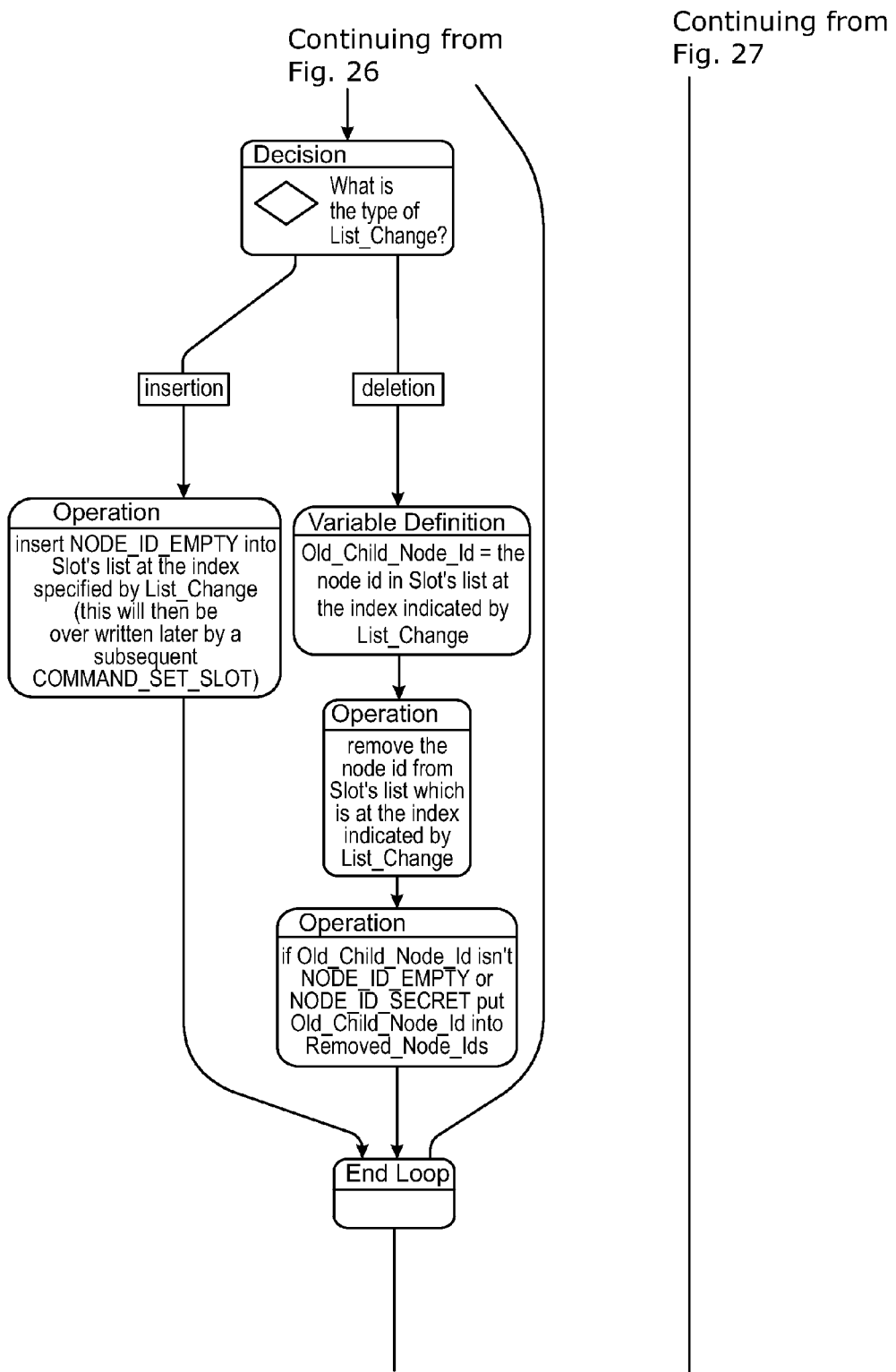
Figure 31:
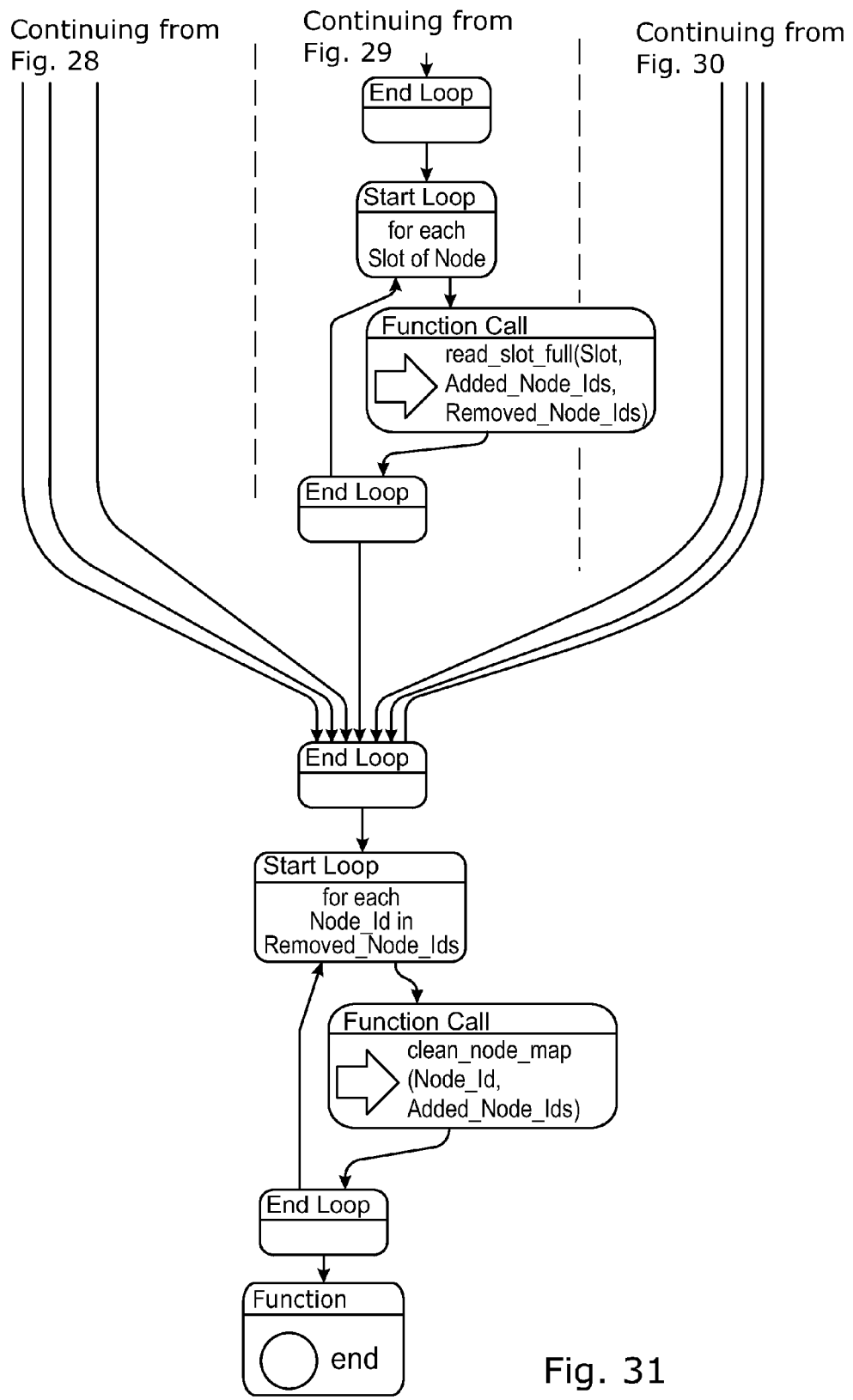
Figure 32:
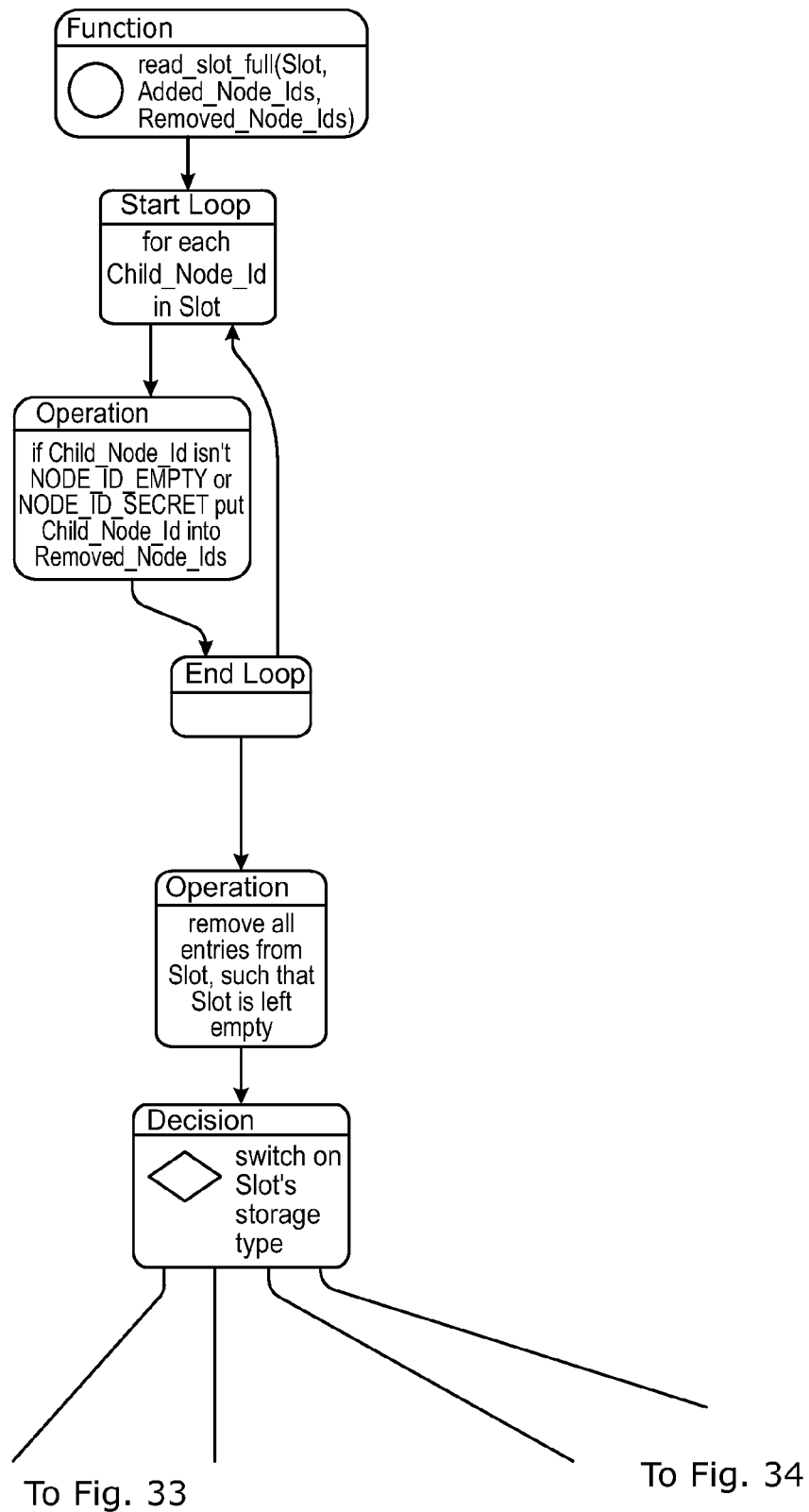
Figure 33:
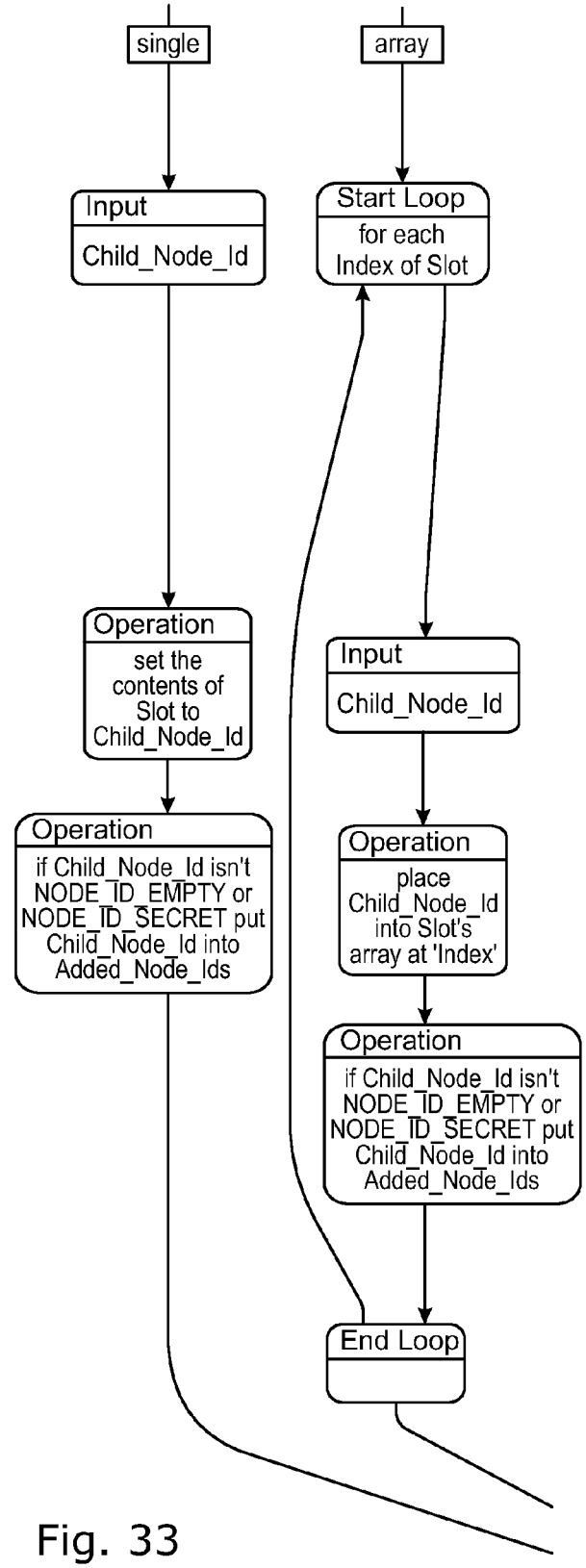
Figure 34:
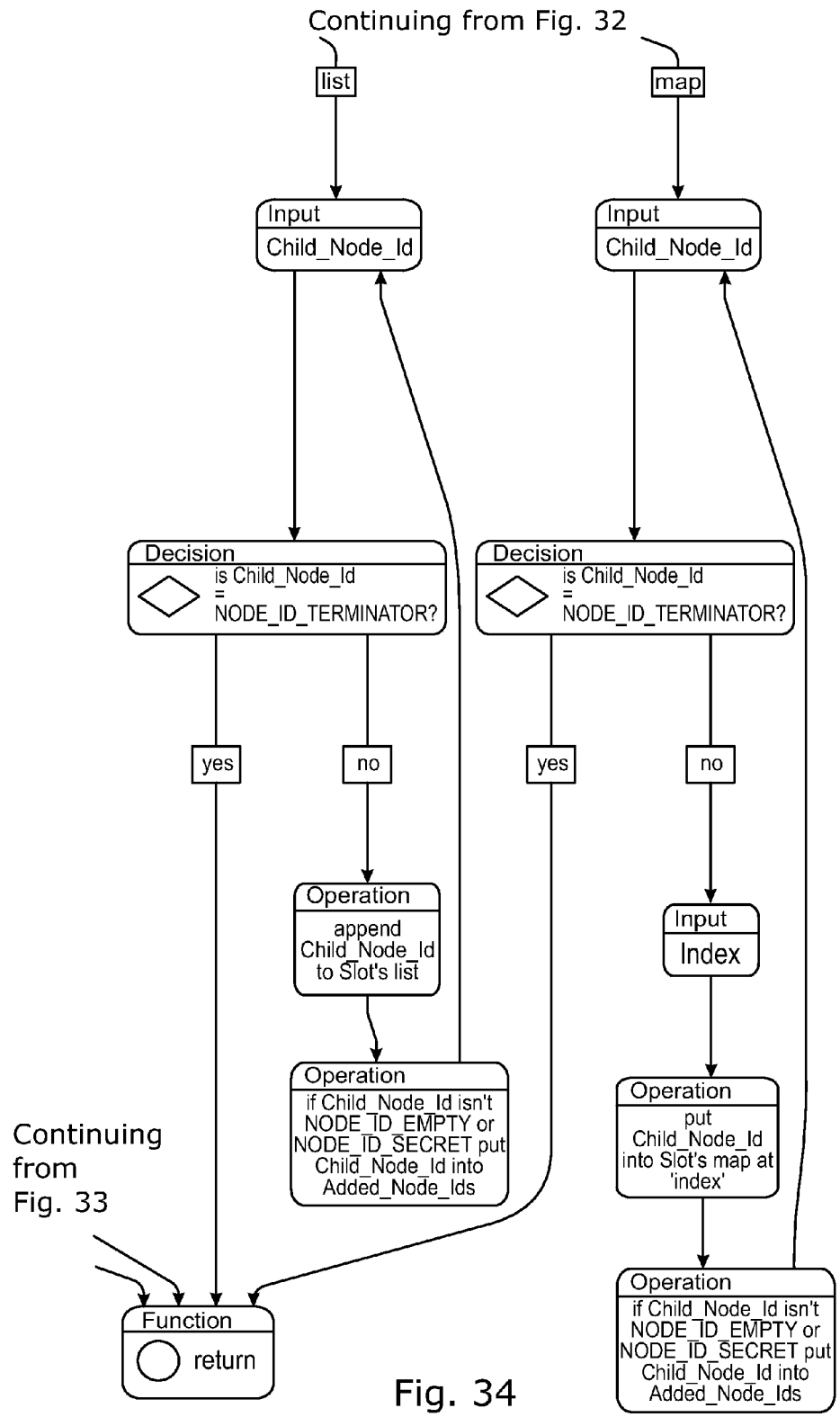
Figure 35:
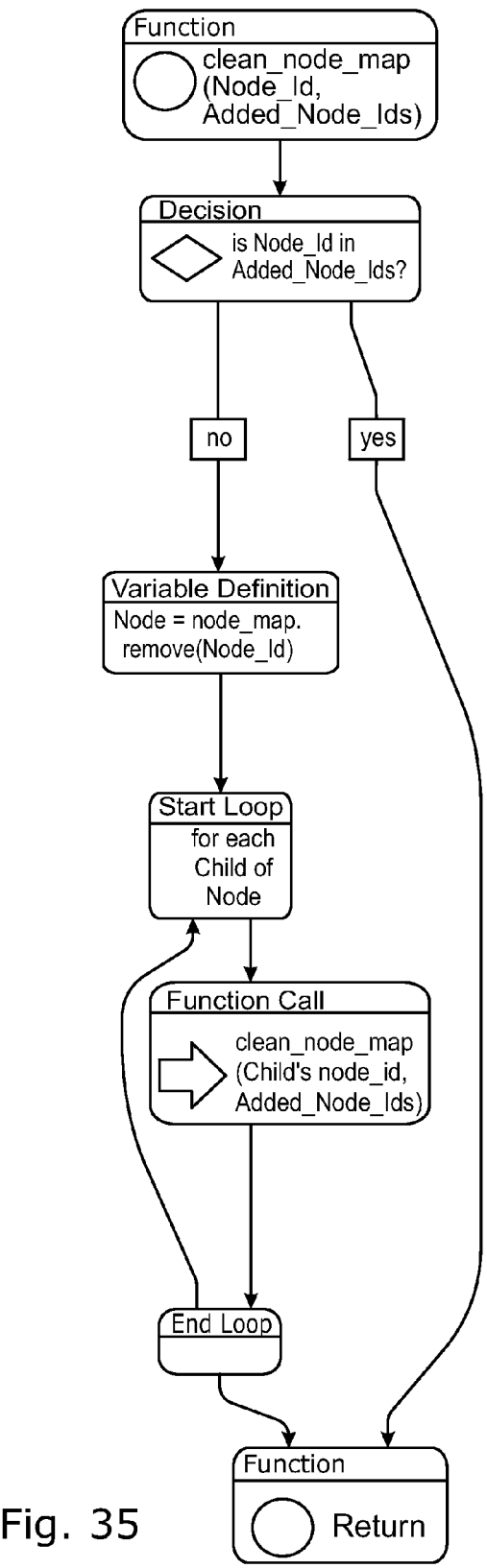
Figure 36:
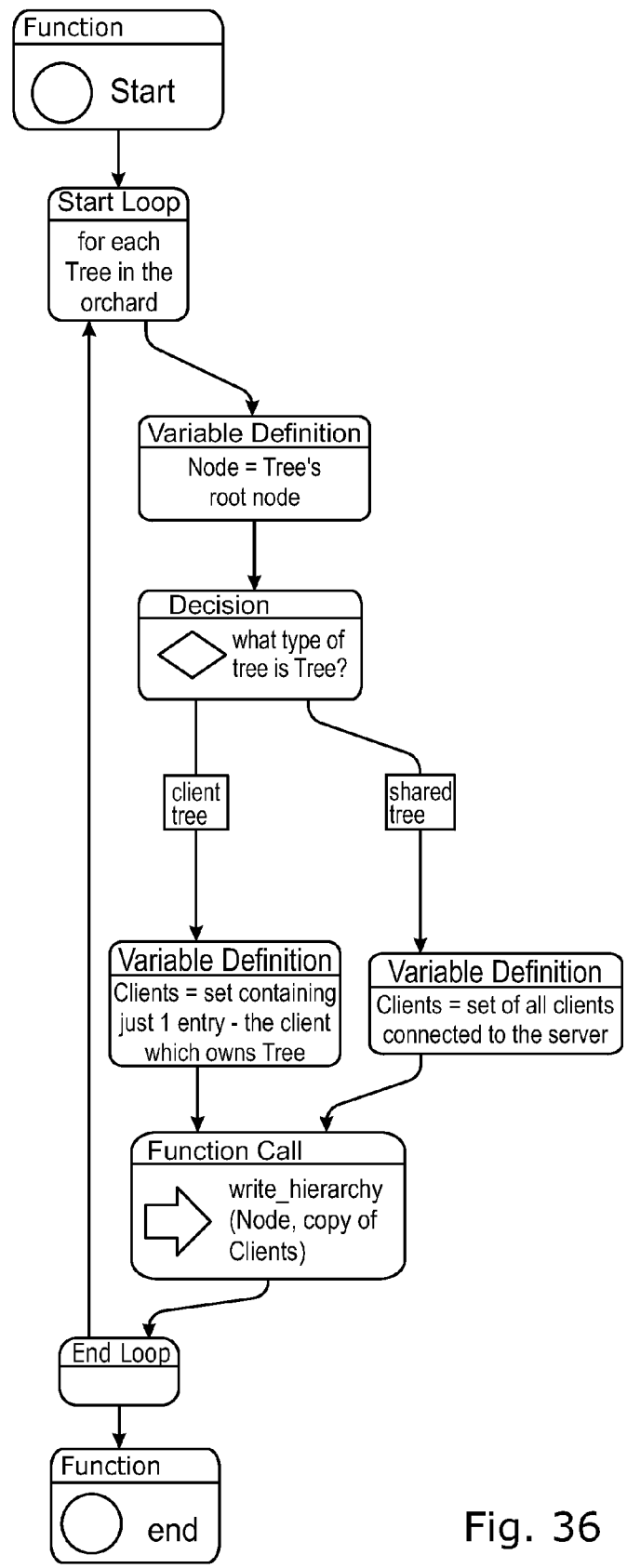
FIGS. 36 to 62 show a flow diagram of a method at a server of creating (writing) synchronization packets.
Figure 37:
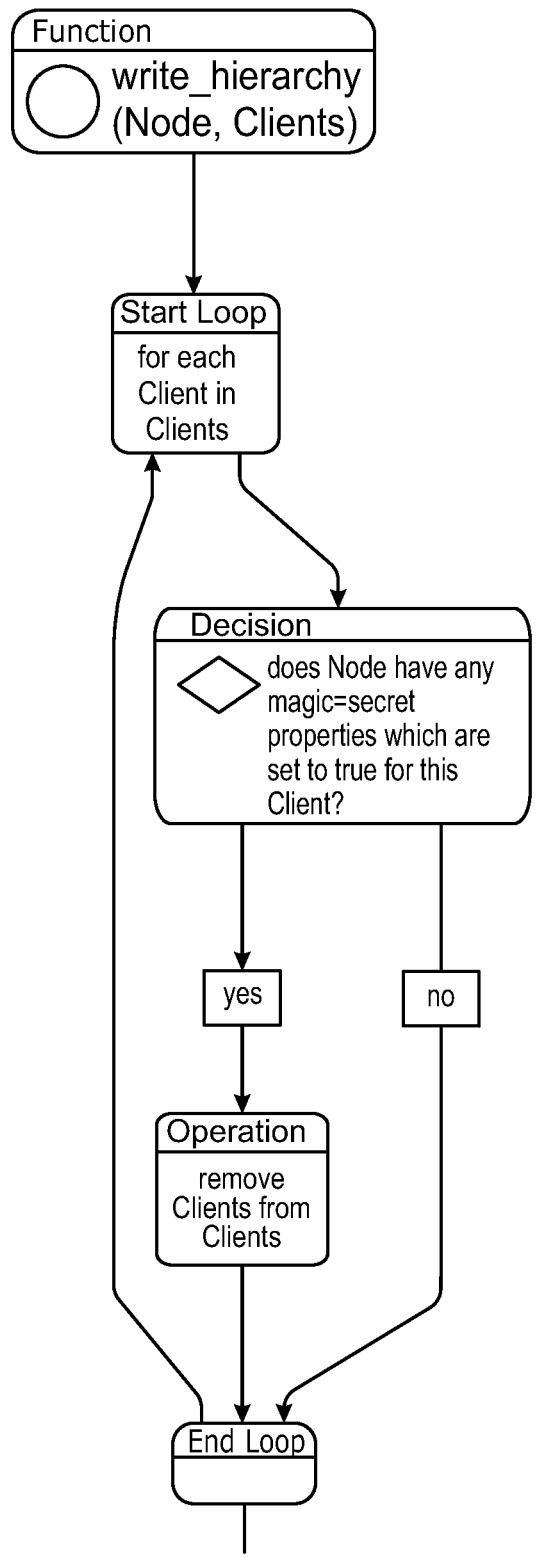
Figure 38:
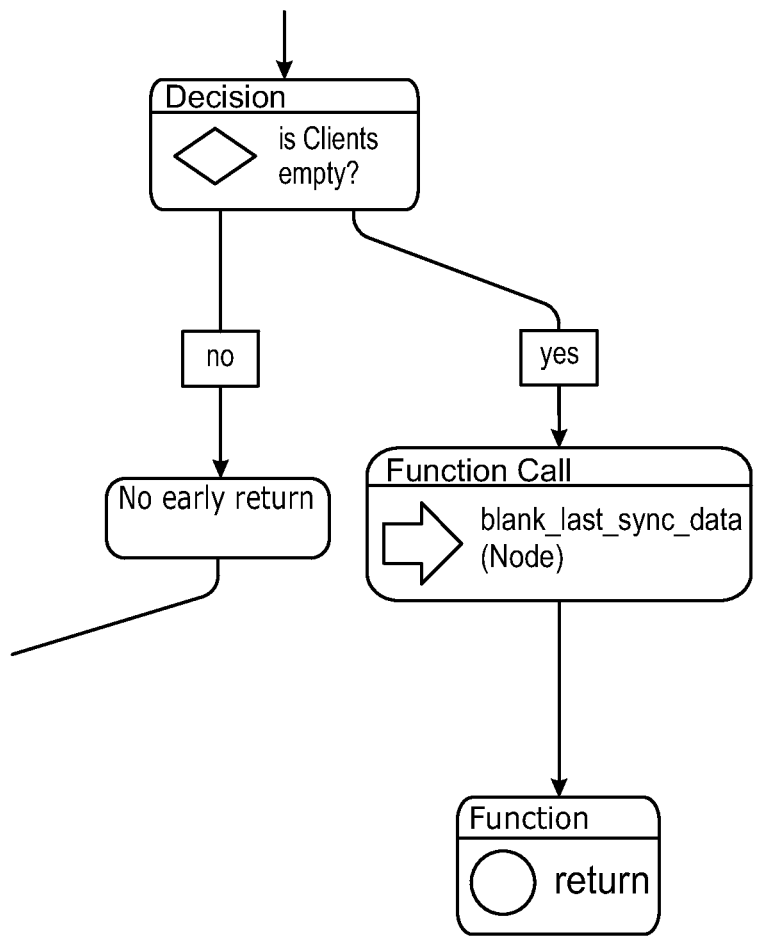
Figure 39:
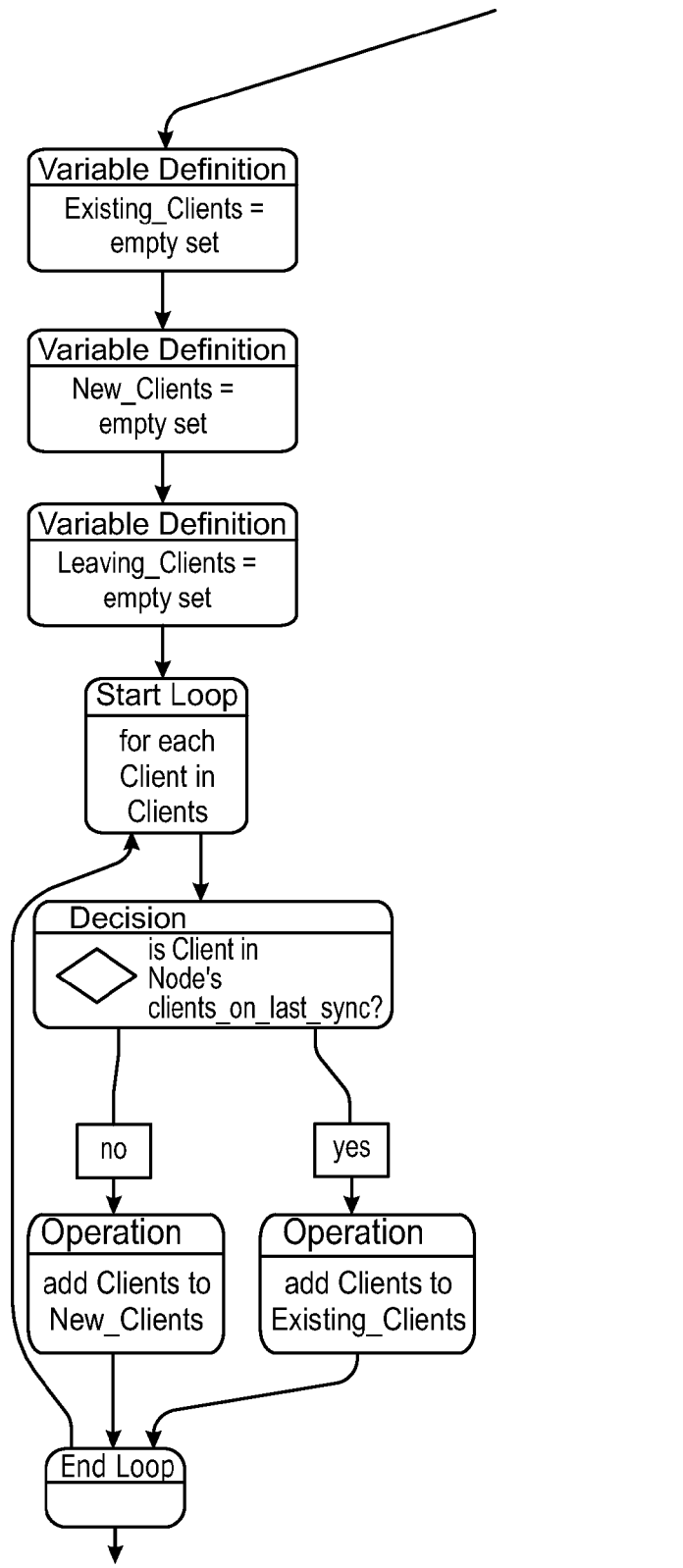
Figure 40:
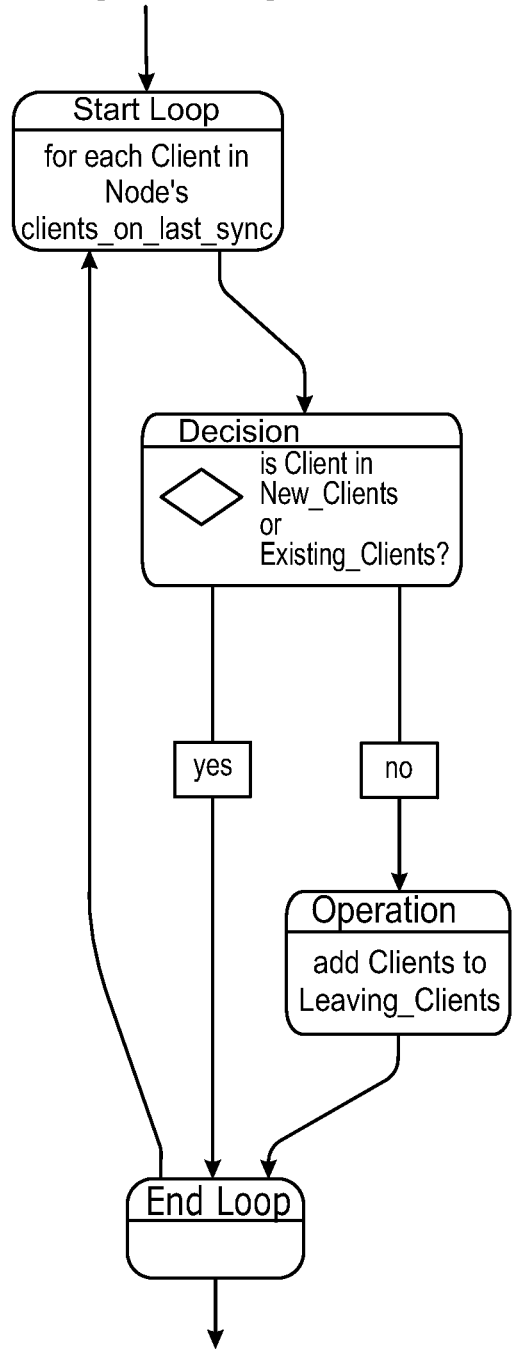
Figure 41:
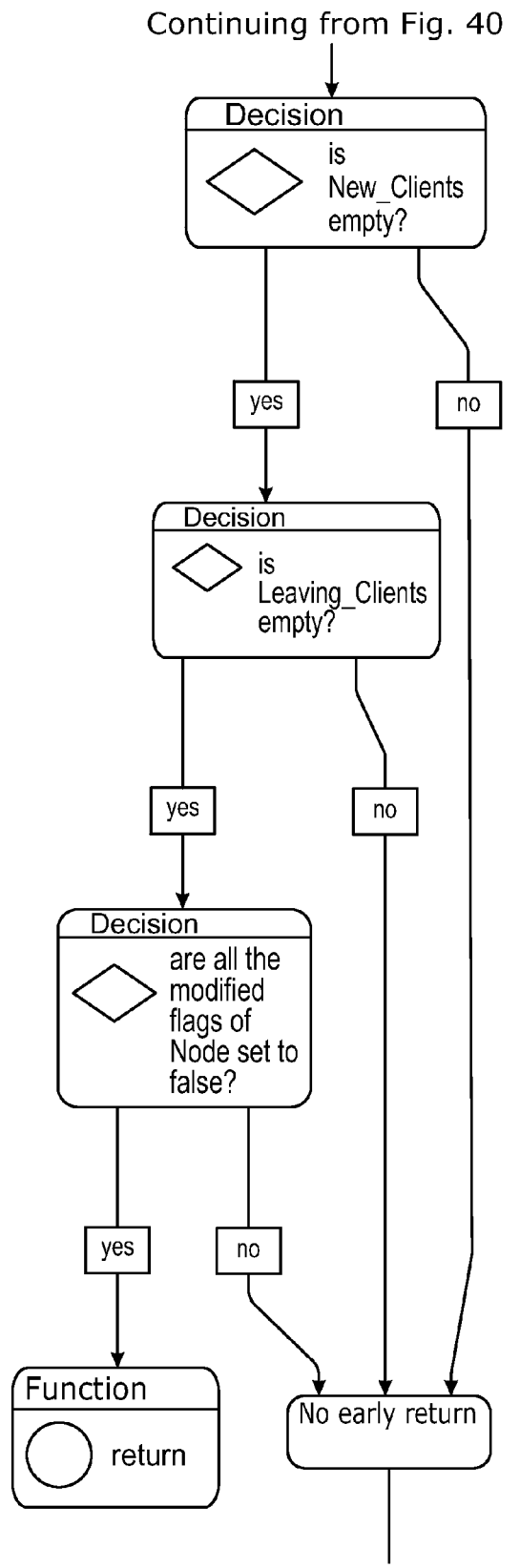
Figure 42:
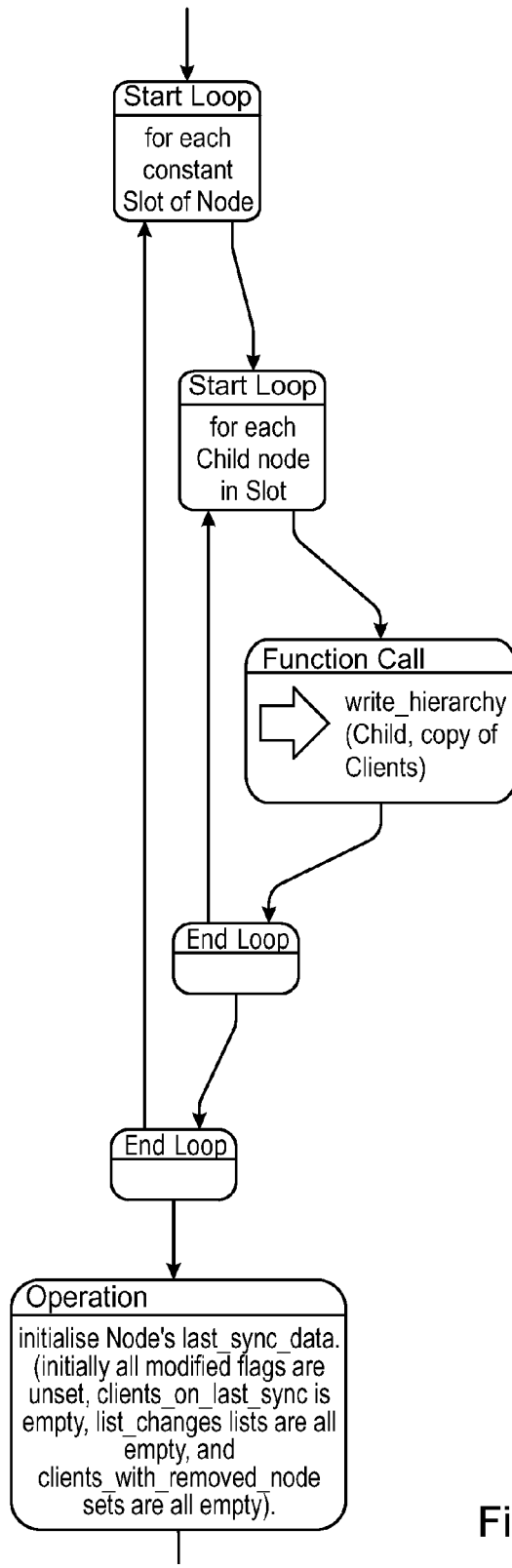
Figure 43:
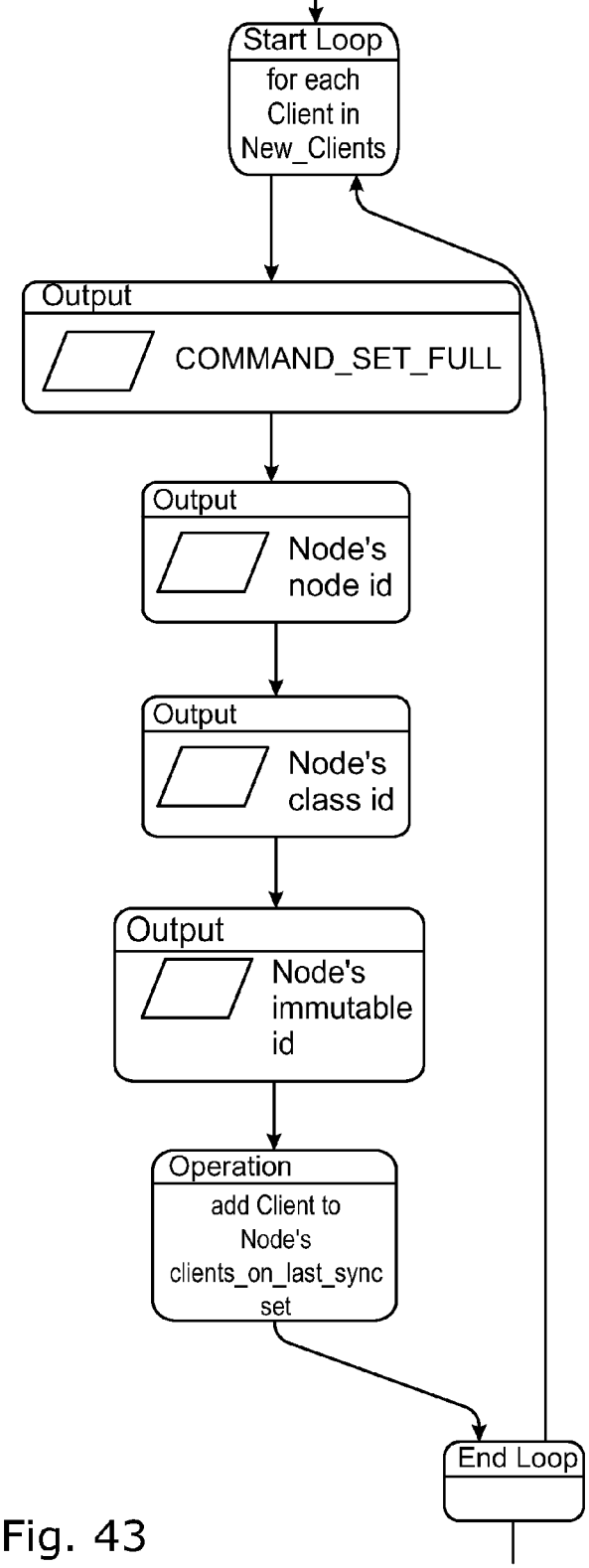
Figure 44:
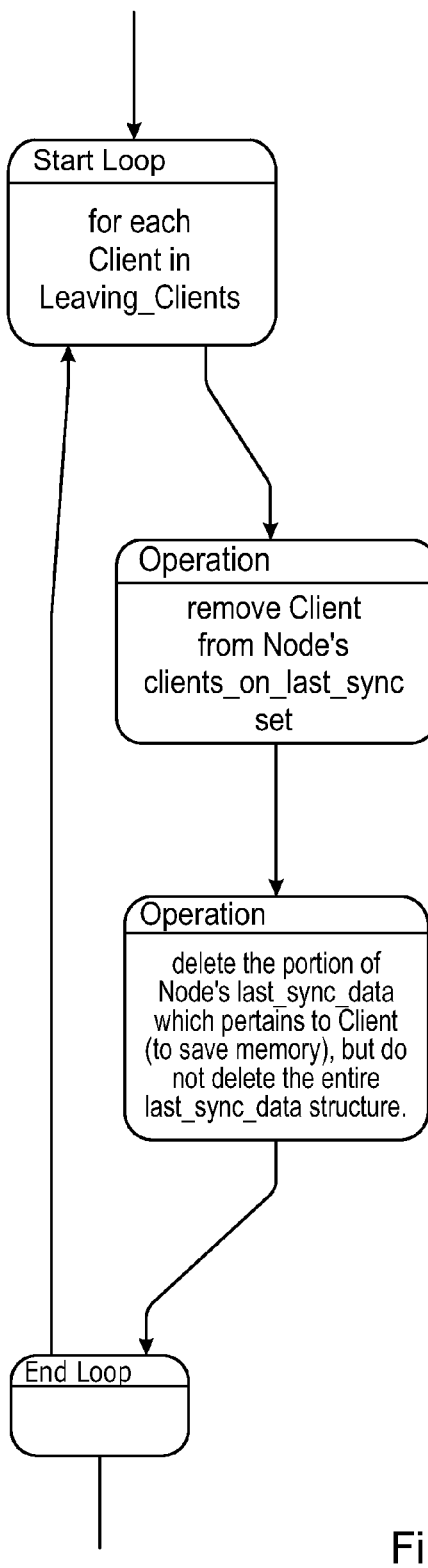
Figure 45:
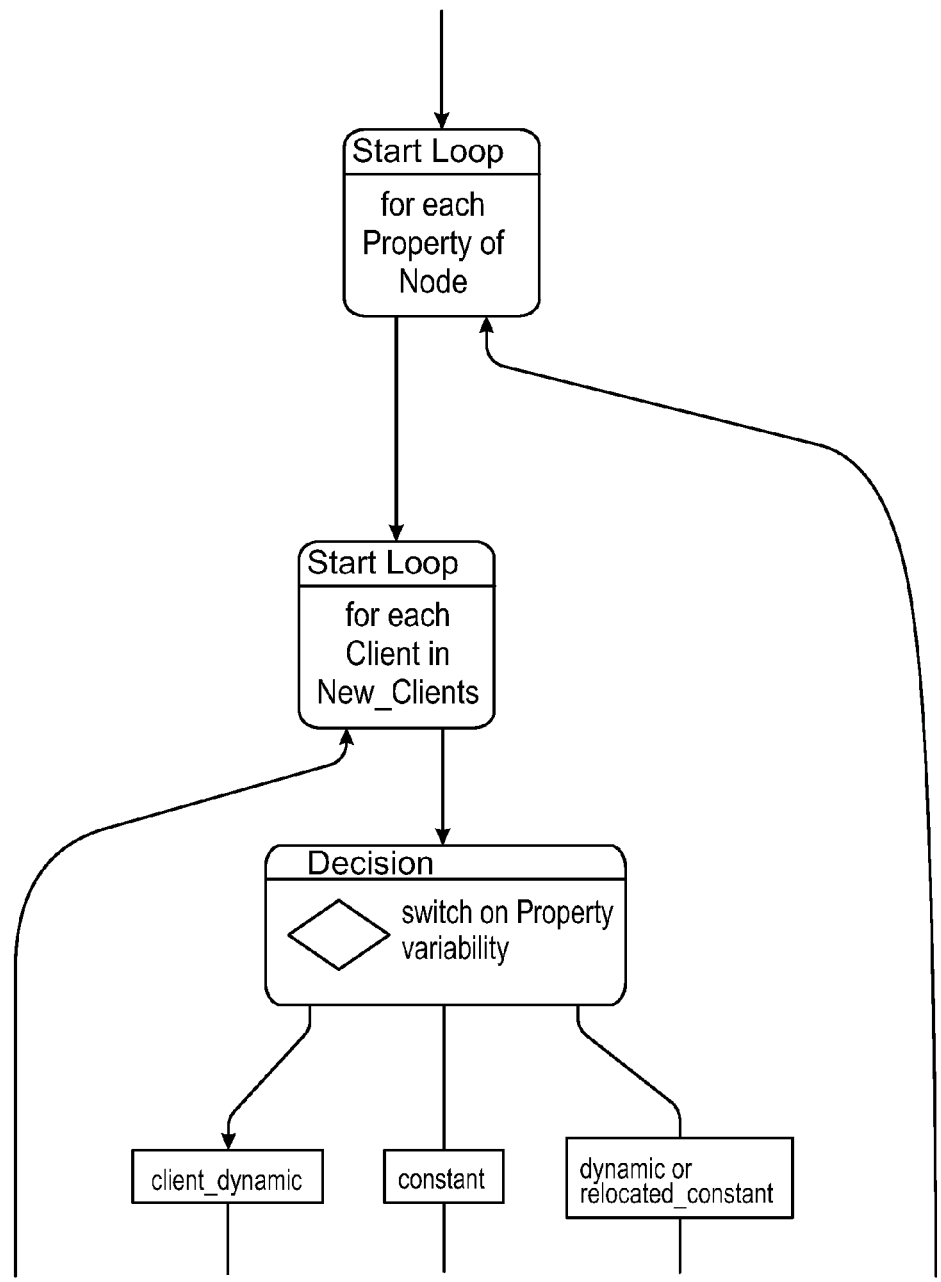
Figure 46:
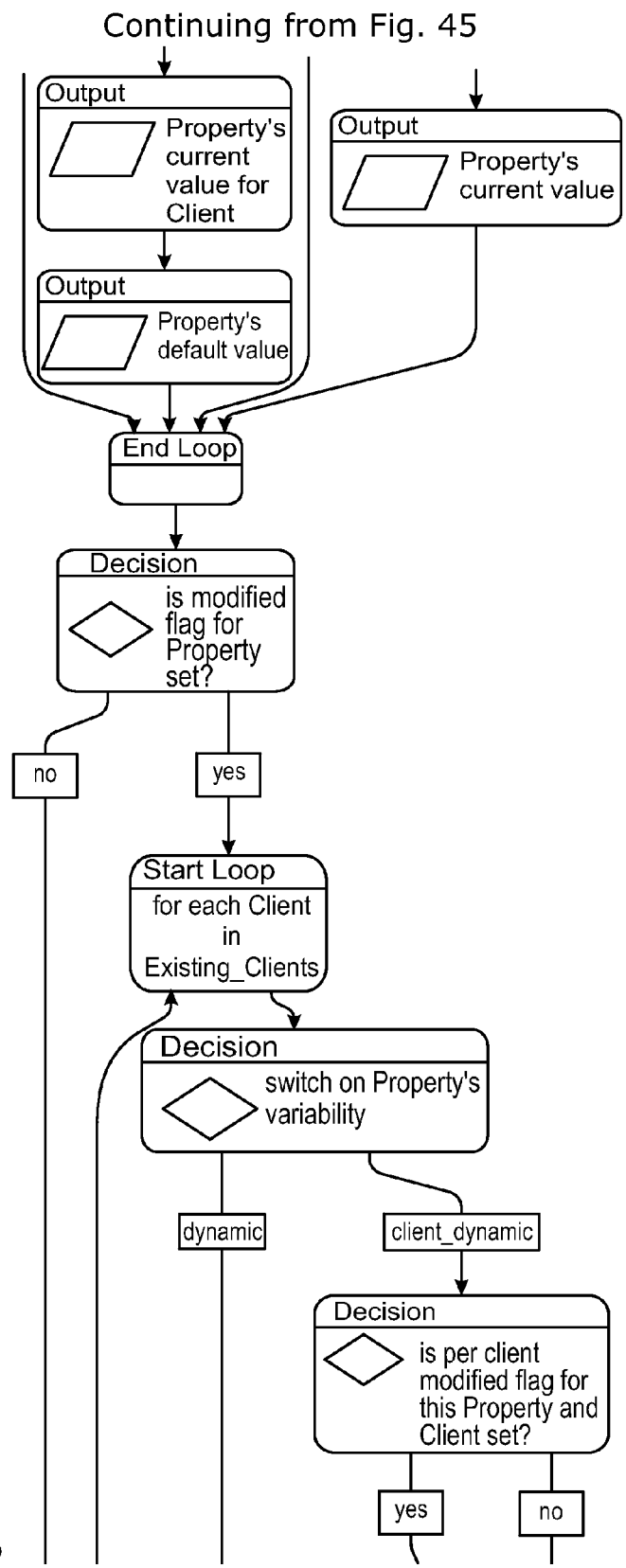
Figure 47:
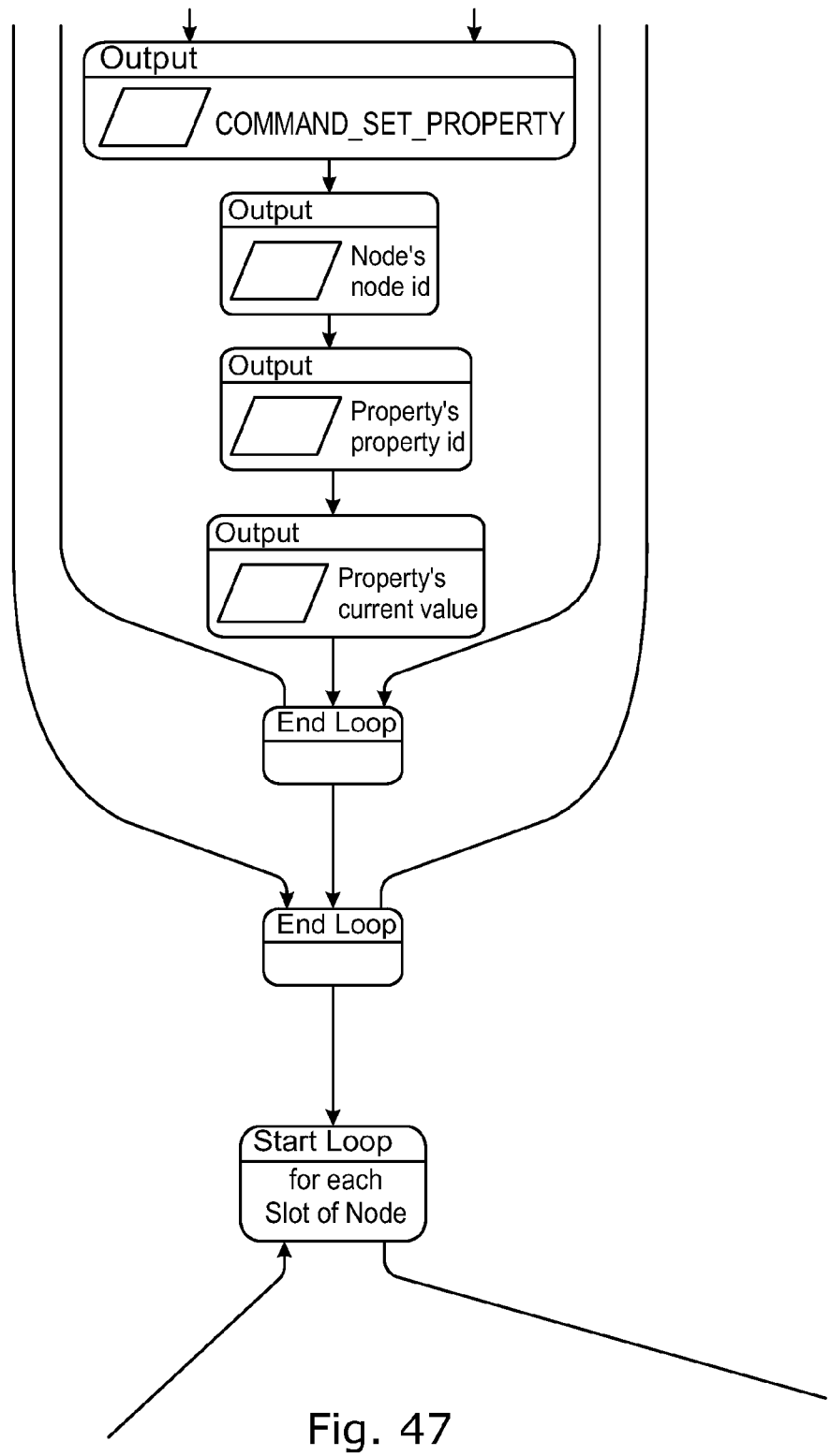
Figure 48:
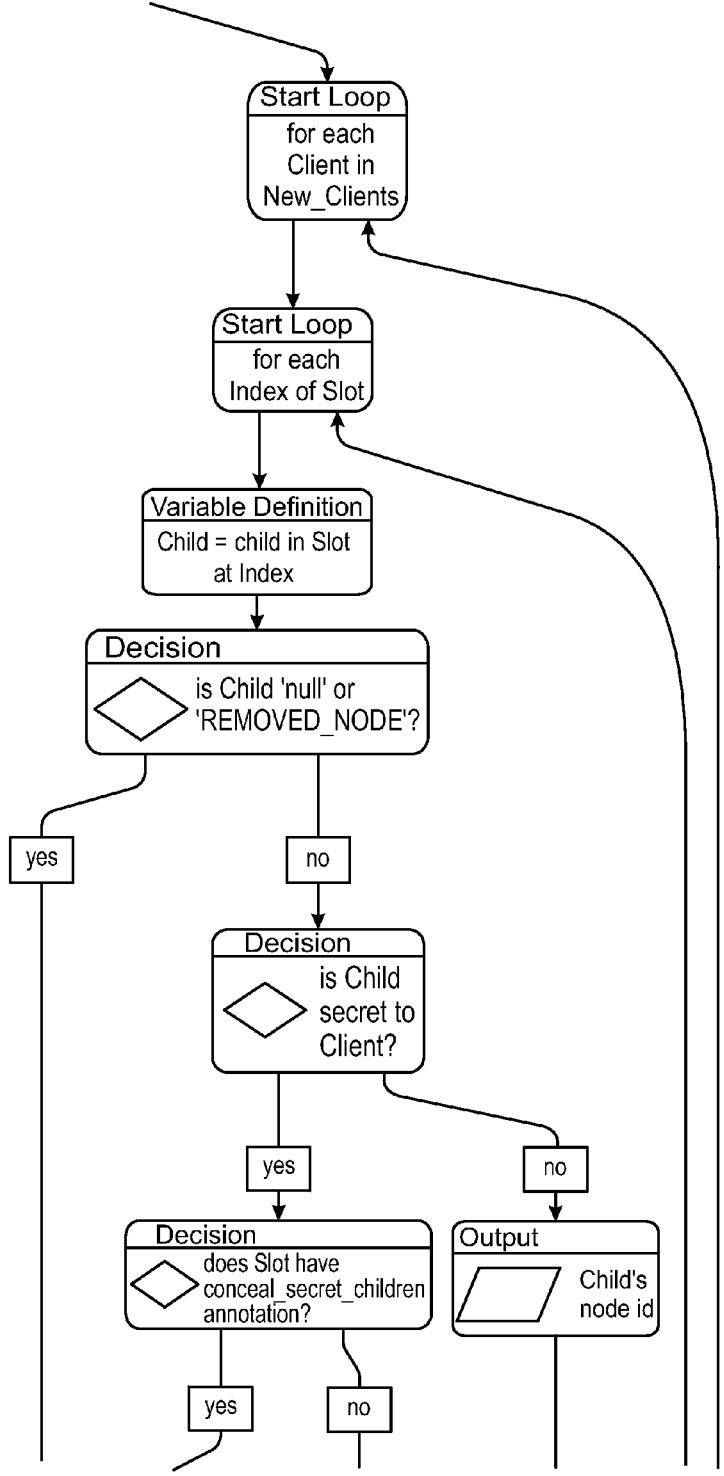
Figure 49:
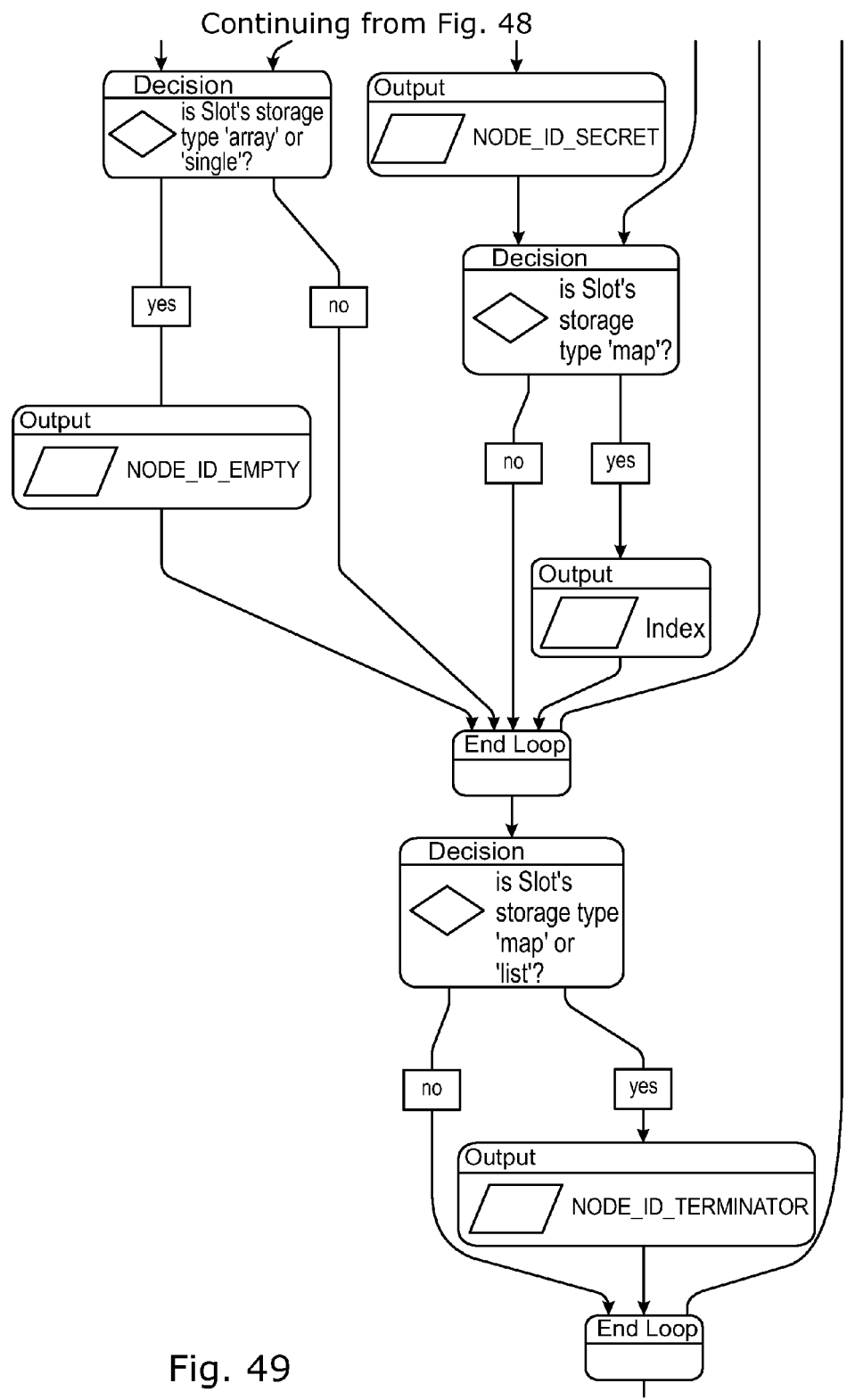
Figure 50:
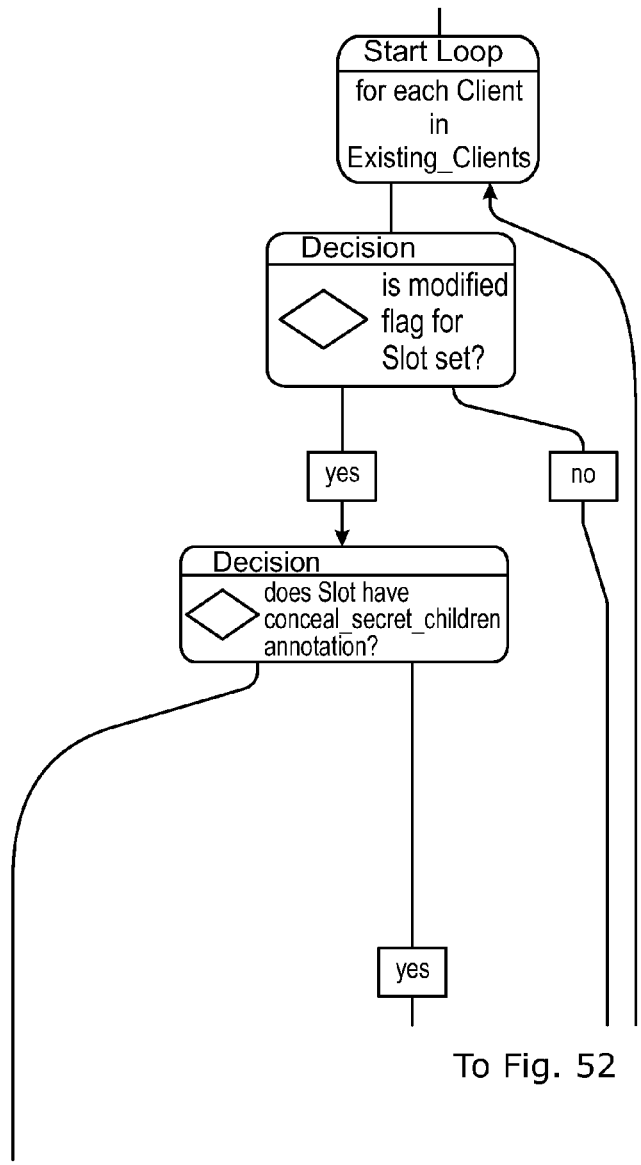
Figure 51:
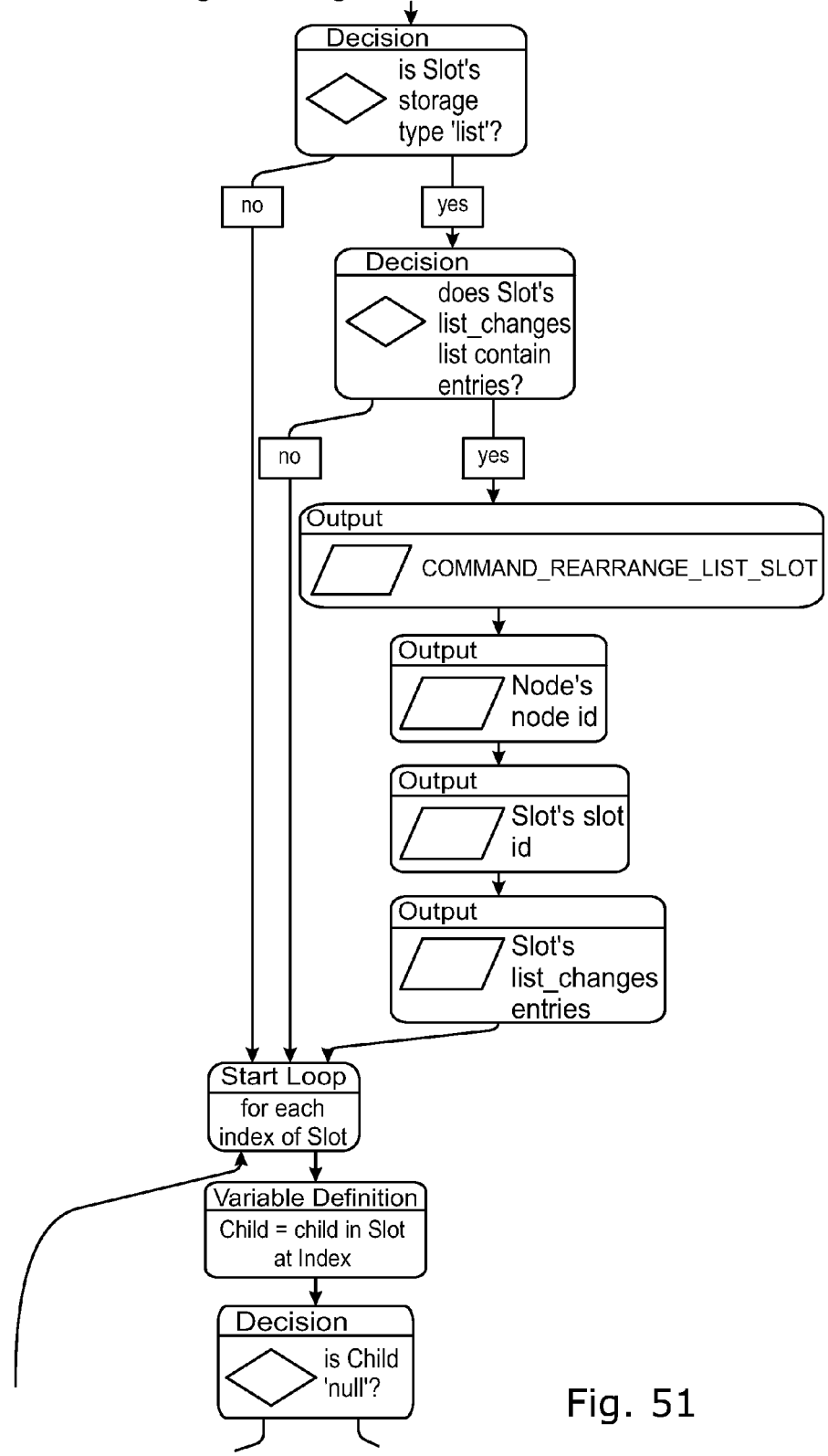
Figure 52:
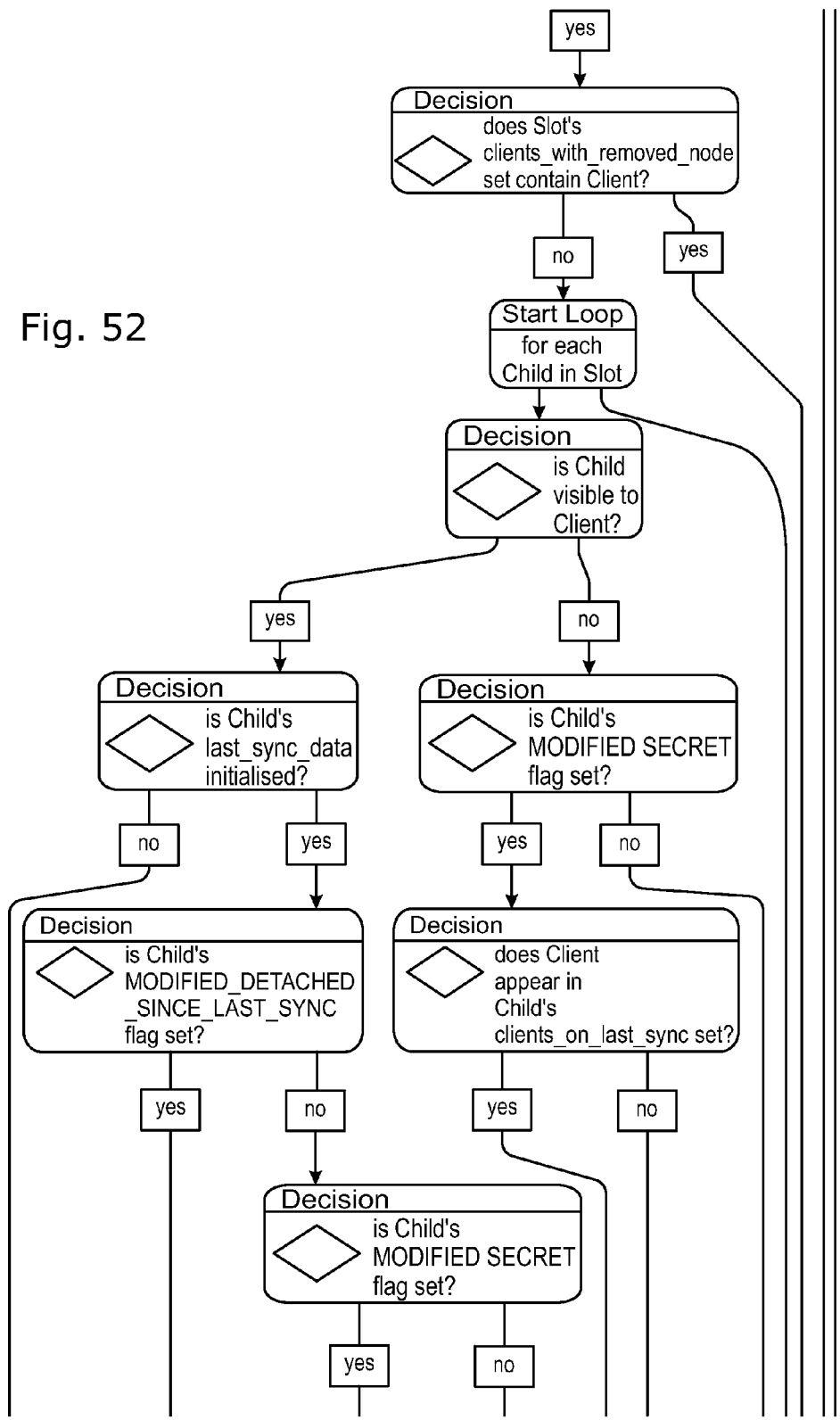
Figure 53:
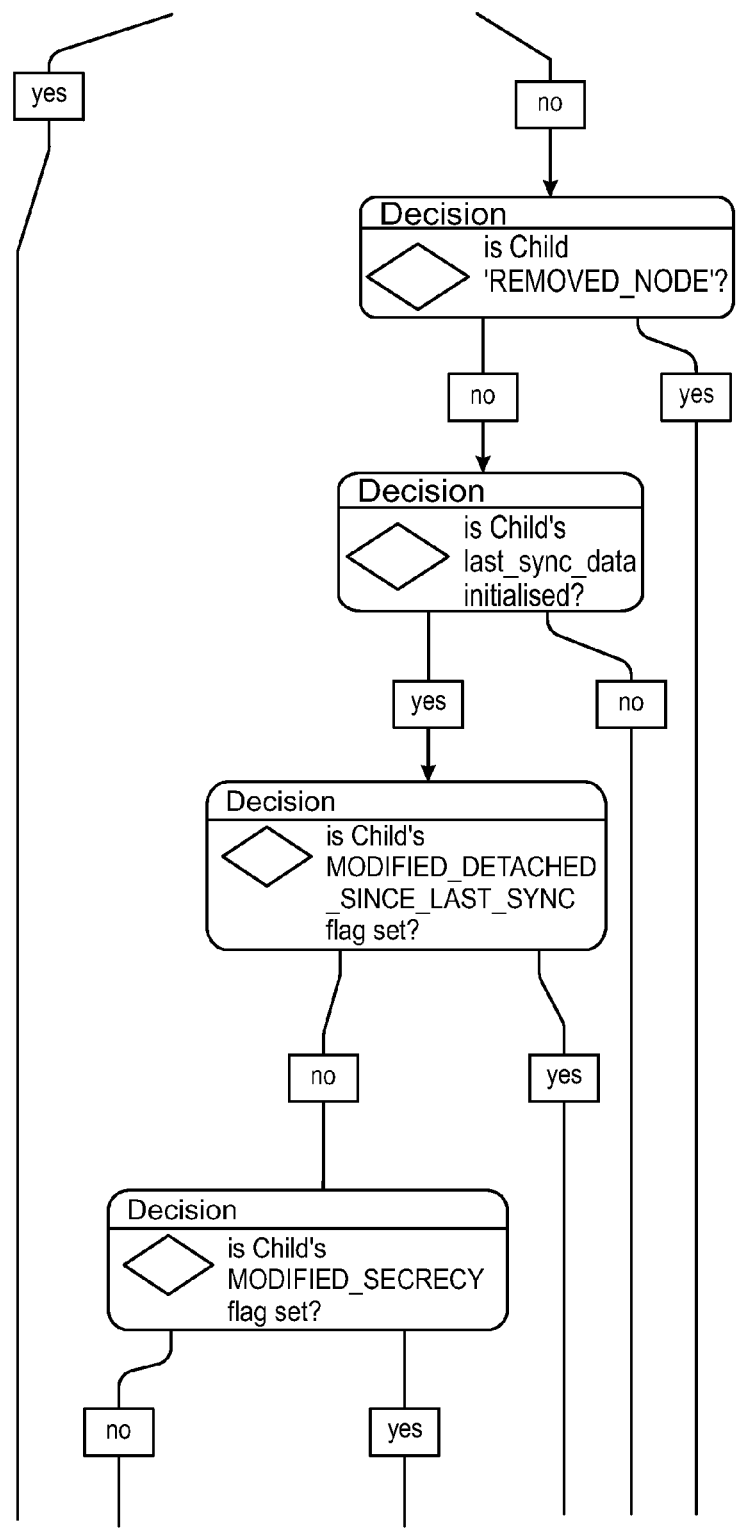
Figure 54:
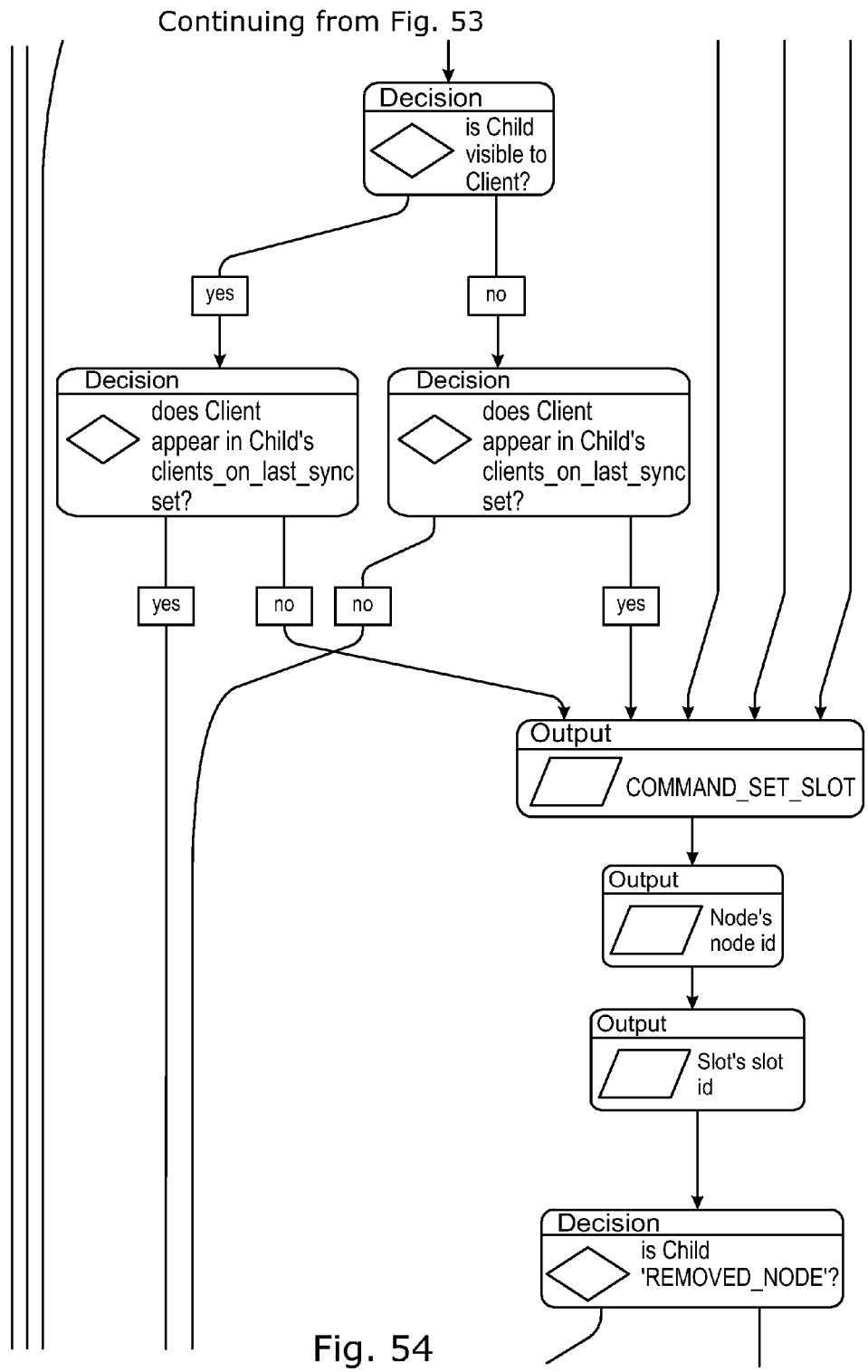
Figure 55:
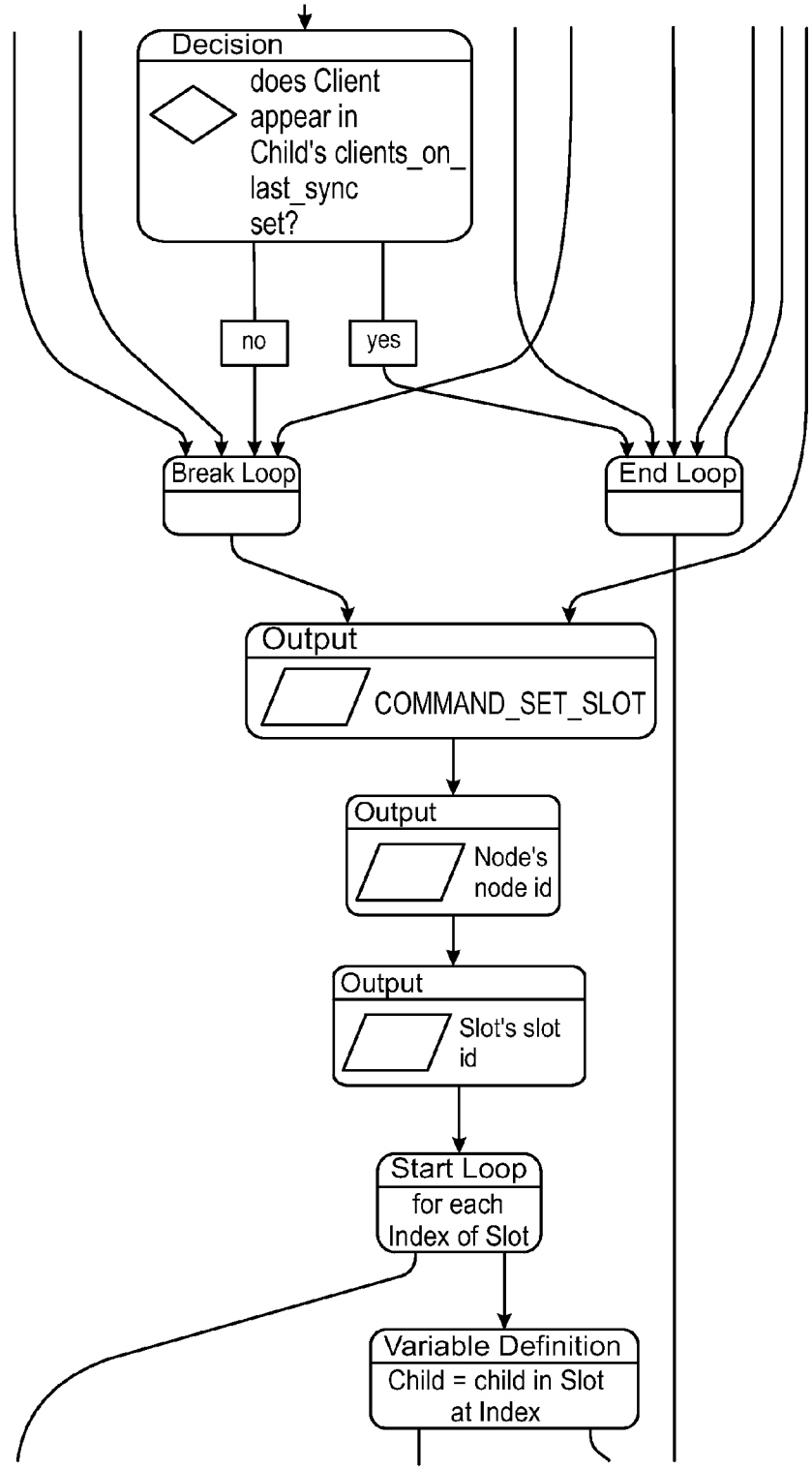
Figure 56:
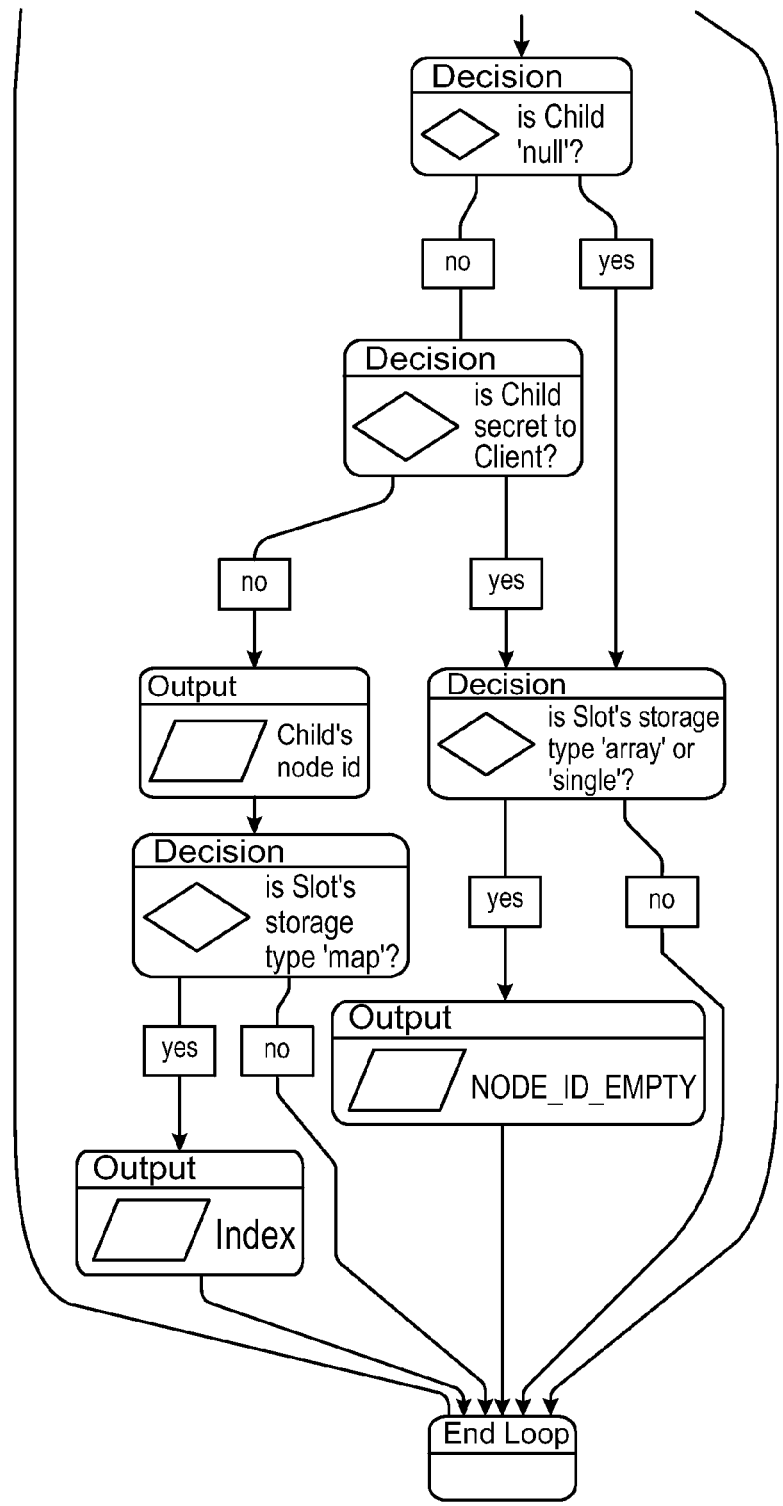
Figure 57:
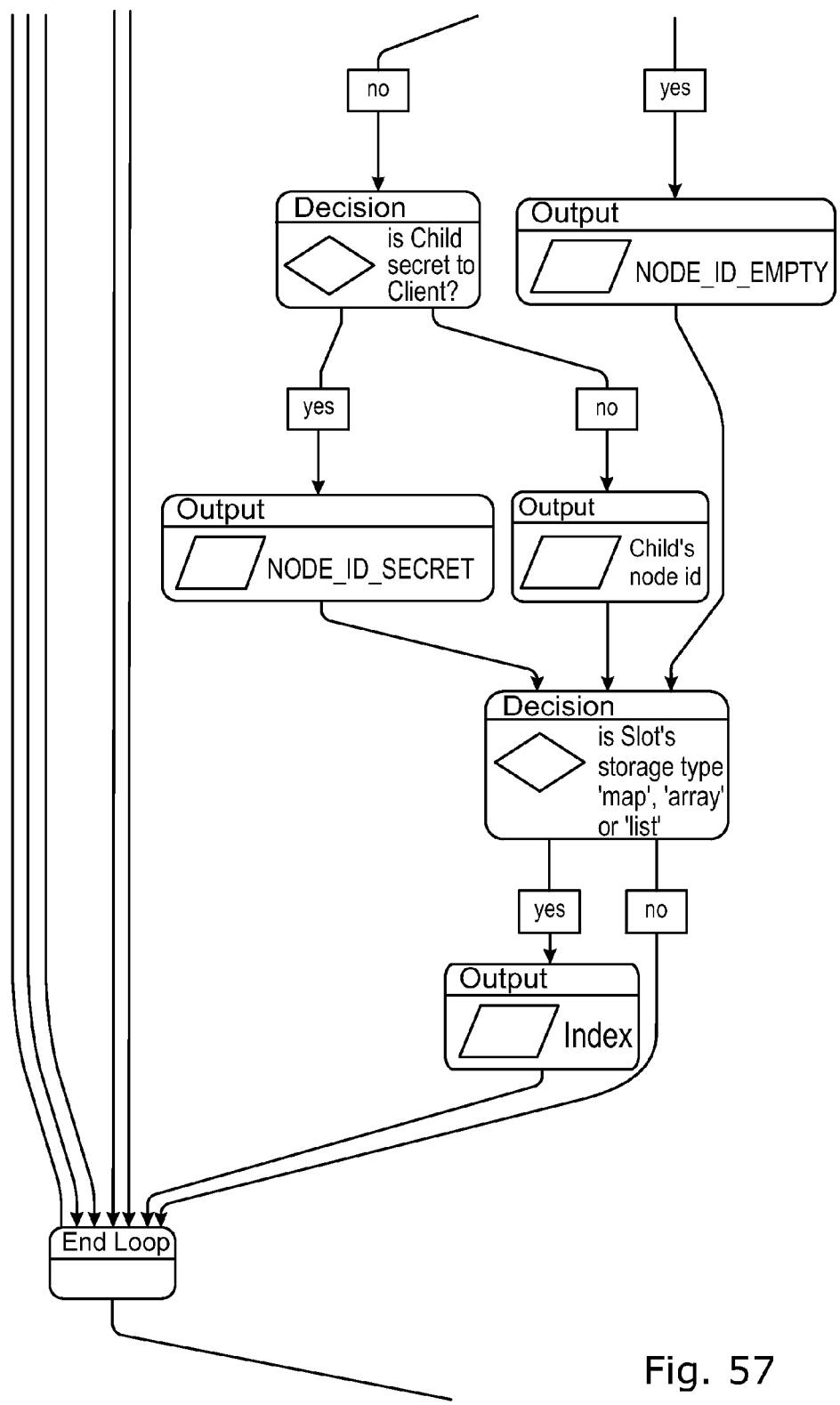
Figure 58:
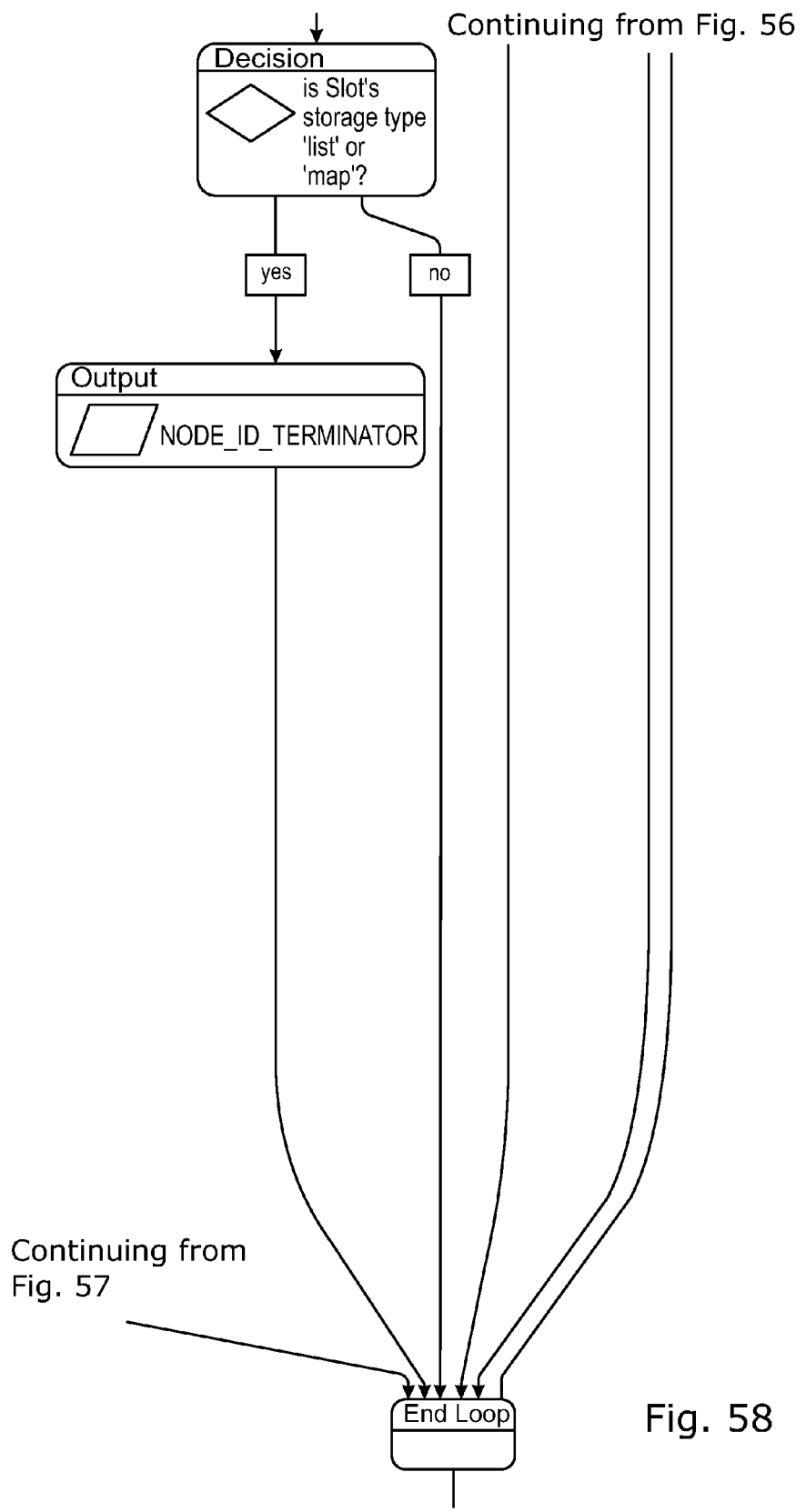
Figure 59:
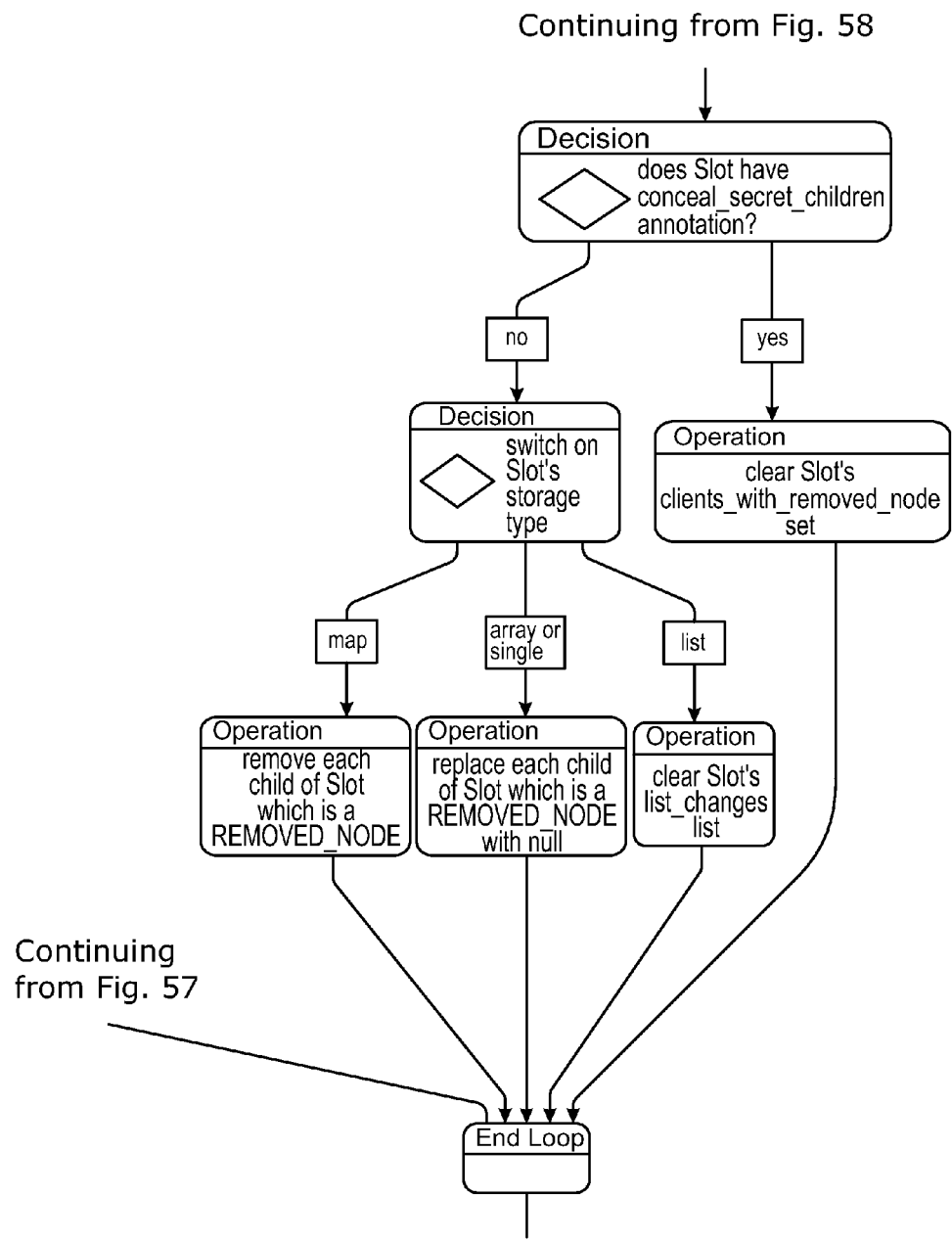
Figure 60:
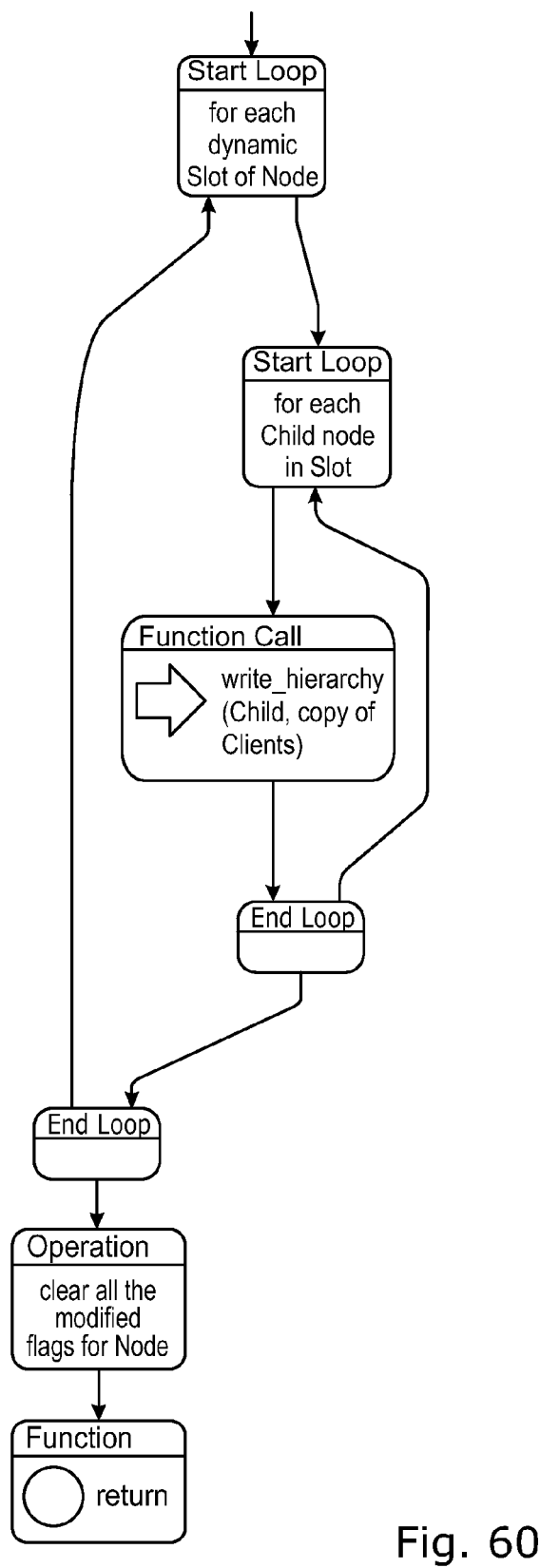
Figure 61:
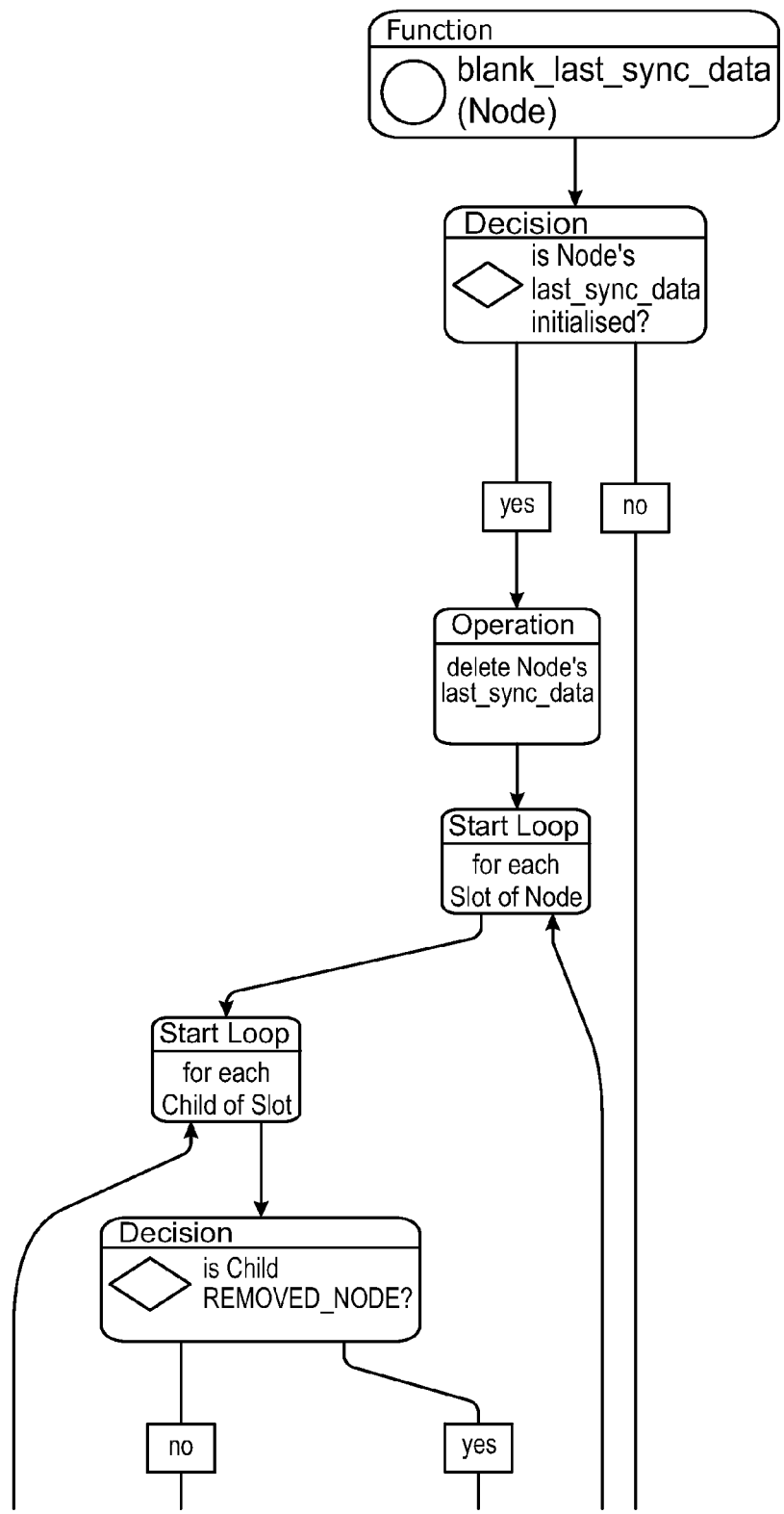
Figure 62:
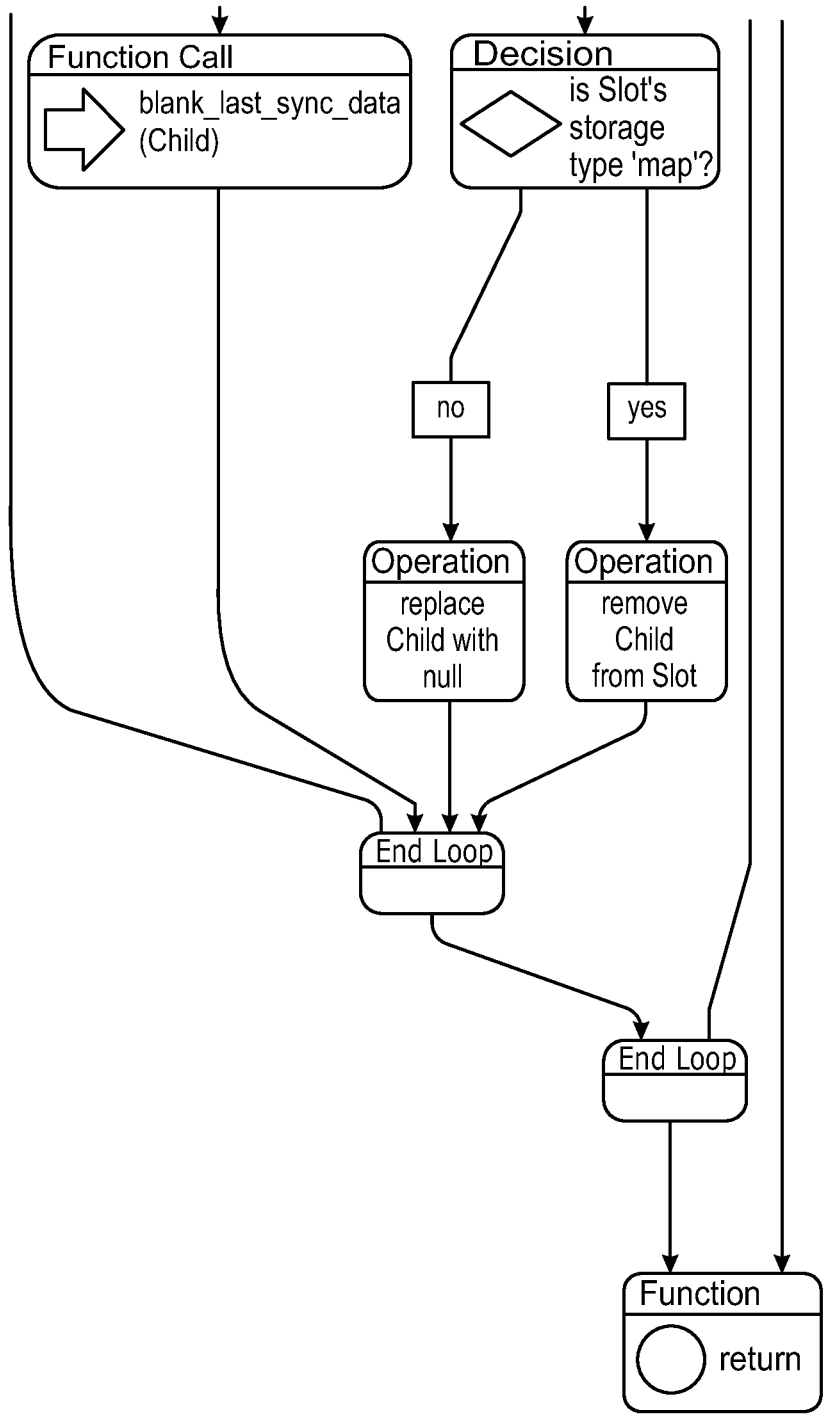

FIG. 2 is a schematic diagram of a server 200, such as the server 102 of FIG. 1. The server is computer implemented using a computing-based device as described in more detail with reference to FIG. 22 below. Only some of the components of the server are illustrated in FIG. 2 for clarity and those additional components to enable the server to operate as a computing-based device are shown in FIG. 22.

The server 200 comprises a network input 212 and a network output 218 which may be part of a communications interface, for example, which uses TCP or another packet-based communications protocol to send and receive packets over a communications network. The network input 212 may receive packets from clients. The network output 218 may send packets to clients.

The server has a store holding the graph of connected nodes which is referred to herein as the orchard 220. In this example the server also stores a server dictionary 222 and a temporary data store 214 neither of which are essential.

The server comprises a synchronizer 202 which is arranged to generate update commands for sending to clients in synchronization packets. The synchronizer generates the update commands using the orchard 220 and information from the temporary data store 214 and/or server dictionary 222 in examples where those components are available. The synchronizer transmits 216 synchronization packets to clients via the network output 218.

Input events are received 210 from clients via the network input 212. An event receiver 208 at the server places the input events into an event queue 206 at the server. The event queue 206 may comprise other types of events such as interval events which are not input events in some examples. An event processor 204 at the server applies events from the event queue 206 to the orchard. It also updates the temporary data store 214. The event processor 204 may use information from the server dictionary in some examples.

Figure 3:
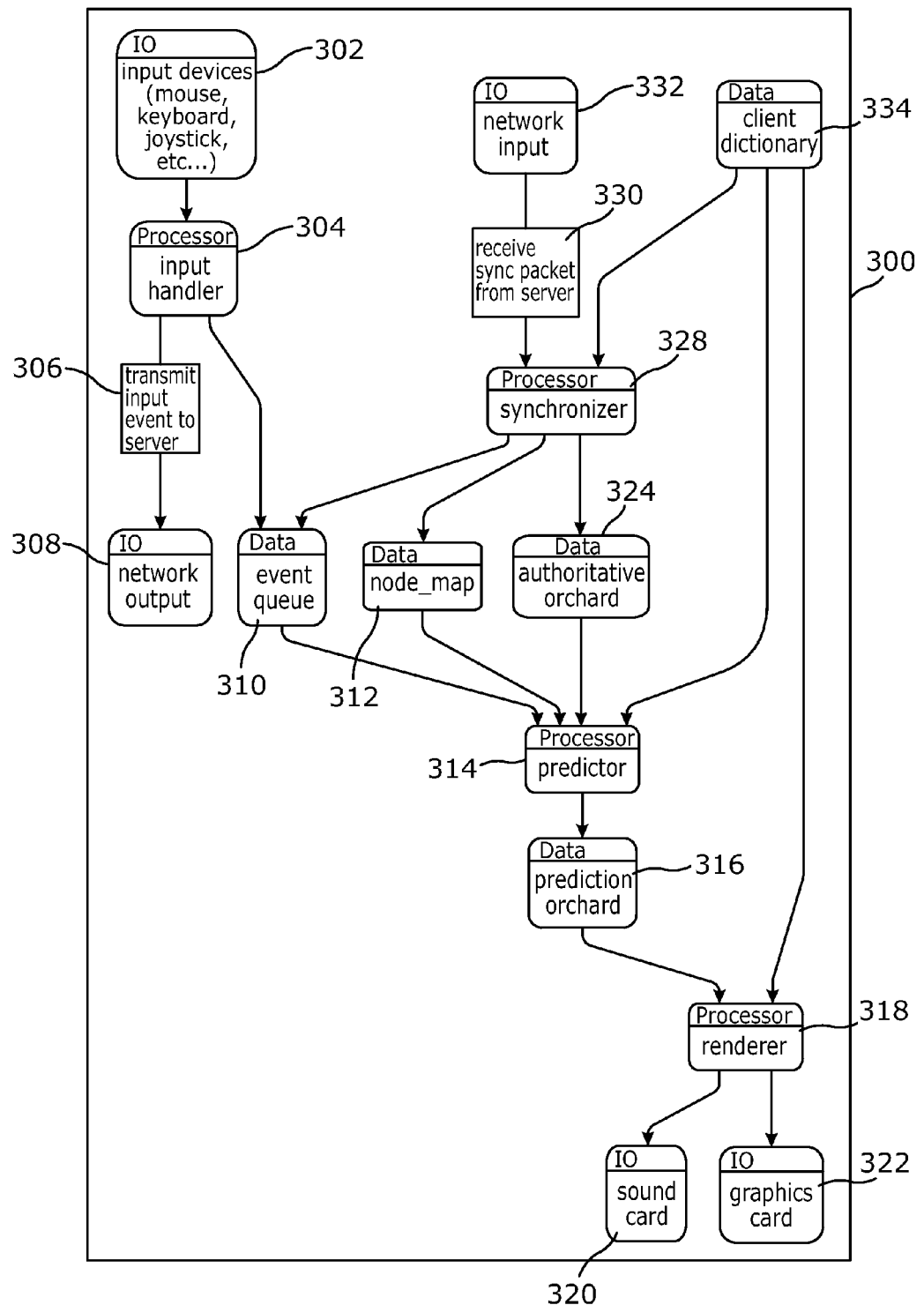
FIG. 3 is a schematic diagram of a client.

FIG. 3 is a schematic diagram of a client 300, such as any of clients 130, 132, 136 of FIG. 1. The client is computer implemented using a computing-based device as described in more detail with reference to FIG. 22 below. Only some of the components of the client are illustrated in FIG. 3 for clarity and those additional components to enable the client to operate as a computing-based device are shown in FIG. 22.

The client 300 comprises a network input 332 and a network output 308 which may be part of a communications interface, for example, which uses TCP or another packet-based communications protocol to send and receive packets over a communications network. The network input 332 may receive packets from the server. The network output 308 may send input events to the server.

The client has a store holding an authoritative orchard 324 which is a copy of at least part of the graph of connected nodes at the server. In this example the client also stores a client dictionary 334, a node map 312, and a prediction orchard 316 none of which are essential. The prediction orchard 316 may be a copy of the authoritative orchard 324 and which is updated using events from an event queue 310 at the client. The node map comprises data about nodes in the authoritative orchard and enables the client to find nodes in the authoritative orchard to which a given update command applies in an efficient manner.

The client has an input handler 304 which receives input from one or more input devices via input 302. The input devices may or may not be user input devices. A non-exhaustive list of examples is: natural user interface devices such as gesture recognition systems; sensors such as temperature sensors, light sensors, orientation sensors, microphones, heart rate monitors; manual user input devices such as games console controllers, joysticks, keyboards, mice, light pens, track pads. The input handler 304 transmits 306 input event data (in the form of event objects) to network output 308 which in turn sends the event objects to the server. The input handler 304 also places the event objects into client event queue 310 at the client. Each event object may comprise an apply time as described in more detail below.

The client receives 330 synchronization packets from the server via network input 332. The synchronization packets are processed by a synchronizer 328 at the client using input from a client dictionary 334 in examples where a client dictionary is available. The synchronization packets comprise update commands and optionally also prediction metrics. The synchronizer updates the authoritative orchard 324 using the update commands and optionally using the node map 312 to carry out the synchronization. Where a node map 312 is used the synchronizer also updates the node map 312 on the basis of the update commands. In some examples the synchronizer may be arranged to prune the authoritative orchard 324 and/or the node map to reduce memory requirements at the client and/or to reduce computing resource requirements.

In examples where prediction is carried out at the client (which is optional) a predictor 314 is arranged to generate and update a prediction orchard 316 from a copy of the authoritative orchard 324. The predictor 314 may apply events from event queue 310 to the prediction orchard 316.

A renderer 318 at the client has access to the prediction orchard 316 and optionally to the client dictionary 334. The renderer 318 renders graphical and/or audio primitives from the prediction orchard 316 and sends its output to a graphics card 322 and/or sound card 320 according to the type of media being rendered. In examples where prediction is not used the renderer may operate using the authoritative orchard 324 in place of the prediction orchard 316.

Figure 4:
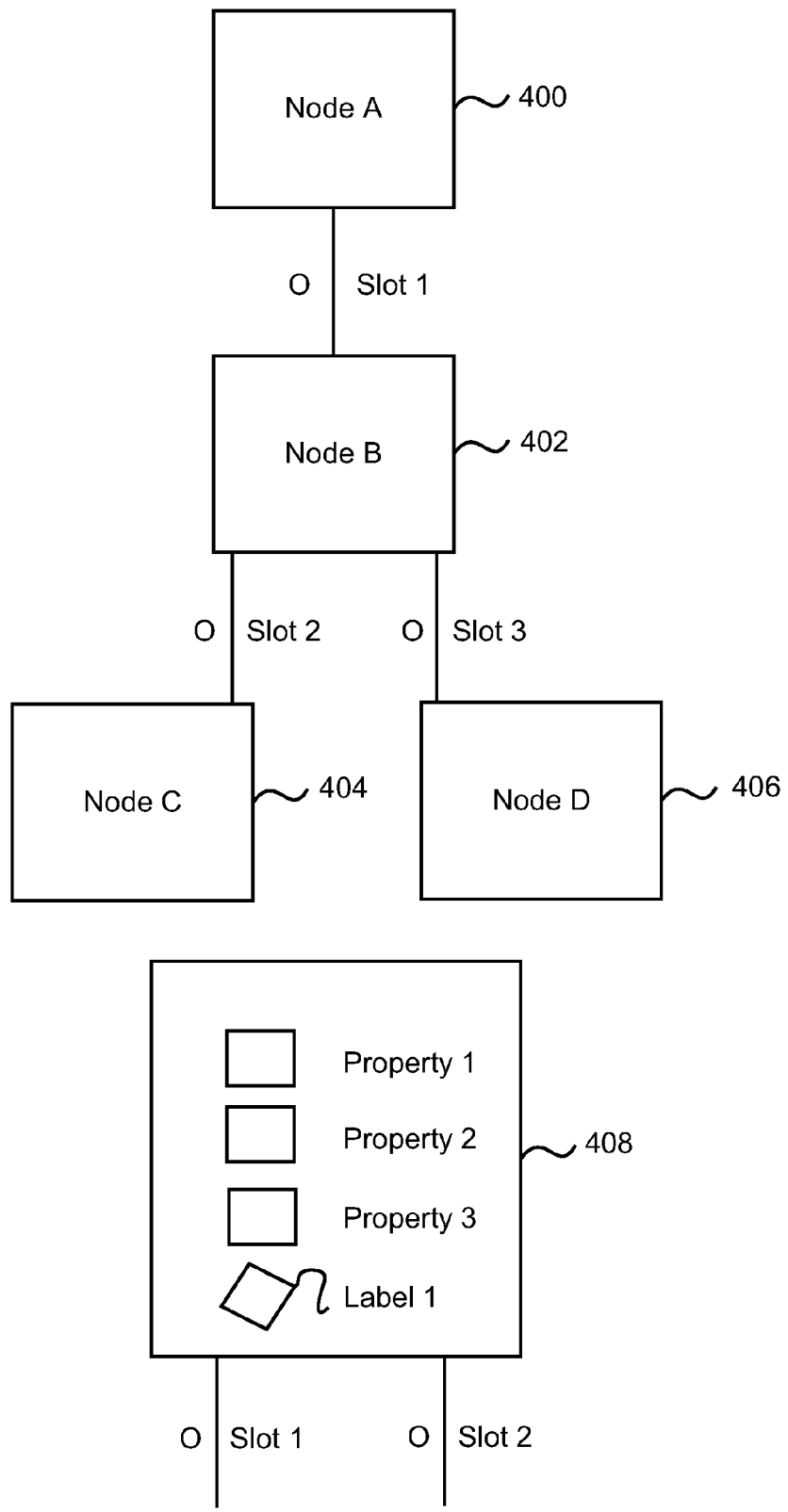
FIG. 4 is a schematic diagram of a graph of connected nodes and an individual node 408 shown in more detail.

FIG. 4 is a schematic diagram of a graph of connected nodes and an individual node 408 shown in more detail. The graph of connected nodes comprises four nodes A to D (400, 402, 404, 406) for clarity although in practice many more connected nodes may be present. The graph of connected nodes shown in FIG. 4 is an example of a type of graph which may be used to store the orchard, authoritative orchard and prediction orchard. Other types of graph may also be used. The graph may be any type of directed, acyclic graph (that is a graph where there is a direction specified for each connection between nodes and where there are no loops).

Figure 5:
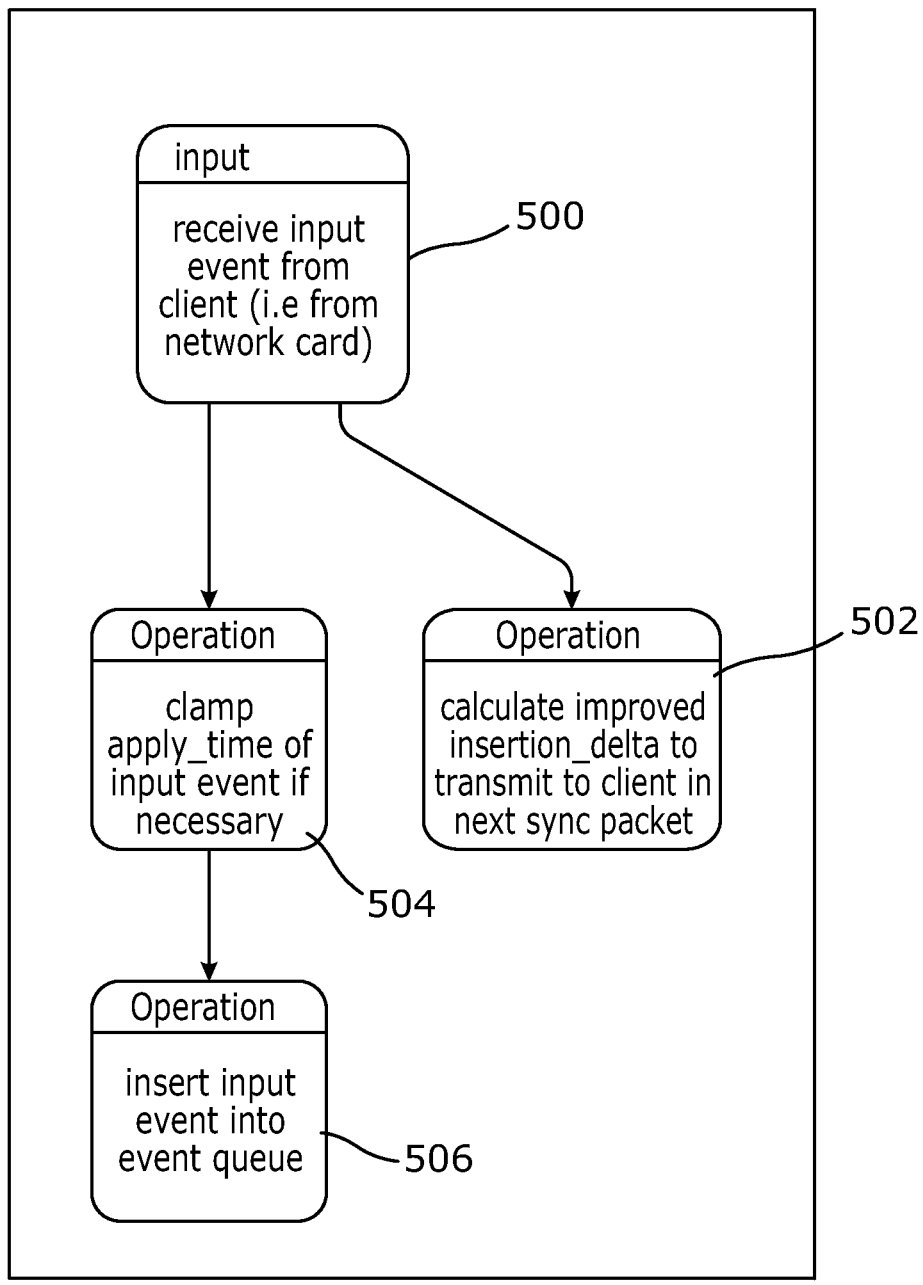
FIG. 5 is a flow diagram of an example method at a server event receiver.

FIG. 5 is a flow diagram of an example method at the server event receiver 208 of FIG. 2. The event receiver receives 500 input from a network card (part of network input 212 of FIG. 2) comprising an input event from a client. The input event has an apply time which is a time at which it is to be applied to the graph of connected nodes at the server. In some examples the event receiver clamps 504 an apply time of the input event so that the apply time is not in the past (with respect to a clock of the server). Clamping involves setting the apply time to the current server clock time. This facilitates synchronization between the client and server as otherwise input events might not be applied to the orchard at the server because of network latency problems. The input event object, with clamped apply time, is inserted 506 into the event queue at the server.

Optionally the server event receiver 208 calculates 502 a prediction metric comprising an insertion delta. An insertion delta is a value that compensates for both network latency and time difference between a clock on the server and a client clock. More detail about how the insertion delta may be calculated is given later in this document. The insertion delta may be transmitted to the client in the next synchronization packet to enable the client to make improved predictions of the client graphical and/or audio display.

Figure 6:
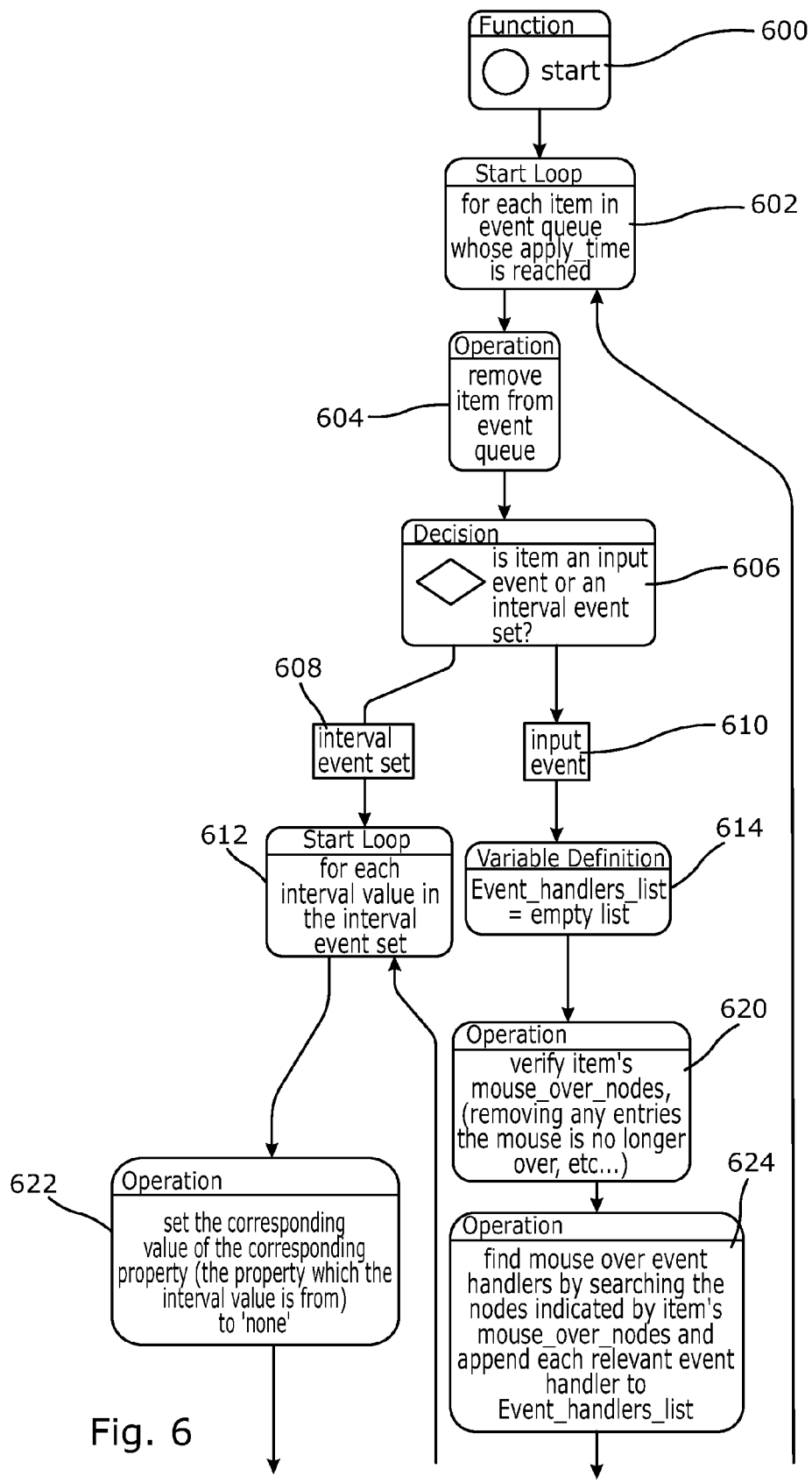
FIGS. 6 and 7 give a flow diagram of an example method at a server event processor.
Figure 7:
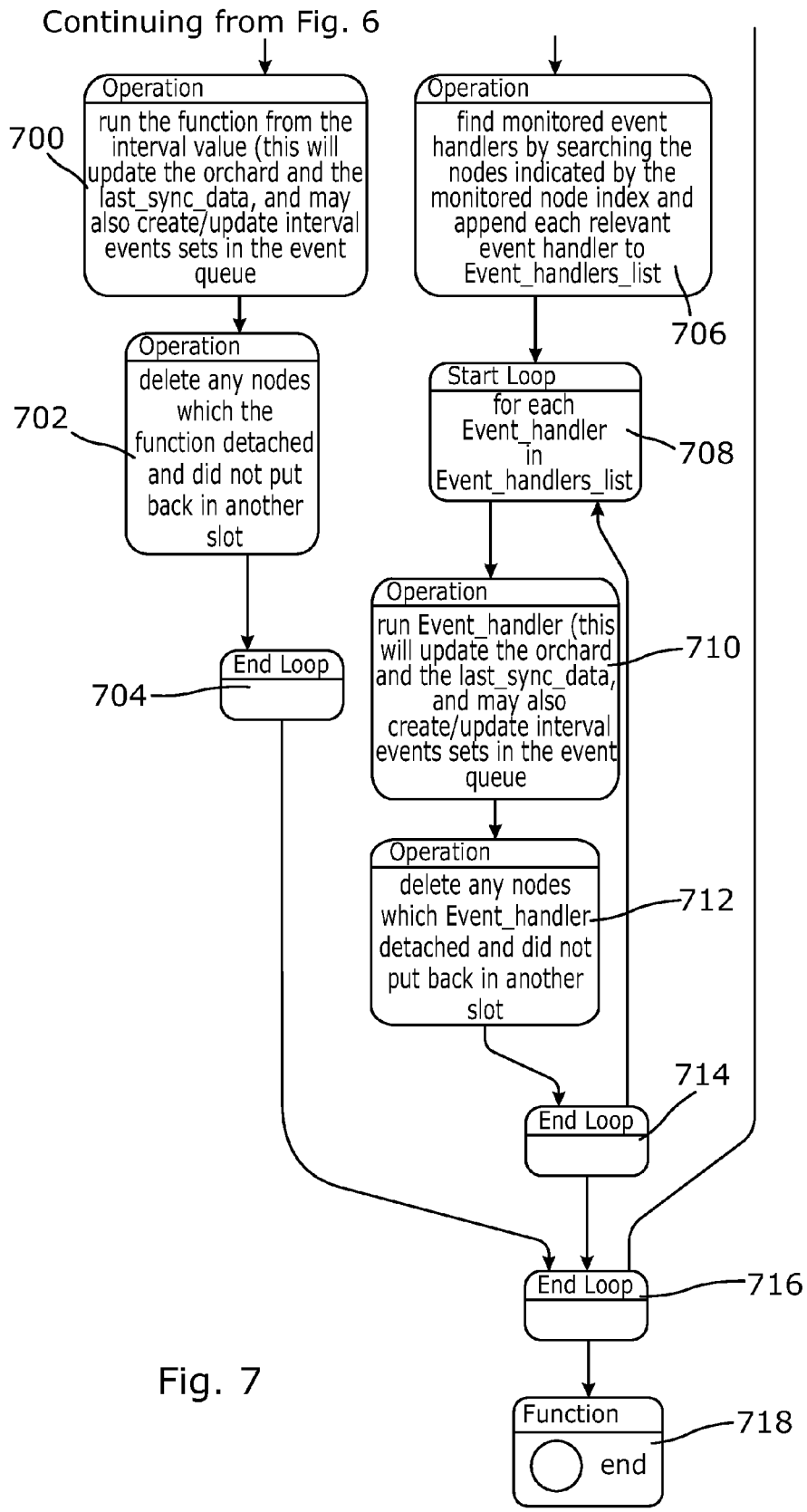

FIGS. 6 and 7 give a flow diagram of an example method at the server event processor 204 of FIG. 2. The flow diagram starts at 600 and is split over two pages so that step 622 of FIG. 6 flows to step 700 of FIG. 7 and step 624 of FIG. 6 flows to step 706 of FIG. 7.

As items (which may be event objects as described later) in the event queue 206 of the server have apply times which are reached 602 (as time passes) these items are removed 604 from the event queue. A check 606 is made as to whether the item is an input event 610 or an interval event set 608. An input event is an event from an input device 302 of a client. An interval event set is one or more events (described as interval properties of nodes) resulting from criteria in the orchard being triggered by time at the server.

If the item is an interval event set 608, the item is applied to the orchard (step 700) so that the events resulting from criteria in the orchard being triggered are applied to the orchard. In a detailed example, for each interval value in the interval event set (see box 612) the event processor sets 622 the corresponding value in the corresponding interval property to ˆnone and executes the function stored in the interval value. This updates 700 the orchard. The last_sync_data 214 may also be updated and interval event sets in the event queue 206 may also be created and or updated. The event processor may delete 702 any nodes which the function detached and did not put back in another slot. This process repeats for each interval property in the interval event set and the loop ends 704.

If the item is an input event 610 the input event is used to update the orchard (see step 710). In the example of FIGS. 6 and 7 this may be achieved in an efficient manner by creating a list of event handlers. Event handlers are functions in the orchard which are triggered by an event. In the example of FIGS. 6 and 7 the event handlers list 614 begins as an empty list. The event handlers list is populated with event handlers found from the orchard in steps 624 and 706. For each event handler in the list (see box 708) the event handler is executed 710. This updates the orchard and the last sync data 214. The update may also create and/or update interval event sets in the event queue of the server. The server event processor may delete 712 any nodes of the orchard which an event handler detached and did not put back in another slot.

The steps 624 and 706 populate the event handlers list by searching two different sources of information, the item's mouse over list and the monitored node index. The mouse over list is optional and is used in examples where the networked graphical application has a facility to enable an end user to trigger functionality by making a user input when his or her mouse is within an invisible rectangle on the graphical display. The monitored node index is a list that enables computational resources to be reduced by considering selected nodes. The method may comprise step 620 of verifying the item's mouse over nodes. This is optional.

Figure 8:
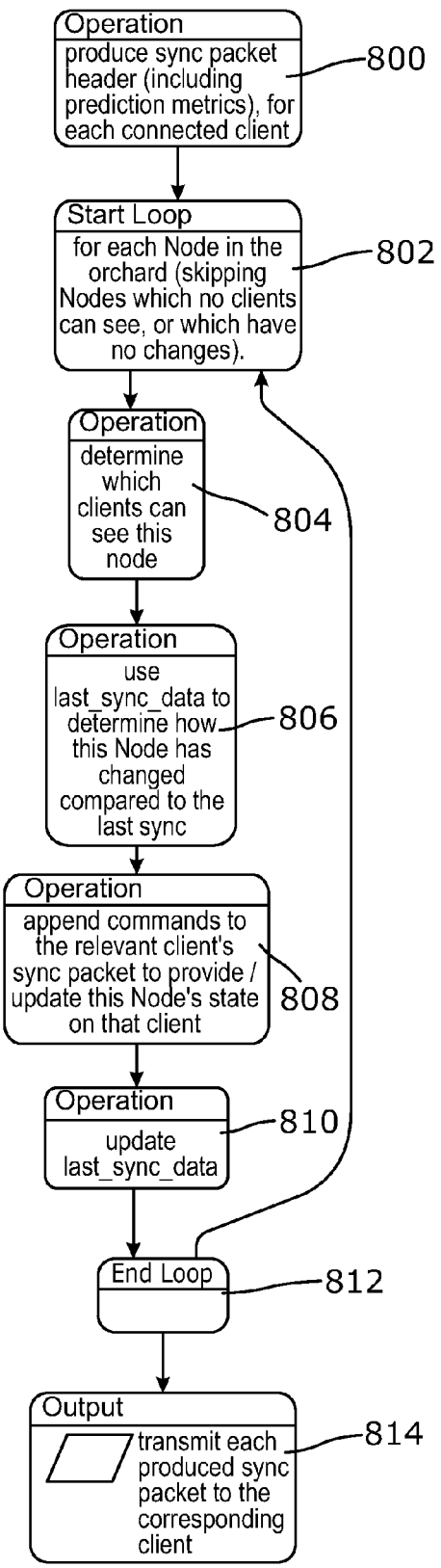
FIG. 8 is a flow diagram of a method at a synchronizer of the server.

FIG. 8 is a flow diagram of a method at the server synchronizer 202 of FIG. 2. The synchronizer creates 800 a synchronization (sync) packet header comprising prediction metrics. This is done for each connected client separately as the prediction metrics may vary between clients, for example, because the location of the clients is different and so the network latencies vary. The synchronizer, for nodes in the orchard 802, (skipping nodes which no clients can see or which have no changes), determines 804 which clients can see the node. A client can see a node if there are no magic=secret properties or secret slots causing it to be secret, see more detailed description later in this document. The synchronizer uses information about the last synchronization (from the last sync data 214) to determine how the node under consideration has changed compared to the last synchronization. It generates update commands and appends them to the relevant client's synchronization packet (for example, in a body of the synchronization packet). The update commands enable the client to update the copy of the node in the authoritative version (or a new node) with the appropriate state. The synchronizer updates its record of the last synchronization at step 810. This process repeats for each node (except any skipped as mentioned above) and the resulting synchronization packets are transmitted 814 to the appropriate client.

Figure 9:
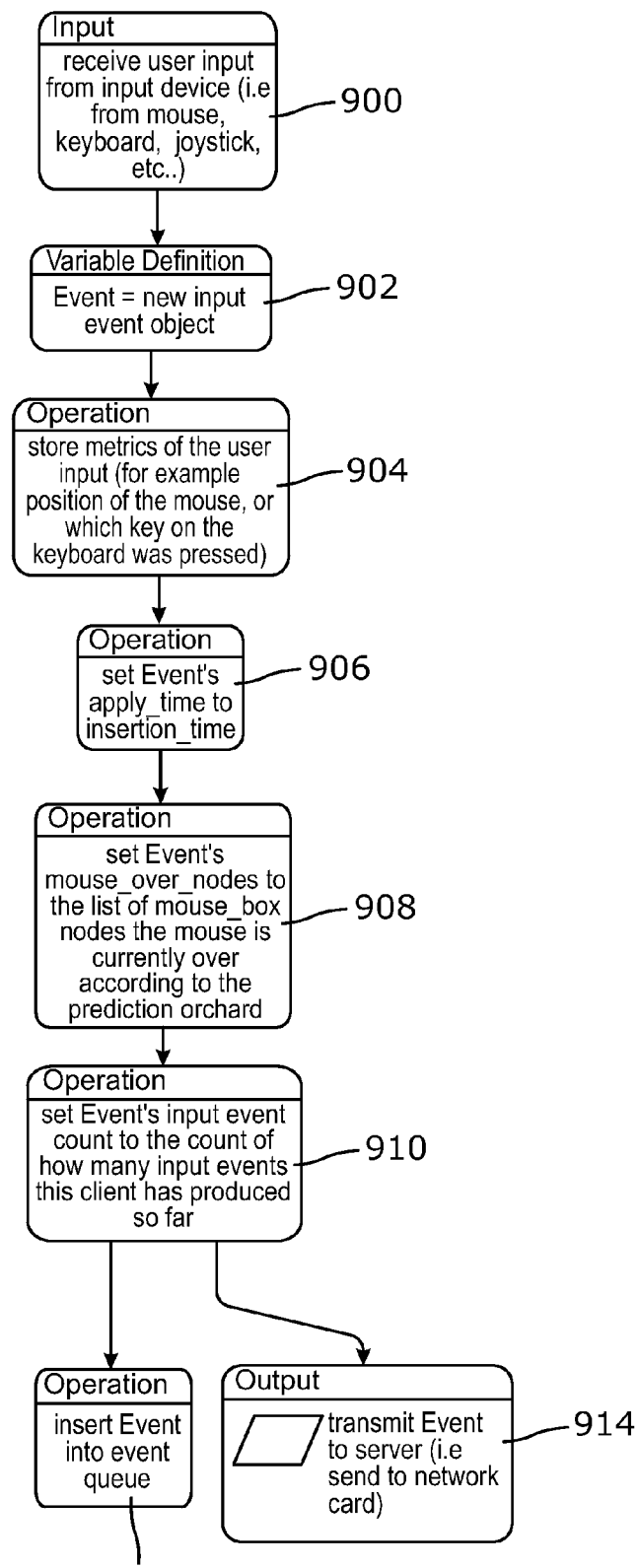
FIG. 9 is a flow diagram of a method at a client input handler.

FIG. 9 is a flow diagram of a method at the client input handler 304 of FIG. 3. User input or sensor data is received 900 and a new input event object is created 902. Features describing the event may be stored 904 in the input event object. For example, sensor data values, sensor data ranges, gesture classes, mouse position, key identifiers or other features. An apply time is recorded in each input event object. In an example, the apply time is set 906 to an insertion time. The insertion time may be preconfigured, or may be dynamically calculated using prediction metrics received from the server. In examples where mouse over nodes is being implemented (optional) a mouse over nodes list is set 908 to a list of mouse box nodes the mouse is currently over according to the prediction orchard. A count of how many input event objects have been produced so far by this client may be set 910.

The client input handler inserts 912 the event object into the event queue. It transmits 914 the event object to the server.

Figure 10:
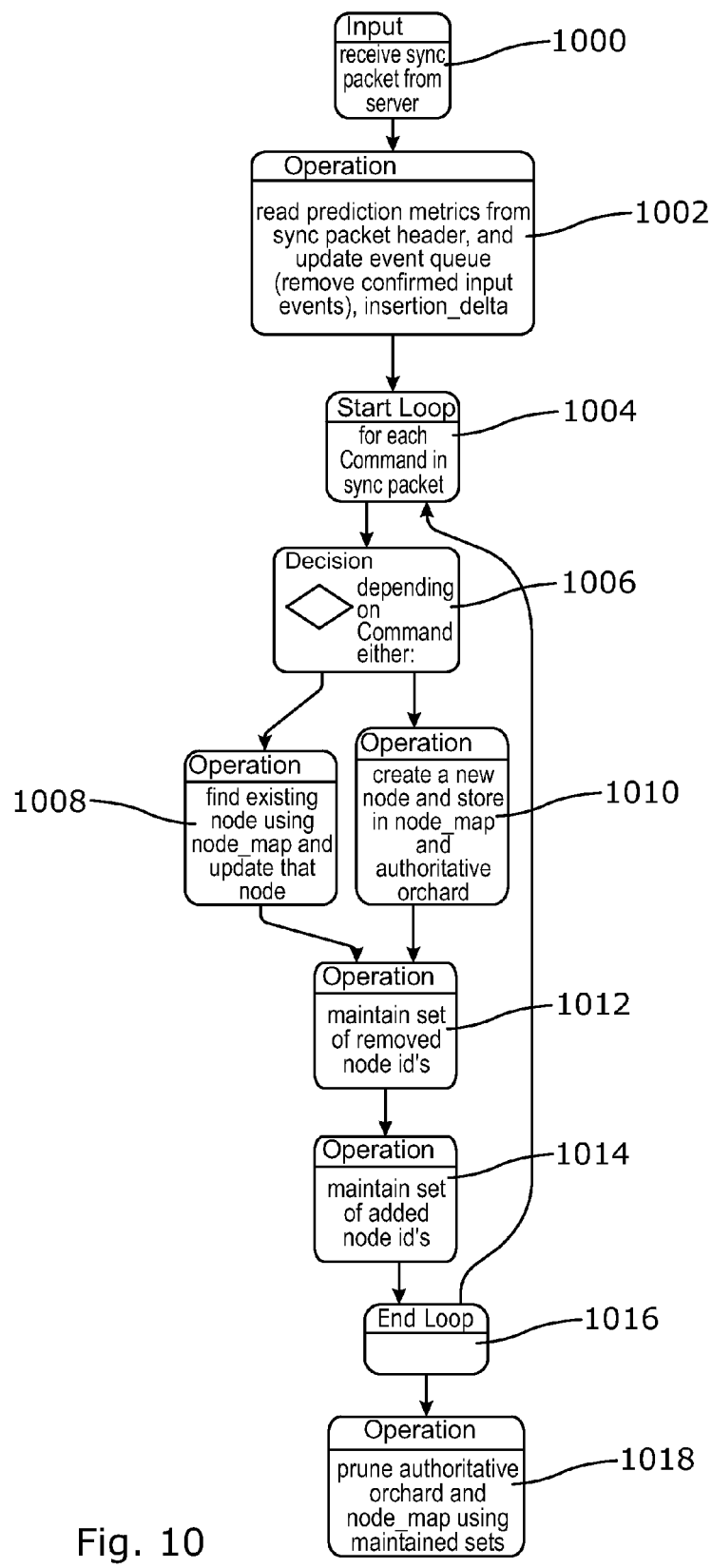
FIG. 10 is a flow diagram of a method at a client synchronizer.
Figure 11:
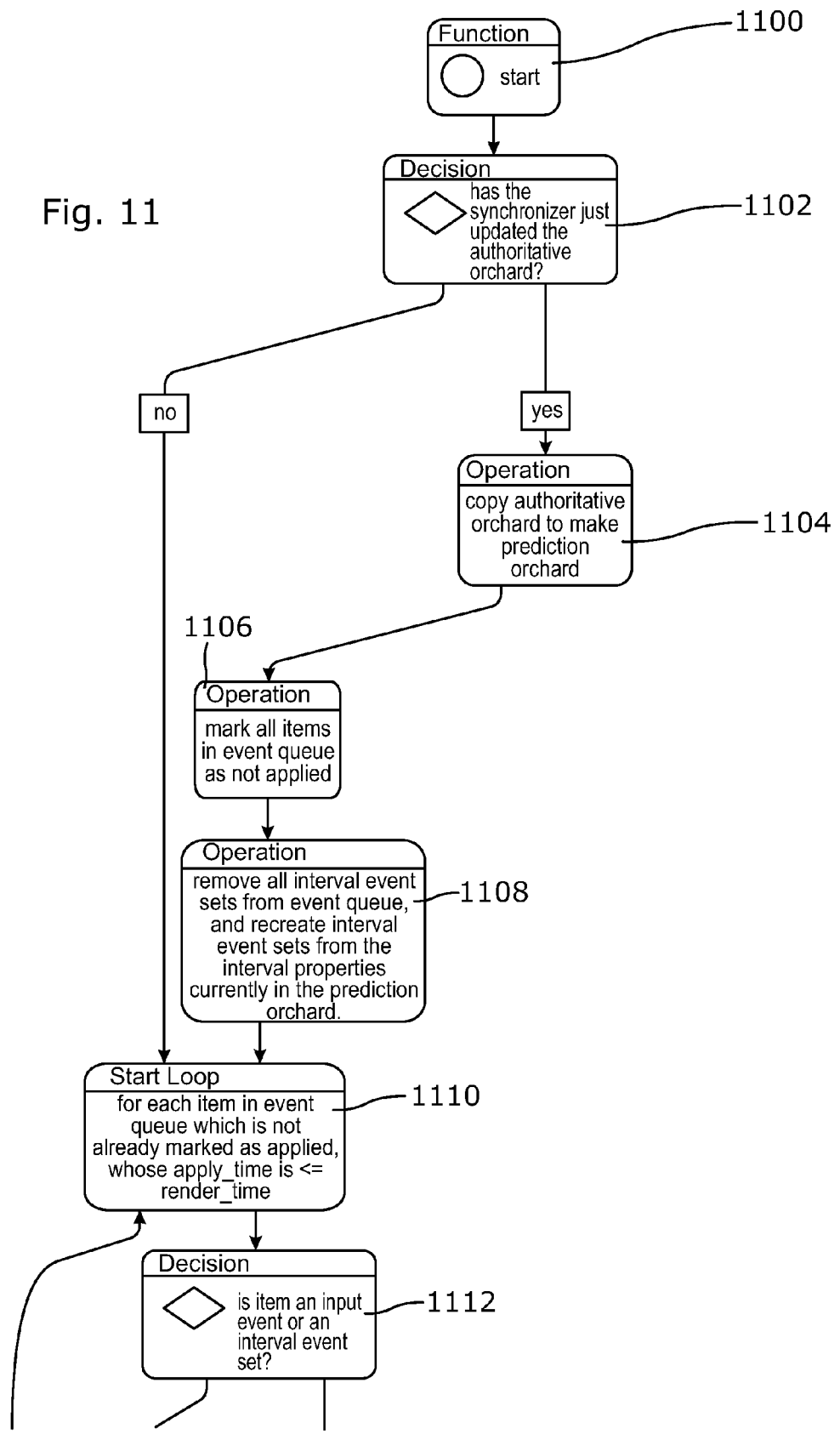
FIGS. 11 to 14 give a flow diagram of an example method at a client predictor.
Figure 12:
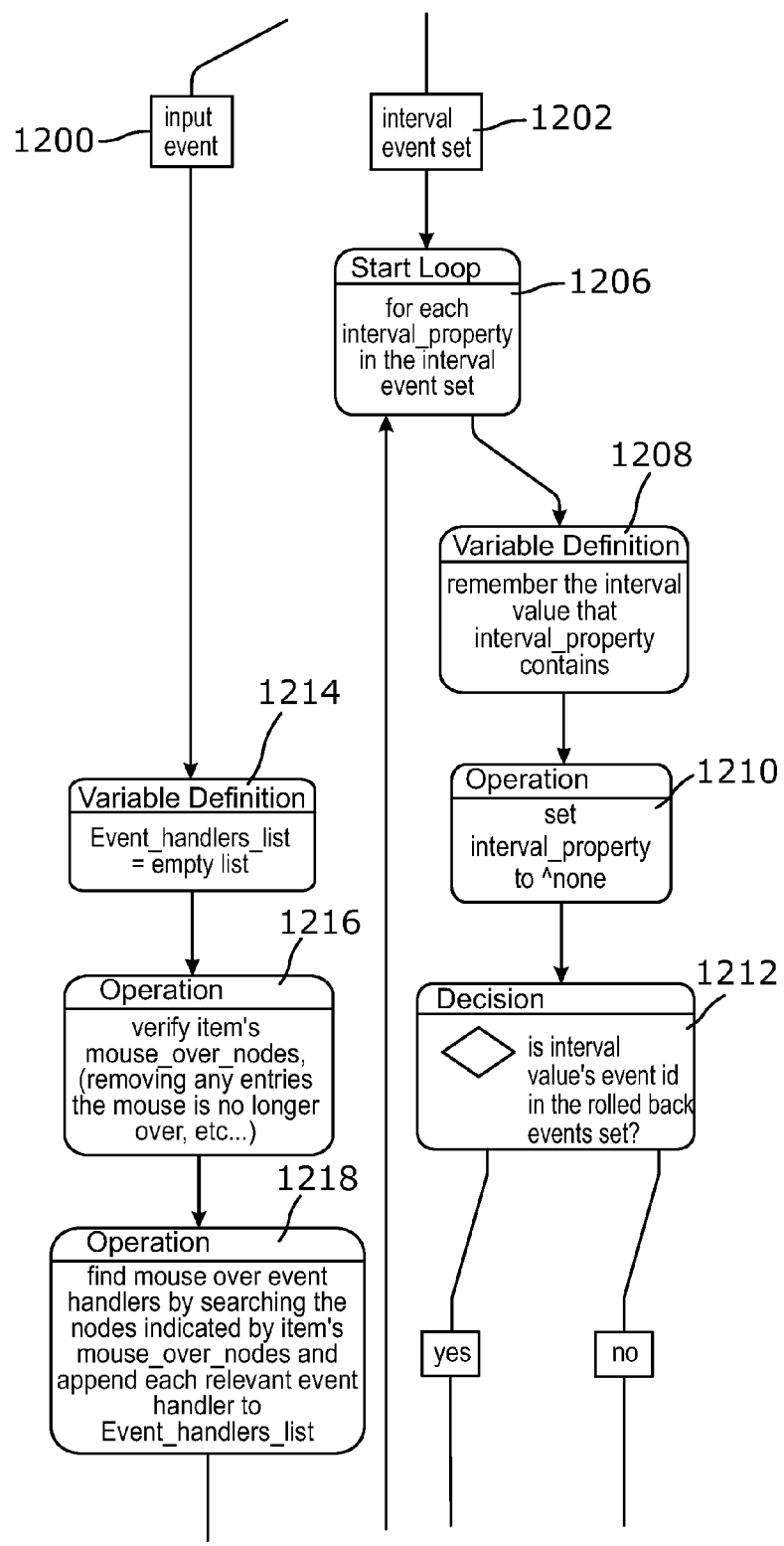
Figure 13:
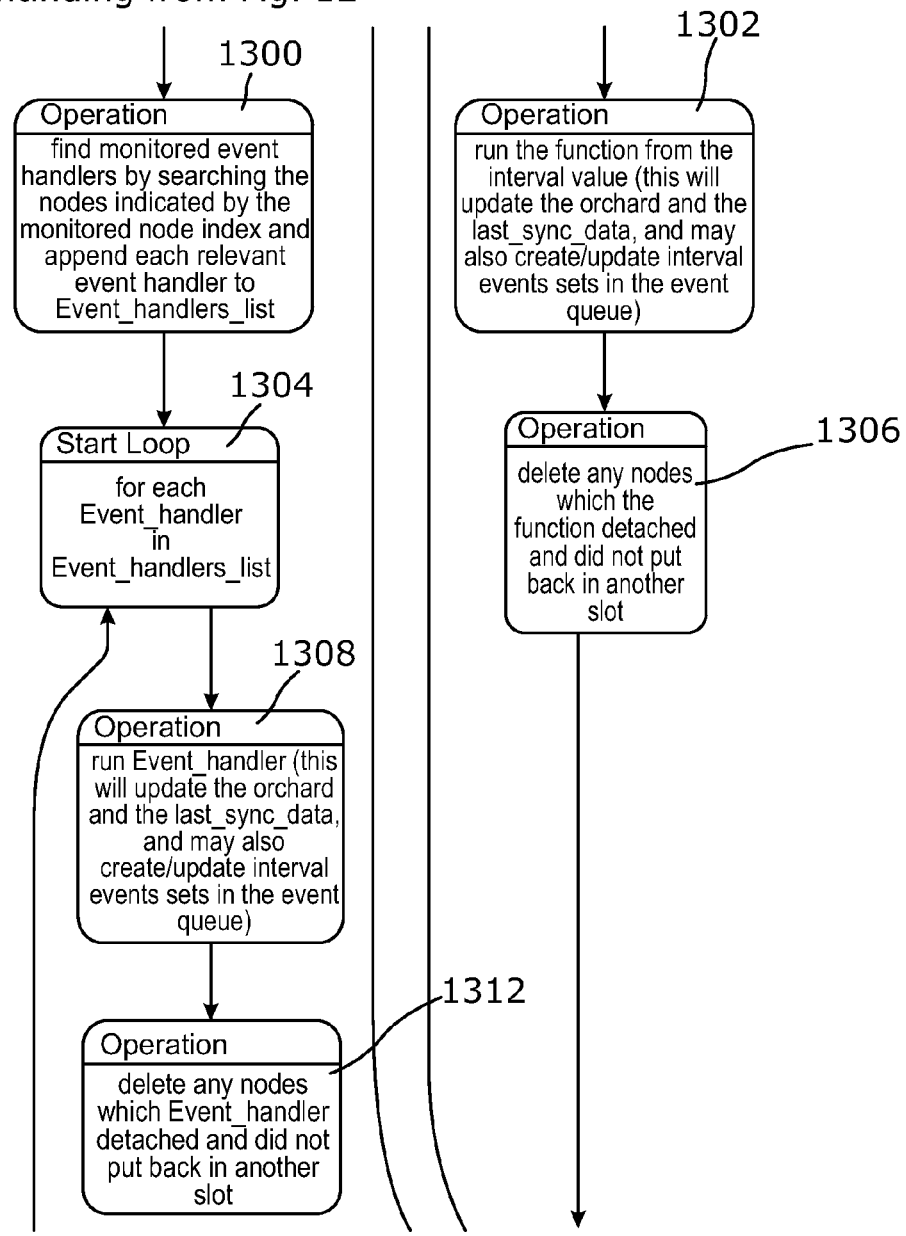
Figure 14:
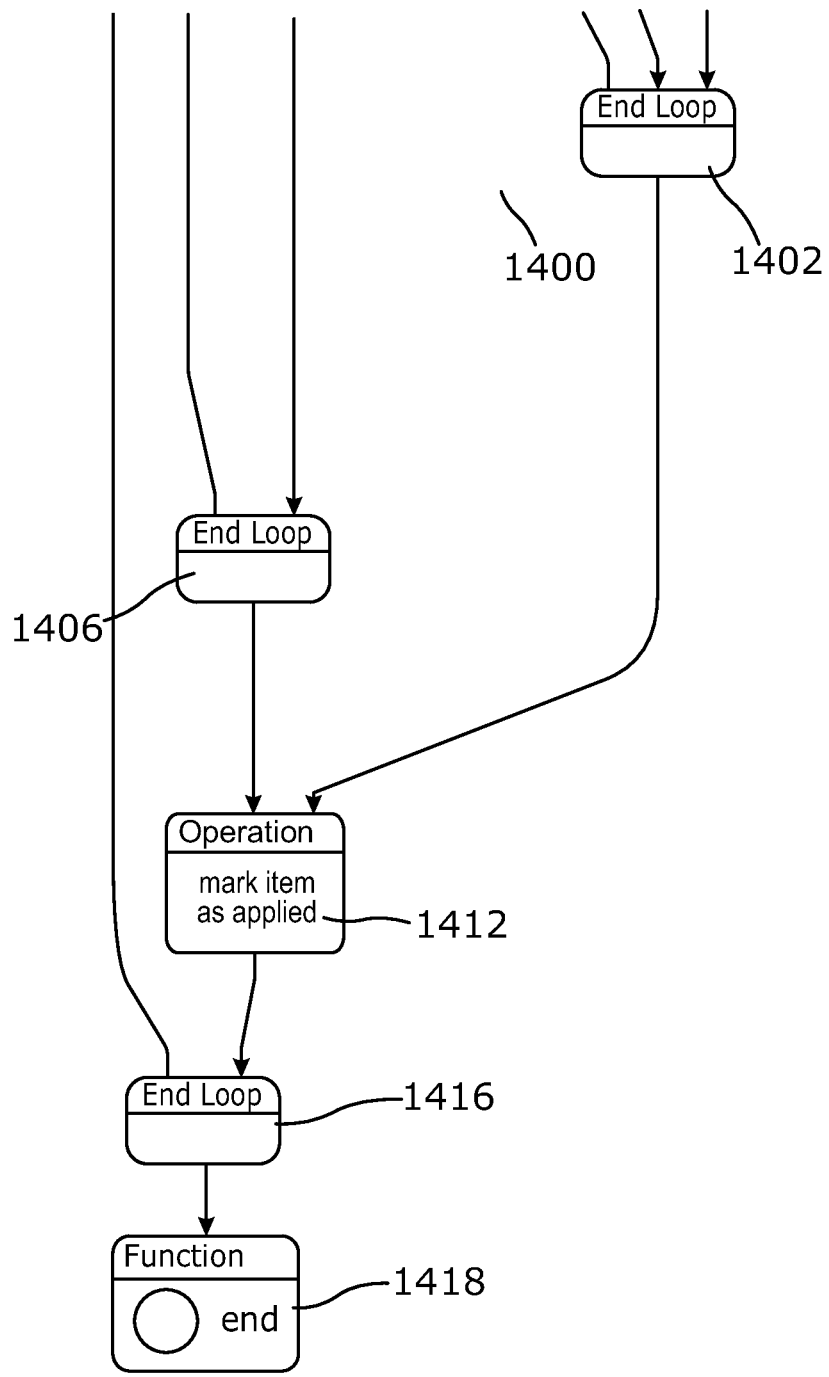

FIG. 10 is a flow diagram of a method at the client synchronizer 328 of FIG. 3. A synchronization packet is received 1000 from the server. The synchronizer reads the prediction metrics from a header of the synchronization packet (in examples where prediction is implemented) and updates the client event queue, and the insertion delta 1002. To update the client event queue the synchronizer may remove any confirmed input events (events which have already been applied at the server). The prediction metrics may include updates to the insertion delta.

The synchronization packet comprises one or more update commands. For each update command in the packet 1004 a check 1006 of the command is made. If the commands is about a node which exists in the authoritative version then the existing node is found 1008 using the node map. The found node is updated using the command. If the node does not yet exist in the authoritative version a new node is created 1010. The new node is stored in the node map and the authoritative version. A set of removed node ids (nodes removed from the node map) is maintained 1012 and a set of added node ids (nodes added to the node map) is also maintained 1014.

To reduce memory requirement and computing resource requirement the authoritative orchard may be pruned using the maintained sets of added and removed node ids. The node map may alternatively, or in addition, be pruned using the maintained sets 1018.

FIGS. 11 to 14 give a flow diagram of an example method at the client predictor 314 of FIG. 3. The flow diagram is split over several pages in a similar manner to FIGS. 6 and 7. The process begins at step 1100 and moves to a decision 1102 as to whether or not the synchronizer has just updated the authoritative orchard. If not, items from the event queue are identified for applying to the prediction orchard. If an update of the authoritative orchard has just occurred then the authoritative orchard is copied to make the prediction orchard. In this way the prediction orchard is repeatedly replaced (as the process of FIGS. 11 to 14 repeats) by the authoritative orchard and this acts to correct prediction errors in a simple, effective manner that results in a highly usable system for the end user.

Immediately after copying 1104 to make the prediction orchard the event queue is updated 1106 to indicate that none of the items in the event queue have been applied to the prediction orchard. Prediction is enabled by applying events to the prediction orchard where the events are known to the client before they are known to the server. Events may be known to the client before they are known to the server because the events occur local to the client (and so avoid long network latency), either at the client itself or at another entity in local communication with the client (such as another client). Thus in some examples clients may send event data to one another to populate event queues at those clients.

The event queue may also be updated 1108 by recalculating the interval event sets from the updated prediction orchard.

Selected items from the event queue are applied to the prediction orchard and then the prediction orchard is used for rendering a display at the client in order to render a predicted display. For example, the selected items are those not already marked as applied and whose apply time is less than or equal to a render time 1110. A decision is made 1112 for each of the selected items as to whether it is an input event 1200 or an interval event set 1202.

An event handlers list is created 1214 which is initially empty. This event handlers list is populated using steps 1216, 1218, 1300 which are the same as steps 620, 624, 706 described above with reference to FIGS. 6 and 7. Each event handler 1304 in the event handlers list is executed 1308 to update the prediction orchard and any detached nodes are deleted 1312.

If the event queue item is an interval event set 1202 then steps 1206, 1208, 1210 occur which are the same as steps 612, 618, 622 described above with reference to FIG. 6. The event is applied to the prediction orchard 1302. Detached nodes are deleted 1306 and end loop 1402 is reached.

As the prediction orchard is replaced by the authoritative orchard after synchronization, errors are corrected in a workable manner. Replacement of the prediction orchard by the authoritative orchard is described above as happening after every synchronization packet update. However, this is not essential. Replacement intervals may be varied according to the particular application and/or communications infrastructure used. Replacement intervals may be regular or irregular. Replacement may be controlled dynamically according to any one or more of: observed network latencies, CPU load, or prediction metrics received from the server.

Figure 15:
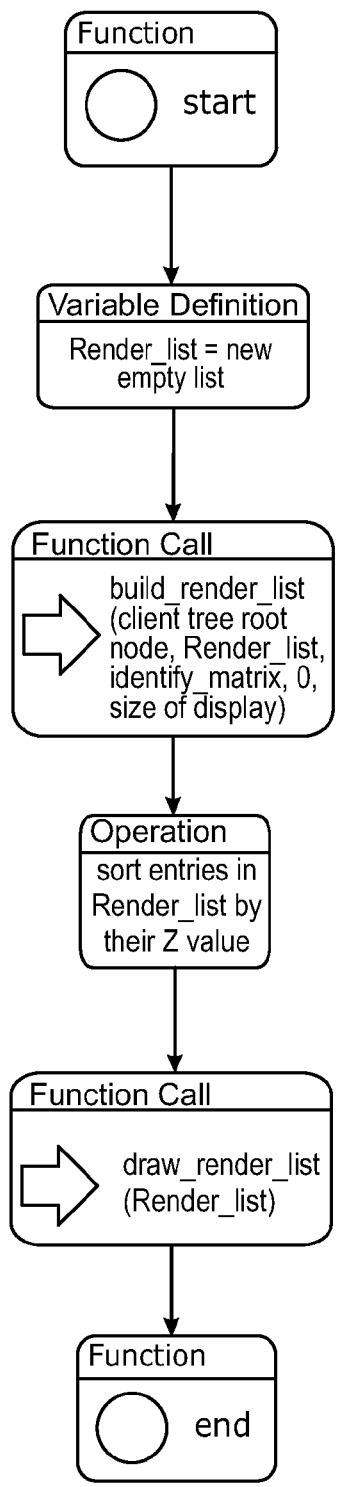
FIG. 15 is a flow diagram of an example method at a client renderer.
Figure 16:
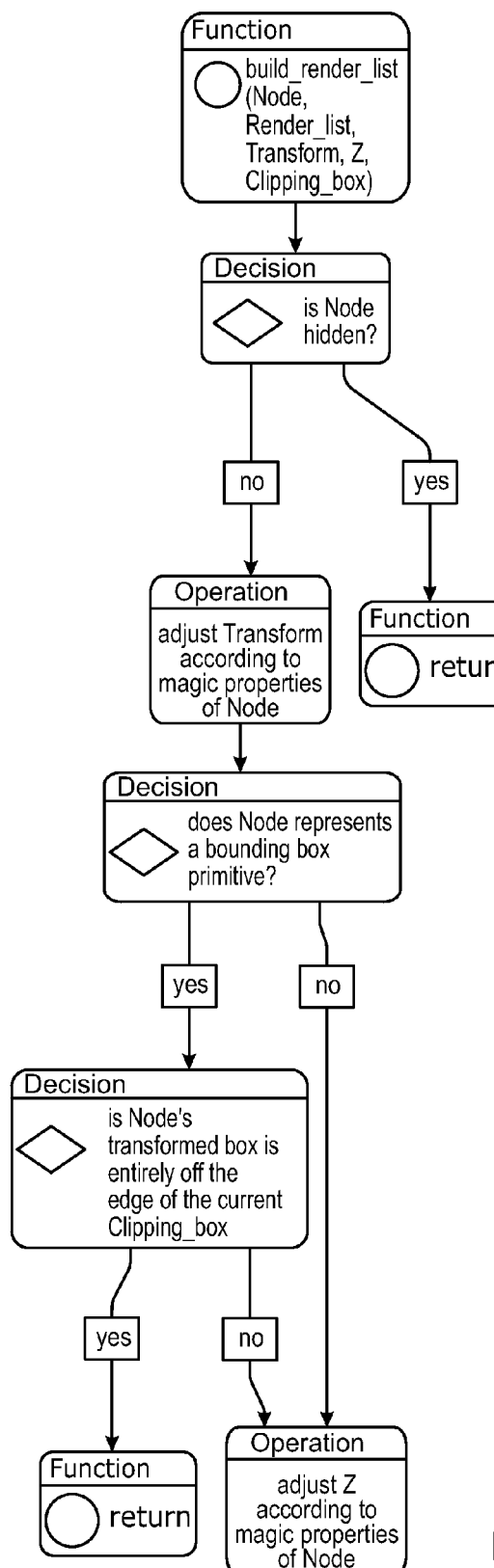
FIGS. 16, 17 and 18 show a flow diagram of an example method of building a render list.
Figure 17:
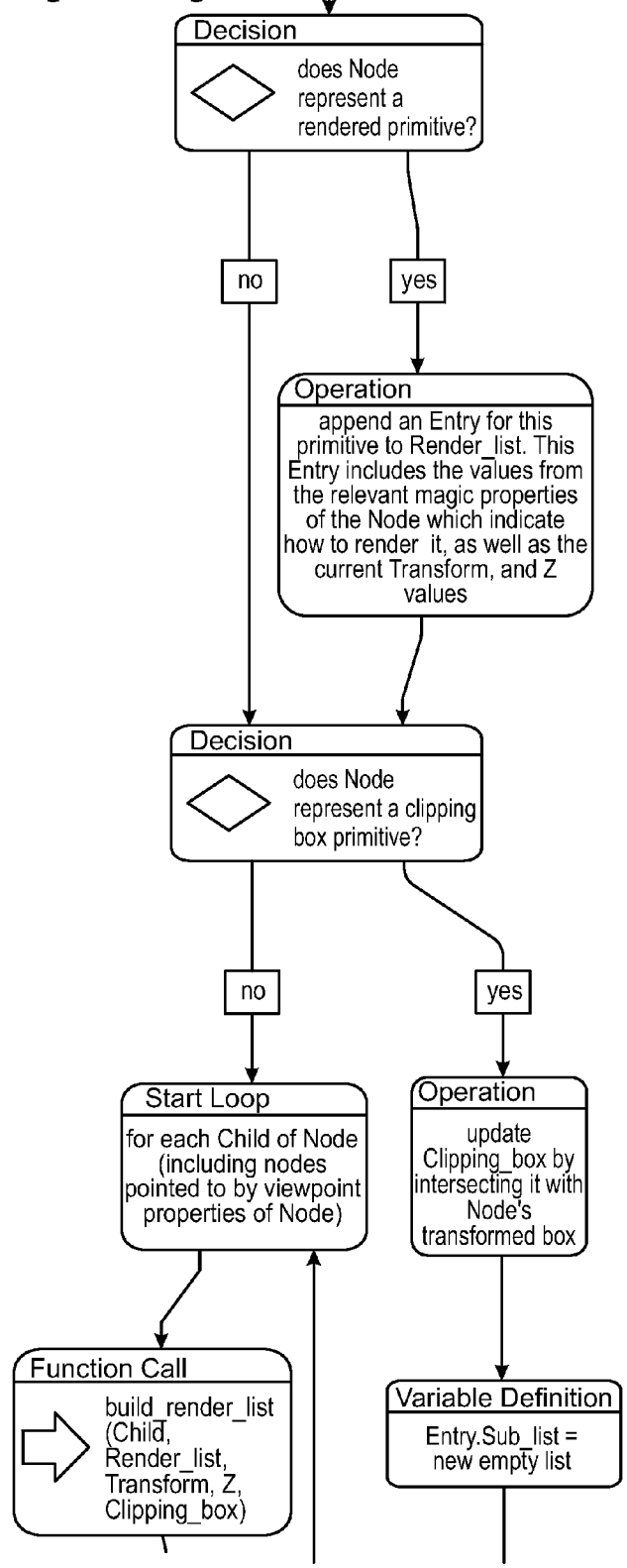
Figure 18:
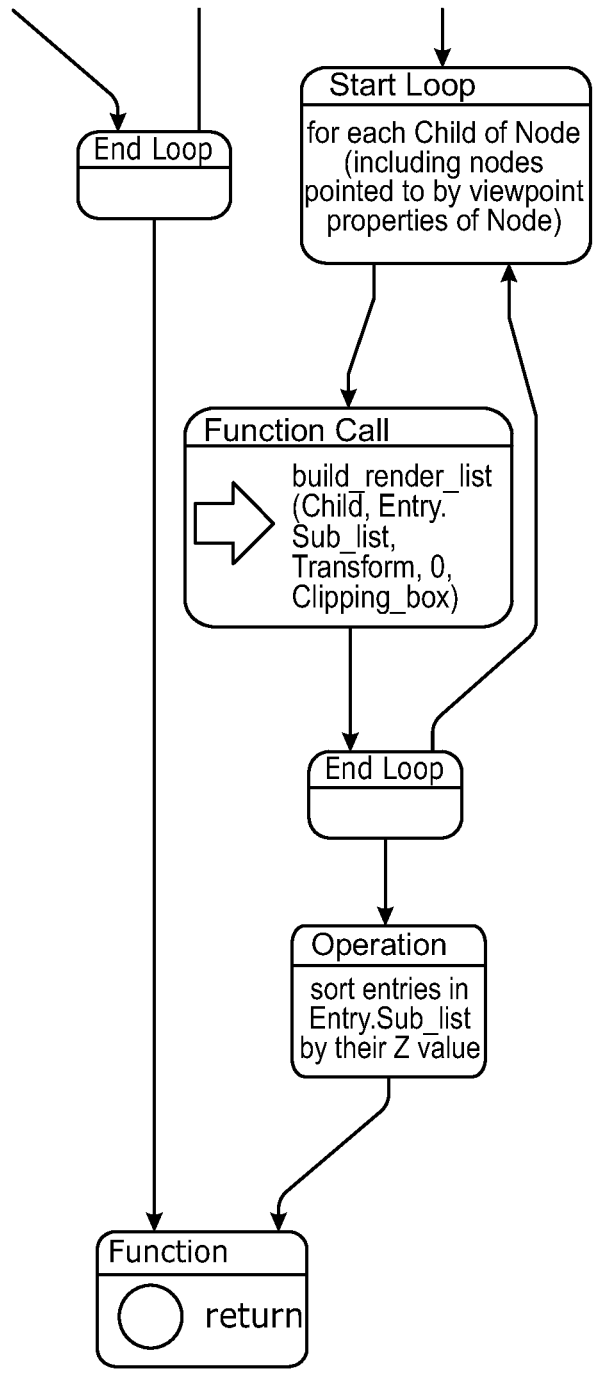
Figure 19:
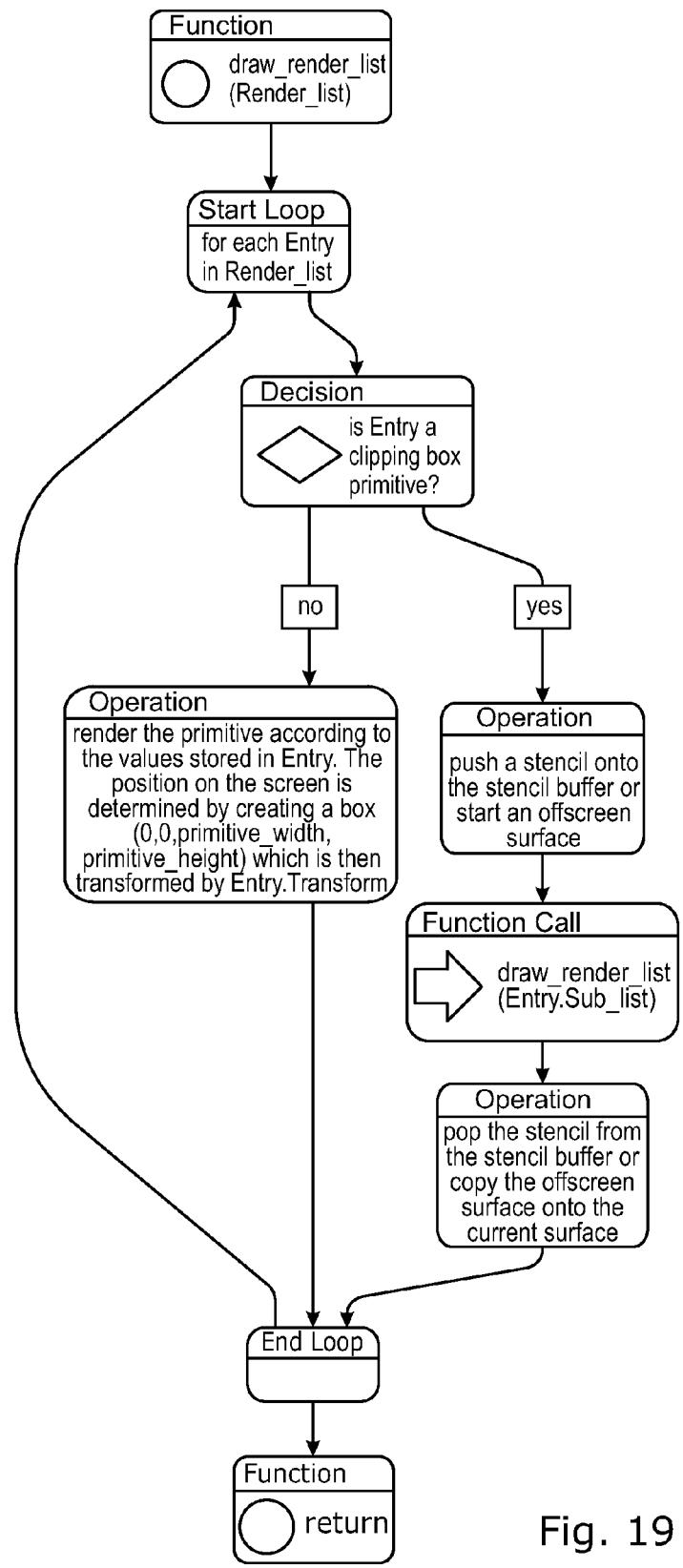
FIG. 19 is a flow diagram of an example method of drawing a render list.
Figure 20:
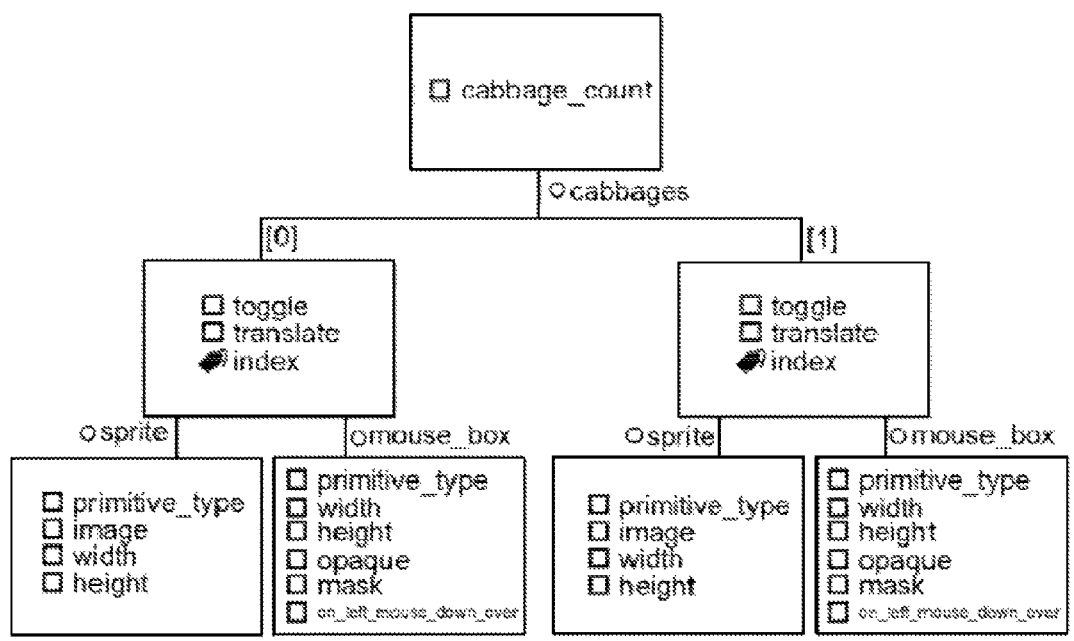
FIG. 20 is schematic diagram of an example graph of connected nodes.
Figure 21:
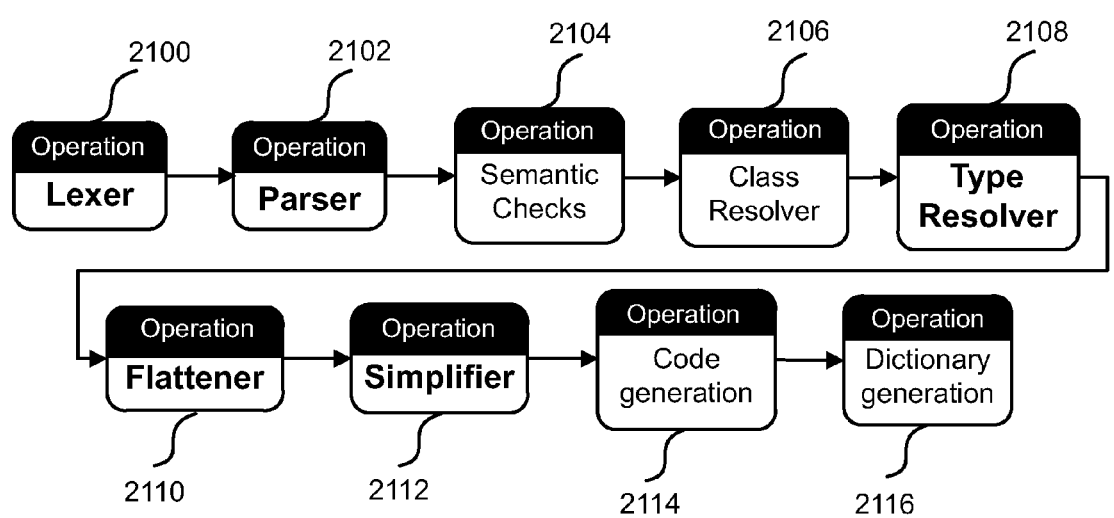
FIG. 21 is a schematic diagram of a compiler.

FIG. 15 is a flow diagram of an example method at the client renderer 318 of FIG. 3. FIGS. 16, 17 and 18 show a flow diagram of an example method of building a render list. FIG. 19 is a flow diagram of an example method of drawing a render list. FIG. 20 is an example graph of connected nodes. FIG. 21 is a flow diagram of a method at the compiler and is described in more detail later in this document.

FIG. 22 illustrates various components of an exemplary computing-based device 2200 which may be implemented as any form of a computing and/or electronic device, and in which embodiments of a server or a client may be implemented.

Computing-based device 2200 comprises one or more processors 2202 which may be microprocessors, controllers or any other suitable type of processors for processing computer executable instructions to control the operation of the device in order to serve a networked graphical and/or audio application or to operate a client computer in a deployment of the networked graphical application. In some examples, for example where a system on a chip architecture is used, the processors 2202 may include one or more fixed function blocks (also referred to as accelerators) which implement a part of the method of any of the flow diagrams herein in hardware (rather than software or firmware). Platform software comprising an operating system 2204 or any other suitable platform software may be provided at the computing-based device to enable application software to be executed on the device. A graphical and/or audio client-server system 2208 is available at the computing-based device 2200 and is arranged to carry out one or more of the methods described herein. A data store 2210 at the computing-based device is available to store dictionaries, temporary data, configurable settings, parameter values and other data.

The computer executable instructions may be provided using any computer-readable media that is accessible by computing based device 2200. Computer-readable media may include, for example, computer storage media such as memory 2212 and communications media. Computer storage media, such as memory 2212, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 2212) is shown within the computing-based device 2200 it will be appreciated that the storage may be distributed or located remotely and accessed via a network or other communication link (e.g. using communication interface 2214).

The computing-based device 2200 also comprises an input/output controller 2216 arranged to output display information to a display device 2218 which may be separate from or integral to the computing-based device 2200. The display information may provide a graphical user interface and/or a loudspeaker. The input/output controller 2216 is also arranged to receive and process input from one or more devices, such as a user input device 2220 (e.g. a mouse, joystick, games console controller, or a keyboard). This user input may be used to operate a networked graphical and/or audio application. In an embodiment the display device 2218 may also act as the user input device 2220 if it is a touch sensitive display device. The input/output controller 2216 may also output data to devices other than the display device, e.g. a locally connected printing device.

Detailed information about various embodiments is now given.

OVERVIEW

The system improves on the status-quo, by achieving much of the simplicity and re-usability normally achieved by using a thin client approach, whilst also achieving the efficiency and prediction benefits typically only achieved by programming a custom server, client and network protocol for each application.

This is achieved by using a general purpose server, client and protocol (i.e. as with the thin client approach), but instead of sending a bitmap of the display to the client several times a second, instead the application itself is sent to the client several times a second (including a snapshot of both its code and current state). The client can then run the application to render the display and make predictions. As the client receives an updated snapshot of the application repeatedly it is kept in sync with the server, even if it predicts incorrectly (for example due to the unpredictable actions of another client).

To make this possible and efficient involves the application being represented using a very carefully designed data structure (called 'the orchard', described later in this document). This data structure:

- Contains both the code of the application and its current state.
- May be sufficiently flexible to represent a wide variety of graphical applications.
- May be possible to transmit from the server to the client efficiently (and allows for incremental updates, so it is not necessary to send the entire application every time.)
- Allows for clients to receive a subset of the total application, (so different clients can receive different portions of the whole depending on what they need to know.)
- Can be processed on the client to allow the client to render the display and make predictions about what the server will do next, even if the client has only received a portion of the total application.

The client and server contain several algorithms (described in the 'Framework Algorithms' section of this document), which are able to process the orchard and hence run the application, including:

- Rendering the display on the client.
- Synchronizing the orchard from the server to the client (using a single protocol which avoids the need to develop a separate protocol for each application.)
- Providing input events to the orchard which then processes them and updates itself based on the code it contains.
- Optionally making predictions on the client about what the server will do. (Continuously correcting/refining these predictions as additional updates are received from the server.)

Finally the system defines:

- A concise language which can be used to describe the application (i.e. it defines the initial state of the orchard). This is described in the 'Sync Algorithm' section of this document.
- A compiler which processes that description, and generates instructions which can be used by the server to create the orchard in its initial state, and dictionaries which may be used by the client and server to represent/transmit/process the orchard more concisely and efficiently.

This means that developing a networked graphical application with this system is then just a case of defining a single description of the application in the language, with no need to develop a separate client, server and protocol.

The Orchard

This section of the document describes the main data structure which is used to represent the state of the running application, and which is synchronized between the server and the client.

Nodes

The state of the application is represented as several 'trees' of connected 'nodes'. These trees can represent the application, including what to render on each client's display, variables and state of the application, and the code which determines the behavior/logic of the application.

In various examples, one such tree is created for each client, (which represents that client's display, and any state private to that client). These are referred to as 'client trees'.

Additionally one 'shared tree' may be created on start-up (which typically represents shared areas multiple clients can see, state shared by multiple clients, and state which needs to persist even when no clients are connected).

There are number of different ways of structuring these trees of nodes. In this implementation each node contains a number of 'properties', 'slots', and 'labels' (collectively referred to as 'features'). However, other ways of structuring the trees of nodes may be used.

There are a number of different ways a tree of nodes can be drawn on paper. In this document the slots which a node contains are drawn as lines extending downwards from that node, and then the nodes in those slots are drawn on the end of those lines.

Features

Properties

Each property may store a single value. The type of the value stored matches the type of the property. For example a property of type 'integer' may store the number 5, or a property of type 'string' may store the string "Hello".

For a list of the types of value a property can store see The 'Types' section of this document. Obviously there are many other different types of value a property could store, (for example: more numeric types, types from other programming languages, types that represent more types of media such as models, etc. . . . ), it is also be possible to give developers the capability to define their own types.

One of the types a property can store is a function, which makes it possible for the node to store code.

A property can be written to, in order to change the value it stores, or it can be read to determine what value is currently stored.

A single node can have multiple properties, and so can store multiple values.

Slots

A slot allows a node to contain further child nodes, and hence allows a tree of nodes to be built.

A node can be moved from one slot to another, and therefore it is possible to reconfigure the trees, and move sections of data from one tree to another. However in this implementation each node is in one slot at a time, and loops of nodes are not allowed.

There are number of different storage types which a slot can use:

- A single slot can contain a single child node or can be empty. The child node's 'index' is 0.
- A list slot contains child nodes in an ordered list, and can therefore contain a theoretically unlimited numbers of child nodes. Child nodes can be appended to the end of the list, or inserted at any point. The child node's 'index' indicates its position in the list.
- An array slot contains child nodes in a fixed size array. This allows that slot to contain up to a fixed maximum number of child nodes. The child node's 'index' indicates its position in the array. If it is a multi-dimensional array there will be more than one index (one index for each dimension of the array).
- A map slot contains child nodes in a hash map. This can also contain any number of child nodes as long as each child node is given a unique index. The child node's 'index' can be any immutable value from which a hash code can be calculated.

There are other storage types which could be implemented corresponding to other common programming data structures.

Labels

Each node has an index which indicates the position of the node in the slot it is in (see above). However the index is not necessarily stored on the node. I.e. a node could be located in index 3 of an array but it isn't necessarily required to store that fact on the node. If it is desired to store the index, so it can be retrieved from a node later, then a label may be used.

A label is very similar to a property. As with properties each label stores a single value. The main difference is the value in the label is set automatically. The value in a label can be set automatically based on the where in the tree the labelled node is.

For example a label could be added to a node, which is automatically set whenever that node is placed into particular list slots, and indicates what position in that list slot the node resides in. As the node is moved around the label is kept up to date. When the node is not in such a list slot the label is automatically cleared.

If the node can be stored in a multi-dimensional array slot more than one label may be desired.

Terminology Used when Talking about Trees

To make things simpler when talking about trees in this document the following terminology is used.

Child and parent: A node which is directly inside another node (because it is stored in a slot of that node), is referred to as a 'child'. I.e. in FIG. 4: Node B is a child of node A. Conversely node A is the parent of node B.

Descendant and ancestor: All the nodes which are directly or indirectly inside another node are referred to as 'descendants'. In FIG. 4 nodes B, C and D are descendants of node B. Conversely nodes A and B are the ancestors of node D.

Root node: A root node is a node which is at the top of a tree and therefore does not have a parent. i.e. in FIG. 4 node A is the root node.

Annotations

Each feature can be annotated with additional information which indicates either how that feature behaves, how that feature should be compiled, or what the data stored in that feature represents/controls. This affects how the framework algorithms (see the 'Framework Algorithms' section) process that feature.

For a list of the annotations the system supports see The 'Annotations' section of this document. The system can be extended with further annotations to extend the capabilities of the system. Examples include: further input event handler annotations to allow handling of more types of input event (such as touch events or joystick events, or events corresponding to new peripherals as they are developed, etc. . . . ) or further annotations to control additional features of the renderer or represent additional primitives in the renderer (such as 3d rendering, particles, shadows, etc. . . . ) or to allow integration with a physics engine.

Node Classes

Which features a node contains, and the annotations of those features is not changed at runtime. In some examples, all that can be changed at runtime about a node is the values stored in the various properties/labels, and which nodes appear in which slots.

So for example if a particular node is defined as containing a property which stores a value of type boolean and which indicates the secrecy of that node, then that particular node will always have that property and it will always control the secrecy. All that can potentially be changed at runtime is if the value of that property is true or false.

The list of features which a particular node has (but not the values or contents of those features), and the annotations of those features determine that node's node class.

There is a finite number of different node classes which a particular application will need. The compiler (see the 'Language and Compiler' section) is able to automatically determine from the application definition all the node classes which will be required for a particularly application and creates a compiled representation of each, which can be used to efficiently represent nodes of that node class.

Ids

Node Class Id

Each node class is assigned a unique 'node class id', which can be used to identify that node class.

Property Ids

Each property field in the node class is given a unique 'property id' which can be used to identify that property within that node class. These ids only need to be unique within that node class. (I.e. if a node class contained 5 properties the ids assigned to those properties would probably be 0 to 4 inclusive).

Slot Ids

Likewise each slot field in the node class is given a unique 'slot id' which can be used to identify that slot within that node class. These ids only need to be unique within that node class. (I.e. if a node class contained 3 slots the ids assigned to those slots would probably be 0 to 2 inclusive).

Node Ids

It is possible to have multiple instances of the same node class. (For example the orchard could contain 5 different nodes each of node class 'sprite', but each representing a different sprite on the client's display)

Each node instance is given a unique numerical id when that node is first created (referred to as the 'node id') which can be used to identify it. No two nodes in the orchard should have the same node id. (No matter where they appear in the orchard, and even if they are of a different node class to each other).

Node Instance Summary

So to summarise, each node instance in the orchard is made up of:

Which node class to use to represent that node instance (which therefore defines which properties and slots the node contains, and all the annotations, but not the property values or slot contents)

The unique node id for that node instance.

The value of each property and label.

The contents of each slot.

The Dictionaries

In some examples, the compiler generates dictionaries which are used to improve the efficiency of the orchard. By pulling commonly used data out into in a dictionary rather than storing it in the orchard directly, the orchard (and the protocol which transmits it) can be more concise. However, it is not essential to use dictionaries.

There is generally no need to make a distinction between what data is held directly in the orchard and what data has been extracted into the dictionary. I.e. whether a property in the orchard directly holds a particular function, or contains a pointer to an entry in the dictionary which contains that function, makes little difference to the algorithms. It is still considered that that property (and therefore the orchard) contains that function, as it is still the pointer in that property which determines which particular function it contains from time to time.

In examples, one dictionary is created for use by the server, and one dictionary is created for use the by the client. The two dictionaries have many entries in common, but differ as the compiler may be able to determine that some entries (or parts of entries) may only be required on the server and some entries (or parts of entries) may only be required on the client.

After the dictionaries are created by the compiler they are constant and do not change whilst the application is running.

The client dictionary can be sent to the client in a variety of ways, for example: it can be bundled with the client installer, sent by the server when the client first connects, or streamed on demand to the client as specific entries are required.

Entries in the dictionary may include:
- Instructions on how to create the orchard in its initial state, which can be referred to by the server when first starting the application. This is not required on the client.
- Instructions on how to create pre-defined branches of nodes, which can then be referred to by the running application to add entire branches to the orchard with a single concise expression.
- All the media which can appear in the orchard: images, models, video, music, sounds, fonts, etc. . . . (On the server the dictionary only needs to include the metrics of the media, for example the dimensions of the image may be required, but not the entire image data).
- Compiled versions of each node class which can appear in the orchard. These can be used by the client or server to represent a node of that node class efficiently.
- Compiled versions of each function which can appear in the orchard. These can be used by the client or server to execute that function efficiently.
- A variety of literal values which can appear in the orchard. (for example string literals)
- Immutable instances (see below).

Another advantage of moving this data into a dictionary rather than storing in the orchard directly is it makes it easier for portions of the dictionary to be stored in the location and format which is optimal for the hardware being used. For example the image media portion of the client dictionary can be converted into a texture atlas and stored directly on the graphics card to allow more efficient rendering.

Immutable Data

A node will typically contain several values which cannot change, including:
- The values of constant properties.
- The values of constant labels.
- The dimensions of any array slots.

If two node instances happen to have the same constant values it is desirable for them to both share the same data rather than storing two copies of it.

To facilitate this all the constant values of a node may be pulled out into a separate data structure called an 'immutable instance'. Rather than storing the constant values directly, the node instead stores a pointer to the immutable instance which contains all its constant values. This way if two nodes have exactly the same set of constant values they can then both point at the same imutable instance. However, it is not essential to use immutable instances.

Furthermore, the compiler can determine the set of all imutable instances required by all the node instances in the orchard, and:
- Assign each such immutable instance a unique id (the 'immutable id').
- Store the definition of each imutable instance into the dictionaries.

This way when a node is transmitted from the server to the client the protocol may include a single 'immutable id' to allow the client to determine the node's constant values (by looking up the appropriate entry in the dictionary), and the protocol then only needs to send more detailed information for the dynamic values of the node.

Framework Algorithms

The framework algorithms are the algorithms utilised by the client and server in order to run the application, render the display, transmit the application from the server to the client, etc. . . .

Note: To allow the algorithms to operate more efficiently some additional data may be temporarily generated and stored in or alongside the orchard. However this data is not considered part of the orchard, in that it is not transmitted from the server to the client, and there is no need to define its initial state. The temporary data used by each algorithm is documented alongside that algorithm. It is not essential to use temporary data.

Render Algorithm

The tree structure described above is sufficiently flexible to be used to represent complex graphical user interfaces.

In examples, this is done by creating individual nodes which represent simple graphical primitives, and then building many of those simple primitives together into a tree to form a more complex interface.

The renderer algorithm works by starting at the node at the top of the client tree to be rendered (each client tree represents a different clients display), and recurring down in a depth-first search into each of the nodes in the tree. For each node it finds, if it determines that node represents a graphical primitive the corresponding graphic is drawn to the display.

For a diagram of one example of a render algorithm see FIGS. 15 to 19. More details of the example algorithm are now given.

Primitive Type

In this implementation the renderer first checks each node it encounters for a magic=primitive_type magic property. This indicates that the node with that property represents a graphical primitive which should be rendered.

In this implementation the renderer supports the following 2d primitive types:
- solid rectangle
- outline rectangle
- text (including outlined text and curved text)
- sprite (with various blending modes)
- bounding box
- clip box (with various blending modes)
- (Other graphical primitives such as circles, triangles, etc. . . . may be supported)

Once the renderer has determined that a particular node represents a graphical primitive, it then reads further magic properties from that same node to determine the parameters of that primitive. (Using default values if the magic property in question is not present on the node).

For example:
- Anode representing a sprite primitive has another magic property containing the image data to render, and other magic properties indicating how large to draw it, and how to blend it on to the display.
- A node representing a text primitive has a magic property containing the string to render, and other magic properties indicating which font to use, what color to use, what font size to use, etc. . . .

Functions in Magic Properties

A magic property read by the renderer is also allowed to contain a value of type function, as long as that function has no parameters, and does not make any modifications. For example: the magic=primitive_width property may contain an integer, and it is also allowed to contain a function which returns an integer (as long as that function doesn't modify the orchard). If the renderer encounters such a function it will just execute it to retrieve the answer. This way it is possible to make the appearance of the display depend on calculations which are performed when rendering occurs.

Transformation Matrix

To determine where on the display to draw each primitive the renderer builds up and then applies a transformation matrix. (Because this is a 2d rendering algorithm this is 3×3 homogeneous matrix)

The algorithm for this is as follows:

At the start of the render the transformation matrix starts off as the identity matrix.

For each node which the renderer descends through it checks for magic properties which transform that matrix, including:
- a magic=translate property, which applies a translate transform to the matrix
- a magic=move_pivot property, which applies a translate transform to the matrix, prior to applying all the rotates and scales, and then applies the inverse of that translate after all the rotates and scales are applied
- a magic=rotate property, which applies a rotation transform to the matrix
- a magic=scale property, which applies a scale transform to the matrix
- (Obviously other matrix transforms could also be supported).

When the renderer comes to render a primitive it first calculates a position for each corner of the primitive, generally placing the top left corner at the origin (for example for a sprite primitive the 4 corners are placed at (0,0), (primitive_width,0), (0, primitive_height), (primitive_width, primitive_height).

Finally the renderer transforms the coordinate of each corner calculated in step c) using the current transform matrix calculated in steps a) and b), to work out the final position on the display which that corner should appear at. The composite transform which is used to transform a primitive into the correct position on the display is referred to as the 'screen space transform'.

For more information on transforms see the section "Types" later in this document.

Z Sorting

When the renderer is drawing the display it doesn't actually draw the primitives as soon as it encounters them. It instead:

First builds up a list of all the primitives which need drawing.

Sorts that list into order (the sorting algorithm is described below).

Finally renderers each primitive in the list.

This allows the primitives to be rendered in a different order to the order they are found in. If two primitives overlap this will affect which one will appear in front.

The list is sorted as follows:

At the start of the render the z value starts off as 0.

For each node which the renderer descends through it checks for magic=z properties, and it any are found, the numbers in those properties are added to the z value.

When the renderer finds a primitive and adds it to the list is also stores the current z value alongside the primitive.

The final list is then sorted using the z value using a stable sorting algorithm.

If two primitives have the same z value they are drawn in the order the renderer encountered them.

Hiding Portions of the Tree

If the renderer encounters a node which has any magic=hidden properties whose value is set to true, it causes the renderer to ignore that node and all its descendants. (I.e. the renderer just returns and does not carry on recurring down that branch).

Bounding Box

The bounding box primitive is used for optimisation. By marking a node as a bounding box the developer is asserting that every descendant of that node will only render to the area of the display covered by the bounding box. Therefore if the renderer detects that the bounding box is entirely off the edge of the current clipping rectangle (which is initially the same size as the display), it does not need to bother considering any of the descendants of that node.

Clip Box

It is possible to create a primitive which sets up a clipping rectangle by specifying primitive_type=clip_box. This may require additional magic properties specifying the width and height of the clipping rectangle. The renderer will then clip all the descendants of that node using that clipping rectangle.

This can be implemented by using the stencil buffer feature of the graphics card, or by rendering all of the children to an off screen surface of the correct size, and then rendering that off screen surface onto the display in place of the clipping rectangle. The advantage of using an off screen surface is it also allows additional blending options to be specified (example blending options are color/transparency manipulations, or spatial distortions such as a rippling effect).

In this example when a clip box is used it affects the z sorting algorithm, as the simplest way to implement the clip box is to set up the clipping, render all the descendants, and then reset the clipping. But if the z sorting changed the order such that some of the descendants were rendered before the clip box that would not work. Therefore to avoid that failure case, when a clip box is encountered the renderer starts a new sub list, and places all the descendants of that clip box in that separate sub list, sorts that sub list separately using the z value of the items in that sub list, and then that sub list is stored alongside the clip box primitive. The clip box primitive is then stored in the parent render list. When the renderer comes to render the clip box it can then just set up the clipping, render the sub list, and then reset the clipping.

Viewport

A viewport can be used to cause the renderer to jump to a different part of the current tree, or jump to a different tree entirely. This is particularly useful because it means that it is possible to place a viewport in the tree which represents a particular client's display, and direct that viewport to point at a node in the shared tree, and hence cause that portion of the shared tree to appear on that client's display. This allows multiple clients to view and manipulate a shared interface whilst also allowing them to display other parts of their interface which are unique to that client.

A viewport is created by specifying a magic=viewport property. The value of this property is a reference (see the 'Types' section of this document) to another node. If this property is specified the renderer will treat the referenced node as an additional child of the current node, and will recur into it exactly as if it were a child in one of the slots of the node. Because this allow loops to be formed the renderer needs to keep track of which nodes it has already been through and error if it goes through the same node twice. (Otherwise an infinite loop locking up the renderer could occur.)

Sync Algorithm

Write Sync Algorithm

The write_sync algorithm is used to send the orchard from the server to each client. The algorithm is designed to save bandwidth and other resources by only transmitting the parts of the orchard which have changed since the client last received an update, and only transmitting the parts which are not secret to that client. A node can be made 'secret' to one or more clients by creating property(s) with the magic=secret annotation, (see The 'Annotations' section of this document magic=secret). If a node is secret, then all its descendants are implicitly also secret.

Temporary Data

In some examples, to enable the write_sync algorithm to operate efficiently each node on the server (which was transmitted to at least one client the last time write_sync ran) may store the following temporary data:

modified flags: Each node has a set of flags which remember if it has been modified since the last write_sync:
There is a flag for each property of the node remembering if that specific property has been modified. (Optimisation: this can be omitted for constant properties and relocated_constant properties, as the property cannot be modified in that case).
There is a flag for each slot of the node remembering if that specific slot has been modified. (Optimisation: this can be omitted for constant slots as the slot cannot be modified in that case).
MODIFIED_DETACHED_SINCE_LAST_SYNC flag: This flag remembers if the node has been detached from a slot since the last write_sync (and therefore may have moved slot).
MODIFIED_SECRECY flag: This flag remember if the secrecy of the node has changed since the last write_sync. (I.e. one of the magic=secret properties has been written to).
MODIFIED_DESCENDANTS flag: This flag remembers if any descendants of the node have been modified.
These flags are set whenever the corresponding modification to the tree is made, such that they contain the correct value by the time the next write_sync runs. They are then cleared at the end of the write_sync ready for the next sync. It is possible for a flag to occasionally be set when no modification has been made (for example if a property is set to a new value and then set back to the old value), and in this case it just causes a small amount of bandwidth to be wasted as unnecessary data is sent.

clients_on_last_sync set: This set remembers all the clients who the node was transmitted to on the last write_sync. (Optimisation: this data can be omitted if the node is in a constant slot and has no magic=secret properties, as in that case the set of clients who could see this node on the last write_sync is bound to be the same as the set of clients who could see the parent node on the last write_sync).

list_changes buffer. This buffer is stored for each revealed list slot, and remembers which insertions or deletions have been made to that list slot since the last write_sync. This doesn't record exactly what was inserted or deleted, it is just an ordered list of each index in the list which an entry was inserted into or deleted from. (This can be represented as a simple list of numbers, positive numbers are used to represent an insertion, negative numbers are used to represent a deletion, and 0 is used to terminate the list. i.e. the sequence 3,−1,2,0 would mean a node was inserted before the $3^{rd}$ node in the list, then the $1^{st}$ node was deleted, then finally a node was inserted before the $2^{nd}$ node in the list.)

clients_with_removed_node set: This set is stored for each concealed slot. This remembers the set of all clients where a child visible to that client has been removed from this slot since the last write_sync. (I.e. Any time a child node is removed from this slot, all the clients who could see that child node on the last write_sync are added to this set, and this set is cleared at the end of each write_sync)

per client modified flags: For each client_dynamic property, as well as the modified flag described in 1a) above (which remembers if the property was modified at all), there are more precise modified flags (one for each client) which remember if the property was modified for that particular client.

For each node, all the write_sync temporary data (as described above) is stored in a single structure referred to as that node's last_sync_data. If a particular node was not transmitted to any clients the last time write_sync ran, then the last_sync_data for that node will be null.

Special Slot Entries

For revealed slots of storage type array or map, whenever a node is removed from that slot, a special REMOVED_NODE marker is put in the slot in place of the node that was removed. If another node is placed in place of the original node then the REMOVED_NODE marker will be overwritten, so it will only be present if a node has been removed, and hasn't yet been replaced.

Array slots and single slots can also contain null to indicate the absence of a child at a particular index. Map slots and list slots will never contain null.

When iterating across the indexes of an array slot, every index will be returned even if the corresponding child at that index is null or REMOVED_NODE.

Algorithm

In an example, the write_sync algorithm works as follows:
The server generates a 'sync packet' for each connected client, which is transmitted to that client
The sync packet has a header which contains:
Various metrics used by the prediction algorithm, (see the 'Prediction' section).
The node id of the root node of the shared tree (if it differs from the last sync packet).
The node id of the root node of that client's client tree (if it differs from the last sync packet).
The sync packet has a body which contains a series of commands which can be used by that client to update the client's representation of the orchard to match the orchard on the server (only including the subset which that client can see).

This list of commands is built up by recurring through each of the trees in the orchard. This particular implementation of the algorithm is optimised to only need to recur through the trees once, and to calculate the sync packets for every connected client all in that single pass.

In an example, for each node encountered the algorithm performs the following steps:
Determine the set of clients which can see the node.
If no clients can see the node there is no need to recur further into this particular branch of the tree. It also deletes the last_sync_data structure for the node and every descendant of the node.
Determine which clients can see the node compared to the last write_sync. Clients who can see the node who could not see it on the last write sync are referred to as new_clients and need the full details about that node, clients who can see the node who could also see it on the last write_sync are referred to as existing_clients and only need an incremental update, and clients who can no longer see the node who could see it on the last write sync are referred to as leaving_clients and do not need an update but some temporary data relating to that client may need tidying up.

If the set of new_clients and the set of leaving_clients are both empty (i.e. the set of clients who can see the node is the same set who could see it on the last sync), and this branch of the tree hasn't changed (i.e. none of the modified flags are set on the node), then there is no need to recur further into this branch of the tree.

Recur into children of constant slots—(note: if using the optimisation mentioned above which allows the clients_on_last_sync set to be omitted for some nodes, this has to be done here, before updating the clients_on_last_sync set of the current node).

Send a COMMAND_SET_FULL command to each new_client, indicating they will receive an update for every slot and non-constant property of the node. (The actual body of this command is written out later in the steps below.)

Update the clients_on_last_sync set for the node, to match the set of clients who can see the node now.

Delete any last_sync_data from node which pertains to clients in the leaving_clients sets (but do not delete the entire last_sync_data structure).

Transmit the value of each non-constant property (and the default value if it is a client_dynamic property) to each new_client.

Transmit the value of each property which has changed since the last write_sync to each existing_client.

Transmit the contents of each slot to each new_client

For each concealed slot: determine which existing_clients need an update (a client needs an update if any changes which are visible to that client have occurred since the last write_sync). If an update is required then transmit the entire contents of that slot to that client.

For each revealed slot: transmit the changes which have occurred to that slot since the last write_sync to each existing_client. Does not need to transmit the entire contents of the slot as instead the individual children which have changed can be referred to by their index.

If any slots of the node have a clients_with_removed_node set, or a list_changes list, this temporary data is cleared.

If any slots of the node contain a REMOVED_NODE marker, this is either replaced with null or removed entirely (depending on the slot type).

Recur into children of non-constant slots—(note: this has to be done here, after transmitting the slot changes, as it will clear the modified flags of the children).

Clear any modified flags of the node.

An example write-sync algorithm is given in FIGS. 8 and FIGS. 36 to 62.

Additional Calls to Blank_Last_Sync_Data

In addition to the calls to blank_last_sync_data described in FIGS. 36 to 62, the last_sync_data for a node is sometimes also blanked in response to that node being moved.

If a node which has last_sync_data is moved to be the child of a new parent node which does not have any last_sync_data, then the last_sync_data for that child is probably no longer needed (as it has just been moved to an area of the orchard nobody could see on the last sync). However as the write sync algorithm does not recur into parts of the orchard nobody can see, the last_sync_data may be blanked as described below:

If a node n which has last_sync_data is moved to be the child of a new parent node which does not have any last_sync_data, then that node n is added to a nodes_which_might_need_last_sync_data_blanking set.

Then after the write sync algorithm has run, each of the nodes in the nodes_which_might_need_last_sync_data_blanking set is checked again, and if it still holds true that the node has last_sync_data and the parent does not, then the blank_last_sync_data function is invoked on that node.

Finally the nodes_which_might_need_last_sync_data_blanking set is cleared ready for the next sync.

Read_Sync Algorithm

The read_sync algorithm reads the command stream output by the write_sync algorithm and uses it to recreate the orchard on the client.

The trees created by the read_sync algorithm may be stored in a slightly different form to the trees on the server. When a slot contains a child node, rather than storing a pointer to that child node directly the slot instead stores the node id of that child node. (i.e. it stores an integer). The client also maintains a map of all the nodes which were visible to it on the last sync. This map is called the node_map, and contains each node indexed by its node id. Therefore to determine which node is in a slot, first retrieve the node id from the slot, and then use the node_map to find the actual node corresponding to that node id. The reason it is implemented this way is because it means the client can safely receive and store the list of children in a slot before it has received the details about those children.

If a slot on the server contains null, (see Special Slot entries above), then that is represented on the client by storing the special node id NODE_ID_EMPTY in the slot (which in this example is stored as −1).

If a slot contains a child which is secret to the client (and the slot is a revealed slot, such that the client is allowed to know that there is a secret child in the slot, just not what that child is), then that is represented by storing the special node id NODE_ID_SECRET in the slot (which in this example is stored as −2).

Slots do not need to contain the special REMOVED_NODE marker on the client, so there is no special node id to represent that.

The read_sync algorithm reads each command from the sync packet in sequence, and for each command it receives it either Creates an entirely new node which it places into the node_map, or Finds an existing node in the node_map, and updates it according to the instructions in the command.

The other thing the read_sync algorithm may do is remove nodes from the node_map which are no longer contained in any slot (otherwise it will slowly leak memory as old nodes will never be discarded). The read_sync algorithm cannot safely delete entries from the node_map the moment it is told the corresponding node is no longer in a slot, as it may be that the node has been moved to a new slot, and it is about to be told about that in a subsequent command. Therefore whilst processing a sync packet, the read_sync algorithm builds up a set of all the node ids which have been removed from a slot (this set is called the Removed_Node_Ids set), and a set of all the node ids which have been added to a slot (this is called the Added_Node_Ids set). Only once it has processed every command in the sync packet can it use these sets. At that point any node id which is listed in the Removed_Node_Ids set, and which is not also listed in the Added_Node_Ids set is no longer connected to the tree, and so that node (including all its descendants which have not separately been added to another slot), should be deleted from the node_map.

An example read sync algorithm is given in FIG. 10 and FIGS. 23 to 35.

Events

The event algorithm allows the state of the running application to be updated in response to an input event or the passage of time.

Examples of receiving and processing events on the server are given in FIGS. 2, 5, 6 and 7. For examples of how events are received and processed on the client see FIGS. 3, 9 and 11 to 14.

Input Events

When a user input occurs on the client:

An input event is created. Each input event stores the relevant metrics of the user input (for example the position of the mouse, or which key on the keyboard was pressed), and also stores the time at which that input event should be applied (the apply_time—which is calculated by the prediction algorithm, see the 'Prediction' section).

The input event is placed into to an 'event queue' on that client. The event queue is a list of all the events which have been created, but not yet applied.

The input event is serialized and transmitted to the server which deserializes it, validates it and then adds it to its own event queue.

The server and client both apply input events from the event queue when the input event's apply_time is reached. (The server applies them to cause the application to respond to the events, and the client applies them to try and predict what the server will do, see the 'Prediction' section).

Each input event can potentially cause the functions stored in one or more 'input event handler' properties to run, or will do nothing if there are no matching input event handler properties. An input event handler property is defined by creating a property in the orchard with the appropriate magic annotation. For example creating a property with the magic=on_left_mouse_down annotation, will cause the function stored in that property to be invoked in response to the left mouse button being pressed down. For a list of possible input event handler annotations see the 'Annotations' section of this document.

In this document invoking the function stored in an input event handler property in response to an input event is referred to as 'running' the input event handler.

An input event handler property can also be set to contain the value ^none, which disables it. This way input event handlers properties can be turned on and off whilst the application is running by changing the value in the property. By making an input event handler property variability=client_dynamic it is possible for that property to contain different values for different clients, and so it is possible to define input event handler properties which will only process events from specific clients.

Mouse Over Input Event Handler Properties

Mouse over input event handler properties are placed on a node which has the primitive_type=mouse_box annotation. This annotation causes the node to represent a primitive which defines an invisible rectangle, (where the position and size of that rectangle on the display is calculated the same way as for other primitives—see the 'Transformation Matrix' section). The functions in these mouse over input event handlers properties are invoked in response to an input event if the mouse of the client generating the input event is within that invisible rectangle at the time the input event is generated (and if the position of the mouse as it was at the time the input event is generated is still within the bounds of that invisible rectangle at the time the input event is applied, i.e. if the mouse_box hasn't moved out from under the original mouse position).

To find all the mouse over input event handlers to run in response to an input event, the event algorithm perform the following steps.

At the time the input event is created, (i.e. on the client), the event algorithm starts at the root node of the client tree for that client, and recurs into each node of that tree in a very similar way to the render algorithm. As it recurs down the tree it follows viewports, builds up a transformation matrix, and builds a Z sorted list of nodes which represent primitives (including their position on the display), etc. . . . all in the same way the render algorithm does. However unlike the render algorithm the resulting list of nodes may be filtered to only include nodes of primitive_type=mouse_box (as opposed to primitive_type=sprite, text, solid_rectangle, etc. . . . ), and may be filtered to only include nodes where the mouse_box primitive intersects with the mouse position at the time the input event is created. This list of nodes is called the 'mouse_over_nodes' and is stored in the input event object along with the mouse position, and other metrics (and is transmitted to the server with the rest of the input event object).

At the time the input event is applied, for each of the nodes in the mouse_over_nodes list generated in step a. the event algorithm verifies that the node in the list still exists, that the mouse position stored in the input event still intersects with the mouse_box of that node, and that a node with a magic=primitive_mouse_opaque property set to true is not obscuring the node. This verification is important because it could be the node has moved or been deleted, since the event was generated, or it could be the client was hacked to transmit the wrong list of nodes. If the verification passes and that node has any mouse over input event handler properties which are able handle the input event being processed then the function in those mouse over input event handlers will be invoked.

Monitored Input Event Handler Properties

Other input event handler properties can be defined which are run in response to an input event irrespective of where the mouse is positioned. These input event handler properties are referred to as 'monitored input event handlers' properties. (This name is chosen due to how they are indexed, see below).

To find all the monitored input event handlers to run in response to an input event, the event algorithm searches the orchard at the time the input event is applied, to build a list of every node which contains a monitored input event handler property, which can handle the input event in question. It then sorts that list of nodes by their node id, and finally runs the function in each of the monitored input event handlers on each of the nodes in property id order.

Brute force searching the entire orchard every time an input event is applied would be quite computationally expensive, so the system instead maintains an index of which nodes in the orchard contains monitored input event handler properties (whose value isn't ^none) for each client. This index needs to be updated every time a node is created or deleted, and every time the value of a monitored input event handler property is changed. This index effectively 'monitors' which nodes in the orchard contain monitored input event handler properties (whose value isn't ^none). This index is called the 'monitored node index'.

Optional optimisation: By restricting the on_login event handler so it can only be placed on the root node of a client tree and the on_allow_shutdown, and on_shutdown event handlers so they can only be placed on the root node of the shared tree, these event handlers can be easily found without needing to add them to the monitored node index.

Interval Events

Interval events are a type of event which occurs in response to the passage of time, as opposed to in response to a user input.

An interval event is created by populating a property with the magic=interval annotation (such a property is referred to as an interval property). The property can either contain ^none in which case it does nothing, or it can create an interval event by containing a value of type 'interval' (see the 'Types' section of this document) which is a value which combines: a) the function to run, and b) the time to run it at—i.e. the apply_time.

In this implementation an interval property cannot be constant because when the interval event is run, the corresponding value in the property is automatically set back to ^none.

If an interval property is client_dynamic then it can contain different interval values for different clients. Therefore it is possible for a single property to define multiple interval events, each of which will be run independently when its apply_time is reached.

An 'interval event set' is automatically created to run all the interval events which are scheduled at a particular apply_time. If two interval events are scheduled to run at exactly the same time only one interval event set will be created, as it can run both of them.

The interval event set stores a list of all the nodes which contain an interval property which creates an interval event for a particular apply_time. Whenever an interval property is created or modified the appropriate interval event set is created or modified, and if a new interval event set was created it is inserted into the event queue.

When the interval event set runs, the event algorithm sorts the list of nodes stored inside that interval event set into node id order. Then for each node it finds all the interval properties on that node which contain one or more interval value with a matching apply_time, and for each such interval value it:

Remembers that interval value.

Sets the property to replace that interval value with ^none.

Applies the interval event by running the function from the value remembered in step a.

(It is done in this order such that the interval event can set the interval property to a new value, and hence queue itself up to run again, this way repeating timers can be created).

Prediction

The prediction algorithm attempts to reduce perceived latency, and make input events appear to occur immediately (rather than after the usual delay caused by the time it takes for the input event to reach the server, and the resulting display to come back to the client).

In various examples, this algorithm may be designed to work correctly even if the client's clock or the server's clock is set incorrectly. To achieve this, the time on the server is considered the authoritative time, and unless specified otherwise all times referred to below mean the time according to the server's clock.

For a diagram of an example prediction algorithm see FIGS. 11 to 14.

A summary of how an example of the prediction algorithm works is as follows (more details are then given in the sections below):

First the client attempts to predict at what time events currently occurring on the client will arrive at the server. This is called the insertion_time. The insertion_time is calculated as the current time on the client+insertion_delta. where insertion_delta is a value which compensates for both the fact that the clocks on the server and client may be different and also for any network latency (i.e. the time it takes for the message to reach the server).

When the client creates an input event it does not attempt to apply the input event immediately, and instead sets the apply_time of that input event to the time it predicts the input event will arrive on the server. i.e. it sets apply_time to insertion_time. The client then inserts that input event into its own event queue at that time. When the client transmits the input event to the server it includes the apply_time it predicted the input event would arrive at, as well as the insertion_delta it used to calculate that predicted apply_time.

When the server receives the input event it:

Compares the apply_time stored in the input event with the actual time the input event arrived, and calculates how much the insertion_delta should be adjusted by, such that the predicted arrival time of future events is more accurate. This improved insertion_delta is then transmitted back to the client in the header of the next sync packet so the client can correct its insertion_delta for subsequent events.

Corrects the apply_time of the input event before adding it to its own input event queue. An input event cannot be applied in the past, so if the requested apply_time has already passed the apply_time is just set to the arrival time, but if the requested apply_time is in the future the server can potentially accommodate that to make the client's prediction accurate. In this example the server will allow apply_times which are up to 1 second late, but after that it clamps the apply_time to the arrival time+1 second. The client may be arranged to err on the side of guessing slightly on the late side, as the server can accommodate for this and so it causes less incorrect predictions. However the client doesn't want to guess too late as that then means it has to predict further into the future (as described below), and is more likely to be wrong there instead.

Finally when the client renders the display, instead of rendering the orchard in its current state, it renders it as it predicts it will appear in the future. The client can choose how far into the future to predict, the further into the future it predicts the more likely there are to be prediction errors, but the lower the perceived latency of the input events will be. The least perceived latency is achieved by rendering the orchard as it is predicted to be just before the insertion_time. As that way the input events by almost immediately applied by the predictor. In this example, the client calculates how the orchard (and hence the display) will appear in the future as follows:

It makes an exact copy of the entire orchard. (It copies the 'authoritative orchard' which is the version of the orchard last received from the server with no predictions applied, to produce the 'prediction orchard').

It removes any existing interval event sets from its event queue, and then inserts new interval event sets based on the interval properties found in the prediction orchard it has just created.

It decides the time in the future it wants to predict to (the render_time). The least latency is achieved by setting the render_time to insertion_time−1.

It then applies events in the event queue against the prediction orchard to update it. It starts with the first event in the event queue, and finishes with the last event whose apply_time is < the render_time. Note: the act of applying these events could cause additional interval events to be created and inserted into the queue. These will also be applied when they are reached (i.e. if their apply_time is within the range being applied.)

Finally it renders the display by running the render algorithm on the prediction orchard, hence providing a view of how it predicts the display will look in the future.

The prediction algorithm does not need to repeat all the parts of step 4 above every single time it renders the display. If since the last render all that has happened is the render_time has increased (i.e. due to the clock on the client advancing), and the only events which have been added to the event queue have an apply_time after the previous render_time, then all the predictor needs to do is apply additional events from the event queue starting with the first event whose apply_time is greater than or equal to the previous render_time and finishing with the last event whose apply_time is less than the new render_time.

The prediction algorithm throws away the prediction orchard, and reapplies the events from scratch if the client receives a sync packet from the server, and therefore the authoritative orchard changes. In this case it wants to run all the predictions again as they may be corrected/refined in light of the new information received.

Sync Packet Header

The sync packet header contains various metrics to give the prediction algorithm the information it needs to operate. The header may contain:

sync_time: the time on the server that the sync packet was written at.

recommended_insertion_delta: the insertion_delta the server recommends the client use, such that the predicted apply_time of the events better matches the time the event arrives at the server.

input_events_applied_since_last_sync: indicates, since the previous sync packet, which input events received from this client the server has applied. (Optimisation: by sending the events over TCP so they always arrive in order, and making sure any adjustment of the apply_time performed by the client or server does not cause events to be inserted out of order, this can be optimised to just be a single integer indicating how many events from the start of the client's event queue were applied.)

In response to receiving this header the client makes the following adjustments:

The client deletes the input events from its event queue which input_events_applied_since_last_sync indicates have been applied by the server. The result of those input events is now incorporated into the authoritative orchard, so they no longer need to be run by the client when the updating the prediction orchard.

If there are any input events remaining in the event queue whose apply_time is <=sync_time then the apply_time of those input events is increased to sync_time+1 (being careful not to change the order of the event queue), because the fact that they weren't confirmed as applied, means they hadn't arrived at the server by sync_time, so the predicted time is assumed to be wrong.

Sets the insertion_delta to the recommended_insertion_delta.

Adjusts the render_delta towards the insertion_delta−1. If the render_delta is only slightly wrong it is 'slewed' towards new value slowly, as moving it quickly (and in particular moving it backwards), causes a visual glitch. However if it is a long way off a visual glitch is accepted and it is just jumped straight to the new value, as slewing it would take too long. (Slewing means correcting its value by changing the rate at which it advances, for example, if it is 1 millisecond fast, the value can be corrected by making the rate advance at 90% speed for 10 milliseconds, instead of setting it backwards).

Authoritative Orchard and Prediction Orchard

The version of the orchard on the client, as it was last received from the server is referred to as the 'authoritative orchard'.

The prediction algorithm does not directly modify that authoritative orchard, it instead makes another copy (referred to as the 'prediction orchard) and modifies that instead, this is so that when the next sync packet comes through from the server, it can be applied to the original authoritative orchard, and then the predictions can be remade in the light of that new information.

Optimisation: When copying the authoritative orchard to produce the prediction orchard, if the client already has a previous version of the prediction orchard, then rather than discarding the prediction orchard and copying the entire orchard from scratch it can instead just copy the parts which differ. To achieve this the read sync algorithm needs to mark which parts of the authoritative orchard it has changed, and when the predictor runs events it needs to mark which parts of the prediction orchard it has changed. Then when copying the authoritative orchard over the prediction orchard, it only needs to copy those parts which have been marked as changed by the read sync and/or the predictor since the last copy.

Prediction Errors

There are four main ways a prediction can be wrong:

The first way the prediction can be wrong is that the client can incorrectly predict at what time an input event will run on the server. However this should be rare as the client tends to predict slightly on the late side, and the server just delays the input event accordingly to match the predicted time, so this is only likely to occur if there is a sudden increase in network latency, even then for most input events this probably won't affect the outcome very much.

The second way the prediction can be wrong is if another client generates an input event, the first client will not know about that input event, so its predicted view of the future will not show the consequences of that input event, (until the server tells the first client about those consequences by sending a sync packet which updates the authoritative orchard to include them).

The third way the prediction can be wrong is if a previous prediction was wrong. The orchard will then be in the wrong state, which then means any subsequent predictions which read that state could also be wrong.

The fourth way the prediction can be wrong is due to something being 'secret'. (see The 'Annotations' section of this document, magic=secret). If something is secret the client will not be sent the entire orchard, if the client then tries to run an event which relies on information in the part of the orchard it has not received it will not be able to make the prediction.

If a prediction error does occur as described above, it will always be corrected after a brief delay, when the server sends an updated version of the authoritative orchard which tells the client what actually happened in response to an event, such that the client doesn't have to predict that event anymore.

In the case of the fourth type of prediction error described above, this is slightly different to the other prediction errors, because in this case it is possible for the client to know that it might have failed to predict correctly. This situation is referred to as a 'known prediction error'. The client knows when it is reading information from part of the orchard which is secret to it (or might be secret to it), so if that occurs it knows it may be calculating the wrong result. In this case a runtime error is thrown on the client.

Example of situations when a known prediction error is generated are:
- Reading from a slot, and finding the NODE_ID_SECRET indicator in that slot.
- Reading from a concealed slot, and finding that the slot index appears to be empty. In this case the client doesn't know if the slot index is actually empty or contains a secret node, so to avoid making an incorrect prediction it treats this as a known prediction error.
- Counting the number of children in a concealed slot (the client knows that because the slot is concealed it cannot know reliably how many children it contains)
- Depending on the index of a node in a concealed list slot (in this case the client knows that the index could be wrong because there could be earlier nodes in the list slot it doesn't know about).

Some known prediction errors can be spotted in advance by the compiler, which can produce a compile error if code which it knows could be run on the client (i.e. code which is not itself secret), accesses something which is bound to be secret. Some other known prediction errors can only be spotted when the program is actually running, i.e. when they occur.

Event Ids

Each input event handler and interval event is provided with a unique event id by the server when it is run. This id is calculated in such a way that it is guaranteed to be unique compared to all other event ids from all other clients, whilst still allowing the client to predict what id the server will assign.

For input event handlers the event id is calculated by combining:
- The node id of the root node of the client tree belonging to the client which generated the input event.
- A count of how many input events that client has generated prior to this input event.
- The predictable node id of the node containing the input event handler.
- The property id of the property containing the input event handler.

For interval events, the event id is calculated by combining:
- The predictable node id of the node containing the interval property.
- The property id of the interval property.
- The apply_time of the interval event
- Which function the interval event executes.

Predictable Node Ids

Each node which contains an interval property or input event handler requires a predictable node id (to be able to generate the event id for the interval event, see the 'Event IDs' section).

When required, this is stored in addition to the node id because node id's are not predictable (see the 'Client Node IDs' section).

The predictable node id may be generated when the node is instantiated using_new by combining:
- The event id of the input event handler/interval event which is using_new.
- The Source Location of the _new expression, and the Source Location of each function invocation expression which was descended through to reach the _new expression.
- A count of how many times each of those Source locations has been used to generate a predictable node id whilst processing the current event id.

If the node is not instantiated using _new (i.e. it is instantiated when the shared tree or a client tree) is created, the predictable node id will always by synced to the client before the client needs to use it, so the server can just use any unique number.

If the node is secret at the time it is instantiated (i.e. it has a magic=secret property whose initial value is true), then likewise, the predictable node id will always by synced to the client before the client needs to use it, so the server can just use any unique number.

Predictable Random Numbers

When the client is applying an event which generates a random number, it needs to be able to predict which random number the server will generate. Random numbers in the system are generated using a pseudo random number generator, so getting the same result on the server and client is just a case of making sure both pseudo random number generators use the same seed. However a way is still needed to ensure that both the client and server choose the same seed, and in particular that if the client and server are requesting different quantities of random numbers (for example due to some events not being predictable on the client), that that doesn't cause all the subsequently generated random numbers to also be wrong.

Which seed to use for the random number generator may be calculated by combining:
- The event id of the input event handler/interval event which is generating the random number.
- The Source Location of the _random expression and the Source Location of each function invocation expression which was descended through to reach the _random expression.
- A count of how many times each of those Source Locations has been used to generate a random number whilst processing the current event id.
- A 'salt' which is a random number generated by the server when it first starts the application, and shared with each client when it connects. This ensures each time the application runs it gets a different sequence of numbers.

The above values are all combined together to produce a 'seed' to a pseudo random number generator (in this example a linear congruential generator is used), which is then used to produce the random number.

In some situations it is not desirable that the client can predict what random numbers the server will generate (for example it could allow a user to cheat at a dice game, if they could know in advance what the next die roll would be), in this case the application can choose to request that the random number is not predictable, (this is done by using the expression _secret_random instead of the expression _random), in which case the server generates the random number using a cryptographically secure pseudorandom number generator, whose seed is not shared with the client, and the client just generates a known prediction error if it needs to predict the result of that request.

Predicting Nodes Becoming Secret

If the client applies an event which makes a node secret, (i.e. by setting a magic=secret property to true), then that node is replaced with the NODE_ID_SECRET indicator in the prediction orchard. This is because the client is trying to predict the orchard which will be received from the server in response to the event, and of course the server would not tell the client about secret nodes, so the client forgets about the node to be consistent with that.

Client Node Ids

When the client applies an event which instantiates a new node in the prediction orchard, that node needs to be assigned a node id. However the client cannot know what node id the server will assign to the node when it applies the event, as the server may have created other nodes in the interim which the client does not know about.

Therefore on the client the node id of that newly created node may be set to an id in a different range which the server will never use. i.e. The server starts assigning node ids from 0, and the client starts assigning client nodes id from a suitably higher number that the server is not expected to reach (say 1 billion). This way the order of the node ids will be correct, (any nodes created on the client are newer than all the ones received in the last sync), even if the exact value of those node ids is not correct. Furthermore the nodes ids whose exact value cannot be safely used, can be easily detected as ones whose id is >=1 billion.

If the client needs to use the exact node id of a node with a client node id a known prediction error is generated. However the client can still safely compare two node ids to see which is higher. (So for example the client can still sort nodes by their node id.)

Language and Compiler

Language

Because the contents of the orchard defines both the current state, behavior and display of the application, creating a new application is just a case of defining what the orchard's initial state should be when the application is started.

This initial state may be defined by writing a textual description of what nodes the orchard should contain, how those nodes should be connected together to form trees, and what properties and labels those nodes should contain. A language (referred to as 'build code' in this document) has been created which describes that initial state.

Part of that initial description will be the code which appears inside properties of type function which is executed by the client and server, and which describes how to update the orchard in response to events. The code written in these properties is referred to as 'function code'.

To use an analogy with an HTML page: A typical webpage is made up of HTML which describes how the page should be displayed, and that description includes JavaScript which describes how the page should respond to input events. Similarly in this example the application is described using build code which describes the initial state of the orchard, and that description includes function code which describes how the orchard should respond to input events.

As well as being used to define the application in its initial state, the language can also be used to specify pre-defined branches of nodes, which can then be referred to by the _new expression to add entire branches to the orchard with a single concise expression.

Build Code

An application is made up of a single project.settings file and multiple .prototype files.

Each .prototype file has instructions on how to create a tree of nodes.

The project.settings file indicates which .prototype to use to create the shared tree when the server starts the application, and which .prototype to use to create each client tree when a client connects to the server. Additional .prototype files can also be defined for use with the add_prototype command or for use with the _new expression.

These files together are referred to as the 'description' of the application.

Example Application

The code for an example application is given below. Because the application is made up of multiple files, the example below uses the following convention to list the contents of each of those files.

The text in square brackets indicates the file name.

The text below the file name, up until the next file name indicates the contents of that file.

```
1.   [project.settings]
2.   header {
3.       path_alias = client_tree, path/to/client_tree.prototype
4.       client_tree = client_tree
5.   }
6.
7.   [client_tree.prototype]
8.   header {
9.       path_alias = red_cabbage, path/to/red_cabbage.png
10.      path_alias = green_cabbage, path/to/green_cabbage.png
11.      path_alias = mouse_box, path/to/mouse_box.prototype
12.      path_alias = sprite, path/to/sprite.prototype
13.  }
14.  body {
15.      create_property cabbage_count {
16.          value = 2
17.      }
18.
19.      create_slot cabbages {
20.          storage = array[cabbage_count index]
21.
22.          create_property toggle {
23.              variability = dynamic
24.              value = true
25.          }
26.
27.          create_property translate {
28.              magic = translate
29.              value = _vector(45.0 + 270.0 * _f(_self.index),
                    150.0)
30.          }
31.
32.          create_label index {
33.              type = integer
34.          }
35.
36.          create_slot sprite {
37.              add_prototype sprite {
38.                  patch_property image {
39.                      value = function{
40.                          if _self._parent.toggle {
41.                              return
                                    _image(green_cabbage)
42.                          }
43.                          else {
44.                              return
                                    _image(red_cabbage)
45.                          }
46.                      }
47.                  }
48.              }
49.          }
50.
51.          create_slot mouse_box {
52.              add_prototype mouse_box {
53.                  patch_property width {
54.                      value = function {
55.                          return _self._parent.sprite.width
56.                      }
57.                  }
58.
59.                  patch_property height {
60.                      value = function {
61.                          return _self._parent.sprite.height
62.                      }
63.                  }
64.              }
65.
66.              create_property on_left_mouse_down_over {
67.                  magic = on_left_mouse_down_over
```

```
 68.                    value = function(var e mouse_over_event){
 69.                        _self._parent.toggle =
                                !_self._parent.toggle
 70.                    }
 71.                }
 72.            }
 73.        }
 74.    }
 75.
 76. [sprite.prototype]
 77. header {
 78.     path_alias = default_image, path/to/default_image.png
 79. }
 80. body {
 81.     create_property primitive_type {
 82.         magic = primitive_type
 83.         value = ˆsprite
 84.     }
 85.
 86.     create_property image {
 87.         //The image to render
 88.         magic = primitive_image
 89.         value = function {
 90.             return _image(default_image)
 91.         }
 92.     }
 93.
 94.     create_property width {
 95.         //The width to render the image at
 96.         magic = primitive_width
 97.         value = function {
 98.             return image._width
 99.         }
100.     }
101.
102.     create_property height {
103.         //The height to render the image at
104.         magic = primitive_height
105.         value = function {
106.             return image._height
107.         }
108.     }
109. }
110.
111. [mouse_box.prototype]
112. header {
113. }
114. body {
115.     create_property primitive_type {
116.         magic = primitive_type
117.         value = ˆmouse_box
118.     }
119.
120.     create_property width {
121.         //The width of the mouse box
122.         magic = primitive_width
123.         value = function {
124.             return 100.0
125.         }
126.     }
127.
128.     create_property height {
129.         //The height of the mouse box
130.         magic = primitive_height
131.         value = function {
132.             return 100.0
133.         }
134.     }
135.
136.     create_property opaque {
137.         //If true then mouse_boxes behind this mouse_box will not receive mouse 'over' events.
138.         magic = primitive_mouse_opaque
139.         value = true
140.     }
141.
142.     create_property mask {
143.         magic = primitive_mask
144.         value = ˆnone
145.     }
146. }
```

The project.settings file indicates that client_tree.prototype should be used to create the initial client_tree for each client which connects to the server. Then when client_tree.prototype is compiled it creates a client tree as illustrated in FIG. 20.

The commands which are used in the example above are as follows:

Header

The header command appears at the top of both the project.settings file, and also each .prototype file.

The header command is written in the form:

```
1.    header {
2.        header annotations
3.    }
```

The header command contains zero or more header annotations. For a list of header annotations see the 'Annotations' section of this document.

Body

The body command always appears directly below the header command in each .prototype file. The body command contains the commands which add features to the root node of the tree defined by this .prototype file. (This node is referred to as the 'body node')

The body command is written in the form:

```
1.    body {
2.        node commands
3.    }
```

They body command contains zero or more node commands. Each of the node commands which appears directly inside the body command, affects the body node. The node commands which can be used include:

Create Property create_property is a node command. It adds a property feature to the current node.

The create_property command is written in the form:

```
1.    create_property property_name {
2.        property annotations
3.        value = expression
4.    }
```

The create_property command contains zero or more property annotations. For a list of property annotations see the 'Annotations' section of this document.

The create_property command always contains a value=line. This provides the initial value of the property which the property contains. The right hand side of the value=line is an expression written in function code, which is resolved by the compiler to calculate the initial value.

Create Slot create_slot is a node command. It adds a slot feature to the current node. It can also optionally immediately place nodes in that newly created slot.

The create_slot command is written in the form:

```
1.        create_slot slot_name {
2.            slot annotations
3.            node commands
}
```

The create_slot command contains zero or more slot annotations. For a list of slot annotations see the 'Annotations' section of this document.

The create_slot command can also optionally contain node commands. If there are no node commands then the slot is created empty (and can be filled later). However if there are node commands then new node(s) are automatically created in the slot, and then the node commands are applied to each of those new nodes. How many nodes are placed in the slot, and what index they are placed at depends on the slot's storage_type, and the quantity and subset annotations, in the same way as for fill_slot. See fill_slot below for more details.

Create_Label create_label is a node command. It adds a label feature to the current node.

The create_label command is written in the form:

```
1.        create_label label_name {
2.            label annotations
3.        }
```

The create_label command contains zero or more label annotations. For a list of label annotations see the 'Annotations' section of this document.

Patch_Property patch_property is a node command. It allows for the modification of an existing property.

The patch_property command is written in the form:

```
1.        patch_property property_name {
2.            property annotations
3.            value = expression
4.        }
```

The property_name indicates which property to set.
The value=line provides the new value for the property.

Add_Prototype add_prototype is a node command. It allows all the commands from an external .protoype file to be applied to the current node.

The add_prototype command is written in the form:

```
1.        add_prototype prototype_file {
2.            node commands
3.        }
```

The node commands in the body of the specified prototype_file will be applied to the current node. i.e. in the above example application, the add_prototype sprite command adds the four properties defined in sprite.prototype to the node.

The add_prototype command allows further node commands to be specified inside the { } braces. These commands will be applied to the current node also. Commands which patch features added by the specified prototype_file should be placed inside here, as that makes it clearer where the features which those commands are patching originated from.

In addition to the commands used in the example above the following commands are also available:

Fill Slot fill_slot is a node command. It allows nodes to be created and placed into an existing slot.

The fill_slot command is written in the form:

```
1.        fill_slot slot_name {
2.            slot annotations
3.            node commands
4.        }
```

The slot_name indicates which slot to be fill.

The fill_slot command contains zero or more slot annotations. Some slot annotations can only be specified when the slot is created, and cannot be specified in this command. The subset and quantity annotations can be used to control how the slot is filled, and the class annotation can be used to make the slot class of the slot more specific if the slot is constant. For more details see the 'Annotations' section of this document.

The fill_slot command will place one or mode nodes into the slot according to the following rules. (If any of the indexes being filled already contains a node a compile error will be generated).

If the slot is a single slot then the number of nodes indicated by the quantity annotation is created (which may be either 0 or 1), and placed into the slot. If the quantity annotation is not specified then a single node is created, and placed in the slot.

If the slot is an array slot then one node will be created at each index specified by the subset annotation, or if the subset annotation is not specified a node will be created at every index of the slot.

If the slot is a map slot then one node will be created at each index specified by the subset annotation. If the subset annotation is not specified a compile error will be generated.

If the slot is a list slot then the number of nodes indicated by the quantity annotation is created, and placed into the slot. If the quantity annotation is not specified a compile error will be generated.

The node commands specified inside the fill_slot command will then be applied to every new node which the fill_slot command created to populate that node with features.

Unfill Slot unfill_slot is a node command. It allows nodes to be removed from an existing slot The unfill_slot command is written in the form:

```
1.        unfill_slot slot_name {
2.            subset annotation
3.        }
```

The slot_name indicates which slot to remove nodes from.

The subset annotation indicates which nodes to remove from the slot. For more details on the subset annotation see the 'Annotations' section of this document.

Patch_Slot patch_slot is a node command. It allows an existing slot to be modified.

The patch_slot command is written in the form:

```
1.    patch_slot slot_name {
2.        slot annotations
3.        node commands
4.    }
```

The slot_name indicates which slot to modify.

The patch_slot command allows the following modifications to be made to an existing slot:

The slot annotations of the slot can be patched. In particular the class annotation can be re-specified to make the slot class of the slot more specific if the slot is constant.

Existing nodes which have already been placed in the slot can be modified. Any node commands specified inside the patch_slot command will be applied to nodes which have already been placed in the targeted slot, hence modifying those nodes. If the subset slot annotation is specified above, then only the existing nodes in the slot which match that annotation will be modified. If the subset annotation is not specified, then all the existing nodes in the slot will be modified.

The language described above is just one example of how code which describes the initial state of the orchard can be represented, the description could also be represented in a variety of other formats. For example it could alternatively be represented using an industry standard format such as XML.

Function Code

Build code as described above allows trees which represent the initial state of the application to be constructed. Function code is then used to specify the initial values of properties, and in values of type function, to specify how the orchard is updated when the application is running.

Function code is written inside a value of type function, or in the initial value of a property.

A literal value of type function is written in the following form:

```
1.    function[function modifiers](parameters)(return type) {
2.        function code
3.    }
```

The function modifiers allow various attributes of the function be specified. For example an active or !active function modifier can be specified to indicate if the function makes changes to the orchard or not. By more precisely indicating the intent of a function the compiler is more likely to be able to spot potential errors and inform the developer. For example an active function cannot be placed in a magic property which the renderer reads (as doing so would mean that rendering the display would cause the orchard to be modified, which is likely to be a mistake), whereas a dynamic or constant function can be safely placed in such a magic property.

The parameters is a comma separated list of variable definition statements, which indicates which values to pass to the function to allow it to calculate its result. In the example above there is a property which contains function (var e mouse_over_event){ ... }. This function receives one parameter of type mouse_over_event which is placed into a variable called 'e'. This value is provided to the function in each input event handler property which handles mouse_over events, and contains the details of the input event which caused the input event handler to be run in case the function needs those details.

The return type indicates what type of value (if any) the functions returns. Often this can be omitted as it is possible to infer from the function code written inside the function. But if it cannot be inferred, or if the developer wishes to make the intended behavior of the function more explicit to help spot errors it can be specified here.

Function code is a procedural language. The exact syntax and behavior of this language is not particularly critical. It just needs to allow the usual procedural programming language constructs, including but not limited to: comparisons, loops, iterators, variables, type checks (e.g. instanceof), type casts, binary and unary operators (for example maths and string operations), function invocations, etc. . . . , and needs to allow the orchard's state to be read, and modifications to the orchard to be made. It is possible to use many existing programming languages for this purpose.

In this example function code is written in a similar syntax to C (although this is not essential). For example in the example application above is a function, which looks like this:

```
1.    function{
2.        if _self._parent.toggle {
3.            return _image(green_cabbage)
4.        }
5.        else {
6.            return _image(red_cabbage)
7.        }
8.    }
```

This example function contains an if/else statement which is very similar to an if/else statement in a language like C. Depending on the result of the condition, the function will either return the green cabbage image or the red cabbage image (which the renderer will then use as the source image when rendering this node which is a 'sprite' primitive).

A set of features which the function code implementation may provide to allow it to read data from the orchard and modify the orchard is listed below (this is in addition to the typical procedural language features):

Node Access

A node access expression retrieves a reference (see the 'Types' section of this document) to a node in the orchard.

The node access expression _self gives a reference to the node which the function was defined in.

The node access expression _body gives a reference to the body node in the .protoype file which the function was defined in.

References to other nodes can be retrieved by navigating from an existing value of type reference as follows: (where r is an expression of type reference, and the 'specified node' is the node pointed to by r).

r._parent—gives a reference to the immediate parent of the specified node.

r._ancestor (node_class)—gives a reference to the nearest ancestor of the specified node, whose node class is the specified node_class or a subclass of the specified node_class.

r.slot_name._reference—gives a reference to the child of the specified node which is in the single slot called slot_name.

r.slot_name [index]._reference—gives a reference to the child of the specified node which is in the array, list or map slot called slot_name at the specified index.

The r. portion is optional. If it is not specified, then the 'specified node' is assumed to be the body node in the .prototype file which the function was defined in.

For convenience the .\_reference part of a child node access expression can be omitted in situations in which it is non-ambiguous that a reference to the node in that slot is required (for example if it is used as the left hand side of another node access expression, property access expression, or property set expression.)

Navigations can be chained together to reach the desired node.

i.e \_body.cabbages[0].sprite.\_reference.

Property Access

The expression \_self.\_parent.toggle in the example above is a property access expression and demonstrates reading the value of a property in the orchard in order to make a decision.

The property access expression is written in the form:

r.property\_name

Where r is an expression of type reference (in the example it is the node access expression \_self.\_parent), which gives a reference to the node containing the property to access.

And property\_name is the name of the property to access on that node (in the example it accesses the property called toggle).

The r. portion is optional. If it is not specified and only property\_name is provided, then the expression is assumed to be accessing a property of the body node in the .prototype file which the function was defined in.

Property Set

The expression \_self.\_parent.toggle=!self.\_parent.toggle in the example above is a property set expression and demonstrates setting the value to a property in the orchard to a new value.

The expression is written in the form:

r.property\_to\_set=new\_value

Where r.property\_to\_set indicates which property to set and is written in the same form as with a property access expression, and new\_value is an expression which is evaluated to determine the new value.

In this particular example the new\_value is calculated by reading the existing value of the property and performing a logical negation. (I.e. if the property previously contained true it is set to false, and if it previously contained false it is set to true). This is written using the same syntax as a logical negation in C.

The r. portion is optional. If it is not specified, then the expression is assumed to be setting a property of the body node.

Fill Slot

A fill slot statement can be used to place a node into a slot.
A fill slot statement is written in the form:
for a single slot: src\_node→dest\_node.slot\_name
for a list slot:src\_node→[insert\_index] dest\_node.slot\_name
for a map slot: src\_node→dest\_node.slot\_name[index]
for an array slot: src\_node→dest\_node.slot\_name[index]
Where:
src\_node—is an expression of type reference (for example a node access expression) which points to the source node to be placed in the slot. The source node may not already be in another slot. i.e. it should be already removed (using the detach expression, see below), or should be a newly created node which is not yet placed in a slot (using the new expression, see below).
dest\_node—is an expression of type reference, which points to the destination node. The dest\_node portion is optional, if not specified then the expression is assumed to be filling a slot of the body\_node.
slot\_name—is the name of a slot of the destination. (This is the slot in which the source node will be placed).
insert\_index is specified when filling a list slot. It is an expression of type integer and it gives the index of an existing node in the list slot. The new node will be inserted in front of the specified one, with the other nodes later in the list slot being moved up one index accordingly. It can be omitted in which case the node is placed at the end of the list.
index is specified when filling an array slot or map slot. It indicates the index in the slot to insert the new node at. There may not already be a node at that index.

Detach

A detach expression can be used to remove a child node from a slot.

A detach expression is written in the form:
r.slot\_name[index].\_detach( )
Where:
r—is an expression of type reference.
slot\_name—indicates which slot of the specified node to remove the child from.
index—indicates the index in that slot of the child to be removed. (In the case a single slot the index portion is omitted)

The detach expression will remove the specified child from the specified slot, and will return a reference to that child.

The r. portion is optional. If it is not specified, then the expression is assumed to be detaching from a slot of the body node.

Deleting Disconnected Nodes

Any node which is detached from a slot, and has not been subsequently placed back into a slot (using a fill slot statement) by the time the current event handler has finished running will be automatically deleted.

Likewise any node which is created with new (see below), and is not then subsequently placed into a slot by the time the current event handler has finished running will also be deleted. (Note: the nodes are not deleted immediately to give the running program a chance to place them into a slot first.)

When a node is deleted, all its descendants will also be deleted, and any remaining references to those nodes will become deleted references (see the 'Types' section of this document).

To implement this, when a node is detached or when a new node is created, that node is added to a list of nodes which might need deleting. After running each event handler the system iterates through each node in that list and checks that it has a parent node. If it does not have a parent node, then it is still not in a slot, and is therefore deleted as described above.

New

A new expression can be used to instantiate a new node (plus its descendants).

A new expression is written in the form:
\_new(prototype\_file)
prototype\_file indicates the .prototype file which describes how to create and populate the node.

The commands inside the .prototype file are executed to create and populate a body node. Descendants of that body node may also be created as the command in the .prototype file may also create further nodes which are placed inside slots of that body node.

A reference to that body node is then returned. That newly created node can then subsequently be placed into a slot in the appropriate tree, (i.e. by using a fill slot statement).

Count Nodes

The count\_nodes expression can be used to retrieve a count of how many nodes there are in a particular slot.

A count_nodes expression is written in the form:
r.slot_name._count_nodes( )
Where
r is an expression of type reference, which points at the 'specified node'. (The expression r can be omitted, in which case the specified node is taken to be the body node of the file in which this expression is written).
slot_name indicates a slot of the specified node.

The number of children in the specified slot is returned as an integer.

All Nodes

The all_nodes expression can be used to retrieve a stack of all the nodes in a particular slot.

An all_nodes expression is written in the form:
r.slot_name._all_nodes( )
Where
r is an expression of type reference, which points at the 'specified node'. (The expression r can be omitted in which case the specified node is taken to be the body node of the file in which this expression is written).
slot_name indicates a slot of the specified node.

The expression returns a stack of references, with one such reference for each child of the specified slot. If the slot has no children this expression will just return an empty stack.

Random and Secret_Random

Special consideration is needed to ensure the random selection is predictable.

See the 'Predictable Random Numbers' section for a description of how random numbers can be made predictable.

The _random expression generates predictable random numbers and is written in the form:
_random(expression list)

The _secret_random expression generates unpredictable random numbers and is written in the form:
_secret_random(expression_list)

Both this implementation of random and this implementation of secret_random work by selecting an entry from a list of expressions. If the list of expressions includes values of stack, range, or array, then each of the values that the stack, range, or array directly contains is considered to be in the list of values to choose from.

For example:
_random(1 to 10)—gives a random integer between 1 and 10 (inclusive)
_secret_random(^red, ^green, ^blue)—randomly returns either ^red, ^green or ^blue Secret Blocks A secret block is written in the form:

```
1.    function{
2.        if _self._parent.toggle {
3.            return _image(green_cabbage)
4.        }
5.        else {
6.            return _image(red_cabbage)
7.        }
8.    }
```

A secret block can be used to mark a subsection of a function as secret from the client. This code inside the secret block will not be sent to the client, and so will not be run by the predictor. Normally when the client encounters something secret it generates a known prediction error. However in the case of a secret block the predictor on the client will instead run the code in the fallback block. The fallback portion is optional, if not specified the predictor will just do nothing instead. This is useful because it gives the developer a way of dealing with code which produces prediction errors. (i.e. the code which produces an error can be put in inside a secret block, which will prevent it from being run on the client, and hence prevent the prediction error happening.)

_Filled

The _filled expression can be used to determine if a slot contains a child node a particular index.

The _filled expression is written in the form:
node.slot_name [index]._filled

The [index] portion is not specified if the slot is a single slot.

The _filled expression can be used to determine if a node access expression will error or not, and avoid running it if it will.

Filled_and_Predictable

The _filled_and_predictable expression behaves exactly like the _filled expression when the server runs it. However when the client predictor runs it, it only returns true if the slot contains a child node at the specified index AND that child isn't secret to the client.

The _filled_and_predictable expression can be used to avoid throwing an error due to a known prediction error.

_Target_Exists

The _target_exists expression can be used with a value of type reference to determine if the node which the reference points to is deleted or not. (see the 'deleting disconnected nodes' section). i.e. it returns false if the value is a deleted reference.

The _target_exists expression is written in the form:
ref._target_exists
where ref is an expression of type reference.

This can be used to avoid running code which will produce a runtime error if given a deleted reference.

_Target_Exists_and_Predictable

The _target_exists_and_predictable expression behaves exactly like the _target_exists expression when the server runs it. However when the client predictor runs it, it only returns true if the node pointed to by the reference has not been deleted AND that node isn't secret to the client.

This can be used to avoid throwing an error due to a known prediction error.

The expressions and statements described above are just one example of a language which could be used to access or modify the orchard Many more features may be implemented to allow function code to be more powerful. For example features from other existing programming languages, and existing algorithms which operate on a graph or tree of nodes, and features which allow the orchard to be searched analysed bulk modifications to be made, shallow and deep copies of nodes to be made, etc. ...

Compiler

In some examples, a compiler is used as now described. However, it is not essential to use a compiler.

The purpose of the compiler is to make the storage and processing of the orchard more efficient, for example by:
Performing some of the calculations in advance of running the application, so when the application is running it can rely on those pre-calculated results. For example:
Calculating the initial values of properties.
Simplifying expressions.
Flattening together all the build code commands which affect the same feature, and hence calculating the final resulting feature. Then when the application is using new to create a node with that feature, it can just create the feature in that final form rather than having to run the create command and each subsequent patch command.

Generating compiled representations of the functions which can be run directly. (The alternative without the compiler, would be to use an interpreter to run the function code inside the function)

Generating data structures (class files), one for each node class, which contain exactly the fields need to represent a node of that node class efficiently. (The alternative without the compiler, would be to use a generic data structure which can represent any node, and stores the features of that node in a hash table or similar).

Generating a dictionary of commonly used data, so when that data appears in a property, rather than the property containing the data directly it can just contain a pointer to the relevant dictionary entry.

The compiler can also perform validation of the orchard description, and the functions in the orchard, and attempt to spot potential programming errors. (e.g. syntax errors, type errors, etc. . . . )

FIG. 21 is a block diagram of the compiler in one example. In an example there is provided, a compiler comprising:

an input arranged to receive a plurality of instructions specifying a graph of connected nodes and properties and labels of the nodes, the graph being arranged to encode a state, a behavior and at least one graphical and/or audio display of a networked application;

a processor arranged to generate a server dictionary and a client dictionary, each dictionary storing data and instructions frequently occurring in the graph of connected nodes.

For example, the processor is arranged to create the server dictionary such that it comprises instructions to create the graph of connected nodes in executable form at a server.

For example, the server dictionary and the client dictionary comprise instructions to create pre-defined branches of nodes which may be referred to in order to add entire branches to an executing graph of connected nodes.

For example, the server dictionary and the client dictionary comprise media items specified in the graph of connected nodes or metrics of the media items.

For example, the server dictionary and the client dictionary comprise compiled node classes of nodes of the graph of connected nodes.

For example, the server dictionary and the client dictionary comprise compiled functions of behavior of the graph of connected nodes.

For example, the server dictionary and the client dictionary comprise literal values of the graph of connected nodes.

For example, the server dictionary and the client dictionary comprise immutable instances being constant values of nodes of the graph of connected nodes.

A detailed description of the compiler components of FIG. 21 is now given.

Lexer 2100

The lexer 2100 performs 'lexical analysis', and converts the textual description of the application, into a sequences of tokens.

Parser 2102

The parser 2102 converts the stream of tokens produced by the lexer 2100 into an 'abstract syntax tree' (or AST for short). The AST should not be confused with the trees of nodes in the orchard, as it is not related. To avoid confusion when talking about an entry in the abstract syntax tree this document refers to it as a 'syntax node'. In this case each syntax node of the AST represents a different programming language construct appearing in the original textual representation. The AST is a more convenient representation of the description than the textual version created by the developer, and it is this representation of the description which is processed by the subsequent steps.

Semantic Checks 2104

The compiler performs a number of other checks to attempt to spot errors in the application (which would otherwise cause later compilation steps to fail).

For example:

It checks that all files referred to in the AST exist and are of the correct type.

It checks that all places which refer to a path_alias annotation refer to a path_alias which exists.

It checks that all media files (such as images, waves, etc. . . . ) referred to in the AST are valid media files, and loads the metrics (dimensions etc. . . . ) of those media files so they are available to subsequent compilation steps.

Class Resolver 2106

The class resolver 2106 calculates the node class of each node used by the application.

It does this by iterating through the AST and looking for commands which define a new node class.

Each body, create_slot, and fill_slot command which contains node commands creates a new node. The class resolver 2106 calculates the node class of that new node, by examining those node commands to determine all the features which the node being created has. If one of those node commands is an add_prototype command, then rather than having to process all the features that the add_prototype adds to the node, the class resolver 2106 can instead just mark the new node class being calculated, as extending the node class of that prototype.

Each patch_slot command which contains node commands patches an existing node. The class resolver 2016 calculates the node class of the resulting modified node, by creating a new node class which extends the node class which the node has originally before it was patched, and then modifying that node class to reflect the changes and new features which those node commands add.

Thus the class resolver 2106 builds a set of every node class which could be required by the application. This set can then be used by the code generator later to generate a compiled class file for each of those node classes, which can be used to represent those node classes efficiently.

Type Resolver 2108

The type resolver 2108 iterates though every syntax node in the AST, for each syntax node it finds which represents an expression, it calculates the type of that expression. It is therefore able to check that each place which requires a value of certain type receives the correct type (even if it cannot check that the value itself is correct). For each expression of type reference the type resolver 2108 refers to the corresponding node class calculated by the class resolver to determine the features of the referenced node, and hence is able to report an error if accessing a feature which a node of that node class does not have, as well as determine the types of property access, and node access expressions which access features of that node.

Flattener 2110

The flattener 2110 calculates all the node instances which initially appear in the orchard, or which can be instantiated using _new, and for each of those node instances it calculates:

What the node class of that node should be.

What the initial value of each of the properties and labels of that node should be set to What the initial contents of each of the slots of that node should be, (and therefore how the nodes are connected together).

It does this by iterating through the AST and looking for commands which create new nodes, and for each such node it finds it builds a list of all the commands which affect that node (i.e. all the node commands from the command which originally created the node, plus all the node commands from each command which patches that node). It then applies each of those node commands to the node in sequence to 'flatten' them together and calculate the final contents of the node.

To calculate the initial value of a property of a node, it finds the last create_property or patch_property command which affects that property, and uses the value=expression line from that command. It evaluates the result of that expression using an interpreter and stores the resulting value as the initial value of the property.

Simplifier 2112

The simplifier 2112 is an optional step which may be used to:

Improve the performance of the application (by optimising calculations which always give the same result, for example: using 'constant folding' and 'constant propagation').

Spot potential programming errors in the application.

Locate 'unreachable code' (code which will never be run).

Locate 'dead code' (code whose result will never be used).

The simplifier 2112 iterates through each node instance created by the flattener 2110 and searches for properties which contain a function.

For each function it finds it looks at each of the expressions in that function and performs the optimisations described above.

For example. A property expression access expression can be replaced with a constant value if:

The node which the expression accesses is guaranteed to always be the same node instance. For example: if the r. part of the expression says _self then the expression must always access properties on the node instance in which the function was defined. Likewise if the node is specified as an ancestor or descendant of _self, and the specified node is only reached from the _self node via varibility=constant slots then the node instance which the expression accesses will always be the same one.

The property which is being accessed is variability=constant.

In that case the simplifier 2112 can determine that the property access expression always accesses the same property on the same node instance, and furthermore that the value of that property cannot change. Therefore it can safely replace that expression with the constant value of that property.

The simplifier 2112 may also spot potential programming errors. For example, if it has calculated/spotted that the argument to an expression is a constant value, and that constant value is not one which is valid for that expression then the error can be reported immediately.

Code Generation 2114

The code generation 2114 step outputs the compiled version of each function, and a compiled version of each node class which can be used to efficiently represent node instances of that node class, and which contain methods which can be invoked by the algorithms in the client and/or server to operate on that node more efficiently.

It is of course possible to output to a variety of formats, for example:

Native machine code (hence producing code which can be run directly on the target hardware).

x86 machine code, or ARM machine code.

Java byte code, (hence producing code which can be run using the Java Virtual Machine).

An intermediate representation used by another external compiler, (hence relying on that external compiler to produce the executable code), for example outputting to LLVM intermediate representation.

In an example the compiler outputs to Java byte code. It outputs Java classes as follows:

For each node class calculated by the class resolver the code generation step outputs:

A Java class (the immutable class) which can be used to store the immutable data for a node of this node class (see the 'Immutable Data' section).

This Java class includes:

A field to store the immutable id.

A field for each constant property of this node class (to allow the property's value to be stored).

A field for each constant label of this node class (to allow the label's value to be stored).

A field for each array slot of this node class (to allow the array's dimensions to be stored).

A constructor which allows the fields of an instance of this class to be populated by de-serializing data from an entry in the data.bundle (see description of data.bundle below)

A Java class (the last_sync_data class) which can be used to store the last_sync_data for a node of this node class.

This Java class includes:

Fields to store the modified flags.

A field to store the clients_on_last_sync set (unless this can be omitted, due to it being identical to the set of clients who could see the parent node)

A field for each dynamic revealed list slot, which stores the list_changes buffer for that slot.

A field for each concealed slot, which stores the clients_with_removed_node set for that slot.

A field for each client_dynamic property, which remembers the per client modified flags for that property.

A Java class which can be used to represent a node of this node class.

This Java class includes:

A field to store an instance of the immutable class corresponding to this node class (such that the immutable data for the node can be included).

A field to store an instance of the write sync class corresponding to this node class (such that there is place for write sync algorithm to store write sync temporary data for the node).

A field to store a pointer to the parent node of the node

A field to store the node's node id

A field for each dynamic/client_dynamic property of this node class (to allow the property's value to be stored).

A field for each client_dynamic property of this node class (to allow the property's default value to be stored).

A field for each slot of this node class (to allow the contents of that slot to be stored). The type of this field depends on the storage type of the slot, so for example if it is a single slot, this is just a pointer to the child node, whereas if it an array slot, this is an array of pointers to the child nodes, etc. . . .

Methods which allow the fields of the node to be populated by de-serializing data from the data.bundle (see description of data.bundle below)

Methods which allow a copy of the node (including a copy of all its descendants) to be created.

Methods which allow the algorithms in the client/server to iterate through each of the children of the node in turn.

Methods which retrieve and combine the values needed by the renderer and mouse over algorithms, (for example a getTransform method, which retrieves each of the magic=translate, magic=rotate, etc. . . . properties and combines them into a single transformation matrix (see the 'Transformation Matrix' section).

Methods to retrieve the various ids of the node (the node class id, the immutable id, etc. . . .

Methods to assist the write sync algorithm, including methods which implement portions of the write sync algorithm, with the implementation tailored to this specific node class.

For example: for the portion of the write sync algorithm which writes out the value of each property for each new client, instead of requiring the server to access each field of the node in sequence (which would involve a lot of method/reflection calls), instead a single method is generated which receives the new_ clients set as a parameter, and performs the 'transmit property to new_clients' part of the write sync algorithm for this node.

An example of tailoring the implementation to this specific node class, is as follows: If the method is implementing a portion of the write sync algorithm which syncs a specific slot of this node, and the algorithm is specified as running a different code path depending on the slot's storage type, the code generated method can be made to omit that storage type check and instead make the generated code only include the code path for the actual storage type of the slot for which the code was generated.

Methods to assist the read sync algorithm, including methods which implement portions of the read sync algorithm, with the implementation tailored to this specific node class.

Methods to assist the render algorithm, including methods which implement portions of the render algorithm, with the implementation tailored to this specific node class.

Methods to assist the event algorithm, including methods which implement portions of the event algorithm, with the implementation tailored to this specific node class.

Note: The methods which are described above are optional. They are generated for efficiency, as the algorithms could instead be implemented entirely in the client/server and could access/modify the relevant fields of the node using reflection.

For each unique function in the application the code generation step may output a Java class which represents that function (the function class). A separate java class may be output for each function, rather than just generating Java methods for each function directly into the node class, as unlike in Java the functions in the example language are 'first class functions'. (I.e. they can be assigned to variables, passed as arguments to other functions, moved between nodes etc. . . . ). This Java class includes:

A field which remembers a reference to the node the function was originally defined in. This is so that reference can be returned as the result of the _self expression. Optimisation: If the compiler is able to determine that the function is never copied or moved to a different node, then this field can be omitted, as in that case _self can just safely return a reference to the node the function is currently stored in, which is bound to be the same thing.

A field which remembers a reference to the body node of the file the function was originally defined in. This is to that reference can be returned as the result of the _body expression. Optimisation: If the compiler is able to determine that the body node is immobile relative to the _self node (i.e. all the slots in between are variability=constant), then this can instead be stored as a count of how many nodes up in the tree the body node is from the _self node.

Fields which remember each of the other values this function 'captures'. (See description of functions in The 'Types' section of this document).

A method which contains the compiled version of the function. (I.e. all the function code written inside the function in the definition is converted into Java code which can be invoked by the client/server directly, and that Java code is placed into this method).

A method which creates a copy of the function (including copying each of the captures).

Methods to assist the write sync algorithm, (e.g. which can write the correct data into the sync packet to transmit this function value to the client). When transmitting a property value of type function to the client, what is written into the sync packet is that function's function class (rather than writing the entire function class directly into the packet, this implementation writes an id which indicates which function class to retrieve from the dictionary, see discussion of dictionary below), plus the data needed to instantiate that function class on the client. I.e. The references from the _self and _body fields (if applicable), and each of the other captures.

Some of the fields/methods described above may only be required by the client and some may only be required by the server. Therefore as a further optimisation it is possible to generate separate client and server versions of each Java class which save space by omitting the parts of the class which are not needed in that environment. These two permutations of the Java class will still have the same class id. For example: When the application is transmitted from the server to the client, and the server instructs the client to instantiate a node with a particular node class id, the client will still instantiate a Java class which represents the same node class, it will just instantiate a version of the Java class tailored to specifically meet the client's needs.

Further optimisations:

Java classes which represents node classes or functions which the compiler can determine as being unused (including Java classes only used by unreachable or dead code), do not need to be code generated, and can be omitted to save space. Likewise portions of a function class which are unreachable or dead code do not need to be generated.

If there are any nodes or code which the compiler is able to determine are always secret to all clients (for example: nodes with magic=secret, variability=constant, value=true properties, or descendants of those nodes in constant slots, or functions of those nodes where there property containing the function is never read—only invoked), then the compiler is able to determine that some classes or code will never actually be transmitted to the client. In that case client versions of those classes/code do not need to be code generated to save space on the client, and also to prevent the client from receiving unnecessary information about the internal workings of the application, which can help prevent cheating or piracy.

Dictionary Generation (2116)

This step creates the client and server dictionaries (see the 'Dictionaries' section).

Each entry placed in the dictionary is assigned an id which can be used to refer to it.

The Java classes generated by the code generation step (2114) (as described above), are considered part of the dictionary. The class id of the class can be used as the id to refer to it in the dictionary.

The media (images, waves, fonts, models, etc. . . . ) and media metrics may be inserted into the dictionary as follows:

The dictionary generator (2116) iterates through each node instance created by the flattener (2110) (including functions stored in properties of those nodes), and finds every place which contains or refers to a media file. That media file is then compressed, assigned an id, and placed into the dictionary.

Literal values may be inserted into the dictionary as follows:

The dictionary generator (2116) iterates through each node instance created by the flattener (2110) (including functions stored in properties of those nodes), and finds every place which contains or uses a literal value, that literal value is then assigned an id, placed into the dictionary, and the place which contained or used that literal value is updated to refer to the dictionary entry instead. It is only worth placing literals in the dictionary where the size of the literal is larger than the size of the id indicating which dictionary entry to use, so for example, if the literal is an unboxed integer it is not placed into the dictionary.

The dictionary may also include a section called the data.bundle which contains entries for each node instance created by the flattener (2110), and each immutable instance used by those node instances. There are three type of entry which may appear in the data.bundle.

An immutable entry, which indicates how to create an immutable instance. (i.e. which immutable class to use, and what value to set each of the fields to).

A property entry, which indicates what values to set the mutable properties of a node instance to.

A slot entry, which indicates what child nodes to instantiate and place in the slots of a particular node instance. This lists the children of every slot, and for each such child indicating which slot it appears in, what index it appears at, and the four ids (see below) needed to instantiate that child.

In order to instantiate and populate a node using the dictionary four ids may be needed.

Which node class id to use.

An imutable entry id, (which indicates which imutable entry to use to create the immutable instance for this node).

A property entry id, (which indicates which property entry to use to set the mutable properties of the node).

A slot entry id, (which indicates which slot entry to use to create the children of the node).

Therefore to create an entire tree of nodes all that needs to be known is the four ids to use to instantiate the root node of that tree. This then allows the entire tree to be built recursively, as the act of processing the slot entry for that root node will in turn instantiate the children, etc. . . .

The dictionary may also contain:

The four ids which the server should use to instantiate the root node of the shared tree. In conjunction with the rest of the data in the dictionary this is enough to inform the server how to construct the entire orchard in its initial state.

The four ids which the server should use to instantiate the root node of a client tree, each time a client connects to the server.

Likewise for each _new expression, the code inserted into the function class to generate the requested node only needs to consist of the four ids which allow the appropriate node to be instantiated, plus a call to a library which generates that node by recursively looking up entries in the data.bundle as described above.

As with the code generated Java classes, dictionary entries which the compiler can determine as being unused (for example: because they are only referred to by unreachable or dead code), can be omitted to save space. Likewise dictionary entries which the compiler can determine will never be utilised on the client (for example: because they are only utilised by functions which the code generator omitted to generate for the client), can be omitted from the client version of the dictionary.

Additional Features

This document lists the fundamental data structure and algorithms which can be used to represent a graphical application and allow it be interacted with over a network. Once that fundamental data structure is understood there many additional features which can added, this section lists some of those additions:

Allowing Node Ids to be Changed

Because each node has a single node unique node id which doesn't change once the node is created, this could leak information to the client which would be better kept secret.

Take for example a card game, where:

Each card in the game is represented by a different node (the 'card node'), and

The 'front' of the card is stored inside a child node which is secret when the card is face down (so the client cannot see which card it is).

Ideally the node id of the card node would not give away which card it was. However because the node id is transmitted to the client it is as if the node id is written on the back of each card, which allows the client to still tell which card is which.

One possible way to mitigate this problem is to assign the node ids in a random order rather than sequentially which prevents the client inferring which card is which initially. However this doesn't entirely solve the problem, as once the client has seen the front of the card it still knows which card that is for ever more even if it is turned face down and shuffled with other cards.

Another solution is to allow the node id of the cards to be changed. Changing the node id involves giving the node (and every descendant of that node), a new node id, and then for each property which contains a reference pointing at any of those nodes, updating that property to refer to that the new node id (and retransmitting everything which changed to the client accordingly) So for example after the deck of cards is shuffled, the system iterates through each card in the shuffled decks, and assigns new node ids. The node ids then only reveal the order of the cards after shuffling, not the original order, so as long as they are changed on each shuffle they cannot be used to infer the value of a card in the shuffled deck.

In various examples, identifiers are assigned to nodes of the graph and are transmitted to one or more of the clients. In some examples the identifiers of nodes on a branch of the graph are changed when it is required to keep data stored at the branch secure with respect to one or more of the clients.

Adapting the Display to Different Resolution Screens

Display Scaling

Because the renderer works by building up a transformation matrix which is then applied to each primitive which is rendered, it is possible to scale the entire display by simply making that matrix start off as a scale transform, as opposed to an identity matrix. This is especially useful if running the application full screen as opposed to in a window, because it allows the application's display to be scaled to match the native resolution of the client's screen, and the application does not need to be modified or even aware that the scaling is going on.

In some examples, a computer-implemented method at the client comprises accessing a native resolution of a display screen controlled by the client and calculating a scale transform on the basis of the native resolution. The client calculates graphical primitives from the graph of nodes. The client may calculate a transformation matrix specifying where on the display screen to draw the graphical primitives. The transformation matrix may be calculated to take into account the scale transform such that the graphical display of the application is adapted to different resolution client display screens.

Borders

However if the client's screen is a different aspect ratio to the one the application was originally designed for, then whilst the client can scale the display to fit either vertically or horizontally, it will still leave gaps at either the top and bottom or left and right of the screen. Normally the renderer will clip the rendering of the display to the aspect ratio which the application was designed for, and will draw solid color borders in those gaps, as this avoids drawing something unexpected if the application did not anticipate this area being visible.

However it is desirable to be able to control the appearance of those borders. This can be achieved via additional magic properties. As these magic properties don't affect a specific primitive, but rather how the renderer deals with the borders they can just be placed directly on the root node of the relevant client tree.

The magic=border_color property controls which color those borders are drawn.

The magic=overscan_h property allows the horizontal borders to be switched off. i.e. if the screen is wider than expected, then any primitives in that portion of the coordinate space will still be drawn, this means for example, assuming the top left corner of the normal display area is at (0,0) it is possible to draw into the left border by placing a primitive with a negative x-coordinate.

Likewise the magic=overscan_v property allows the vertical borders to be switched off.

In some examples, a root node of the graph of connected nodes comprises instructions controlling how a renderer at a client deals with different aspect ratios of a client display screen.

Pixel Alignment

The coordinate space used by the renderer uses floating point coordinates so primitives can be positioned with sub pixel accuracy. When the primitive is rendered it is rendered using a graphics API such as DirectX or OpenGL which supports that sub pixel accuracy. However if the primitive is not aligned to the native pixels of the screen it causes the primitive to appear slightly blurred. Therefore to cause primitives to appear sharp it can be desirable to make sure the edges of the primitive align with the edges of the pixels on the screen.

However because of the display scaling step described above the application does not know the native resolution of the screen, and does not know which coordinates in the display coordinate space correspond to the edge of pixels on the screen. i.e. it is not necessarily just the case that integer coordinates correspond to pixels, so the application cannot itself just carefully choose coordinates which cause this pixel alignment to occur.

In various examples, a renderer at a client is arranged to carry out pixel alignment during rendering of the graphical display. In some examples, a client detects that an image of the graphical display is rotated other than in 90 degree increments, and omits the pixel alignment process.

A solution to this is for the renderer to perform the pixel alignment on behalf of the application as it is rendering the screen. It can do this by aligning the coordinates specified to it by the application to the nearest pixel, to cause the edges to be pixel aligned. If this alignment is not desired it can be switched off using a magic=pixel_align property. It can also be automatically switched off if the renderer detects that it won't help anyway—for example if the image is rotated (other than in 90 degrees increments), then the pixels would not be aligned anyway.

Unfortunately, it is also possible for this alignment to cause the width of a primitive to change by up to a pixel. For example, if the left edge of the primitive should be aligned to the left to reach the nearest pixel, and the right edge of the primitive could be aligned to the right to reach the nearest pixel. This can cause an undesirable distortion effect where the image is sometimes stretched by a pixel and sometimes isn't as it moves across the screen. To avoid this the renderer can be extended to support nudging one of the edges by 1 pixel, after the pixel alignment, such that the total width/height remains constant. However if two primitives are being drawn adjacent to each other this nudging can cause a crack to form between them, so the renderer needs to know which edge it can nudge safely. This can be done using a magic=primitive_h_nudge property, which specifies which of the left/right edges (if any) it is safe to nudge without introducing a crack, and magic=primitive_v_nudge which does the same thing for the top/bottom edges.

Quantize Scale

A situation can arise where it is not safe to nudge either edge of a primitive (as moving either would introduce a crack), but it also undesirable for the primitive to change in width as it is moved across the screen. An example of this is a 2d platform game where the background image is made of a grid of tiles, which is then scrolled across the screen. If the width of those tiles does not divide into the width of the screen, then at least one of them will have to be drawn wider than all the rest to make the image fit. With the algorithm described above which tiles end up being drawn 1 pixel wider will change as the background is scrolled, which causes an unpleasant rippling effect. The problem can be resolved by turning off pixel alignment entirely but then the background appears slightly blurred.

If the width of the tile (after scaling) is an integer number of pixels, then it follows that the left and right edges will always be pixel aligned in the same direction, and hence it will never be necessary to nudge one of the edges to avoid stretching. A solution therefore is to offer an option to restrict how the renderer will scale the display to the screen, such that the size of those tiles is guaranteed to be an integer. This of course means the renderer has less choice about how it scales the display, and cannot necessarily scale the display to the exact size required to fit either horizontally or vertically, so it can result in larger borders.

This can be done by specifying a magic=quantize_scale scale property on the root node of the client tree. For example specifying a value of 16 to this property will cause the renderer to force the display to only be scaled in increments of 1/16 (which is 0.0625). i.e. the display scale may be 1.0, or 1.0625 or 2.25, etc. . . . This in turn means as long as the width and height of the tiles is a multiple of 16 then the scaled tile size will remain an integer, hence solving the problem.

In some examples, a root node of the graph of connected nodes comprises instructions controlling a size of scaling increments to be used by a client.

The lower the number the quantize_scale property is set to, the less leeway the renderer has to scale the display to make it fit the native screen. For example taking the most extreme example, if the magic=quantize_scale property was set to the minimum value of 1, then that guarantees that every primitive which had integer dimensions originally will remain with integer dimensions, and so won't need to be nudged, but it means the display scale will be 1.0, or 2.0, or 3.0, etc. . . . i.e. the renderer can only scale the screen by doubling or tripling, etc. . . . , each pixel, which can of course result in very large borders if none of those sizes fits very well.

Background Color

If an area of the display is not drawn to by any primitives, then there is a question of what color that area of the display should appear. This can be set by specifying a magic=background_color property on the root node of the client tree.

In some examples a root node of the graph of connected nodes comprises instructions controlling a background color of the graphical display to be rendered by a client.

Black Box Properties

Sometimes for a property which contains a dynamic or constant function (with no arguments) it is desired to keep the code inside the function secret from the client (either because it contains a calculation we don't want the client to know about, or because it contains code which would always throws a known prediction error), but we still want the client to know the result of running that function.

This is particularly likely to happen with magic properties which are read by the renderer, where the renderer needs the result to render the primitive correctly, but does not necessarily need to know how the result is derived.

This can be achieved by marking the property with the blackbox=yes annotation. The write sync algorithm should then be extended so that for such properties, it first evaluates the function in the property (for the client it is being transmitted to), and then transmits the return value of that function (referred to as the blackbox value) instead of the function itself.

This means the client will have the value, but does not know how it was calculated. The downside is the client will not be able to predict how the value should change. The value on the client (and what is rendered as a consequence) will therefore only update each time the client receives an update from the server, and so may not respond immediately to input or interval events.

A further consideration is that the blackbox value can change, (and hence need to be retransmitted to all the relevant clients), without the property itself being modified. For example if the function reads the value from another node, and that other node is modified. One solution is to make it so that when the blackbox value for a property 'P' is being calculated, if the function reads a value from a node 'N', then P is added to a set stored on N. If at a later time N is modified in any way the server then knows it needs to reconsider each of the properties in that set, and so sets a modified flag on those properties to cause the blackbox values to be reconsidered for transmission on the next write sync.

Feature Visibility

As well as allowing nodes to be hidden using a magic=hide property, or made secret using a magic=secret property it can also be beneficial to allow individual features of a node to be made hidden or secret. This allows things to be made hidden or secret in a more granular way.

This can be achieved by implementing support for a visibility=annotation on properties and slots, e.gs
  visibility=visible (the feature is visible—assuming its parent is)
  visibility=hidden (the feature is hidden, i.e. it won't be rendered, but will still be transmitted to the client assuming its parent is)
  visibility=secret (the feature is secret, i.e. it won't be transmitted to the client).

Note that, unlike nodes whose visibility is controlled by properties, the visibility of slots and properties is controlled by annotations. Controlling the visibility in this way has the disadvantage that it can't be changed whilst the application is running (as in this example the value of annotations cannot be changed in a running application).

In various examples, a property and/or a slot of a node of the graph of connected nodes may be annotated with a visibility annotation and the server is arranged to generate the update commands to keep secret the property and/or slot from one or more of the clients in dependence on the visibility annotation.

In various examples, a property and/or a slot of a node of the graph of connected nodes may be annotated with a visibility annotation and the server is arranged to generate the update commands to control transmission of the property and/or slot to the clients in dependence on the visibility annotation.

In various examples, a client is arranged to control rendering of a property and/or a slot on the basis of a visibility annotation of the property and/or slot.

Decorator Features

Sometimes it is desired that how a node is rendered is dependent on which slot that node is in, rather than dependent on a property of that node.

For example: An application which has a list slot representing a stack of cards, where that slot contains multiple children each of which represents a different card, where it is desired that each card in that slot is rendered at a different coordinate on the display depending on which index of the stack it is stored in. (such that the whole stack of cards can be seen fanned out on the display).

To achieve that normally a magic=translate property on each card would need to be set, but that adds an extra property to the card (which will still be present even when the cards isn't in the stack slot), and also may require extra code to adjust that property on the card every time it is moved between slots. This complicates the application.

One way to avoid that without extending the system is by programming the application to place an intermediary node into each index of the list slot, and making the intermediary node performs the translate instead of the card. The card is then made a child of that intermediary node instead. However this also complicates the application because then either the intermediary nodes have to be added and removed as the cards are added and removed, or have to be left permanently in the list slot which then places an upper limit on how many cards can be placed in the slot (i.e. no more than the number of intermediary nodes already there). It also makes the application more complex as every slot access expression which wants to access a card in that slot now has to navigate through the intermediary node to reach the desired card.

One possible extension therefore is to allow annotations on the slot itself which affect the transformation matrix (i.e. allow a translate annotation on the slot, which translates every child of that slot). The problem is this would not allow the translation to be adjusted whilst the program is running.

Another possible way to cause each of the children of the slot to appear at a different coordinate, is to make the slot visibility=hidden (see the 'Feature Visibility' section) such that the children aren't rendered at all, and then create a 2nd slot which contains a node for each card in the 1st slot, where that node has the desired translate property, and a viewport to the corresponding node in the 1st slot. This still requires appropriate nodes to be manually added and removed from the 2nd slot as children are moved in and out of the 1st slot, but at least avoids complicating slot access expressions that wish to access cards in the 1st slot, as the intermediary node is now parallel in a 2nd slot, rather than a parent of the card.

The problem presented in the previous solution can be solved if there is a way of causing the nodes to be added and removed from the 2nd slot automatically as nodes are moved in and out of the 1st slot. This way nodes can be moved in out of the 1st slot without having to manually adjust any other node or property at all, but the viewports in the children of the 2nd slot will still cause the children of the 1st slot to appear at the correct position on the screen based on their index. This can be achieved by adding support for a new type of feature called a 'decorator', which is a special type of slot which cannot have children added to it or removed from it manually, and is instead automatically populated/depopulated based on the children of a 1st slot, such that it always contains the same number of children as that 1st slot.

In some examples, at least one node of the graph comprises at least one decorator slot and wherein a client or a server is arranged to automatically populate or depopulate the decorator slot with child nodes such that it always comprises the same number of child nodes as another slot of the node.

A decorator feature could be supported through a new build code command 'create_decorator', which is a lot like create_slot. However a decorator slot also needs to specify which slot it tracks, (which can be done using a 'decorates=slot_name' annotation), and also needs to specify what features the children of that decorator should contain when they are automatically created (which can be done by allowing the features to be specified by placing node commands inside the create_decorator command).

The write sync algorithm then also needs extending to be able to transmit decorator features to the client. They can be transmitted in much the same way as slots, however they do not require a separate modified flag, as they are only modified in response to the slot being modified, so can share the same modified flag.

Ordered Map Slots

If two primitives have the same Z value they will be drawn in the order in which the renderer encounters them. However if the map slots are implemented as a standard open HashMap then the order which the renderer encounters the children when iterating through the map will be somewhat obtuse, as the order in which it encounters them will depend on which bucket of the HashMap they appear in, and that depends on the exact hashing algorithm used.

This also affects other algorithms which iterate through each of the children of a map slot in order. (For example it can also affect the order which event handlers will be run, if one event has multiple event handlers).

One way to make it less obtuse which order an iterator finds the children of a map slot, is to return the children of the map slot in the order in which they were originally inserted. For example if compiling to Java, this can be achieved by implementing the map slot as a LinkedHashMap instead of Hash-Map, which effectively stores each child in both a map (which lets it be found quickly by its index), and also in a list (which remembers the order).

In some examples, at least one of the nodes of the graph comprises a map slot which is arranged to preserve an order in which child nodes of the slot were inserted into the slot.

If the map slot is ordered, then the write sync algorithm needs extending to also transmit that order to the client. When transmitting the entire map slot, the map slot can simply be transmitted in order. When transmitting a partial update to the map slot, the write sync algorithm needs to indicate where in the ordering to insert each new child of the map. This can be achieved by sending a COMMAND_SET_MAP_SLOT command instead of a COMMAND_SET_SLOT command when informing the client about children which have been newly inserted into a map slot. COMMAND_SET_MAP_SLOT is very similar to COMMAND_SET_SLOT, except it also includes an additional piece of data indicating the index of the previous child in the map slot. The client can then find that previous child using that index, and hence insert the new child immediately after it in the LinkedHashMap.

In some examples, the server is arranged to generate at least one update command which comprises at least part of an order in which child nodes were inserted into a map slot.

Access Annotation

If creating a large application, or if creating a library, it can be useful to allow encapsulation. i.e. being able to restrict access to some of the features in the orchard, to only the parts of code which are expected to interoperate with those features.

In various examples the graph of connected nodes comprises at least one property or slot or label which has an access annotation specifying read/write access to the property, slot or label.

This can be achieved by adding a new property annotation 'access=' to the create_property command, which can take the values:

access=private (the property can only be accessed by friends, see description of friends below)

access=read_only (the property can only be written by friends, but can be read everywhere)

access=public (no restrictions, the property can be read or written everywhere).

By default any function created in the same .prototype file which created the property, is allowed full access to the property, even if the property is access=private. However functions specified in other .prototype files are not allowed access if the access=annotation prevents it.

It may be that it is desired to allow an external .prototype file to access a private or read_only property without having to make the property public to everywhere. This can be achieved by allowing a friend=filename annotation to be specified in the header of the .prototype which created the property. (Where filename refers to a file which should be given full access to all the features of this .prototype, even if those features are private/read_only). More than one friend-annotation can be specified to allow multiple external files access to private features.

If a function attempts to access a private/read_only property which it does not have access to, then it is possible to spot that at compile time and produce a compile error.

Likewise it is possible to allow a similar access=annotation to be specified on labels and slots, to restrict which .prototype files can access those.

Unfinished Annotation

If creating a .prototype which is only intended to be used with the add_prototype command, (for instance, because some of the features are expected to be patched or filled when the prototype is used), it can be useful to be able to indicate that.

To allow this the language can be extended to allow an unfinished-true annotation to be specified on features which are intended to be patched.

unfinished=true, in the header of a .prototype file indicates that that prototype is intended to only be used in conjunction with the add_prototype command. (If any features of the prototype are marked as unfinished then the unfinished=true annotation also appears in the header).

unfinished=true, on a property indicates that the property is intended to be patched with the patch_property command, and a new value=line provided to give a new value for the property.

unfinished=true, on a slot indicates that the slot is intended to be filled with the fill_slot command, and at least one node be placed in the slot.

For example: with the sprite.prototype given in the example application in the 'Build Code' section of this document, it is very unlikely the developer ever wants the default image to be displayed and will likely always want to specify which image to use. Therefore the unfinished=true annotation can be added to the image property of the sprite, and this way an integrated development environment can prompt the developer to provide a value for that property when that prototype is used, or if the developer forgets to patch that property to provide the image a compile error can be generated.

Mobile/Immobile Functions

In the 'Code Generation' section (and in the 'Types' section of this document 'Captures') it has been described how functions sometimes need to store a reference to the _self node. However if the compiler is able to determine that function is never copied or moved to a different node, then this field can be omitted from that function.

One way to indicate if a function is ever copied or moved to a different node is through the use of a mobile/!mobile function modifier. (see the Types' section of this document).

The compiler may also infer if the property is mobile or immobile from the property variability annotation. (For instance it could be programmed to infer that functions defined directly in the initial value of a constant property are immobile, and all other functions are mobile.)

If the function is marked/inferred as immobile and the compiler wishes to enforce that it is never moved/copied to a different node, then one way to do that is check that the function is never read (only ever invoked), and therefore the function cannot be copied or moved.

This can optionally be made less restrictive, as if the function is only copied or moved to a property on the same node it is still not necessary to store the _self reference in the function, therefore immobile functions can optionally still be allowed to move between properties of the same node.

The following restrictions on immobile functions may be implemented to achieve that:

If a value of type immobile function is stored in a property which isn't on _self, a compile error is generated.

If a property of type immobile function is read from a property which isn't on _self, a compile error is generated.

If a value of type immobile function is passed as a parameter to another function and that other function is not stored in a variable/property of _self, a compile error is generated.

If a value of type immobile function is passed as a parameter to another function and that other function is not itself an immobile function, a compile error is generated.

If a function that returns an immobile function is invoked, and the _self of that invoked function is not the same as the current _self, a compile error is generated.

Sound

Sound Primitives

As well as supporting primitives which cause something to be rendered to the display, support for primitives can also be added which causes a sound to be played.

In various examples a method at a client comprises rendering the graphical and/or audio display by finding nodes which represent any one or more of: a sound buffer primitive corresponding to a native sound buffer on a sound card, a sound primitive.

In an example this is achieved by adding 2 new primitives, a 'sound buffer' primitive, and a 'sound' primitive.

A sound buffer primitive corresponds to a native sound buffer on the sound card (for example a SecondaryBuffer if using DirectSound). Sounds can then be mixed into that buffer by adding descendants which represent sound primitives.

The sound buffer also has properties which are used to calculate the sample position used to play all the sounds within it. This is calculated in such a way that all the sounds in the same sound buffer will play precisely in sync with each other.

A node which represents a sound buffer primitive can be created by specifying a:

magic=primitive_type property whose value is ^sound_buffer.

A sound buffer primitive needs additional properties to configure it, including

| | |
|---|---|
| magic = start_time | Should be set to a value of type time, and is compared with the render time to calculate the sample position of the sound buffer. This is then in turn used to calculate the sample position of each sound being mixed into the sound buffer (see mixing thread below). |
| magic = start_time_tolerance | If the value of the start_time property is changed, then this property is consulted. It indicates (in 600ths of a second) how much start_time maybe changed by before the sample position of the sound buffer is recalculated. It may be desirable to ignore small changes in start_time, such that if the predictor predicts start_time slightly early or late, it doesn't cause an audio glitch when the sync packet arrives and corrects it. |
| magic = volume | Should be set to a value of type float between 0.0 and 1.0 (can be set out of this range in which case the sound engine will just clamp the value). |

To make a sound buffer produce sound, one of more sounds can be mixed into the sound buffer by adding descendants which represent sound primitives. A node which represents a sound primitive can be created by specifying a magic=primitive_type property whose value is ˆsound.

A sound primitive needs additional properties to indicate which wave should play, how loud it should play etc. . . . Including:

| | |
|---|---|
| magic = wave | Should contain a value of type wave, which contains the sound data to play. |
| magic = volume | Should be set to a value of type float between 0.0 and 1.0 (can be set out of this range in which case the sound engine will just clamp the value). |
| magic = looping | Should be set to a value of type boolean, indicating if the sound should loop or not. |
| magic = start_type | Indicates how the sound should start playing, options are: |
| ˆimmediate | The sound starts playing at the specified volume. |
| ˆfade_in | The sound starts playing at zero volume, and then fades in according to volume_fade_time. |
| magic = end_type | Indicates what should happen if the sound is deleted from the sound buffer part way through play back, options are: |
| ˆimmediate | The sound stops playing immediately. |
| ˆfade_out | The sound is faded out according to volume_fade_time. |
| ˆstop_looping | Looping is disabled for the sound, and then the sound plays to the end of the wave. |
| ˆend_of_loop | The sound stops when it reaches the end of the loop. |
| ˆany_marker | The sound stops when it reaches one of the markers defined in the wave configuration file, (see the 'Media Configuration Files' section) |
| magic = switch_type | Indicates what should happen if the magic = wave property is set to a new value, options are: |
| ˆimmediate | The sound switches to the new wave immediately |
| ˆcross_fade | The sound cross fades to the new wave according to volume_fade_time. |
| ˆfade_out_then_fade_in | The sound fades out, and then the new wave fades in according to volume_fade_time. |
| ˆend_of_loop | The sound switches to the new wave when it reaches the end of the loop. |
| ˆany_marker | The sound switches to the new wave when it reaches one of the markers defined in the wave configuration file, (see the 'Media Configuration Files' section) |
| magic = volume_fade_time | Indicates (in 600ths of a second), how long it should take to fade all the way from volume 1 to 0 (or 0 to 1). A smaller volume change will take proportionally less time. This is used if the volume of a sound is changed, and is also used in conjunction with start_type/end_type/switch_type (see above). A value of 0 means the volume will change instantly. |
| magic = offset | Subtracted from the sound buffer's sample position, when calculating the sample position for this sound. |

Further features typical to sound engines may be supported, for example giving each sound or sound buffer a 2d or 3d position and an attenuation, and allowing microphone primitives to be added to the scene, such that the volume can vary with distance, or being able to specify environmental effects, (such as adjusting the reverb of the sound or sound buffer etc. . . . )

Algorithm Used by the Renderer to Find Sound Buffers and Sounds

The sound implementation arranges that any node which represents a sound buffer primitive or sound primitive has a predictable node id. (see the 'Predictable Node IDs' section)

In various examples, the graph of nodes comprises at least one node representing a sound buffer primitive or a sound primitive, the at least one node having a node identifier which is predictable.

Each time the display is rendered the client also works out which sound buffers are in the scene, and which sounds each sound buffer in the scene contains. This can be done at the same time as the renderer is recurring through the tree to render primitives.

The sound buffers which are in the scene, are compared with the sound buffers currently being played by the mixing thread. The predictable node id of the node which represents the sound buffer is used to tell the difference between an existing sound buffer being adjusted, or a sound buffer being removed and a new sound buffer being created.

If the scene contains a new sound buffer primitive (which contains at least one sound primitive) then that sound buffer is copied to the mixing thread, the corresponding native buffer is created on the sound card to represent that sound buffer, the initial sample position of the sound buffer is calculated by comparing start_time with current_time, and the mixing thread will start populating the native buffer according to the sound_buffer's sample position, and the sounds it contains.

If the scene no longer contains a sound buffer which the mixing thread is still playing, then each of the sounds in the mixing thread's copy of the sound buffer will be marked as 'ending', but the mixing thread's copy of that sound buffer will not be immediately deleted.

If the scene contains a sound buffer which the mixing thread already has a copy of, then the sample position of the sound buffer is not normally adjusted, as it is normally only incremented by the mixing thread (see below). However if the start_time of a sound buffer has been changed by more than the start_tolerance then the sample position of the sound buffer will be recalculated, which will cause a glitch in the audio playback.

The list of sounds which the mixing thread's sound buffers contain may also be updated in a similar way. The predictable node id of the node which represents the sound primitive is used to tell the difference between an existing sound being adjusted, or a sound being removed and a new sound being created. If the nodes found in the scene indicate that a sound buffer contains a new sound, then that sound is just added to the list of sounds to mix into the sound buffer. If the nodes found in the scene indicate that a sound has been removed from a sound buffer or a sound has been changed, then the request will be stored against the corresponding sound in the sound buffer, for the mixing thread to action (see below).

It is also possible to extend the primitive_type=clipbox to contain another property which controls if it clips just graphics, just sounds, or both. i.e. this allows a clipbox which prevents something from being seen, but still allows it to be heard.

Mixing Thread

In an example the sounds are mixed by a separate thread to ensure the native sound buffers are filled in a timely fashion.

For each sound buffer which the mixing thread is processing, a corresponding native buffer will have been created. The mixing thread repeatedly writes samples into these native buffers to produce sound.

The sample position of each sound in a sound buffer is calculated by subtracting the sounds 'offset' from the sound buffers 'sample position'. If the sound is marked as looping=true the sample position of the sound is then wrapped according to the loop start and loop end markers of the wave.

When the mixing thread writes a sample into a native buffer it creates an accumulator variable which starts at 0, and then for each sound in the corresponding sound buffer where the sample position of that sound is not beyond the start or end of the wave, it:

retrieves the appropriate sample based on that sound's current wave and sample position.

multiplies that sample by the sound's current volume.

adds the resulting value onto the accumulator.

The final resulting value in the accumulator is then multiplied by the sound buffer volume, and then clamped into the valid range for the native buffer, and is written into the native buffer. The mixing thread will then increment the corresponding sound buffer's sample position by 1.

The mixing thread also processes requests to end or change sounds. For example: If a sound has requested a new volume it will adjust towards that volume according to the volume_fade_time. If a sound has been marked as ending or switching to a new wave, then it will process that request according to the end_type and switch_type parameters.

Once a sound's end request is completed (for example once it has finished fading out), that sound will be removed from the sound buffer by the mixing thread. If all the sounds are removed from a sound buffer then the mixing thread will then delete the entire sound buffer, and will also release the corresponding native buffer.

Integrated Development Environment

In some examples an integrated development environment (IDE) is provided for creating and editing .prototype files. This can behave in a similar way to IDEs used for editing files from other programming languages, (such as C, Java, etc. . . . ) in that it can display programming errors, syntax highlighting, etc. . . . , which can be updated as the file is being edited. As well as supporting the usual tools for such development environments such as refactoring.

The modular design of the compiler, with the separate lexer, parser steps etc. . . . makes this more practical to implement, as the IDE can for example run only the modules of the compiler it needs to check for errors or syntax highlight the file without having to run the entire code generation step.

Because each .prototype file describe the initial state of a portion of the application, and because that initial state by definition includes the initial state of the display, it is possible to make the IDE show a graphical preview of how the tree defined by the .prototype will be displayed when it is first created.

In various examples the integrated development environment is arranged to calculate a preview of the graphical display having a state and behaviour encoded by the graph of connected nodes, and output the preview to a display device.

For example: This is very useful if each graphical user interface used by the application is defined in a separate .prototype file, as it means a graphical preview of the interface can be seen as it is being coded, and whilst that preview will not show how the interface updates in response to input events it can be very helpful to position all the buttons etc. . . . , in the correct initial position.

Save and Load

The implementation can be extended to allow the application to save files and load files. In some examples the server is arranged to save and/or load files comprising values calculated as a result of the execution of the graph of connected nodes. In some examples the client is arranged to save and/or load files comprising values calculated as a result of the execution of the copy of at least part of the graph of connected nodes.

Depending on what is being saved sometimes it is useful for the file to be saved in the user's space (for example to store their save game, or personal best high score), and sometimes it is useful for the file to be saved in the application's space (for example to store the highest score achieved by anyone, or to allow the application state to be persisted across reboots).

A file can be saved in the current user's space by using a statement like:

_user_file_save (array, file_name)

the current user is the user of the current client.

A file can be saved in the current application's space by using a statement like:

_application_file_save(array, file_name)

Where array is an array of values to save (see description of array in the 'Types' section of this document), and file_name is a string giving the name of the file.

State which has been previously saved can be retrieved by using an expression like:

array=_user_file_load(file_name)

or array=_application_file_load(file_name)

Serialization

In various examples a value stored in a file may be a record comprising a serialization of a branch of nodes of the graph of nodes. The save and load feature above only allows values to be saved, but sometimes it can be useful to be able to save the layout and contents of an entire branch of a tree. This can be facilitated by adding support for serialization expressions which can serialize a branch of the tree into a value of type record which can then be saved into a file using the save statements described above. At a later time that value can then be retrieved using the load expression described above, before finally being converted back into a branch of the tree using the corresponding deserialization statement.

In an example, the serialization algorithm works by recurring through the tree from the requested starting point, and:

for each serializable property it finds storing its value, for each serializable dynamic slot it finds storing its contents, and then recurring into each serializable slot to store the details of its children's features also.

Expressions and Statements

To serialize a portion of a tree use the serialize expression in the form:

record=node.slot._serialize( )

The corresponding deserialize statement is:
node.slot._deserialize(record)
Where node.slot indicates which dynamic slot the serializer/deserializer should start from.

Example Implementation 1

One possible implementation is, to allow a 'serializable-true' annotation to be specified on each property and slot which the serializer should store, then:
  For each serializable property the serializer encounters it will output into the record, the value of the property.
  For each serializable dynamic slot the serializer encounters it will for each child of that slot:
    Output into the record, the index at which that child was found, and the prototype file to use to instantiate that child
    It will then recur into that child (i.e. to store the value of its serializable features in the same way)
  For each serializable constant slot the serializer encounter it will recur into each child of that slot (i.e. to store the values of its serializable features in the same way)

Example Implementation 2

The advantage of the above implementation is it is straightforward to implement, the disadvantage is that if the application is changed (i.e. a new version of the application is created), then the records saved by the previous version may be incompatible with the new version. This will happen for example if:
  Any serializable features are added, removed, or reordered.
  Children of a constant slot are added or reordered.
  The storage type or class of a slot is changed in a way which makes it incompatible with the record.
  Prototype files referred to by the record are deleted or renamed.
To make the records less likely to become incompatible if the application is changed, the example implementation can optionally be extended as follows:
  Add a new step to the compiler which causes it to generate a 'template file' for each serialize expression it encounters.
  This template file may include in what order the serializer should visit the serializable features of each node. This can be indicated by just storing an ordered list giving the name of each serializable feature. The serializer/deserializer will then follow the order indicated by the template, even if the features in the source file are in a different order.
  For each dynamic serializable slot, the template includes a list giving the name of each prototype which could be used to create a child of that slot. This way the serializer can save space as it does not have to include the name of the prototype in the record, and can instead include the appropriate index into this list.
  For each constant serializable slot, the template indicates in what order the serializer should recur into the children of that slot. One possible way to do this is to add a magic=child_serialization_id constant property to each node which appears in a constant serializable slot. Where each such node in a particular constant serializable slot has that property set to unique value. The order the children should be visited, can then be indicated by just storing an ordered list giving the value of that property for each child of the slot.
  If the application is updated to a new version and recompiled, the compiler may load the template generated for the previous version, and use that when calculating the template for the new version.

In this way the new template may list the serializable features in the same order as the previous version, maintaining compatibility if the order in the features in the source file is changed. Any newly added serializable features may be added to the end of the list, and if any serializable features have been removed compared to the previous version a compile error or warning may be generated to indicate that the new version will not be able to load records created by the old version.

Likewise the new template may list the children of a constant serializable slot in the same order as the previous version. Any newly added children may be added to the end of the list, and if the slot no longer contains a child with a particular child_serialization_id compared to the previous version a compile error or warning may be generated to indicate that the new version will not be able to load records created by the old version.

Likewise other changes to the application which would break compatibility may be detected by the compiler by referring to the previous version of the template. For example if the list of prototypes for a dynamic slot includes a prototype which no longer exists, or if the storage type or class of a slot is changed.

When the serializer generates a record it may include at the start of the record which version of the template it used to generate the record. This way the deserializer can refer to that template and know exactly which features/children were saved and in what order. Any newly added features/children which have been added to the application since the record was created can be detected and simply not loaded.

Example Implementation 3

The implementation given above will still fail if a serializable feature or a prototype is renamed, as the names stored in the template will no longer match. Whilst the application can be updated without renaming such features or prototypes it may impair the readability of the source code if the names cannot be updated as desired. To resolve this the implementation can optionally be further extended as follows:
  Instead of the proposed 'serializable=true' annotation, instead add a serialization_id=UUID annotation which is used to indicate a particular feature is serializable. Where UUID is a 'universally unique identifier'.
  In various examples, when serializing a branch of a tree the serializer only includes features which have a serialization_id.
  The template file generated by the compiler can then indicate which features the serializer should visit, by listing them by their UUID instead of by their name. In this way the name can be changed without breaking compatibility (however changing the UUID will break compatibility instead, but since this is not used for other purposes this is less inconvenient)
  Likewise each prototype file which could be used to create a child of a serializable dynamic slot, may be given a UUID by specifying a UUID annotation in the seed header of the prototype. The template file can then store the list of prototypes for each dynamic slot using these UUIDs instead of using the name of the prototype file.

Media Configuration Files

In the examples described above the application definition refers to media files (images, waves, fonts, etc. . . . ) directly. However it can be useful to be able to specify additional configuration data for media files to indicate to the compiler exactly how it should pre-process or compress the media file, or to indicate to the runtime system how it should process or render the media file.

One way to achieve this is to make it so that the application definition does not refer to the media file directly, and instead refers to a configuration file. The configuration file then refers to the media file and can also provide the additional configuration data. With this approach a single configuration file refers to a single media file, but it is possible for the same media file to be used by multiple different configuration files, which allows the same media file to be used in different ways by making multiple configurations files which refer to it.

For various media types, the following gives an example of some of the options a configuration file could allow to be specified. This same approach may be extended to other types of media file (3d models, animations, maps, etc. . . . ). Also there are other options that could be specified, including, but not limited to one or more of:

additional compression options to utilise other existing compression formats/algorithms (both lossy and lossless)

additional pre-processing/rendering options to utilise other existing image/sound processing/rendering algorithms.

Also some of these options may be platform dependent so it may be desirable to allow the configuration files to specify different options for different platforms (for example more compression may be desired when deploying the application to a mobile platform with less memory).

Image Configuration Files src—The image file this configuration file refers to.

alpha_threshold—Indicates a value from 0-255. Any pixel in the image with an alpha lower than this will be set to fully transparent. This can be useful to clean up noise in the background of the image.

alpha_background—If specified, then (after applying the alpha_threshold see above), this specifies a color which should be drawn under any partially transparent pixels in the image, such that they become fully opaque pixels. This results in an image with no partially transparent pixels which can therefore be compressed better, and/or takes less video memory.

format—indicates in what format the image will be stored on the graphics card in. (i.e. what color depth or texture compression to use). e.g. ˆ32 bit, ˆ16 bit, ˆdxt, ˆpvrtc, etc. . . .

border—When rendering an image with a modern graphics card sometimes the sampling algorithm used by the graphics card will try to read pixels just off the edge of the image. Therefore if placing the images in a texture atlas it is common to place a border around each image. This options allows control over how that border is generated, possible options include:

ˆtile The border is generated by copying pixels from the other side of the image. Useful for repeating/tiling images.

ˆsoft The border is set to fully transparent. This gives a soft edge.

ˆhard The border is generated by copying pixels from the same side of the image. This gives a hard/sharp edge.

Also it is useful to be able to optionally specify a different border generation method for each of the four sides of the image, for example: border=ˆsoft, ˆhard, ˆsoft, ˆsoft (which makes only the east border hard, assuming the borders are specified in north, east, south, west order)

subsection—Allows a rectangular subsection of the image to be specified, and only uses that subsection of the image. This can be useful to trim off unwanted parts of an image without having to modify the original image file. Also useful to allow a single image to be used with multiple different configuration files, each of which takes a different subsection of the image, hence slicing the image up into several smaller images.

dpi_factor—Indicates that the image is provided at a higher DPI than the standard DPI for the application. For example dpi_factor=3 would mean the image was provided at a 3× higher DPI. The renderer will then shrink the image accordingly when rendering, such that the image is rendered in proportion to the rest of the display.

dynamic_scale—When scaling an image to render it to the screen there are many different scaling algorithms which can be used. If the image is being drawn at a variety of different sizes then it may be best just to allow the graphics card to perform the scaling (and to generate mip maps to assist it in doing that), however if the image is normally only drawn at one particular size (and therefore only needs scaling once, to perform the pre_scale and/or to make the display fit the screen) it may be better to scale the image using a higher quality but slower scaling algorithm, before uploading it to the graphics card. To allow the client/compiler to decide which method is best for this image, this option can therefore be used to specify if the image is likely to be scaled using any magic=scale properties or not. If true then mip maps are generated for the image, if false then the image is instead scaled before uploading to the graphics card using a higher quality, but slower, scaling algorithm.

group—A string indicating which group this asset belongs to. Two assets with the same group string are considered to be in the same group. The client can use the group information to know which assets are likely to be required in combination, which can potential improve performance if used to keep those assets near each other in memory/video-memory (for example by placing them on the same texture sheet if building a texture atlas). It can also be used to assist the client's decision if it needs to page out some assets to save memory.

Wave Configuration Files src—The wave file this configuration file refers to.

markers—indicates a list of sample positions in the wave. The sound engine can be instructed to use these markers to know when best to switch to a different wave, or stop the wave. This is useful for example when the wave is a track of music and it should only be switched to a different track of music, or stopped, at an appropriate point (such as at the end of a bar or phrase).

loop_start—only applicable if the wave is played with looping, indicates the sample position at which the looping section of the wave starts.

loop_end—only applicable if the wave is played with looping, indicates the sample position at which the looping section of the wave ends. Can be set to ˆend to mean the exact end of the wave.

group—See description in image configuration files.

Font Configuration Files src—The font file this configuration file refers to.

character_set—A string indicating which glyphs of this font will be used by application, can either be a string, or a hard coded constant such as ˆascii, ˆcp1252, ˆletters, ˆnumbers, ˆcapitals, ˆnumbers_and_letters, etc. . . . ). This can be useful if the client or compiler wishes to pre-render the glyphs as it can use this to know in advance which ones are required.

group—See description in image configuration files.

Immutable Nodes

It is possible to save memory by introducing the concept of an 'imutable node'. An imutable node is a node which a) has only constant features (i.e. the slots, properties, and labels are all variability=constant), and b) all the descendants of that node are also immutable nodes).

Because nothing about the imutable node can change it is therefore possible to save memory by making it so that if multiple identical immutable node instances are required only one instance is actually created. All the places in the orchard which would refer to those identical immutable node instances, instead refer to that single instance.

This can also be used to save bandwidth as since nothing about the imutable node can change, its definition (including the details about all its features and descendants) can be stored in the dictionary, and hence when the write sync algorithm encounters a child which is an imutable node it can tell the client to refer to that dictionary entry, and does not need to recur into any of the features or descendants.

However there is a complication with this idea. Because only one instance of the imutable node exists, it is not possible for the node instance to contain a link to the parent node, (unless that parent node is also an imutable node), and therefore the _parent navigation cannot work on such a node.

One possible work around for this is to store the reference to the parent node in the reference object instead in this case. i.e. the reference object contains two pointers, one which points at the node being referenced, and one which indicates the parent of the most distance ancestor which is still an immutable node. This is easier to implement if there is a restriction that a reference to an imutable node can only be stored temporarily in a variable, but cannot be stored in a property (including disallowing it being stored inside a function capture, see The 'Types' section of this document). This means that the only way to get a reference to an immutable node will be to navigate down to it from a mutable node, and therefore the extra value which needs to be stored into the reference will always be available when the reference is created.

Having introduced the concept of imutable nodes it is possible to make even more savings by introducing the concept of 'immutable slots'. An immutable slot is slot which is variability=constant, and which only contains immutable nodes. Imutable slots can be stored in the immutable instance (see the 'Immutable Data' section) rather than in the main node class, hence saving even more memory and bandwidth.

Rendering 3d Scenes

The types and annotations listed in the appendices, and the render algorithm described in the 'Render Algorithm' section describe how to render a 2d scene from a tree.

It is also possible to use the same technique to make a tree which represents a 3d scene. In various examples the graphical displays depict a 3D scene. For example, one or more nodes of the graph represent 3D graphical primitives.

This is very similar to the algorithm already described, the primitives are instead just 3d primitives—such as a cube, sphere, plane, etc. . . . or more complex 3d shapes such as a model created in a 3d modelling package (for example a model represented by a triangle mesh loaded from an external file).

The magic properties which control those new primitives are also chosen accordingly. For example the sphere primitive could have magic properties indicating the radius, and color, or the model primitive could have magic properties which specify which animation to apply to the models skeleton.

The transformation matrix when rendering in 3d is a 4×4 homogeneous matrix because it now needs to transform 3d coordinates rather than 2d coordinates.

New types corresponding to these additional features are similar to the types already described. For example: types representing 3d points and vectors, a type to represent a 4×4 transform matrix, a type to represent model data loaded from an external file (similar to the existing image type which loads 2d image data from an external file), a type to represent animation data loaded from an external file, which could then be applied to a model to animate it, etc. . . .

The separate z sorting algorithm described in the 'Z Sorting' section may not be required when rendering in 3d, because if the calculation is being done in 3d there is already a z coordinate, and the sorting will typically be done by the graphics card's z buffer instead.

In some examples primitives which trigger a transition between 2d rendering and 3d rendering are used. For example the renderer could start off rendering in 2d mode, until it encounters a viewing frustum primitive, which sets up the viewing frustum, and then that causes the renderer to render the descendants of that node using the 3d rendering algorithm. Likewise a 3d primitive could be provided for transitioning back into 2d (which renders all the descendants using the 2d rendering algorithm, and then the 3d renderer texture maps the resulting image onto that 3d primitive).

Types

Types of Value

This section lists the various types of value that can be stored in a property or variable.

For each type this appendix gives:

A description of the type.

How the type itself is written (for example: for use with the type=annotation).

How a literal value of that type is written.

It also provides non-exhaustive examples of some of the expressions which can be used in conjunction with some of the types.

Array

A value of type array is a container value which can contain multiple other values. Hence allowing multiple values to be combined together into a single value which can then be stored in a single property. The values the array contains are called 'elements'.

There are many different array types. Which array type is used determines what types of elements the array can contain.

An array type is written in the form:

array(element_type)

where element_type is another type, and indicates what types of element the array can store, for example: array (integer) or array(string) or array(any).

A literal value of type array is written in the form:

_array(expression, expression, expression, etc. . . . )

where each expression gives a value to place in the array, and one or more expressions may be specified. for example: _array (67,65,66,66,65,71,69).

Each element stored in the array is given an integer index counting upwards from 0. I.e. the first element stored in the array is at index 0, the second element is at index 1, and so on.

Retrieving an element from an array is achieved by writing an array access expression which is of the form:

array[index]

where array is an expression of type array, and index is an expression of type integer indicating which element in the array to retrieve. If the index is less than 0 or >=the number of elements in the array an error is generated.

In examples an array cannot be modified after it has been created. It is therefore normally created by either using an array literal to list all the contents at once, or if the contents need to be determined dynamically (for example by a loop), it can be created by first adding each of the values to a stack (see below), and then converting that stack into an array. If a property contains an array whose contents need to be changed that can be achieved by replacing the value of the property with an entirely new array which has the new contents which are desired.

In examples an array cannot have holes, i.e. there cannot be indexes which do not contain a value.

There are various other expressions which can be used with an array value, for example to retrieve the length of the array.

An array value, should not be confused with an array slot, despite the similar names they are not the same thing. An array value allows multiple values to be stored in a single property, whereas an array slot allows multiple nodes to be stored in a slot. Also whilst the contents of an array value cannot be modified after it is created, the contents of an array slot can.

Auto_Const

There are many different auto_const types. The defining feature of an auto_const type, is that for each auto_const type, there is only a single value of that type.

An auto_const type is written in the form:
^name

Where 'name' is an identifier.

For example: ^enabled.

A literal value of type auto_const, is written the same way as it's type. For instance for the example above there is only one value of type ^enabled, that value is itself also written as ^enabled. (The compiler can determine if ^enabled is a type or a value from the context in which it is written).

This is useful in conjunction with type sets (see composite types section below), as it allows for properties, functions etc. . . . which accept a specific set of auto_consts in a way which can be checked at compile time.

For example it is possible to make a property with the type annotation:
type=[^up, ^down].

This property can then store values of type ^up, or values of type ^down, and because this is restriction is specified by restricting which types the property can store (as opposed to which values it can store), the Type Resolver (see the 'Type Resolver' section) can check at compile time that no other auto_const is placed in the property.

Boolean

There are two different values of type boolean. These are true and false.

The boolean type is written as:
boolean

A literal value of type boolean is written simply as either true or false.

Values of type boolean are used in many places, but are especially useful in conjunction with the flow control constructs typical to many procedural programming languages, including:

A comparison expression gives a value of type boolean to indicate the result of the comparison.

An if statement is followed by a value of type boolean to indicate which block of code should be executed.

A while statement is followed by a value of type boolean to indicate if the body of the loop should be executed again or not.

etc. . . .

Bounds

A value of type bounds represents a 2-dimensional parallelogram.

The bounds type is written as:
Bounds

A literal value of type bounds is written in the form:
_bounds (x1,y1, x2,y2, x3,y4).

Where each of x1, y1, x2 etc. . . . is an expression of type float.

x1,y1 is the coordinate of the first corner, x2,y2 is the coordinate of the second corner, and x3,y3 is the coordinate of the third corner.

The coordinate of the fourth corner does need to be specified, as this is a parallelogram it can be calculated as:
x4=x2+x3−x1
y4=y2+y3−y1

This type is useful as it can be used to represent the result of applying an arbitrary transform (see below), to a box (see below).

There are various expressions which can be used with a bounds value, for example (assuming b is an expression which gives a value of type bounds):

b._x1—retrieves the x1 value which was specified when b was created.

similar expressions for y1, x2, y2, etc. . . .

b._contains_point (point)—indicates if the specified point is inside the parallelogram b or not.

b._aabb—gives the smallest axis-aligned bounding box which fully contains b.

etc. . . .

Box

A value of type box represents a 2-dimensional rectangle.

The box type is written as:
box

A literal value of type box is written in the form:
_abs_box(x1,y1,x2,y2).

Where each of x1,y1,x2,y2 is an expression of type float.

x1,y1 is the coordinate of the first corner, and x2,y2 is the coordinate of the second corner.

For convenience, it is also possible to write a literal value of type box in the form:
_box(x1,y1,width,height)

Where each of x1,y1,width, height is a value of type float.

x1,y1 is the coordinate of the top left corner of the box, and width, height indicates the size of the box.

This creates the same values as the first literal, it just calculates x2 as x1+width, and y2 as y1+width.

There are various expressions which can be used with a box value, for example (assuming b is an expression which gives a value of type box):

b._x1—retrieves the x1 value which was specified when b was created. similar expressions for y1, x2,y2,width, and height.

b._contains_point(point)—indicates if the specified point is inside the box b or not.

b._insersect (b2)—gives the box which is the intersection of box b and box b2 etc. . . .

Color

A value of type color represents a color with an alpha channel, red channel, green channel, and blue channel.

The color type is written as:
color

A literal value of type color can be written in a number of formats, either.
_color(a,r,g,b)

where each of a,r,g,b is an expression of type integer. The value of each of these expressions is clamped to the range 0 (minimum intensity/full transparent) to 255 (maximum intensity/fully opaque).

or
_color(#aarrggbb)

where each of aa, rr, gg, bb is an integer written in hexadecimal in the range 00 (minimum intensity) to ff (maximum intensity).
or
_color(#rrggbb)
same as above except as is implicitly ff
or
_color(#argb)
where each of a, r, g, b is an integer written in hexadecimal in the range 0 (minimum intensity) to f (maximum intensity).
or
_color(#rgb)
same as above except a is implicitly f
or
_color(color_name)
where color_name, is one of the predefined colours: white, red, green, blue, yellow, cyan, magenta, black or none For example each of the following represents the color red, with full opacity:
_color(1.0, 1.0, 0.0, 0.0)
_color(#ffff0000)
_color(#ff0000)
_color(#ff00)
_color(#f00)
_color(red)

There are various expressions which can be used with a color value, for example (assuming c is an expression which gives a value of type color):
- c._r—retrieves the intensity of the red channel (in the range 0 to 255).
- c._g—retrieves the intensity of the green channel (in the range 0 to 255).
- c._b—retrieves the intensity of the blue channel (in the range 0 to 255).
- c._a—retrieves the opacity of the alpha channel (in the range 0 to 255).

Float
A value of type float stores a 32-bit floating point number. The float type is written as:
float
A literal value of type float is written in the form:
0.0
or 0.0e+0
or 0.0e−0
where '0' can be any decimal number. The float can also be prefixed with a—to specify a negative number.
For example:
5.0, or 37.34, or 95.35e+3 or −3.6
it can also be written in a hexadecimal form:
0x0.0p+0
0x0.0p−0
For example:
0x2.3p+1B or −0x3F.6Ap+0
Of course as with many programming languages the usual range of arithmetic operations can be performed with float values (e.g. they can be added together, subtracted, multiplied, etc. . . . )

Font
A value of type font contains font data (the exact format the data is stored in depends on what works best for the hardware, for example it could be stored in ttf format, or it could be stored as pre-rendered glyphs), along with the metrics of the font (i.e. the ascent of the font, the descent of the font, how much to advance after letter, the line spacing, etc. . . . )

The font type is written as:
font
A literal value of type font as written in the form:
_font (filename)
where filename is the path+filename of the file which contains the desired font data. (or an alias to that path+filename, see path_alias annotation in the 'Annotations' section of this document).

There are various expressions which can be used with a font value, to retrieve the metrics Function
A value of type function contains function code which can be used to control how the application behaves. See also the 'Function Code' section and 'Code generation' section.

There are many different function types, as the function type includes the types of the function parameters, the type of value that it returns (if any), and the function modifiers. The type does not however include the function body, or the captures (for a description of captures see below).

Function Type
A function type is written in the form:
function[function modifiers](parameter types)(return type)
The [function modifers] is a comma separated list of function modifiers, if a function modifier is not specified the default value is used, if no function modifiers are specified this section can be omitted entirely. Possible function modifiers include:
- mobile—indicates that this is a mobile function (if implementing the feature described in the 'mobile/immobile functions' section)
- !mobile—indicates that this is an immobile function (default) (if implementing the feature described in the 'mobile/immobile functions' section)
- secret—indicates that the function should be kept secret from the client. Secret functions can only be stored in secret properties. (see the 'feature visibility' section)
- !secret—indicates that the function should not be kept secret from the client. (default)
- active—indicate that the function can depend on dynamic values other than its input, and can make modifications.
- dynamic—indicates that the function can depend on dynamic values other than its input, but still cannot make modifications.
- constant—indicates that the function can only depends on its input, and constant values, and cannot make modifications. (i.e. it is a pure function) (default)
- terminal—allows the function to use the end statement instead of the return statement. The end statement finishes all processing of the current event handler/interval event without passing control back to the calling function. One possible way to implement this is to internally code generate the end statement as a return, and then make the compiler enforce that any code which invokes a terminal function: a) immediately follows that invocation with an end statement, and b) is a terminal function itself. A function which is terminal may not specify a return type (as it does not return!).
- !terminal—allows the function to use the return statement instead of the end statement. The return statement passes control back to the calling function, and can also optionally return a result, as in other programming languages (default)
- subjective—allows the function to use features which depend on the current client. For example: accessing/ modifying client_dynamic properties, querying which nodes the client's mouse cursor is pointing at, using the _user_file_save and _user_file_load features, and invoking other subjective functions.

The parameter types is a comma separated list indicating the type of each parameter the function receives. If the function receives no parameters this is an empty set of brackets.

The return type indicates the type of value the function returns. If the function does not return a value this an empty set of brackets.

Examples:

function[constant](integer,integer) (integer)

Is the type of a function which cannot make any modifications, and which receives 2 integer values as parameters, and returns 1 integer value as the result.

function[active]( )( )

Is the type of a function, which can make modifications, which receives no parameters, and which returns no result.

Function Literal

A literal value of type function is written in the form:

```
1.    function[function modifiers](parameters)(return type) {
2.        function code
3.    }
```

The function modifiers are written in the same way as in a function type (see above).

The parameters are written in a similar way as in a function type (see above), except for each parameter the function also provides the name of the variable to place that parameter into, and in this example may also indicate if that variable is read only (indicated by prefixing with val), or is read/write (indicated by prefixing with var). Each parameter is therefore written in the form:

var/val variable_name type.

If there are no parameters and the return type can be inferred (see below) the (parameters) section can be omitted.

The return type is written the same way as in a function type (see above), however it can often be omitted if the compiler can infer the return type of the function (from the types of value used with the return statements).

The function code provides the body of the function. For a description of function code see the 'Function Code' section Example:

```
function[constant](val integer a, val integer b) {
    return a+b
}
```

Defines a function with receives two integer parameters, adds them together and return the result. In this example the return type has been omitted because it is possible for the compiler to infer that this function always returns an integer.

The type of this function is: function [constant](integer, integer) (integer).

Another example:

```
function {
    _self.count++
}
```

Defines a function with receives no parameters, and returns no result. This function modifies the _self node, (it increments the property called count on the _self node by 1).

The type of this function is: function( ) ( ).

Captures

As well as receiving inputs via its parameters, a function may also 'capture' constant values which are available at the time the function is defined.

The easiest way to describe this is with an example:

```
function {
    val a=5
    val inner = function {
        return a+3
    }
    return inner( )
}
```

The example function above contains another function inside itself. A function which is defined inside another function is called an 'inner function'. In the example above, the inner function is placed in a read only variable called inner.

Whilst calculating its result, the inner function uses the variable a. That variable is defined in the outer function, and the inner function does not receives it as an argument. However the inner function it still allowed to access a because it 'captures' it.

An inner function can use any read only variable (i.e. one defined with val). which is available at the time the inner function is defined. To make this work the value in each read only variable which is used in this way is copied into a field on the inner function object at the time the inner function is defined. (this copying is called 'capturing'). This way the inner function can use that captured value when it needs to. Because it has its own copy of the captured value which is stored when it is defined, it can also can carry on using that value even if the inner function is moved to no longer be inside the outer function. I.e. in the example above the inner function defined by that outer function, will always return the result 8 even if is moved elsewhere in the orchard.

The values which a function captures do not form part of its type. However they do form part of the function's value, so if two function values are compared with a value comparison expression (i.e. the ==expression) they will only be considered equal if they have the same captures.

In the 'Function Code' section Node access it was described how the _self expression gives a reference to the node which the function was defined in, and the _body expression gives a reference to the body node in the .prototype file which the function was defined in. This is implemented by using the captures feature. Every function which uses _self or _body implicitly captures and stores those references at the time the function is defined. This is how _self will always give the node the function was originally defined in, not the node it is currently in. (note: all functions can capture these references, not just inner functions). The 'Mobile/immobile Functions' section then describes an optimisation which can be used to avoid capturing these references some of the time.

Image

A value of type image contains image data (the exact format the data is stored in depends on what works best for the hardware, for example it could be stored as a 2d bitmap of the image, with values indicating the color of each pixel), along with the metrics of the image (i.e. it's width and height)

The image type is written as:

image

A literal value of type image as written in the form:

_image(filename)

where filename is the path+filename of the file which contains the desired image data. (or an alias to that path+filename, see path_alias annotation in the 'Annotations' section of this document).

There are various expressions which can be used with an image value, to retrieve the metrics, for example (assuming i is an expression which gives a value of type image):

i._width—retrieves the width of the image i.

i._height—retrieves the height of the image i.

Integer

A value of type integer stores a 32-bit signed integer number.

The integer type is written as:

integer

A literal value of type integer is written as a sequence of digits, and can be written in either decimal or hexadecimal. It can be preceded with a—to specify a negative integer.

For example: 35 or –77 or 0x1337 or –0x10

Of course as with many programming languages the usual range of arithmetic operations can be performed with integer values (e.g. they can be added together, subtracted, multiplied, etc. ...)

Interval

A value of type interval is a container value which combines a value of type function( ) ( ), and a value of type time.

A value of type interval is typically placed in a property with the magic=interval annotation to define an interval event. See the 'Internal Events' section for a more detailed discussion of interval events.

The interval type is written as:

interval[function modifiers]

A literal value of type interval is written in the form:

_interval(time, function).

Where:

time is an expression of type time function is an expression of type function, which takes no arguments, and returns no value.

As with other values which contain multiple values, there are various expressions which can be used with an interval value, to retrieve the individual values it contains.

The [function modifiers] are specified in the same way as the function modifiers for a function. In this case they indicate the type of function that the interval can contain. For example they indicate if the interval can contain a secret function or not, or if it can contain a subjective function or not. (an interval in a client_dynamic property may contain a subjective function).

Key

A value of type key represents an individual key on a computer keyboard.

Values of this type are passed to functions in the on_key_down and on_key_up event handlers to indicate which key was pressed or released.

The key type is written as:

key

A literal value of type key is written in the form:

_key(KEY_NAME)

where KEY_NAME is the name of the key.

for example: _key(W) or _key(F1) or _key(NUMPAD_3)

Long

A value of type long stores a 64-bit signed integer number.

The long type is written as:

long

A literal value of type long is written as a sequence of digits followed by the suffix l or L, and can be written in either decimal or hexadecimal. It can be preceded with a—to specify a negative integer.

For example: 35l or –77l or 0x1337l or –0x10l

Of course as with many programming languages the usual range of arithmetic operations can be performed with long values (e.g. they can be added together, subtracted, multiplied, etc. ...)

Mouse_Event

A value of type mouse_event is a container value which combines a value of type point and a value of type integer.

Values of this type are passed to the functions in some of the mouse event handlers to indicate the position of the mouse on the display, at the time the event was generated (and where applicable the number of times the button was clicked, or how many notches the scroll wheel was rotated).

The mouse_event type is written as:

mouse_event

In examples literal values of type mouse_event cannot be written, values of this type are only created by the system to pass to the functions in the appropriate event handler functions.

As with other values which contain multiple values, there are various expressions which can be used with a mouse_event value, to retrieve the individual values it contains.

Mouse Over Event

A value of type mouse_event is a container value which combines a value of type point, a value of type integer, and an array of values of type transform.

This type of value is passed to the functions in the mouse over input event handler properties. The functions are only invoked if the mouse is over the node containing the event handler at the time of the event.

This type is very similar to the mouse_event type, except it also indicates the screen space transform (see the 'Transformation Matrix' section) which was calculated when determining that the mouse is over the containing node. This is useful because it can be used in conjunction with the point to determine the position of the mouse relative to the node at the time of the mouse event, as opposed to just the absolute position of the mouse on the display. (i.e. it can be used to determine the exact point on the node which was clicked).

Because it is theoretically possible for a single node to be rendered to the screen more than once (i.e. through the use of viewports—see the 'Viewport' section) it is possible for the mouse to be over a single node more than once. Therefore there could be multiple different screen space transforms for a single mouse over event, so this is actually an array of transforms. (although under normal circumstances there will only be one entry.)

The mouse_over_event type is written as:

mouse_over_event

In this implementation literal values of type mouse_over_event cannot be written, values of this type are only created by the system to pass to functions in the appropriate event handlers.

As with other values which contain multiple values, there are various expressions which can be used with a mouse_over_event value, to retrieve the individual values it contains.

It is also helpful to provide convenience expressions, for example:

mouse_over_event._local_position—retrieves the position of the mouse relative the node which triggered this event. i.e. takes the first transform stored in the mouse_over_event, inverts it, and applies it to the point stored in the mouse_over_ event, and then returns the result as a point. If there is more than one transform only the first one is used.

mouse_over_event._local_positions—as above, except instead of returning a single point it returns an array of points. I.e. it uses all the transforms stored in the mouse_over_event, and hence can produce multiple results.

Point

A value of type point represents a two-dimensional coordinate in space.

The point type is written as:

point

A literal value of type point is written in the form:

_point(x,y).

Where x and y are both expressions of type float.

As with other values which contain multiple values, there are expressions which can be used with a point value, to retrieve the individual values it contains (in this case to retrieve the x and y values).

Range

A value of type range represents a range of integer values.

The range type is written as:

range

A literal value of type range is written in the form:

start to end step x

Where start, end, and x are each expressions of type integer.

The 'step x', portion can be omitted in which case it is implicitly 'step 1'.

The start and end indicate where the range starts and ends (inclusive).

The step may be a positive integer, and providing a value greater than 1 causes some of the integers between the start and end to be skipped by the range. Note: if the step is set to a value greater than 1 it can cause the range to not actually include the end value (see examples below).

For example:

1 to 5—represents the range 1,2,3,4,5

1 to 10 step 2—represents the range 1,3,5,7,9

10 to 1 step 2—represents the range 10,8,6,4, 2

−25 to 25 step 5—represents the range −25,−20,−15,−1, −5,0,5,10,15,20,25

This range can then be iterated across using a loop statement, or a random integer from the range can be selected using a _random or _secret_random expression (see the 'Function Code' section random and secret_random).

There are various expressions which can be used with a range value, for example (assuming r is an expression which gives a value of type range):

r._start—retrieves the integer which gives the start of the range.

r._end retrieves the integer which gives the end of the range.

r._step—retrieves the integer which gives the step of the range.

Reference

A value of type reference contains a pointer to a single node instance.

There are many different reference types, as the type of the reference includes the node class of the node which the reference can point to.

A reference type is written in the form:

reference(node_class)

Where node_class indicates the node class of the node which the reference can point to, and can be any of the following:

any—the reference can point to any node. Every node class is considered to a sub class of any.

prototype_filename—the reference can point to any node instance which was created by the body command of the specified prototype file, OR any node which extends the specified prototype (see the 'Class Resolver' section—i.e. which used the add_prototype to add the specified prototype)—where prototype_filename is the path and filename of a prototype file, or a path_alias to such a path and filename.

prototype_filename#slot_path—the reference can point to any node which could be placed in the specified slot of the specified prototype. (i.e. a node which the slot class of that slot allows)—where #slot_path is a path from the body node down to the specified slot, where the name of each slot to descend into is separated by dots, see examples below.

For example, for the example application given in the 'Build Code' section, the following is a selection of the reference types which could be used:

reference(any)—a reference which can point to any node reference(sprite)—a reference which can point to any sprite node (i.e. any node which has add_prototype sprite)

reference(client_tree#cabbages)—a reference which can point to any node which could be placed in the cabbages slot in the client_tree prototype.

reference(client_tree#cabbages. sprite)—a reference which can point to any node which could be placed in the sprite slot inside the cabbage slot in the client_tree prototype. Note: in this particular example this is the same as reference(sprite) because the slot class of that particular slot is inferred to just be sprite.

Literal values of type reference cannot be written. references are instead obtained by using a node access expression, (see the 'Function Code' section Node access)

If the node which a reference points to is deleted (see the 'Function Code' section Deleting disconnected nodes) then the reference will become broken. (In this implementation the fact that there is still a reference pointing at the node will not prevent the node being deleted if it is no longer connected to a tree at the end of an event. This makes the garbage collection much simpler to implement.) A reference in this state is referred to as a deleted reference.

Attempting to use a deleted reference in most contexts will result in a runtime error. For example trying to use a property access expression with the deleted reference, cannot work as the node to read the property from no longer exists. However a deleted reference can still be compared with other values using the value comparison expression ==. (i.e. it is still possible to determine if two deleted references both used to point at the same node), and the type of the deleted reference value can still be checked (i.e. using a type check expression). It is also useful to provide an expression which can be used to check if a reference is a deleted reference, which potentially allows the application to handle that case gracefully and avoid runtime errors.

One way to implement reference values is to make the implementation store the value as the node id of the target node. This can then be used in conjunction with a map which indexes each node by its node id (for example see description of node_map in the 'Read sync Algorithm' section) to find the node. If the node is not in the map then the reference is a deleted reference. This way the reference can still be compared using the value comparison expression == even if the node is deleted, as that expression can just compare node ids without using the map.

Another way to implement reference values if compiling to a language like Java, is to use a Java WeakReference instance to store the pointer to the target node, (or to use a similar intermediate object which can be disconnected when the node is deleted), as this way the reference will not incorrectly prevent the Java garbage collector from being able to collect the target node, if the target node is only kept alive by reference values.

The reference value should also store a copy of the node class of the target node, so that this information is still available (for example for use with a type check expression), even if the target node is deleted.

Wave

This type is applicable if implementing the idea described in the 'Sound' section.

A value of type wave contains sound data (the exact format the data is stored in depends on what works best for the hardware, for example it could be stored as PCM wave data, or in a compressed format such as ogg vorbis), along with the metrics of the wave if it is desired that those metrics can be queried (for example the wave's length)

The wave type is written as:

wave

A literal value of type wave as written in the form:

_wave(filename)

where filename is the path+filename of the file which contains the desired sound data. (or an alias to that path+filename, see path_alias annotation in the 'Annotations' section of this document).

If separate metrics have been stored in the wave value, then expressions should be added which can be used with a wave value, to retrieve those metrics.

Stack

A value of type stack is a container value which can contain multiple other values. Hence allowing multiple values to be combined together into a single value which can then be stored in a single property.

There are many different stack types. Which stack type is used determines what types of value the stack can contain.

A stack type is written in the form:

stack(value_type)

where value_type is another type, and indicates what types of value the stack can store, for example: stack(integer) or stack(string) or stack(any).

The only literal value of type stack is an empty stack, which is written as:

_empty_stack

More complex stack values are normally made by starting from the _empty_stack, and then repeatedly pre-pending each of the desired items. (see below).

Items can only be added or removed from the start of a stack value. To add an item to the start of the stack the binary operator ++ is used. The left hand side of the operator specifies the item to add to the stack, and the right hand side of the operator specifies an existing stack value. The existing stack value is not modified, but instead a new stack value is returned, which contains the additional item prepended to the start.

For example:

1++2++3++_empty_stack

Gives a stack value, which contains the sequence 1,2,3.

Technical note: The ++ operator is right associative. Therefore the above example is interpreted as:

1++(2++(3++_empty_stack))

i.e. it first prepends 3 onto the empty_stack, then it prepends 2 onto the resulting stack, then finally it prepends 1 onto that stack, to give the final stack.

There are various expressions which can be used with a stack value, for example (assuming s is an expression which gives a value of type stack):

s._head—Gives the first item in the stack, or errors if the stack is the _empty_stack.

s._tail—Gives the remainder of the stack with the first item removed, or errors if the stack is the _empty_stack.

s._reverse—Creates a new stack which is a copy of the specified stack but with the values stored in the reverse order.

s._is_empty—Gives true if the stack is the _empty_stack or false otherwise.

s._to_array—Creates an array value, where the length of the array is the same as the number of values in the stack, and the values in the stack are placed into the array in order. i.e. the head of the stack is placed at array index [0].

s._reverse_to_array—Equivalent to s._reverse._to_array, but can be implemented more efficiently.

s._length—Gives the length of the stack (0 in the case of an _empty_stack).

s._jumble—Randomly reorders the stack, using predictable random numbers.

s._secret_jumble—Randomly reorders the stack, using unpredictable random numbers.

Implementation note: a stack value is never modified after it has been created. Prepending a new value to the stack creates a new stack object, which simply has a 1st field for the additional value, and a 2nd field for the old stack, (which is stored unmodified). Retrieving the head of the stack therefore just gives the value from the 1st field, whereas retrieving the tail of a stack just gives back that old stack from the 2nd field. For efficiency it is helpful for the stack object to also store a 3rd field which contains the total length of the stack, such that it can be returned without having to iterate into the tail repeatedly.

String

A value of type string stores a string of characters. These characters can be stored in a variety of formats/character sets, for example as unicode characters.

The string type is written as:

string

A literal value of type string is written as a sequence of characters enclosed in double quotes. As with other programming languages unusual characters can be inserted into the string using an escape sequence.

Examples of string literals include

"Hello World!"

"Cabbage"

"First line\nSecond line"

Examples of escape sequences include:

\n

\"

\u2202

\\

Strings can be appended together using the binary operator

+ for example:

"This"+"is"+"just"+"like"+"other"+"languages."

String values are immutable, any operation which would change a string instead returns a new string, and leaves the original string unmodified.

There are various expressions which can be used with a string value, for example (assuming s is an expression which gives a value of type string):

s._length—gives the length of the string (i.e. the number of characters it contains).

s._substring(start_index,end_index)—gives a new string which is a subsection of the specified string.

There are also various expression which operate on a string in conjunction with a value of type font to indicate the metrics of the string, when rendering in that font, for example:

s._render_width(font, point_size, letter_spacing)—Indicates the minimum allowed primitive_width of a primitive which renders this string onto a single line, using the specified font at the specified point_size, with the specified letter_spacing.

Time

A value of type time stores a time.

In this implementation times are measured in 600th of a second since 1 Jan. 1970, (and are internally stored as a 64-bit signed integers).

The time type is written as:

time

In this implementation literal values of type time cannot be written. However the expression _event_time can be used to retrieve the time value which represents the current time (i.e. the time at which the expression was run).

It is possible to add/subtract a long to/from a time to get a new time. In this implementation the given long should be in 600ths of a second.

For example (assuming t is an expression of type time):

t+1—gives a new time which is 1/600th of a second ahead of t.

t+600—gives a new time which is 1 second ahead of t.

t−600—gives a new time which is 1 second behind t.

It is also possible to subtract one time from another time to get the difference between the two times. The result is given as a value of type long and is measured in 600ths of a second.

Transform

A value of type transform stores a 3×3 homogenous transformation matrix which can be used to transform a 2-dimensional point, vector, box, or bounds The transform type is written as:

transform

There are several ways of writing a literal value of type transform:

_translate(x,y) gives the transform:

$$\begin{bmatrix} 1 & 0 & x \\ 0 & 1 & y \\ 0 & 0 & 1 \end{bmatrix}$$

_scale(x,y) gives the transform:

$$\begin{bmatrix} x & 0 & 0 \\ 0 & y & 0 \\ 0 & 0 & 1 \end{bmatrix}$$

_rotate(angle) gives the transform:

$$\begin{bmatrix} \cos(\text{angle}) & -\sin(\text{angle}) & 0 \\ \sin(\text{angle}) & \cos(\text{angle}) & 0 \\ 0 & 0 & 1 \end{bmatrix}$$

_skew_x(x) gives the transform:

$$\begin{bmatrix} 1 & x & 0 \\ 0 & 1 & 0 \\ 0 & 0 & 1 \end{bmatrix}$$

_skew_y(y) gives the transform:

$$\begin{bmatrix} 1 & 0 & 0 \\ y & 1 & 0 \\ 0 & 0 & 1 \end{bmatrix}$$

Two values of type transform can be combined together by using the binary operator **. The transforms are combined using matrix multiplication. This way a single transform which performs multiple manipulations can be produced:

For example:

_rotate(90.0)  _scale(2.0, 2.0)  translate(50.0, 0.0)

Creates a single transform value, which: first rotates 90 degrees, then doubles the size on both axis, and then translates 50 units to the right.

A transform can be applied to a value of type point using the binary operator **, which transforms the point, and gives the result as a new value of type point.

e.g.

new_point=point ** transform

This is implemented by creating a 1×3 matrix from the point as follows:

$$\begin{bmatrix} \text{point}\_x \\ \text{point}\_y \\ 1 \end{bmatrix}$$

then multiplying that by the 3×3 transform matrix, and then taking the x,y values from the resulting matrix to create the new point A transform can also be applied to a value of type vector using the binary operator **, which gives a new value of type vector.

This is implemented the same way as for point, except the 1×3 matrix which is created from the vector is as follows:

$$\begin{bmatrix} \text{vector}\_x \\ \text{vector}\_y \\ 0 \end{bmatrix}$$

A transform can also be applied to a value of type box, which gives a new value of type bounds. This is implemented by transforming each corner of the box as if it were a point. The resulting shape is not necessarily a box anymore, but is bound to be a parallelogram, so the result is given as a bounds.

A transform can also be applied to a value of type bounds, which gives a new value of type bounds. This is implemented by transforming each corner of the bounds as if it were a point. The resulting shape is still representable as a value of type bounds.

A transform can be inverted by using the expression: transform._invert. This gives a new value of type transform which when applied will undo the specified transform. (i.e. a transform where the matrix is the inverse of the specified transform's matrix).

In this implementation attempting to create a transform which cannot be inverted immediately gives an error (even if the transform is never inverted). So for example executing _scale (0.0, 0.0) immediately gives an error as it creates a non invertable transform.

Vector

A value of type vector represents a two-dimensional vector. The vector type is written as:

vector

A literal value of type vector is written in the form:

_vector(x,y).

Where x and y are both expressions of type float.

As with other values which contain multiple values, there are expressions which can be used with a vector value, to retrieve the individual values it contains (in this case to retrieve the x and y values).

A value of type vector can be added to a value of type point, (using the + binary operator), to create a new value of type point.

Two values of type point can be subtracted from each other, (using the − binary operator), to create a new value of type vector.

Composite Types

In places where a type can be written to specify which type is allowed, as well as being able to specified one of the individual types described above, it is also optionally possible to support a composite type which can be used to allow more than one type of value. For example these can be used with the type=annotation to create a property which can store more than one type of value, or they can be used when defining a variable to create a variable which can store more than one type of value, etc. . . .

Of course this means that when reading that property or variable the resulting type of the access expression will also be that composite type, so a type cast will often then be needed to be able to utilise the value.

Any Autoconst

The type any_autoconst can be used to create a property, variable, etc. . . . which can store any type of auto_const value.

Any_Index

The type any_index can be used to create a property, variable, etc. . . . which can store any type of value which can be used as the index to a map slot.

Type_Set

A type_set can be used to create a property, variable, etc. . . . which allows values of a specific set of types.

A type_set is written in the form:

[type, type, . . . ]

where one or more types may be specified.

For example:

A property with the annotation:

type=[string, integer]

could store a value of type string, or a value of type integer, but could not store other types of value A property with the annotation:

type=[^red, ^green, ^blue]

could store a value of type ^red, or a value of type ^green, or a value of type ^blue, but could not store other types of value.

Annotations

This section lists the annotations used by the design as specified in the 'Background,' 'The Orchard,' 'Framework Algorithms,' and 'Language and Compiler' sections of this document. Additional annotations which go with additional features are then listed along with those features in the 'Additional Features' section of the document.

Magic Property Annotation

A property can be given the 'magic' annotation to indicate what the value stored in that property represents/controls, and therefore causes that property to affect the behavior of the framework algorithms.

The magic annotation can only be specified on a create_property command. (It cannot be added to a property later with the patch_property command.)

The value stored in a magic property (and hence the behavior it controls) can be changed dynamically whilst the program is running. It also possibly to cause different behavior on different clients by making the property variability=client_dynamic. (see description of property variability annotation below). For example a node can be made secret to a subset of the clients by making a property with both the magic=secret annotation and the variability= client_dynamic annotation.

The following magic annotations are available:

Magic=Secret

This indicates that the value in the property controls if the containing node (and all its descendants) should be kept secret from the clients or not. This allows portions of the application's state to be hidden from clients who do not need to know about that state (which helps with performance), or who should not know about that state for security reasons (for example the cards in another player's hand to prevent cheating). If there are multiple properties with the magic=secret annotation on the same node, then the node is considered secret to a specific client if ANY of those properties indicates it should be secret to that client. A node which is secret is implicitly also hidden.

Magic=Hidden

If a node is hidden then it (and all its descendants) is not further considered by the render algorithm or the mouse over input event algorithm. However being hidden will not prevent the node and its descendants from being transmitted to the client so that data can still be used for prediction. If there are multiple properties with the magic=hidden annotation on the same node, then the node is considered hidden to a specific client if ANY of those properties indicates it should be hidden on that client.

Magic=z

A property with this annotation can be used to control what order the renderer renders the nodes in (and hence which one will appear in front). If there are multiple properties with the magic=z annotation on the same node, then the z offset for that node is calculated by summing all those properties together (see the 'Z-sorting' section).

Magic=Translate

A property with this annotation can be used to control the transformation matrix used by the renderer. If there are multiple properties with this annotation, then they will each be applied to the transformation matrix (see the 'Transformation Matrix' section).

Magic=Rotate

A property with this annotation can be used to control the transformation matrix used by the renderer. If there are multiple properties with this annotation, then they will each be applied to the transformation matrix (see the 'Transformation Matrix' section).

Magic=Scale

A property with this annotation can be used to control the transformation matrix used by the renderer. If there are multiple properties with this annotation, then they will each be applied to the transformation matrix (see the 'Transformation Matrix' section).

Magic=Move Pivot

A property with this annotation can be used to control the transformation matrix used by the renderer. If there are multiple properties with this annotation, then they will each be applied to the transformation matrix (see the 'Transformation Matrix' section).

Magic=Interval

A property with this annotation can be used to define an interval event which will run after a period of time (see the 'Internal Events' section). A single node can contain multiple interval properties.

Magic=Viewport

A property with this annotation can be used to define a viewport, which causes the renderer to recur into another section of the tree, or into another tree entirely (see the 'Viewport' section).

Primitive Magic Properties

There are variety of magic properties which can be used to make a node represent a primitive which will then be rendered to the screen (or an invisible primitive which can be clicked on by the mouse)

First which primitive the node represents should be set by setting the magic=primitive_type property.

In this implementation only one of these properties can exist per node, as a single node cannot represent more than one type of primitive.

Depending what value the magic=primitive_type property is set to, additional magic properties may be specified to configure that primitive. The implementation may require that these additional magic properties are specified in the same block of node commands which created the magic=primitive_type property, and only one of each of these magic properties is specified per node.

For the primitives types listed below (except ˆnone of course), a magic=primitive_width and a magic=primitive_height property may also be specified to indicate the size of the primitive. (this indicates the size prior to the application of the transformation matrix). Where the primitive_type may also require further supporting properties those are listed below.

The magic=primitive_type property can be set to the following values:

ˆnone

The node does not represents a primitive.

ˆsolid_rectangle

The node represents a solid rectangle.

Also specify:

magic=primitive_color—to indicate the color of the rectangle.

ˆoutline_rectangle

The node represents an outline rectangle.

Also specify:

magic=primitive_color—to indicate the color of the rectangle.

ˆtext

The node represents a block of text, which is wrapped to fit within the width/height of the primitive box.

Also specify:

magic=primitive_text—to indicate the string of text to draw.

magic=primitive_color—to indicate the color of the text.

magic=primitive_font—to indicate which font to use.

Can also specify.

magic=primitive_font_size—to change the font size.

magic=primitive_letter_spacing—to change the horizontally spacing between letters.

magic=primitive_line_spacing—to change the vertically spacing between lines.

magic=primitive_h_align—to change how the text is horizontally aligned within the primitive box (i.e. ˆleft, ˆright, ˆcenter, or ˆjustify).

magic=primitive_v_align—to change how the text is vertically aligned within the primitive box.

magic=primitive_stroke_width—to control the stroke width of the font.

ˆtext_outlined

The node represents a block of text, where the text is drawn with an outline around it.

Specify extra properties as for ˆtext, and also:

Also specify:

magic=primitive_outline_color—to indicate the color of the outline.

Can also specify.

magic=primitive_outline_width—to change the width of the outline.

ˆtext_curved

The node represents a block of text, where the text is drawn around the edge of a circle, which fits within the primitive box.

Specify extra properties as for ˆtext, and also:

Can also specify.

magic=primitive_flip—if set to false indicates the text should be centered on top middle of the circle (i.e. and will curve down on either side), if set to true indicates the text should be centered on the bottom middle of the circle (i.e. and will curve up on either side).

ˆsprite

The node represents a sprite (i.e. an image) which is scaled to fit within the width/height of the primitive.

Also specify:

magic=primitive_image—to indicate which image to draw.

ˆsprite_light_map

The node represents a sprite which is drawn with an additive blending effect which is useful for lighting effects.

i.e. dest_pixel=src_pixel+src_pixel*dest_pixel

Specify extra properties as for ˆsprite

ˆsprite_modulated

The node represents a sprite which is drawn with a blending effect where the color of each pixel of the sprite is adjusted by multiplying it by a specified color.

i.e. dest_pixel=src_pixel*color

Specify extra properties as for ˆsprite, and also:

Also specify:

magic=primitive_color—to indicate the color to multiply onto each src_pixel.

ˆsprite_colorized

The node represents a sprite which is drawn with a blending effect where any pixels of the sprite which are totally grey are saturated with a specified color.

i.e.

4. if src_pixel.saturation==0 {

5. dest_pixel.hue=color.hue; dest_pixel.saturation= color.saturation; dest_pixel.lightness=src_pixel. lightness*color.lightness

6.}

7. else dest_pixel=src_pixel

Specify extra properties as for ˆsprite, and also:
Also specify:
  magic=primitive_color—to indicate the color to use to colorize grey pixels.
ˆsprite_repeating
The node represents a sprite where the image is repeated the specified number of times, and then the entire repeated pattern is stretched to fit the width/height of the primitive.
Specify extra properties as for ˆsprite, and also:
Can also specify:
  magic=primitive_repeat_x—to indicate how many times to repeat the image horizontally.
  magic=primitive_repeat_y—to indicate how many times to repeat the image vertically.
ˆsprite_mixed
The node represents a sprite which is drawn with a blending effect whereby the color of each pixel of the sprite is adjusted by weighting it towards a specified color using a specified weight.
i.e. dest_pixel=src.pixel*weight+color*(1−weight)
Specify extra properties as for ˆsprite, and also:
Also specify:
  magic=primitive_color—to indicate the color to use in the algorithm above.
  magic=primitive_weight—to indicate the weight to use in the algorithm above.
ˆsprite_mixed_gourad
The node represents a sprite which is drawn with a blending effect which is the same as for ˆsprite_mixed, except a different weight and color can be specified for each corner, and the weight and color which is used for an individual pixel is calculated by interpolating between each of those corner values. This can be used to achieve gradients.
Specify extra properties as for ˆsprite, and also:
Also specify:
  magic=primitive_color_nw—to indicate the color to use in the north-west corner.
  magic=primitive_color_ne—to indicate the color to use in the north-east corner.
  magic=primitive_color_se—to indicate the color to use in the south-east corner.
  magic=primitive_color_sw—to indicate the color to use in the south-west corner.
  magic=primitive_weight_nw—to indicate the weight to use in the north-west corner.
  magic=primitive_weight_ne—to indicate the weight to use in the north-east corner.
  magic=primitive_weight_se—to indicate the weight to use in the south-east corner.
  magic=primitive_weight_sw—to indicate the weight to use in the south-west corner.
ˆclipbox
The node represents a clip box.
ˆclipbox_masked
The node represents a clip box with a mask.
Also specify:
  magic=primitive_mask—to indicate an image to use as a mask, the mask is stretched to the width and height of the primitive, and can be used to achieve non rectangular clipping
ˆclipbox_modulated
The node represents a clip box where the contents of the clip box are composited on an off screen surface and then rendered onto the screen using the modulated blending effect (see sprite_modulated above).
Specify extra properties as for ˆclipbox and as for ˆsprite_modulated.
ˆclipbox_h_ripple
The node represents a clip box where the contents of the clip box are composited on an off screen surface and then rendered onto the screen with a horizontal ripple applied using a sine wave.
i.e. x=x+sin(y*frequency+offset)*amplitude
Specify extra properties as for ˆclipbox.
Also specify:
  magic=primitive_frequency—to indicate the frequency to use in the algorithm above.
  magic=primitive_amplitude—to indicate the amplitude to use in the algorithm above.
Can also specify:
  magic=primitive_offset—to indicate the offset to use in the algorithm above.
ˆclipbox_mixed
The node represents a clip box where the contents of the clip box are drawn to an off screen surface and then rendered onto the screen using the mixed blending effect (see sprite_mixed above).
Specify extra properties as for ˆclipbox and as for ˆsprite_mixed.
ˆclipbox_mixed_gourad
The node represents a clip box where the contents of the clip box are drawn to an off screen surface and then rendered onto the screen using the mixed_gourad blending effect (see sprite_mixed_gourad above).
Specify extra properties as for ˆclipbox and as for ˆsprite_mixed_gourad.
ˆbounding_box
The node represents a bounding box.
ˆmouse_box
The node represents an invisible box which can be used with the mouse over input event handlers (see below), to allow interactions with the mouse.
Can also specify:
  magic=primitive_mouse_opaque—to cause the primitive to be opaque to the mouse, such that primitives behind it will not receive mouse clicks or the mouse position.

Input Event Handlers

A property whose magic annotation is set to one of the identifiers listed below is an input event handler property. An input event handler property can be added to a node in order to react to input events. A single node can have multiple input event handler properties to allow it to respond to multiple different events. It can also contain more than one of the same type of input event handler property, in which case both handlers will be run in response to that event (see the 'Input Events' section).

The function in the input event handler property will, where applicable, receive parameters which provide details of the event which caused the input event handler to be run. For instance the functions in mouse related input event handlers receive a value which provide details such as the position of the mouse, if it was a double click or not, etc. . . .

A list of magic annotations which can be used to create an input event handler property is given below:

Mouse Over Input Event Handlers

Each of these event handler properties should contain either ˆnone (to do nothing) or a function which receives one parameter of type mouse_over_event (see the 'Types' section of this document).

| | |
|---|---|
| magic = on_left_mouse_down_over | Triggered in response to the left mouse button being clicked whilst the mouse is over this node. |
| magic = on_left_mouse_up_over | Triggered in response to the left mouse button being released whilst the mouse is over this node. |
| magic = on_middle_mouse_down_over | Triggered in response to the middle mouse button being clicked whilst the mouse is over this node. |
| magic = on_middle_mouse_up_over | Triggered in response to the middle mouse button being released whilst the mouse is over this node. |
| magic = on_right_mouse_down_over | Triggered in response to the right mouse button being clicked whilst the mouse is over this node. |
| magic = on_right_mouse_up_over | Triggered in response to the right mouse button being released whilst the mouse is over this node. |
| magic = on_mouse_moved_over | Triggered in response to the mouse being moved whilst the mouse is over this node. |
| magic = on_mouse_scroll_over | Triggered in response to the mouse scroll wheel being used whilst the mouse is over this node. |

Monitored Input Event Handlers

Each of these event handler properties should contain either ˆnone (to do nothing) or a function which receives no parameters.

| | |
|---|---|
| magic = on_login | Triggered in response to a client logging in to the server (just after that client's client_tree is instantiated). |
| magic = on_allow_logout | Triggered in response to a client attempting to logout from the server (for example if the client connection is closed). Once a logout is requested the server will poll this event handler periodically until it returns true. Once the logout is approved, it will then invoke the on_logout event handler (see below), and finally delete the client_tree. |
| magic = on_logout | Triggered in response to a client logging out of the server (just before that client's client_tree is deleted). |
| magic = on_allow_shutdown | Triggered in response to a request to shut the server down. Once a shutdown is requested the server will poll this event handler periodically until it returns true. Once the shutdown is approved, it will then invoke the on_shutdown event handler (see below), and finally shutdown the server. |
| magic = on_shutdown | Triggered in response to a server shutdown (just before the server is shutdown). |
| magic = on_window_focus_gained | Triggered in response to the client window being given focus (i.e. if the client is running the application in windowed mode) |
| magic = on_window_focus_lost | Triggered in response to the client window losing focus (i.e. if the client is running the application in windowed mode) |

Each of these event handler properties should contain either ˆnone (to do nothing) or a function which receives one parameter of type mouse_event (see the 'Types' section of this document).

| | |
|---|---|
| magic = on_left_mouse_down | Triggered in response to the left mouse button being clicked |
| magic = on_left_mouse_up | Triggered in response to the left mouse button being released |
| magic = on_middle_mouse_down | Triggered in response to the middle mouse button being clicked |
| magic = on_middle_mouse_up | Triggered in response to the middle mouse button being released |
| magic = on_right_mouse_down | Triggered in response to the right mouse button being clicked |
| magic = on_right_mouse_up | Triggered in response to the right mouse button being released |
| magic = on_mouse_moved | Triggered in response to the mouse being moved |
| magic = on_mouse_scroll | Triggered in response to the mouse scroll wheel being used |

Each of these event handler properties should contain either ˆnone (to do nothing) or a function which receives one parameter of type key (see the 'Types' section of this document).

| | |
|---|---|
| magic = on_key_down | Triggered in response to a key on the keyboard being pressed |
| magic = on_key_up | Triggered in response to a key on the keyboard being released |

Each of these event handler properties should contain either ˆnone (to do nothing) or a function which receives one parameter of type string (see the 'Types' section of this document).

| | |
|---|---|
| magic = on_character_typed | Triggered in response to a character being typed (this is not the same as pressing a key, as there is not a 1:1 mapping between keys being pressed and characters being typed, e.g. due to use of: caps lock, auto repeat, alt-codes, on screen keyboard etc . . . ). |

Other Property Annotations

Variability Annotation

The variability annotation is used to indicate if the value of a property can be changed from its initial value after the node has been instantiated. It is advantageous to know which properties cannot be changed for many reasons including:

- Properties whose value cannot be changed do not need to be considered or transmitted by the sync algorithm, hence saving processing time, and bandwidth. (The value of the property can just be stored in the data.bundle)
- Properties whose value cannot be changed can be stored in the immutable instance (see the 'Immutable Data' section), hence saving memory.
- It allows the compiler to spot potential programming errors and report an error if the code attempts to modify such a property.
- It potentially allows the result of a property access expression which accesses this property to be inlined by the compiler, making the resulting code more efficient.
- It makes it safe to narrow the type of the property in a patch_property command (see type annotation below).

The property variability annotation can be set to one of four values:

- constant if the value in the property cannot be changed, or
- relocated_constant if the value in the property cannot be changed, but may need to be relocated when the node is first instantiated (see description below).
- dynamic if the value in the property can be changed (and the property stores the same value for every client).
- client_dynamic if the value in the property can be changed, and the property can store different values for different clients. For more details on client_dynamic properties see below.

If the variability annotation is not specified, then the default value of constant is used.

The variability annotation can only be specified on a create_property command, it cannot be patched later.

Relocated Constant Properties relocated_constant is used if the property value cannot be changed, but the type of the property allows it to contain either a time or a reference. This is necessary because these values need to be relocated (see below), when the node is first instantiated.

For values of type time. Say the property's initial value is given by the expression: _event_time+10. The expression _event_time is an expression which gives the apply_time of the event which is causing the expression to be run. Therefore if _event_time is used in a property's initial value expression it gives the apply_time of the event which caused the property to come into existence (i.e. the event which ran the corresponding _new). However the compiler does not know what this time will be so it just stores the time as 10, and then when the node is instantiated the value of each property which contains a time is relocated by adding on the _event_time at that point.

Similarly for values of type reference, if the initial value of the property is a reference to another node (which may be one which will be instantiated at the same time, i.e. which will created by the same _new command), then the compiler does not know the node id that that node will be assigned (as it depends how many other nodes have been assigned before the _new command ran). So the compiler just gives each node an id counting upwards from 0, and sets the values in the reference properties accordingly. Then when the nodes are instantiated and each node is given a node id by the system, a relocation map, (which maps from the node id the compiler guessed, to the node id which was actually assigned), is produced, and each of the properties which contains a value of type reference is relocated using that map, to contain the correct node id.

Therefore, for the above types even if the value cannot change after the node is instantiated, it can still change just as the node is instantiated, which mean less optimisations can be performed (for example: the sync engine still needs to inform the client of the initial value of the property, and the value of the property cannot be stored in the immutable instance as different nodes could store different values). To indicate this the variability of the property is set to at least relocated_constant in this case.

Client_Dynamic Properties

If the variability of the property is specified as client_dynamic, then the property can store a different value for each client. This for example allows parts of a shared interface to be rendered differently for different clients, or allows for nodes which are secret to some clients, and non-secret to others.

In this case the initial value which is specified for the property in the create_property or patch_property command is used as the properties 'default value', (the value the property is initially considered to contain for every client). The default value of the property is constant and cannot be changed once the application is running (although it may still need to be relocated when the node is first instantiated, see discussion of relocated_constant above)

Whenever a property set statement is used to write to the property, only the value of the property for the current client is changed, and whenever a property access expression is used to read the property, the value of the property for the current client is retrieved.

To allow the property to store different values for different clients its values are stored in a hash map (indexed by the node id of the corresponding client's client tree). The hash map contains an entry for each client for which the property's value is not currently the default value.

The 'current client' is determined as follows:

- In the case of function code being run by an input event handler the current client is the client whose input event caused the input event handler to run.
- In the case of function code which is being run by the renderer it is the client whose renderer is running.
- In the case of function code which is being run by write sync (for example if implementing black box properties), it is the client which the value will be synced to.
- In the case of function code being run by an interval event—if the interval_event is defined by a client_dynamic property, it is the client for whom the interval value was set, if the interval_event is defined by a dynamic property, the current client is unavailable, and any attempt to use it may give an error.
- It is also possible to add statements to function code which allow the current client to be queried or changed.

Type Annotation

The type annotation is used to indicate the types of value which a property can take. This is then used by the type resolver to know the type of each property access expression's which access that property.

If the type annotation is not specified, then the type of the property will be inferred from the initial value of the property. (i.e. the type of the property will be set to the type of that initial value). Therefore the type annotation only needs to be specified if creating a property which you wish to be able to store a wider range of types, than that initial type.

The right hand side of the type annotation indicates one of the types listed in the 'Types' section of this document.

The type annotation can be specified on a create_property command.

The type annotation can also be specified on a patch_property command, but only if the property is variability=constant or variability=relocated_constant, and it can only be used to make the property type more restrictive (i.e. it should be a subset of the types the property originally allowed).

Slot Annotations

Storage Annotation

The storage annotation is used to indicate the storage type of the slot, which indicates how many child nodes it can hold, and how they are indexed. There are four possible storage types, single, list, array, and map (see the 'Slots' section).

Depending on the storage type chosen additional parameters are specified. If the storage type is array then the dimensions of the array are provided, and if the storage type is map then the type of the index values which will be used as the keys for the map is specified.

Finally for all storage types except single, it is optionally allowed to specify a label feature, which will be set whenever a child is placed in the slot, (to indicate the index of the child in the slot).

The storage annotation is written in one of the following forms:

storage=single
storage=array[dimension label][dimension label] . . . .
   (where the number of [dimension label] parts provided must be >=1)
storage=list[label]
storage=map[index_type label]
where dimension is an expression of type integer.
where index_type indicates a type (written in the same form as for a property type annotation).
and where label is optional but if provided is an identifier indicating which label (of the slot class), to set when a child is added to the slot.

If the storage annotation is not specified, then the default value of single is used.

The storage annotation can only be specified on a create_slot command, it cannot be patched later.

Class Annotation

The class annotation is used to indicate the type of child node which the slot can contain (the slot class).

The right hand side of the class annotation indicates the slot class, using the same syntax as reference (i.e. the same syntax as that used inside the brackets of a reference type to indicate the node class of the node which the reference points at). For more details see documentation of reference in the 'Types' section of this document.

If the class annotation is not specified, then the slot class will be inferred to be the node class of the children which the slot initially contains. If the create_slot command does not contain any node commands, and therefore does not define any children in the slot, then the slot class cannot be inferred.

The slot can store any node whose node class is the slot class or is a subclass of the slot class.

The class annotation can be specified on a create_slot command.

The class annotation can also be specified on a patch_slot command, but only if the slot is variability=constant or variability=secrecy_dynamic, and it can only be used to make the slot class more restrictive (i.e. it is a subclass of the previous slot class).

Variability Annotation

The variability annotation is used to indicate if the contents of the slot can change (after it is initially populated when the node is instantiated). It is advantageous to know which slots cannot be changed for many reasons including:

Constant slots do not need a modified flag and it is possible to optimise the write sync algorithm to not consider them when there are no new clients.

It allows the compiler to spot potential programming errors and report an error if the code attempts to modify such a slot.

It potentially allows the result of a slot access expression which accesses this slot to be inlined by the compiler, making the resulting code more efficient.

It makes it safe to narrow the slot class of the slot in a patch_slot command (see class annotation above).

It potentially allows the clients_on_last_sync set to be omitted on the children (see optimisation described in the 'Write sync Algorithm' section).

The slot variability annotation can be set to three values:

constant if the children of the slot cannot be changed, AND the secrecy of those children cannot be changed.

secrecy_dynamic if the children of the slot cannot be changed, but the secrecy of at least one child can be changed.

fully_dynamic if the children of the slot can be changed.

Note: even if the contents of the slot cannot be changed, if any of the children in the slot have a dynamic magic=secret property, then the slot is still considered dynamic by the sync algorithm, as those children can still be effectively added/removed from the slot on the client by changing their secrecy, and from the point of view of the sync algorithm the slot contents it needs to transmit can still change. The secrecy_dynamic setting therefore exists to reflect this.

If the variability annotation is not specified, then the default value of constant is used.

The variability annotation can only be specified on a create_slot command, it cannot be patched later.

Conceal Secret Children Annotation

The conceal_secret_children annotation controls how the child list of the slot is transmitted to the client if the slot contains child nodes which are secret to that client.

If this annotation is set to false then the slot is a revealed slot. If a revealed slot contains node(s) that are secret then the client is told that the slot has secret children, and the indexes of those children, but not what those secret children are.

If this annotation is set to true then the slot is a concealed slot. If a concealed slot contains node(s) that are secret then the client is not told about them or their index. So for example the slot may appear empty or to have less entries than it really has. Note: if it is a list slot then this means that for any non-secret nodes which are in the slot the client cannot be sure of the index of their index as it does not know if there are secret nodes earlier in the slot.

Setting this annotation to true will therefore leak less information to the client. However it will cause more known prediction errors as it means the client cannot be sure if the slot is really empty, or how many children it contains (see the 'Prediction Errors' section).

If the conceal_secret_children annotation is not specified, then the default value of false is used.

The conceal_secret_children annotation can only be specified on a create_slot command, it cannot be patched later.

Subset Annotation

The subset annotation is used to indicate which indexes of a slot to fill or modify. (see the 'Build Code' section).

The subset annotation can be used with:
the fill_slot command, and create_slot commands which define a child node.
In this case:
It indicates which indexes of the slot to fill with a child.
It can be used when the slot's storage type is array or map.
If the storage type is array then the subset annotation is optional, if it is not specified then a child is placed in every index of the slot.
The subset annotation can also be used with:
the patch_slot command, and
the unfill_slot command.
In this case:
It indicates the indexes of the children which should be modified.
It can be used when the slot's storage type is array, map, or list.
The subset annotation is optional, if it is not specified then every child of the slot is patched/unfilled.

Quantity Annotation

The quantity annotation is used when filling a list slot with the create_slot or fill_slot command. It indicates how many children to place in the slot. (see the 'Build Code' section)

The quantity annotation can also be used when filling a single slot with the create_slot or fill_slot command. It indicates if a child should be placed in the slot or not.

Label Annotations

Type Annotation

The type annotation is specified on a create_label command to indicate the types of a value which the label can take. This is then used by the type resolver to know the type of label access expression's which access that label.

The type of a label is not inferred, (as there is no initial value to infer it from), so this annotation is specified on each create_label command.

The right hand side of the type annotation indicates one of the types listed in the 'Types' section of this document.

Variability Annotation

The variability annotation can be specified on a create_label command.

A label can be set to either constant or dynamic.

If the label is constant then it cannot changed after the node is created. It therefore follows that a label cannot be constant if it is referred to by the storage annotation of a dynamic slot, (as it would not be possible to correctly adjust that label if the node was moved into that slot).

Header Annotations

Path Alias Annotation

The path_alias annotation can be used to define an alias which can then be used anywhere in the current file to refer to another file more concisely.

The path_alias annotation is written in the form:
path_alias=short_name, full_path_to_file An example of a path_alias annotation is:
path_alias=client_tree, path/to/client_tree.prototype The example above then allows places in the current file which wants to refer to path/to/client_tree.prototype to specify it by just writing it client_tree as opposed to having to provide the full path each time.

The short_name can be any identifier, it does not have to be related to the actual file name.

The header can contain multiple path_alias annotations, hence allowing multiple aliases to be defined.

It is allowed to create more than one path_alias to the same destination file, however each alias in a single header has a unique short_name.

GLOSSARY abstract syntax tree—The tree of syntax nodes which is produced by the parser step of the compiler.

ancestor—If node A is a descendant of node B, then node B is an 'ancestor' of node A.

annotation—Additional information which can be provided with regards to a feature to control how that feature behaves or is compiled, or to indicate what the data stored in that feature represents/controls.

application—A program which may be being run.

apply_time—The time at which a particular event will run.

AST—see abstract syntax tree authoritative orchard—The version of the orchard on the client as last received from the server, with no predictions applied.

body node—A body node is a node which is created by a body{ } command. In a function the body node is the node created by the body{ } command in the file in which the function was originally defined.

build code—The language which is used to describe the initial state of the orchard.

child—A node which is directly inside another node (because it is stored in a slot of that node), is referred to as a 'child' of that node.

client—The software and/or hardware which connects to the server, and allows the application to be viewed and interacted with. This can be run remotely to the server, or it can be run on the same machine.

client node id—A temporary node id which is generated by the predictor on the client in place of the real node id, when the predictor predicts the creation of a new node.

clients_on_last_sync—Part of the last_sync_data.

client tree—A tree which represents a single client's display, and contains state private to that client.

clients_with_removed_node—Part of the last_sync_data.

current client—Indicates on which clients behalf function code is currently being executed. See 'client_dynamic properties' section.

descendant—The nodes which are directly or indirectly inside another node are referred to as 'descendants' of that node.

developer—A person utilising this invention to create an application.

event—either an input event, or an interval event.

event handler—either an input event handler, or an interval property.

event id—a unique id which is assigned to each input event handler/interval event, which is calculated in such a way as to be likely to be correctly predicted.

event queue—A queue of all the events which are scheduled but have not yet been run.

_event_time—When function code is being executed the '_event_time' is the apply_time of the event which caused that function code to run. Or in the case of function code being run by the renderer the render_time.

feature—Each node has features which allow it to store data, and allow it be contain other nodes and hence form a tree, there are 3 types of features, 'properties', 'slots', and 'labels'.

function code—The language used to indicate the initial value of each property, and used inside functions to describe how the orchard should respond to events.

function modifier—An attribute which can be specified as part of a function type or function value, which indicates something about the behavior of that function. (i.e. a bit like an annotation, except attached to a function as opposed to a feature).

imutable id—A numerical identifier which uniquely identifies a particular immutable instance.

immutable instance—A data structure which contains the constant values for a particular node, and allows two node instances with the same constant values to share the same immutable instance, hence saving memory.

immutable node—An immutable node is a node which a) has no dynamic features (i.e. the slots, properties, and labels are all variability=constant), and b) all the descendants of that node are also imutable nodes.

immutable slot—A constant slot which only contains immutables nodes.

index—The index of a node indicates the position of the node in the slot it is in. The index is available to be read from the node if a label feature is used.

input event—An event generated by the user by utilising an input device (such as a mouse or keyboard).

input event handler—A property whose magic annotation is set to one of the identifiers listed in (input event handlers).

mouse over input event handler—A property whose magic annotation is set to one of the identifiers listed in (Mouse over input event handlers).

monitored input event handler—A property whose magic annotation is set to one of the identifiers listed in (Monitored input event handlers).

insertion_delta—The amount to add on to the client's clock to calculate the insertion_time.

insertion_time—The time which the client predicts the server's clock will read, when currently occurring events arrive at the server.

interval—A value of type interval.

interval event—An event which occurs at a specified time, created due to the presence of an interval property which contains a value of type interval.

interval event set—An item which is generated and placed into the event queue, to run all the interval events for a specific time (the event queue does not hold interval events directly).

interval property—A property with the magic=interval annotation.

known prediction error—A prediction error which is generated due to the client attempting to calculate something which it knows it cannot predict reliably. See the 'Prediction Errors' section.

label—A type of feature which is automatically set to always contain the current index of the node as it is moved between slots. If the node is in a multi-dimensional array slot more than one label may be desired.

label variability types: (determined by the variability=annotation)

constant label—a label whose value cannot change, which will always have the same initial value.

dynamic label—a label whose value can change.

last_sync_data—A structure which contains all the temporary data stored by write_sync for a particular node instance.

list_changes—Part of the last_sync_data.

magic property—A property with the 'magic=' annotation, and therefore whose value will impart special meaning to the server or client.

modified flags—Part of the last_sync_data.

monitored node index—An index of which nodes in the orchard contain monitored input event handler properties for each client.

mouse_over_nodes—A list of which mouse_box nodes the mouse was over at the time a particular input event was generated.

node/node instance—A basic building block of the orchard, multiple nodes are connected together to form trees.

node class—A list of features which a particular node has (but not the values or contents of those features), and the annotations of those features.

node class id—A numerical identifier which uniquely identifies a particular node class.

node command—A command which contributes to the class and/or initial state of a node.

node id—A numerical identifier which uniquely identifies a particular instance of a node.

node_map—A map which stores every node indexed by its node id.

parent—If node A is a child of node B, then node B is the 'parent' of node A.

predictable node id—See the Predictable Node IDs' section.

prediction orchard—A version of the orchard on the client to which predictions are applied. This is the version which is rendered.

property—A type of feature which can store a single value. A node can have multiple properties to store multiple values, or a container value (such as an array or stack) can be used to combine multiple values into a single value.

property id—A numerical identifier which uniquely identifies a particular property within a node class.

property variability types: (determined by the variability=annotation)

constant property—a property whose value cannot change, which will always have the same initial value.

relocated constant property—a property whose value cannot change, but whose initial value depends on when/where the property was created.

dynamic property—a property whose value can change.

client_dynamic property—a property whose value can change, and which can store a different value for each client. (the 'default value' of such a property is the value which will be seen by a client if a specific value has not been set for the client).

protocol—Determines how to transmit information between the server and client, and how that information is encoded.

read_sync—An algorithm which runs on the client to receive the orchard transmitted from the server.

render_time—A time which the client is predicting to. Event's whose apply_time is <=render_time are run by the predictor to update the prediction orchard, before rendering the display.

root node—A root node is a node which is at the top of a tree and therefore does not have a parent.

sample—An amplitude measurement at a single point in time in a wave file. For example a 44.1 khz wave file which is 1 second long will contain 44100 samples. Note: the wave could be multi-channel (e.g. stereo), in which case a single sample will contain an amplitude measurement for each channel.

sample position—The distance through a sound/wave measured in samples. For example for a 44.1 khz wave, 88200 would represent exactly 2 seconds in from the start.

self node—In a function the self node is the node in which the function was originally defined.

server—Software and/or hardware which runs the application.

shared tree—A tree which represents shared areas multiple clients can see, and state shared by multiple clients or which needs to persist even when no clients are connected.

slot—A type of feature which can contain one or more node.

slot class—Indicates which children can be placed in the slot. A child can only be placed in the slot if that child's node class equals the slot class or is a sub class of the slot class.

slot id—A numerical identifier which uniquely identifies a particular slot within a node class.

slot types: (determined by the storage-annotation)

single slot—A slot which can only store one node or can be empty.

list slot—A slot which can store multiple nodes in an ordered list.

array slot—A slot which stores a fixed number of nodes in an array.

map slot—A slot which can store multiple nodes in a hash map.

slot conceal types: (determined by the conceal_secret_children annotation)

concealed slot—A slot with a conceal_secret_children annotation which is true.

revealed slot—A slot without a conceal_secret_children annotation or whose conceal_secret_children annotation is false.

slot variability types: (determined by the variability=annotation)

constant slot—A slot where which children the slot contains cannot be changed.

dynamic slot—A slot where which children the slot contains can be changed, (i.e. child nodes can be moved in and out the slot)

sync packet—The packet of data which is built up the write sync algorithm to provide/update the authoritative orchard for a particular client.

syntax node—Represents a programming language construct from the build code which describes the application. Syntax nodes are connected together to form the abstract syntax tree. Not to be confused with a 'node'.

the orchard—A data structure which represents the current state, the behavior, and the display of the application.

thin client approach—A specific implementation of the server, client and protocol, which works by transmitting a video stream from the server to the client, and transmitting input events from the client to the server, without needing any understanding of the specific application being run.

tree—A collection of nodes. Multiple trees together form the orchard. There are two type of tree client trees and the shared tree.

user/player—A person utilising a client to view and interact with the application.

write_sync—An algorithm which runs on the server to transmit the orchard to the client.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

We claim:

1. A computer implemented method at a server comprising:

executing, at a processor of the server, a graph of connected nodes that encode a state, a behavior and, a plurality of graphical and/or audio displays of an application, at least some of the nodes being indicated as secret with respect to one or more clients of a plurality of clients;

receiving data from the plurality of clients connected to the server over a communications network, individual ones of the plurality of clients executing a copy of at least part of the graph of connected nodes received from the server such that at least part of at least one of the graphical and/or audio displays is rendered at individual ones of the plurality of clients;

from time to time computing update commands arranged to update the copies of the graph at one or more of the plurality of clients on the basis of changes to the graph of connected nodes at the server which occur as a result of the execution, wherein computing the update commands to be sent to one of the clients comprises skipping nodes of the graph of connected nodes at the server which are secret to the client;

transmitting, several times a second, synchronization packets comprising the update commands to one or more of the plurality of clients over the communications network; and wherein a first one of the plurality of clients executes a first part of the graph of connected nodes and a second one of the plurality of clients executes a second part of the graph of connected nodes, the first and second parts being different subsets of the graph of connected nodes.

2. A method as claimed in claim 1 wherein the graph of connected nodes comprises a sub graph for individual ones of the plurality of clients, the sub graph encoding a part of the graphical and/or audio displays which is private to that client; and a shared sub graph encoding: at least parts of the graphical and/or audio displays which are capable of being rendered at more than one of the plurality of clients, and state of the application shared by more than one of the plurality of clients.

3. A method as claimed in claim 1 wherein at least one of the nodes comprises one or more properties, and at least one of the nodes comprises one or more slots, wherein a property is capable of comprising a function, and at least one of the slots comprises another node.

4. A method as claimed in claim 1 comprising determining that configuration or contents of some nodes cannot change during the executing and, as a result, reducing the size of the synchronization packets and/or reducing the computation of the update commands.

5. A method as claimed in claim 1 comprising determining that some portions of the graph of connected nodes have not changed since a last synchronization packet was transmitted to individual ones of the plurality of clients and, as a result, reducing the size of the synchronization packets and/or reducing the computation of the update commands.

6. A method as claimed in claim 1 comprising determining that some portions of the graph of connected nodes are not present at any of the plurality of clients and, as a result, reducing the computation of the update commands.

7. A method as claimed in claim 1 comprising receiving, at the server, a plurality of event objects from one or more of the plurality of clients, each of the event objects having an apply time being a time at which the event object is to be applied to the graph of connected nodes, and executing functions at properties of nodes of the graph according to the event objects and the apply times.

8. A method as claimed in claim 7 comprising placing the event objects into an event queue, the queue also comprising event objects arising from internal events generated from the graph of connected nodes and which execute as a result of time passing.

9. A method as claimed in claim 1 comprising receiving, at the server, a plurality of event objects from one or more of the plurality of clients, each of the event objects having an apply time being a time at which the event object is to be applied to the graph of connected nodes, and clamping the apply time at the server so the apply time is not in the past.

10. A method as claimed in claim 1 comprising receiving, at the server, a plurality of event objects from one or more of the plurality of clients, each of the event objects having an apply time being a time at which the event object is to be applied to the graph of connected nodes, and modifying the apply time at the server so the apply time is not in the future by more than a threshold amount.

11. A method as claimed in claim 1 comprising calculating prediction metrics for individual ones of the plurality of clients and adding the prediction metrics to the synchronization packets, the prediction metrics comprising at least an estimate of an insertion delta which is a value that compensates for both network latency and time difference between a clock on the server and a client clock.

12. A server comprising:
a processor arranged to execute a graph of connected nodes that encode a state, a behavior and, a plurality of graphical and/or audio displays of an application, at least some of the nodes being indicated as secret with respect to one or more clients of a plurality of clients;
an input arranged to receive data from the plurality of clients connected to the server over a communications network, individual ones of the plurality of clients executing a copy of at least part of the graph of connected nodes received from the server such that at least part of at least one of the graphical and/or audio displays is rendered at individual ones of the plurality of clients, a first one of the plurality of clients executing a first part of the graph of connected nodes and a second one of the plurality of clients executing a second part of the graph of connected nodes, the first and second parts being different subsets of the graph of connected nodes;
the processor arranged to compute update commands arranged to update the copies of the graphs at one or more of the plurality of clients on the basis of changes to the graph of connected nodes at the server which occur as a result of the execution, wherein computing the update commands to be sent to one of the clients comprises skipping nodes of the graph of connected nodes at the server which are secret to the client;
a communications interface arranged to transmit, several times a second, synchronization packets comprising the update commands to one or more of the plurality of clients over the communications network.

13. A computer implemented method at a client comprising:
executing, at a processor of the client, a copy of at least part of a graph of connected nodes that encode a state, a behavior and, a graphical and/or audio display of an application, the copy of at least part of the graph of connected nodes having been received from a server executing the whole graph of connected nodes, the whole graph of connected nodes comprising at least some nodes indicated as secret with respect to the client;
several times a second, receiving from the server over a communications network, synchronization packets, each packet comprising update commands computed by skipping nodes of the whole graph of connected nodes at the server which are secret to the client;
executing the update commands to update the copy of the at least part of the graph of connected nodes;
rendering the graphical and/or audio display of the application at the client on the basis of the updated copy; and
wherein the copy of at least part of the graph of connected nodes executed at the client is a different subset of the graph of connected nodes from another subset of the graph of connected nodes executed at another client of the server.

14. A method as claimed in claim 13 comprising receiving a user input event at the client and generating an event object comprising an apply time being a time at which the event object is to be applied to the graph of connected nodes at the server; and applying the event object to a prediction copy of the copy of the at least part of the graph of connected nodes.

15. A method as claimed in claim 13 comprising storing, at the client, a prediction copy of the copy of the at least part of the graph of connected nodes.

16. A method as claimed in claim 15 comprising, in response to executing the update commands, checking for errors in the prediction copy and correcting the errors.

17. A method as claimed in claim 15 comprising rendering the graphical and/or audio display by finding nodes which represent graphical primitives in at least part of the prediction copy of the graph of connected nodes.

18. A method as claimed in claim 13 comprising finding at least one node having a viewport property which refers to a node of a shared part of the whole graph of connected nodes at the server, the shared part of the whole graph being available to at least one other client.

19. A client computer comprising:
- a processor arranged to execute a copy of at least part of a graph of connected nodes that encode a state, a behavior and, a graphical and/or audio display of an application, the copy of at least part of the graph of connected nodes having been received from a server executing the whole graph of connected nodes, the whole graph of connected nodes comprising at least some nodes indicated as secret with respect to the client;
- a communications interface arranged to receive, several times a second, from the server, over a communications network, synchronization packets, each packet comprising update commands computed by skipping nodes of the whole graph of connected nodes at the server which are secret to the client;
- the processor arranged to execute the update commands to update the copy of the at least part of the graph of connected nodes;
- the processor arranged to render the graphical and/or audio display of the application at the client on the basis of the updated copy; and
- wherein the copy of at least part of the graph of connected nodes executed at the client is a different subset of the graph of connected nodes from another subset of the graph of connected nodes executed at another client of the server.

\* \* \* \* \*